US012801611B2

(12) United States Patent
Bove et al.

(10) Patent No.: US 12,801,611 B2
(45) Date of Patent: Nov. 17, 2026

(54) MERGING SWITCH BLOCKS IN A DATABASE SYSTEM

(71) Applicant: Ocient Holdings LLC, Chicago, IL (US)

(72) Inventors: Samuel Peter Bove, Chicago, IL (US); Ellis Mihalko Saupe, University City, MO (US); Jason Arnold, Chicago, IL (US); Andrew Park, St. Charles, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 19/261,000

(22) Filed: Jul. 7, 2025

(65) Prior Publication Data

US 2025/0335446 A1 Oct. 30, 2025

Related U.S. Application Data

(63) Continuation of application No. 18/326,305, filed on May 31, 2023, now Pat. No. 12,353,418.

(60) Provisional application No. 63/367,270, filed on Jun. 29, 2022.

(51) Int. Cl.
*G06F 16/2455* (2019.01)
*G06F 16/2453* (2019.01)

(52) U.S. Cl.
CPC .... *G06F 16/2456* (2019.01); *G06F 16/24544* (2019.01)

(58) Field of Classification Search
CPC ........................ G06F 16/2456; G06F 16/24544
See application file for complete search history.

(56) References Cited

U.S. PATENT DOCUMENTS

2018/0157707 A1* 6/2018 Lurie ................ G06F 16/24539

OTHER PUBLICATIONS

Gryz, Queries with CASE expressions, J Intell Inf Syst 34, pp. 345-366 (Year: 2010).*
Mullins, SQL Statements Replacing UNION with CASE, pp. 1-4, Nov. 2017.*
KMG Technology, 8 Practical Tips for an ETL Solution, pp. 1-11 (Year: 2018).*

* cited by examiner

*Primary Examiner* — Albert M Phillips, III
(74) *Attorney, Agent, or Firm* — Garlick & Markison; Timothy W. Markison

(57) ABSTRACT

A database system is operable to determine a query that includes a join expression for execution. A set of input rows are dispersed for processing via a plurality of parallelized join processes in conjunction with executing the join expression based on identifying a first proper subset of the set of input rows based on a null-handling strategy. First rows in the first proper subset are dispersed for processing across the plurality of parallelized join processes in accordance with the null-handling strategy, second rows in a set difference between the set of input rows and the first proper subset are dispersed across the plurality of parallelized join processes in accordance with a join key-based assignment strategy. The set of input rows are processed via the plurality of parallelized join processes.

18 Claims, 67 Drawing Sheets database system 10 computing device 18 computing device 18 computing device 18 node 37 node 37 node 37 node 37 data set query processing system 2510 query execution module
2504 database system 10 database system 10 query execution module 2504 join process 2530 join process 2530 query execution module 2504 database system 10 database system 10 database system 10 database system 10 database system 10 query execution module 2504 query execution module 2504 query execution module 2504 query execution memory resources 3045 database system 10 join process 2530 join process 2530 database system 10 database system 10 database system 10 operator flow generator module 2514

MERGING SWITCH BLOCKS IN A DATABASE SYSTEM

CROSS-REFERENCE TO RELATED APPLICATIONS

The present U.S. Utility Patent Applications claims priority pursuant to 35 U.S.C. § 120 as a continuation of U.S. Utility application Ser. No. 18/326,305, entitled "HANDLING NULL VALUES IN PROCESSING JOIN OPERATIONS DURING QUERY EXECUTION", filed May 31, 2023, issuing on Jul. 8, 2025 as U.S. Pat. No. 12,353,418, which claims priority pursuant to 35 U.S.C. § 119 (e) to U.S. Provisional Application No. 63/367,270, entitled "OPERATOR EXECUTION OPTIMIZATIONS IN DATABASE SYSTEMS", filed Jun. 29, 2022, all of which are hereby incorporated herein by reference in their entirety and made part of the present U.S. Utility Patent Applications for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

DETAILED DESCRIPTION OF THE INVENTION

Figure 1:
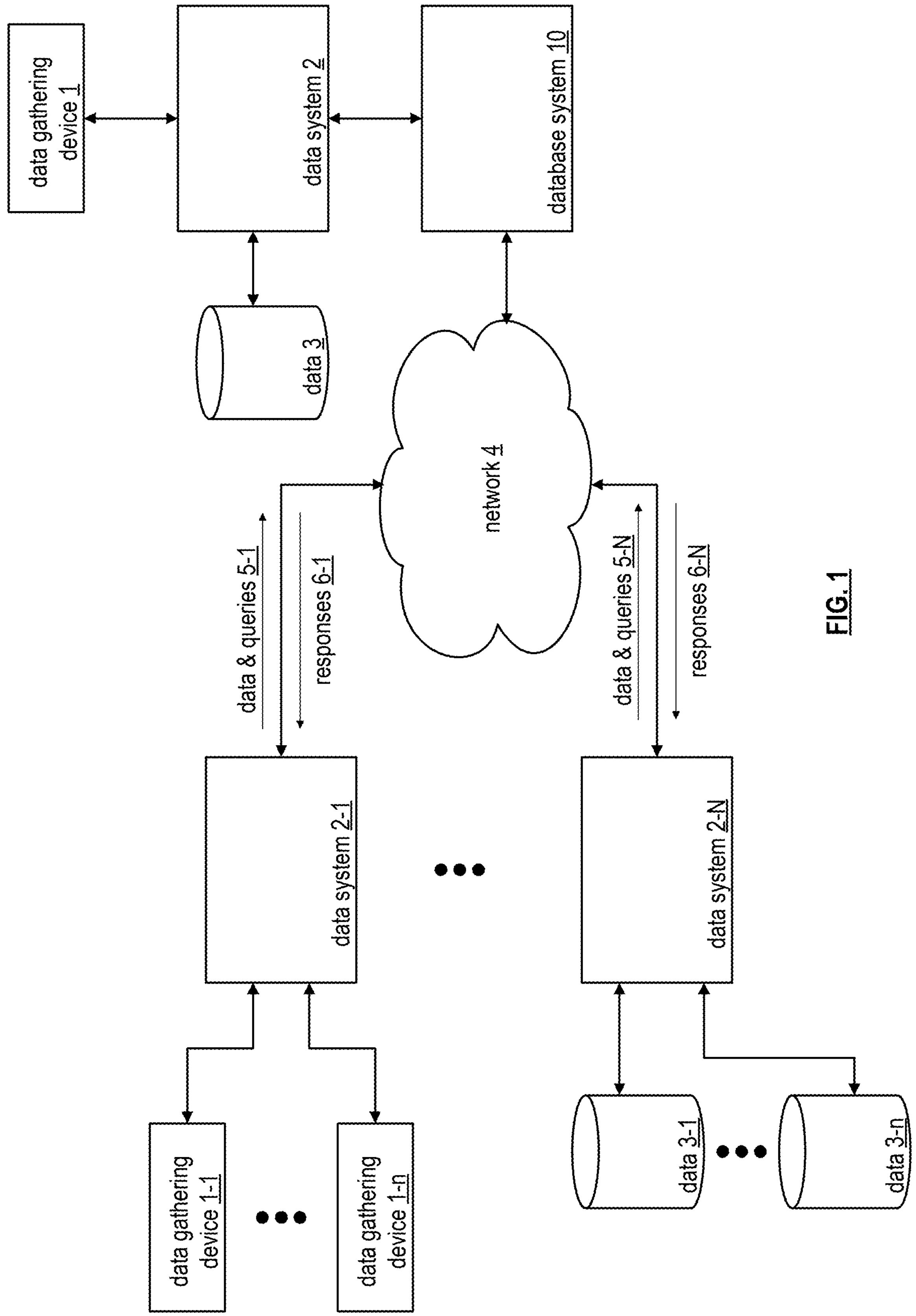
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
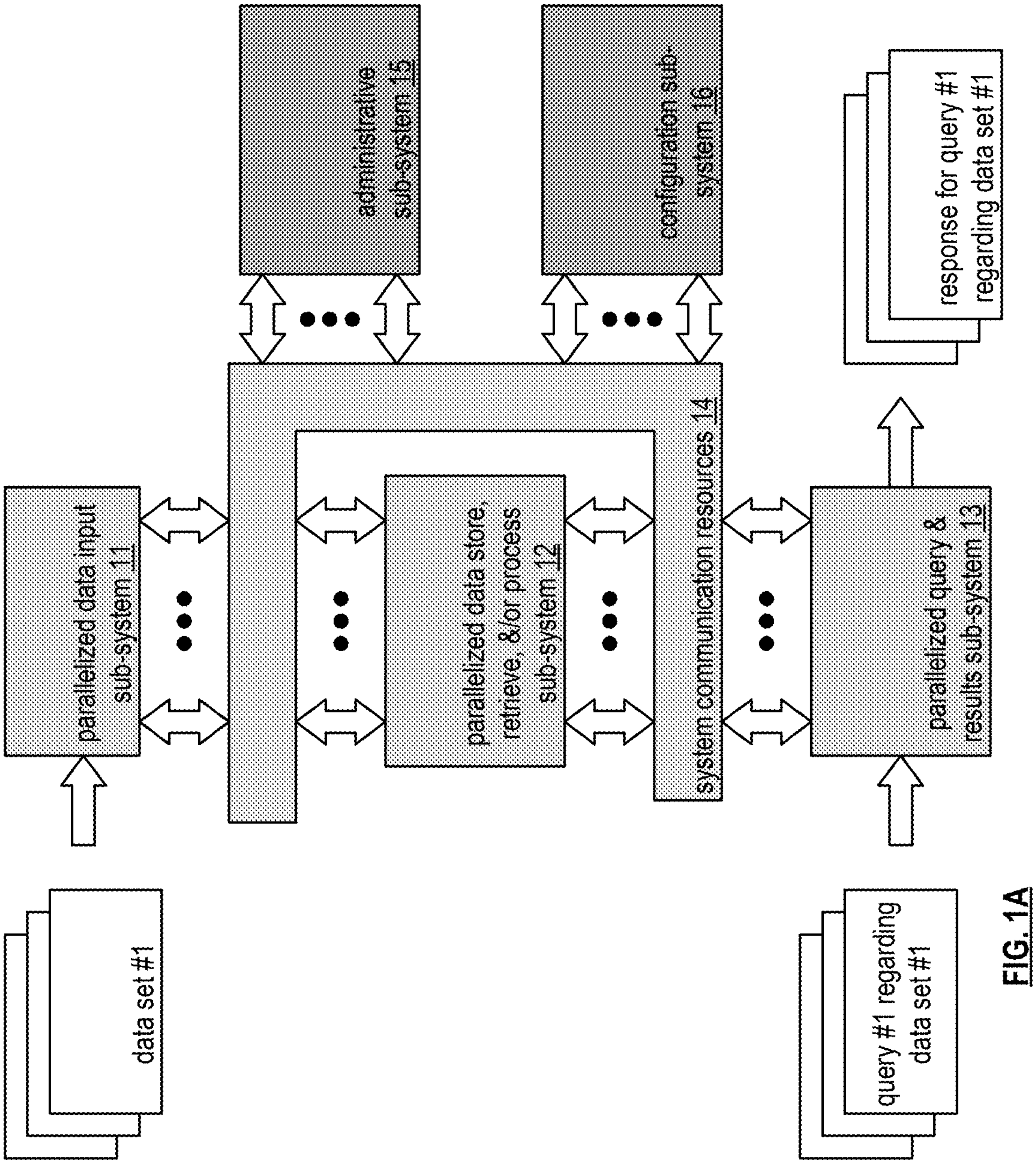
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
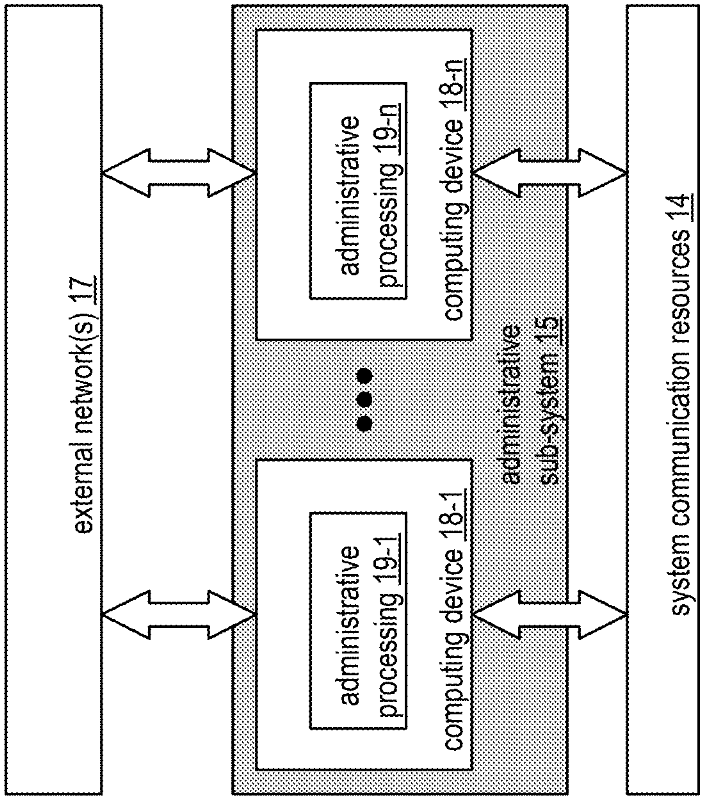
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-*n*. Each of the computing devices executes an administrative processing function utilizing a corresponding administrative processing of administrative processing 19-1 through 19-*n* (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
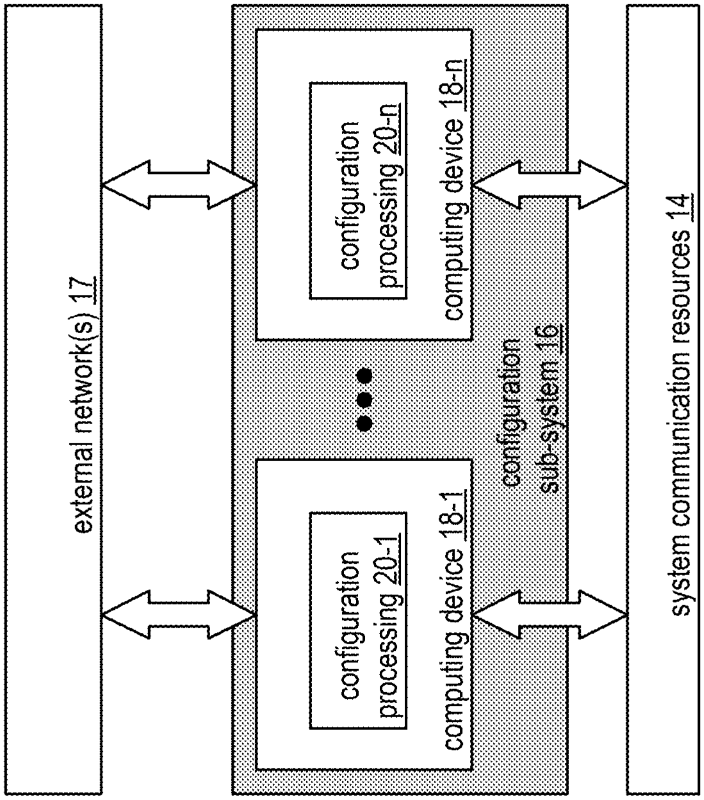
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
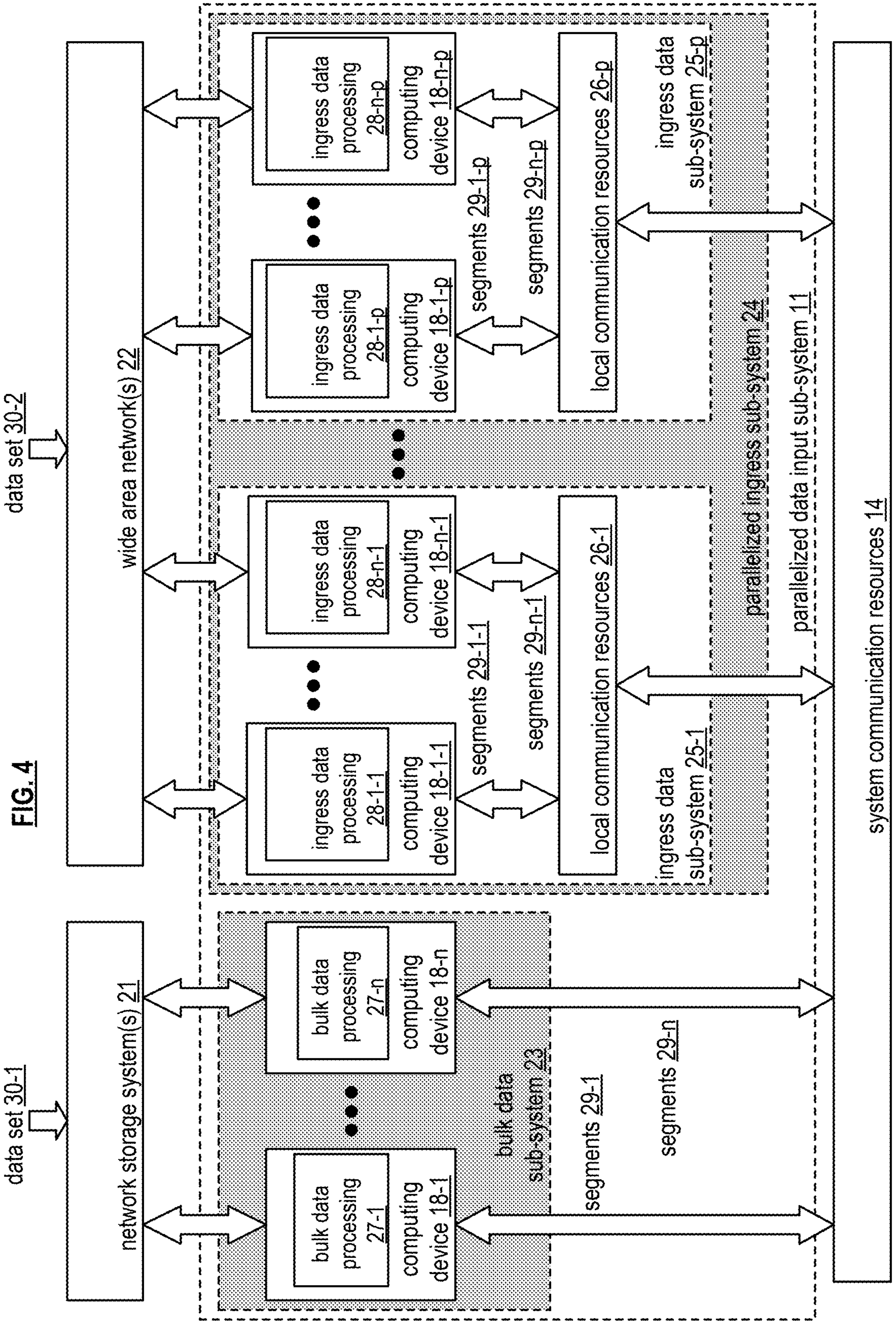
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
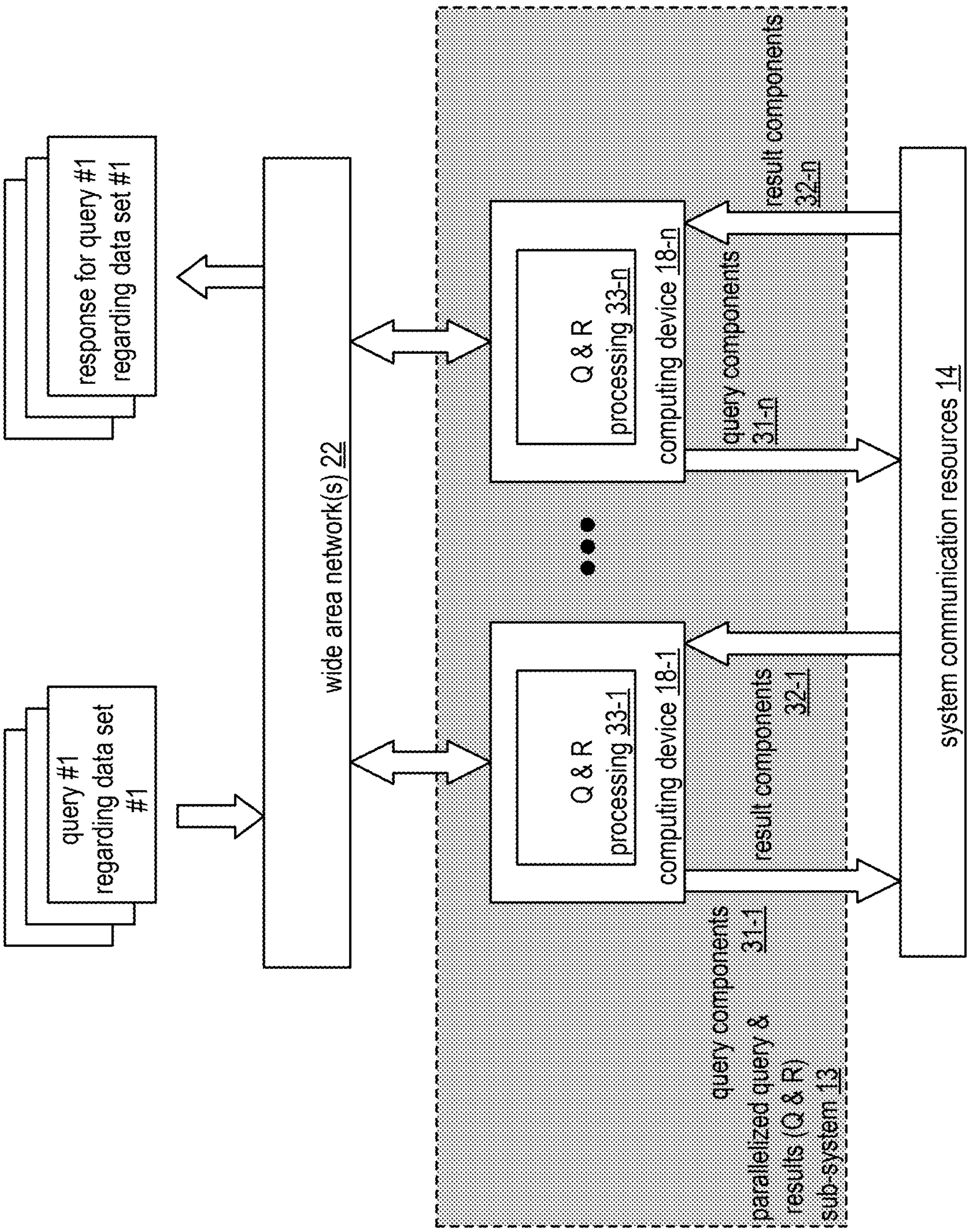
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
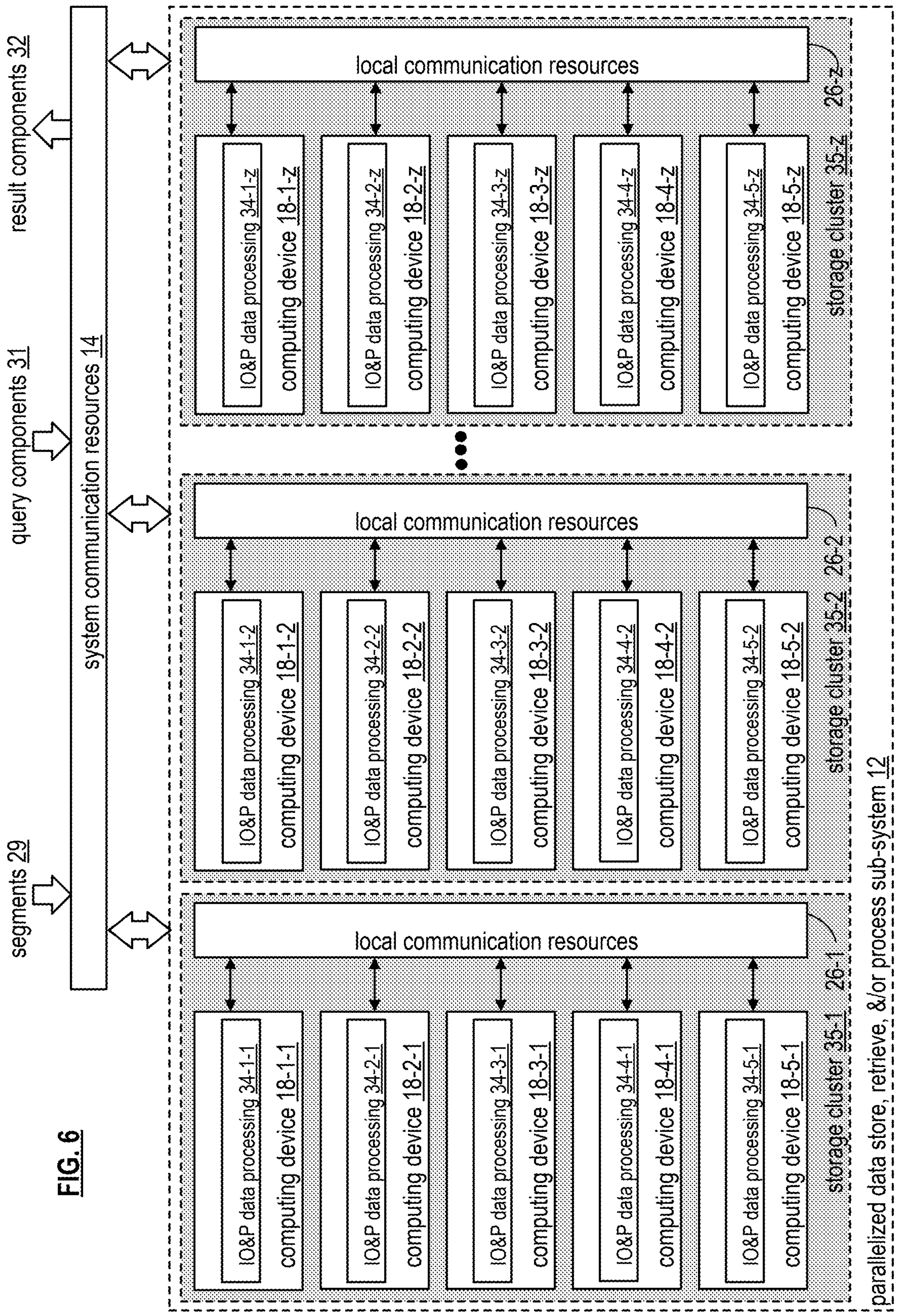
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partition is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
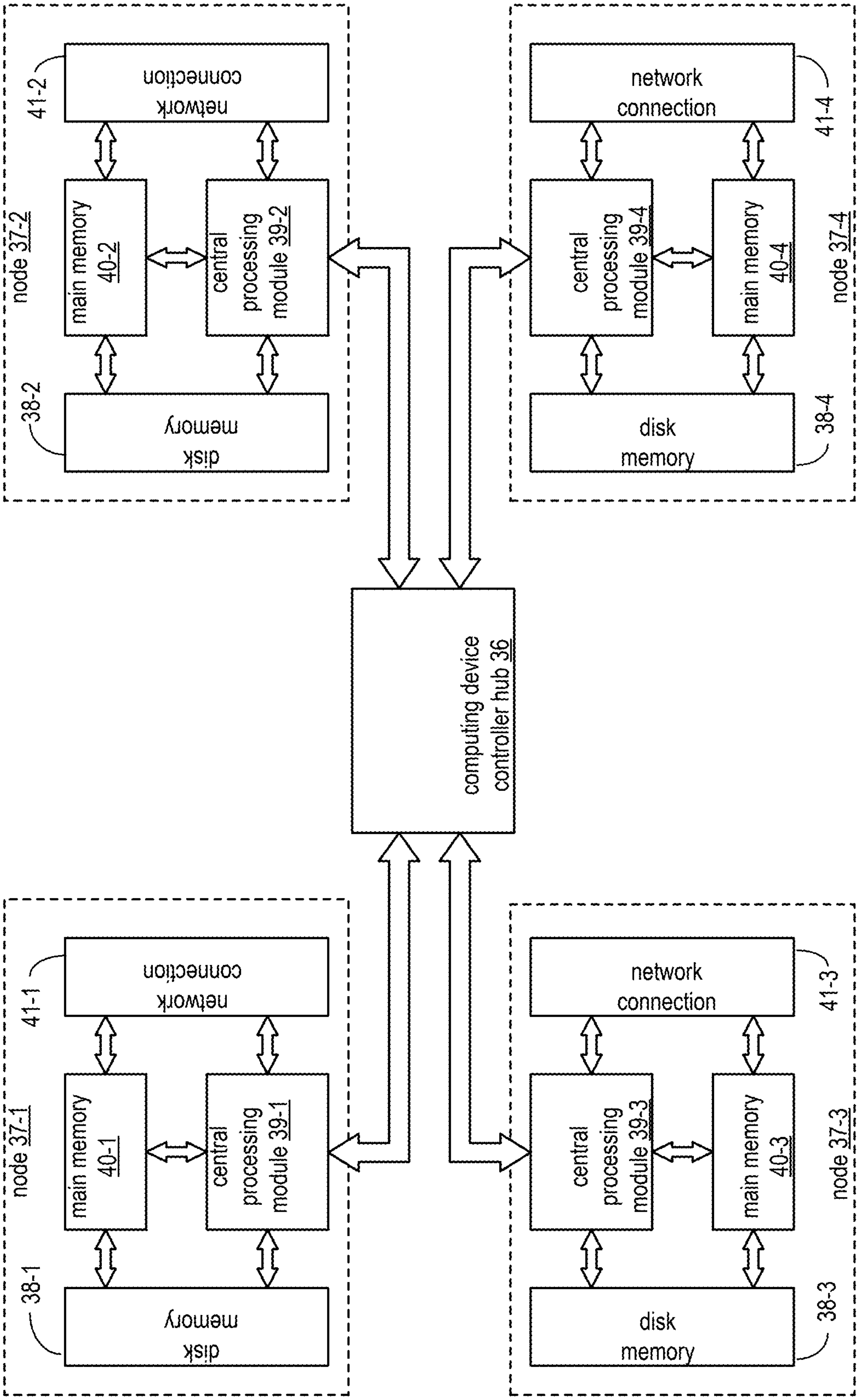
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
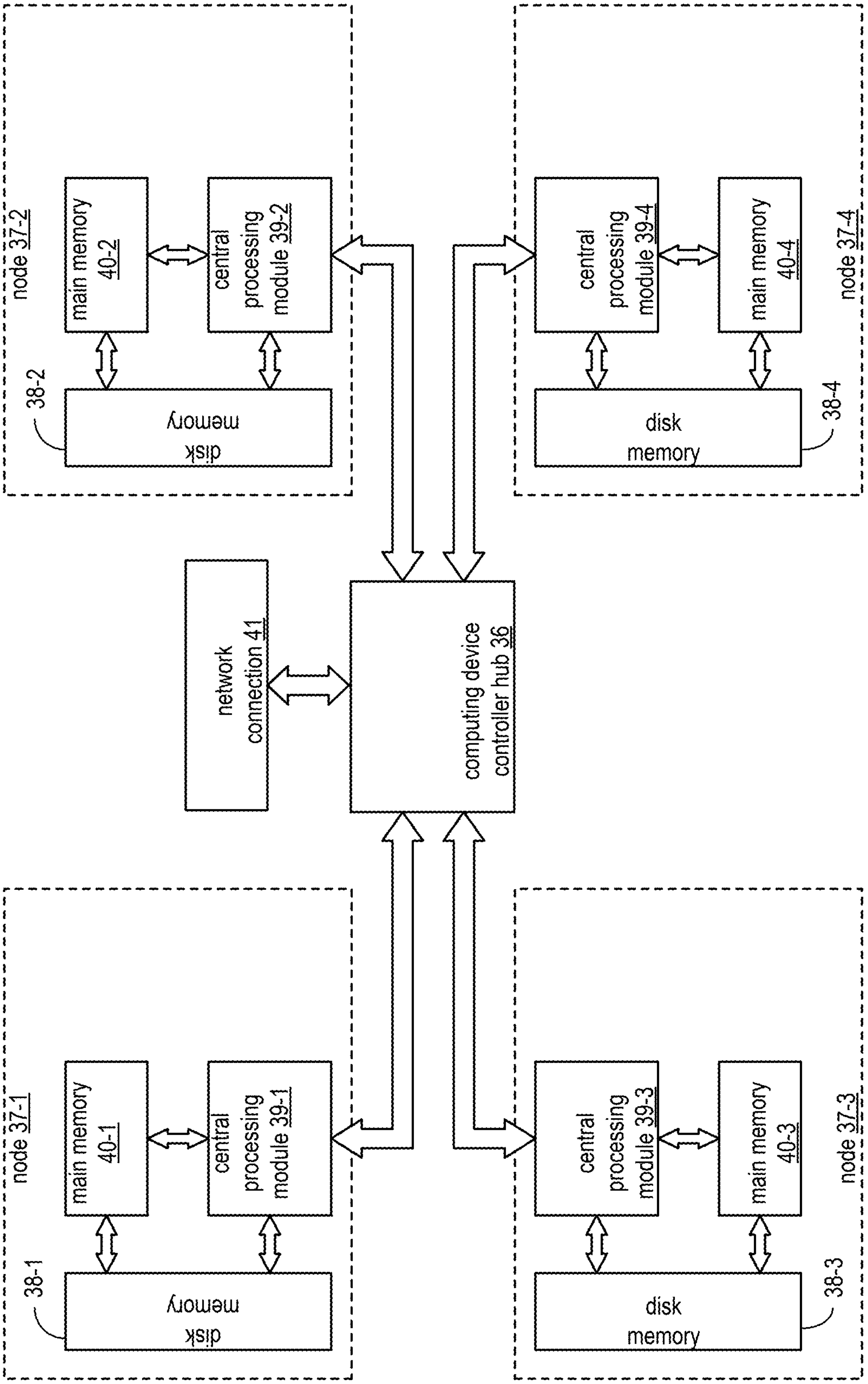
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
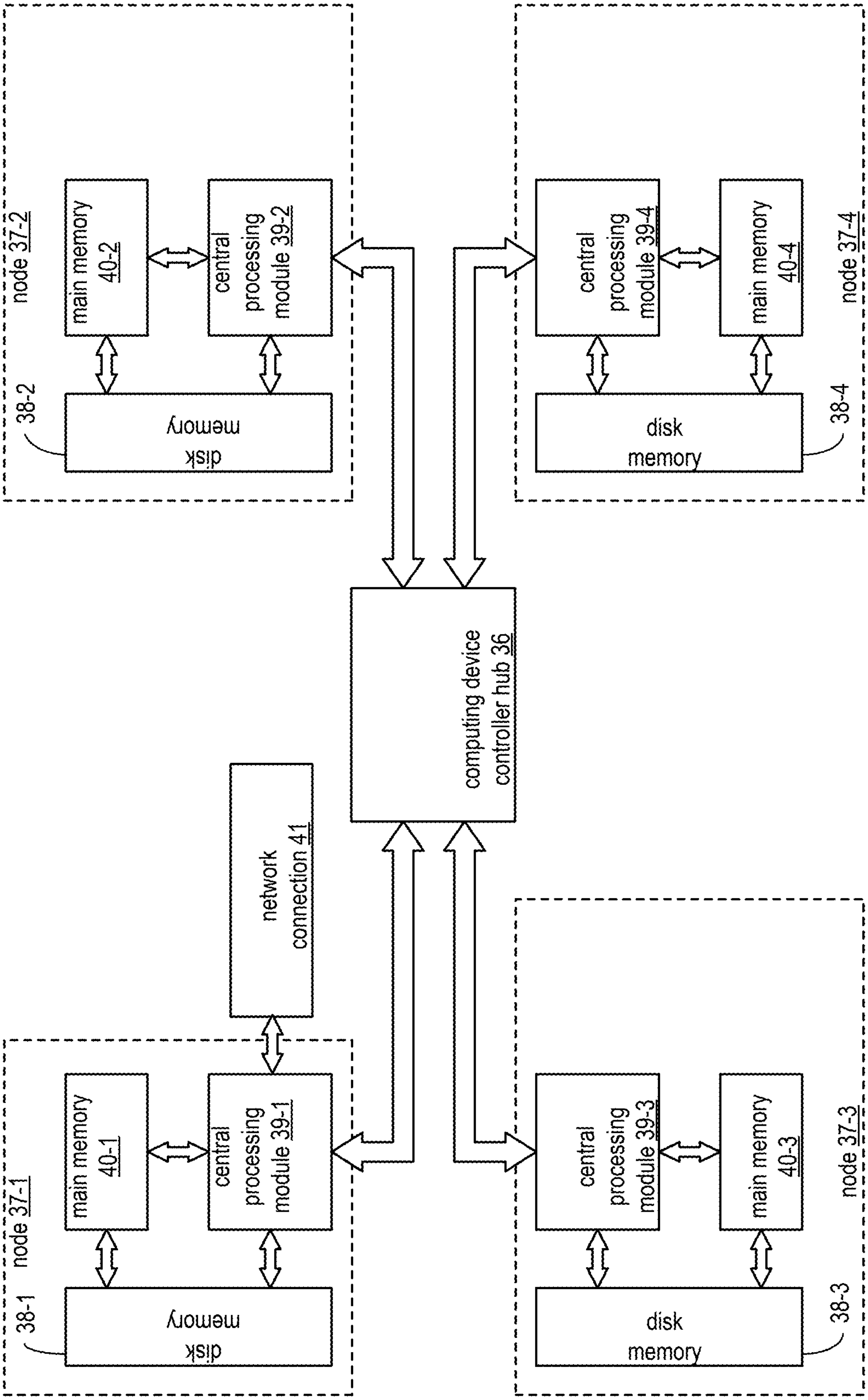
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
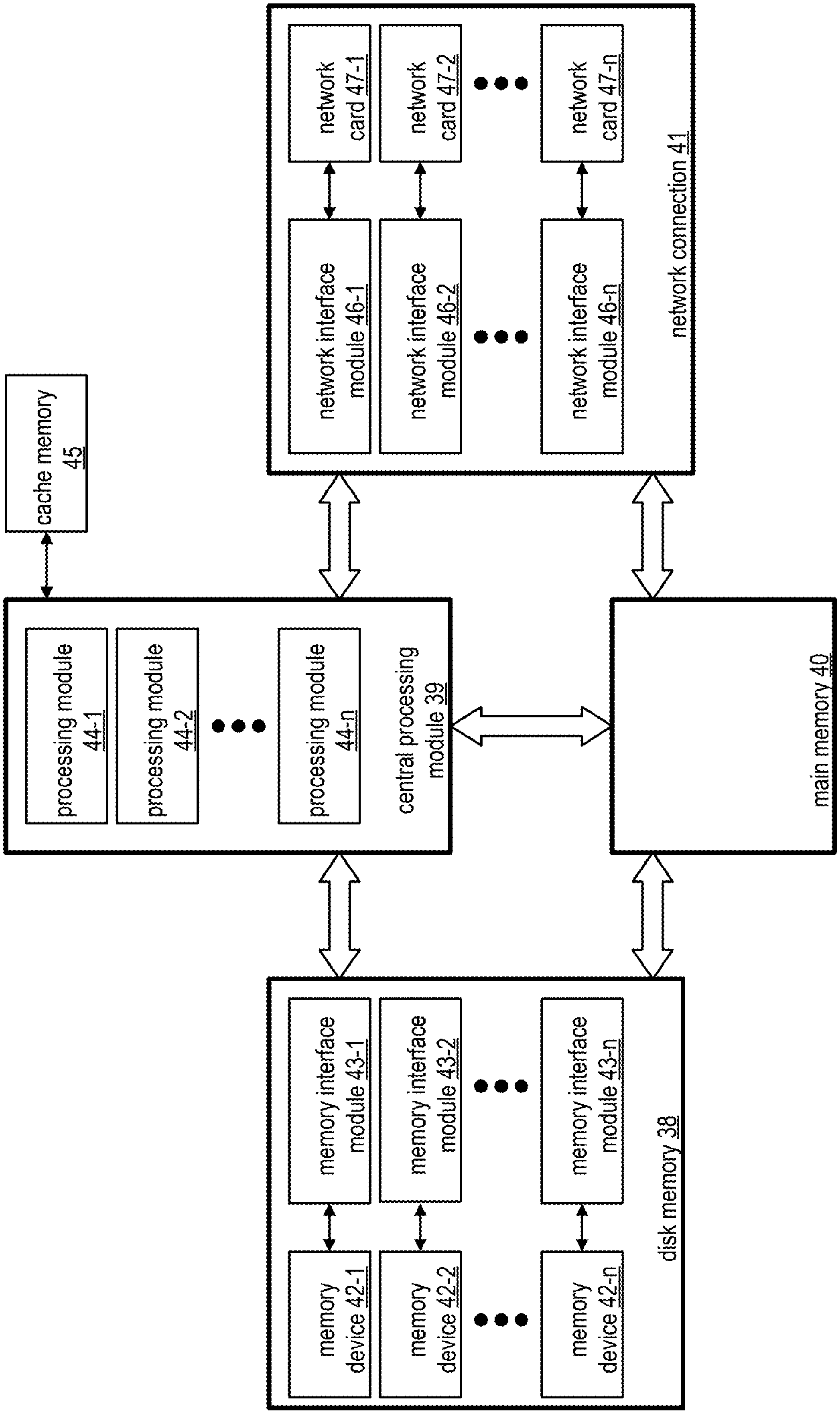
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through **44-*n* and an associated one or more cache memory 45**. A processing module is as defined at the end of the detailed description.

The disk memory 38 includes a plurality of memory interface modules 43-1 through **43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n*** is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through **46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
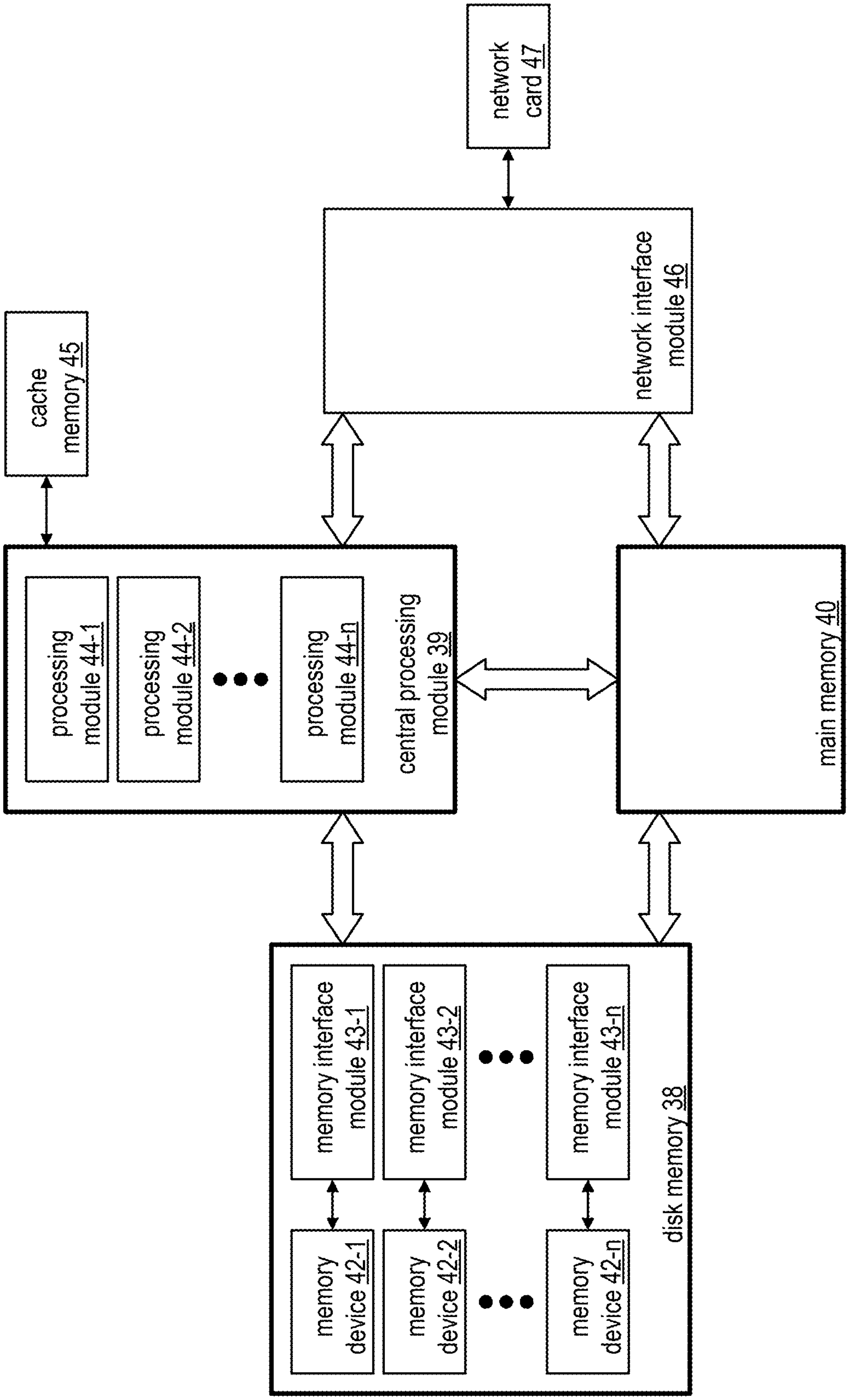
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
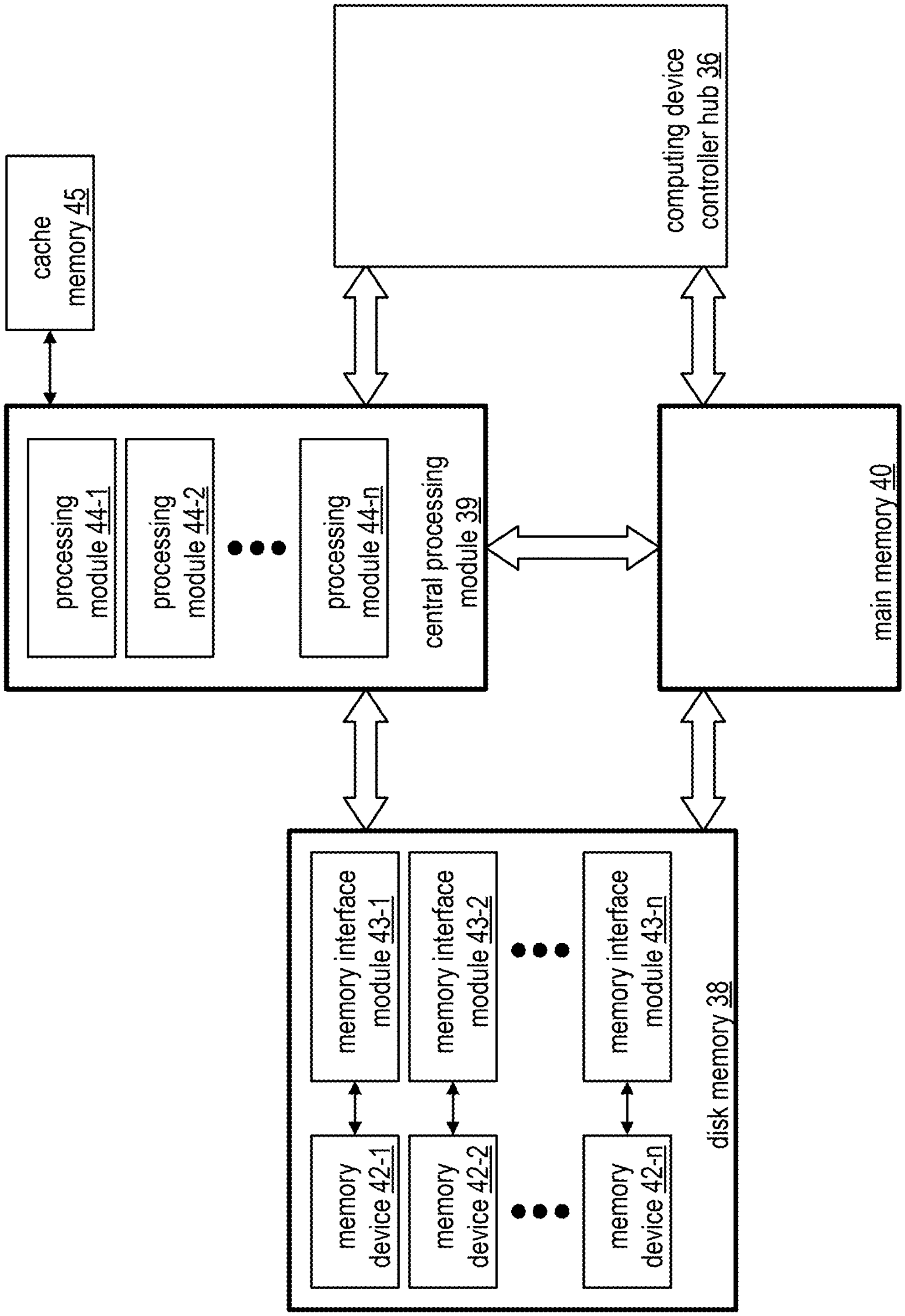
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
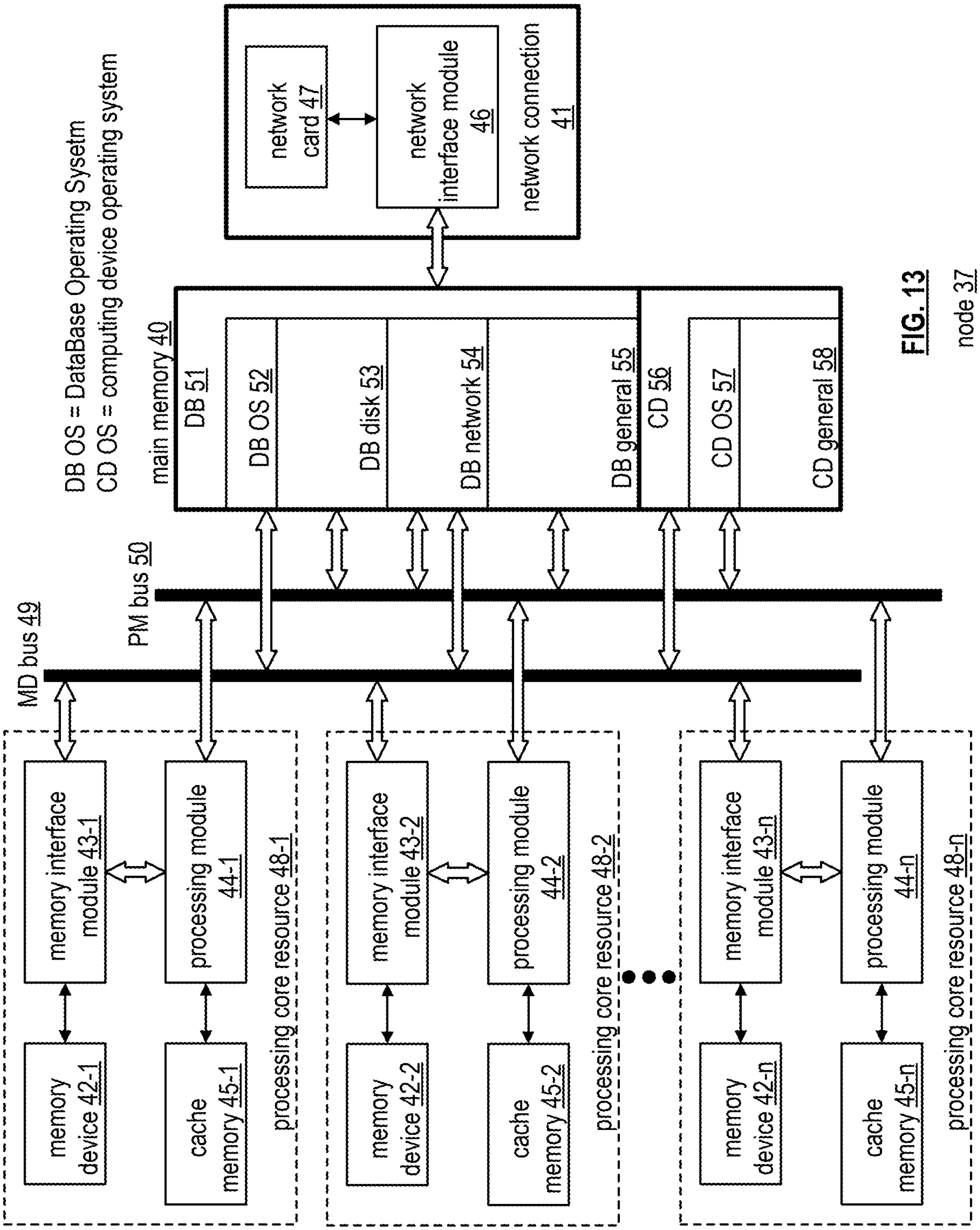
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through **48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
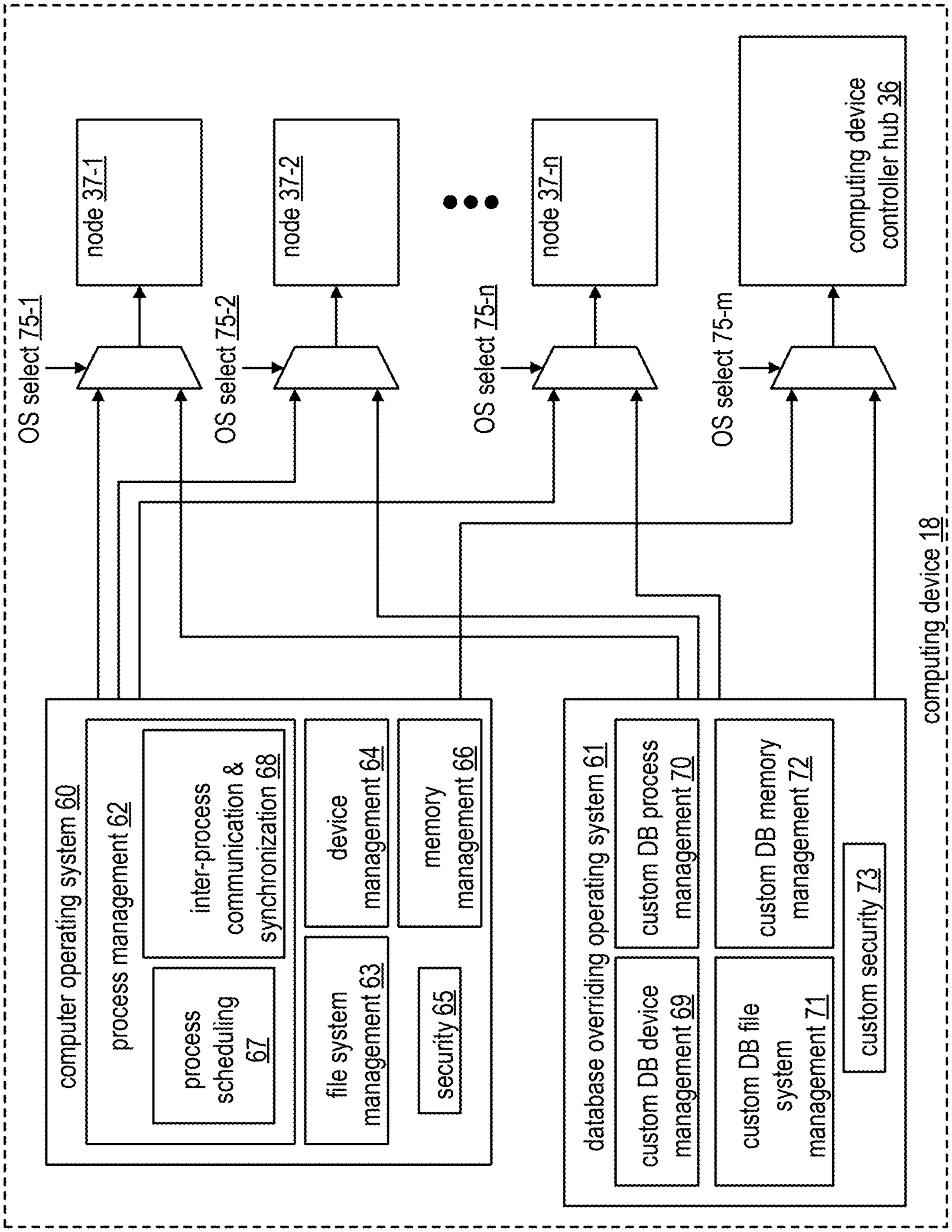
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through **75-*n*** when communicating with nodes 37-1 through **37-*n* and via OS select 75-*m* when communicating with the computing device controller hub 36**). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
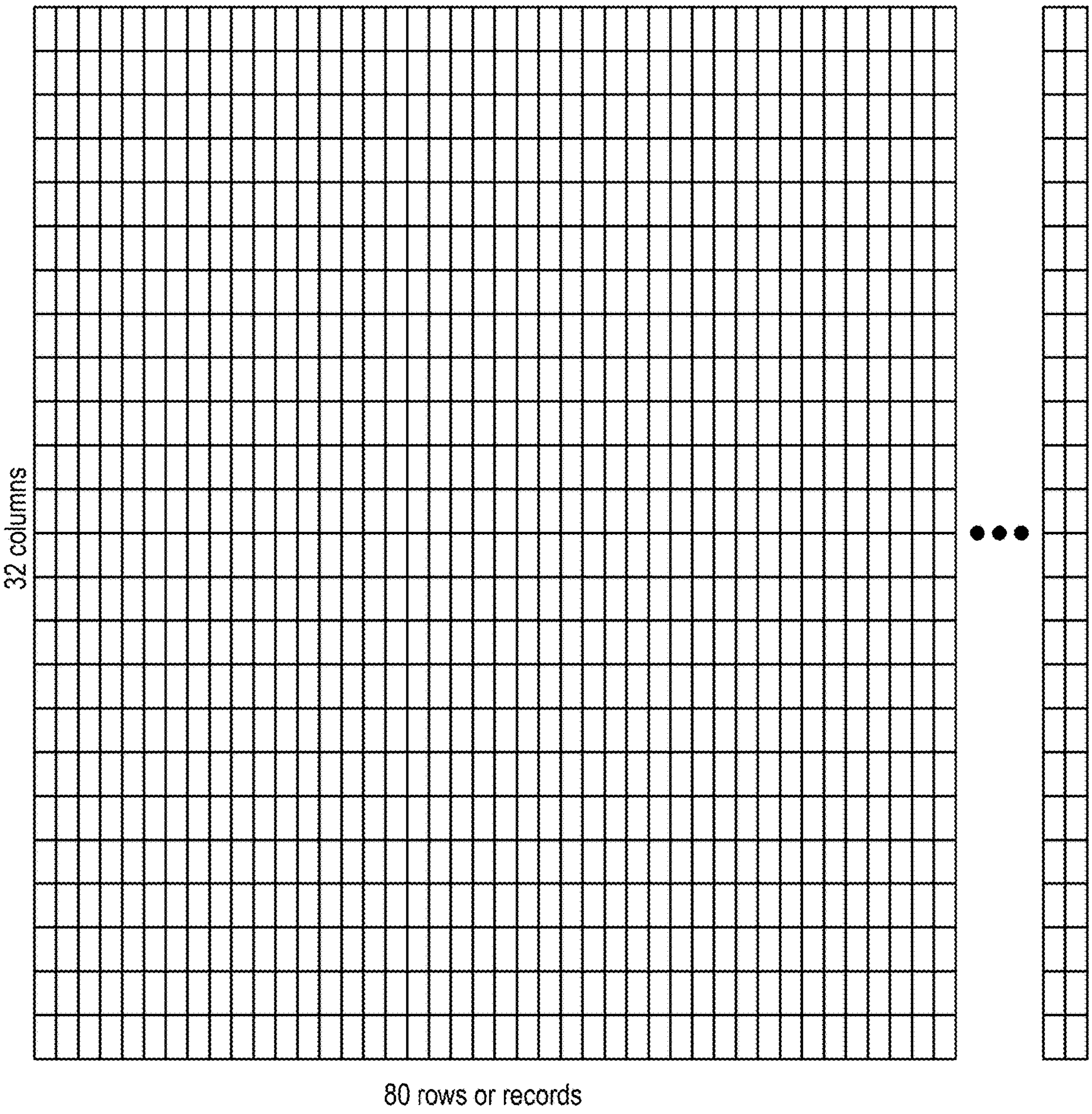
FIGS. 15-23 are schematic block diagrams of an example of processing a table or data set for storage in the database system in accordance with the present invention.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
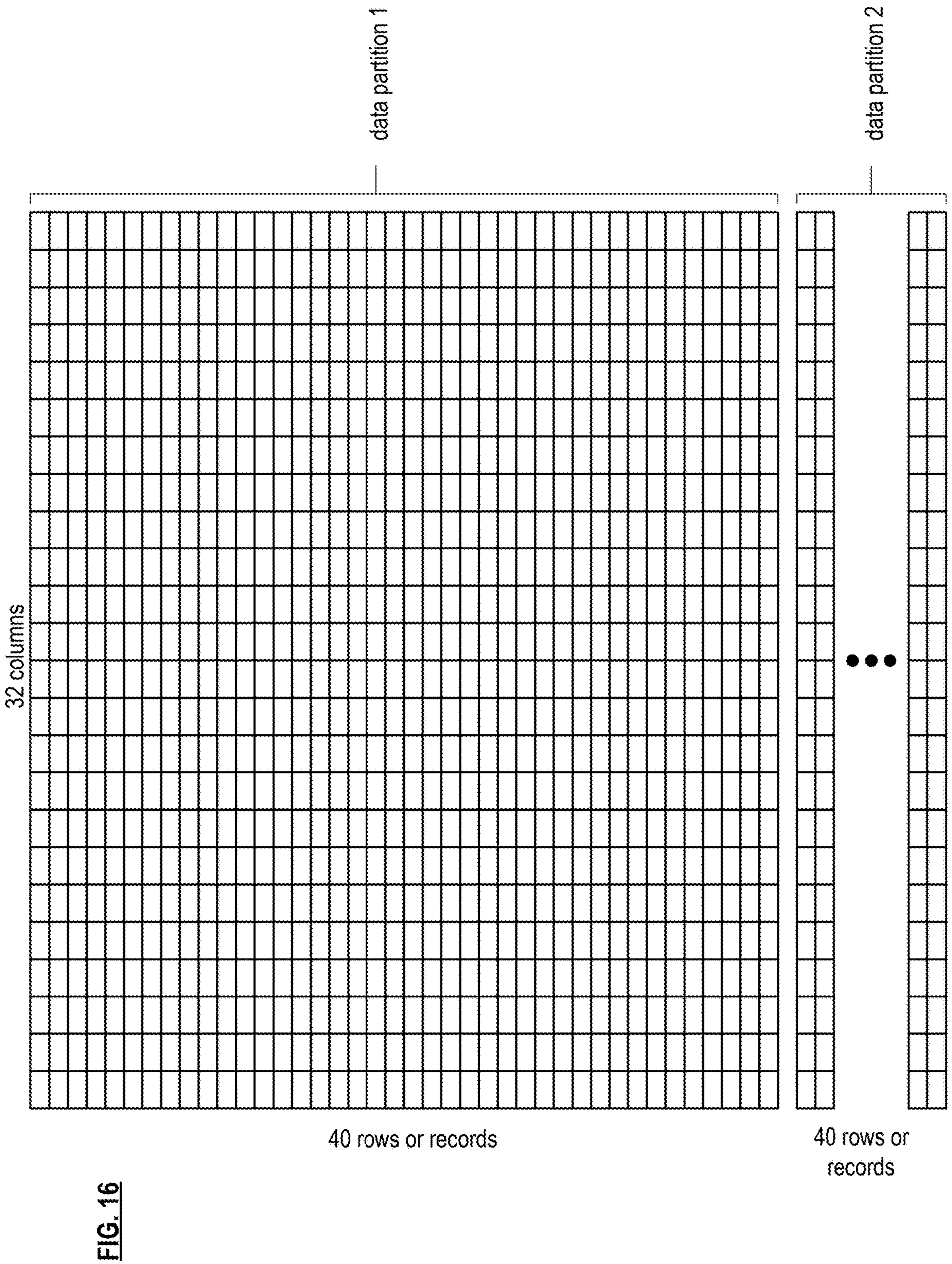

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
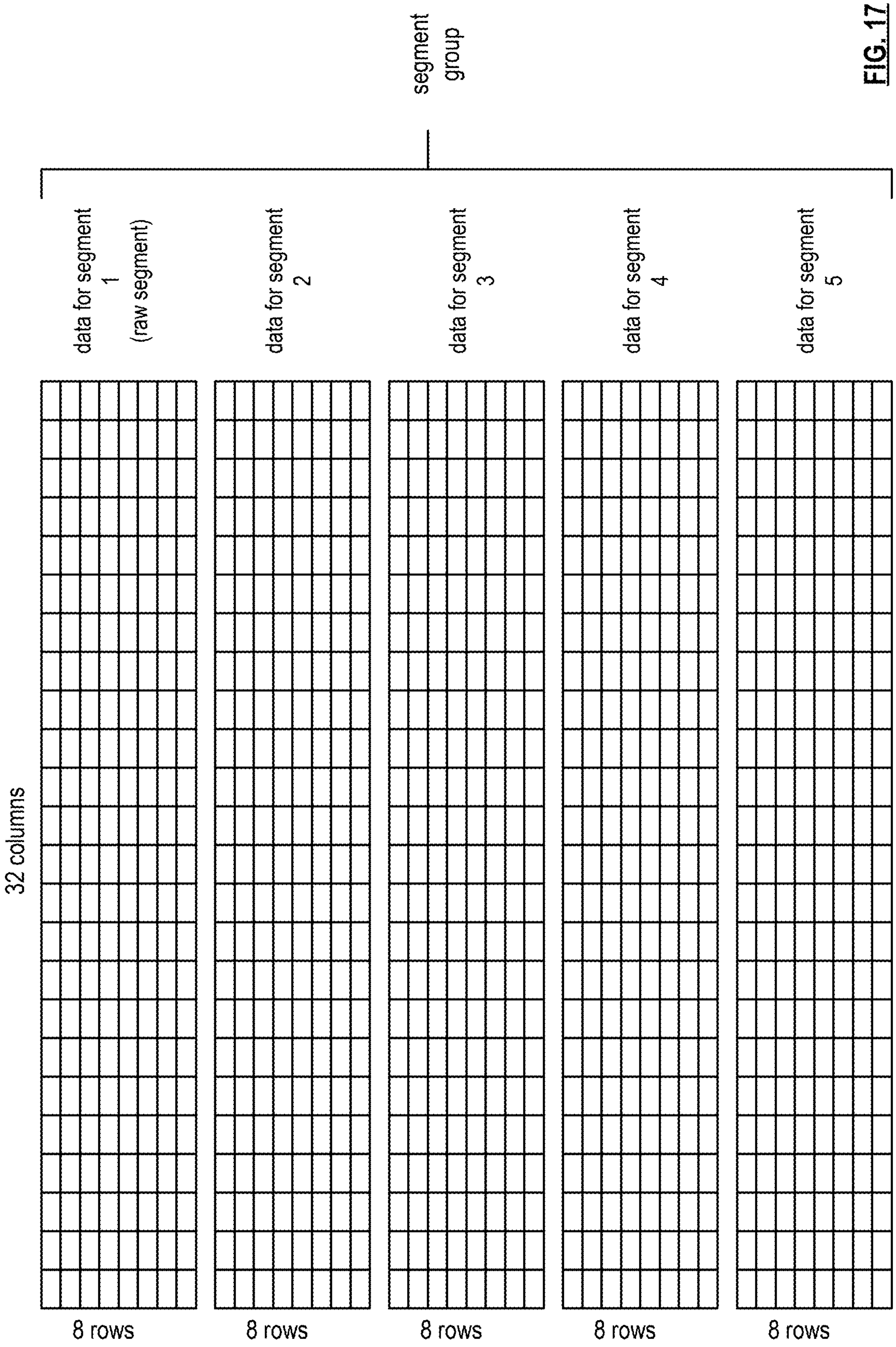

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figure 18:
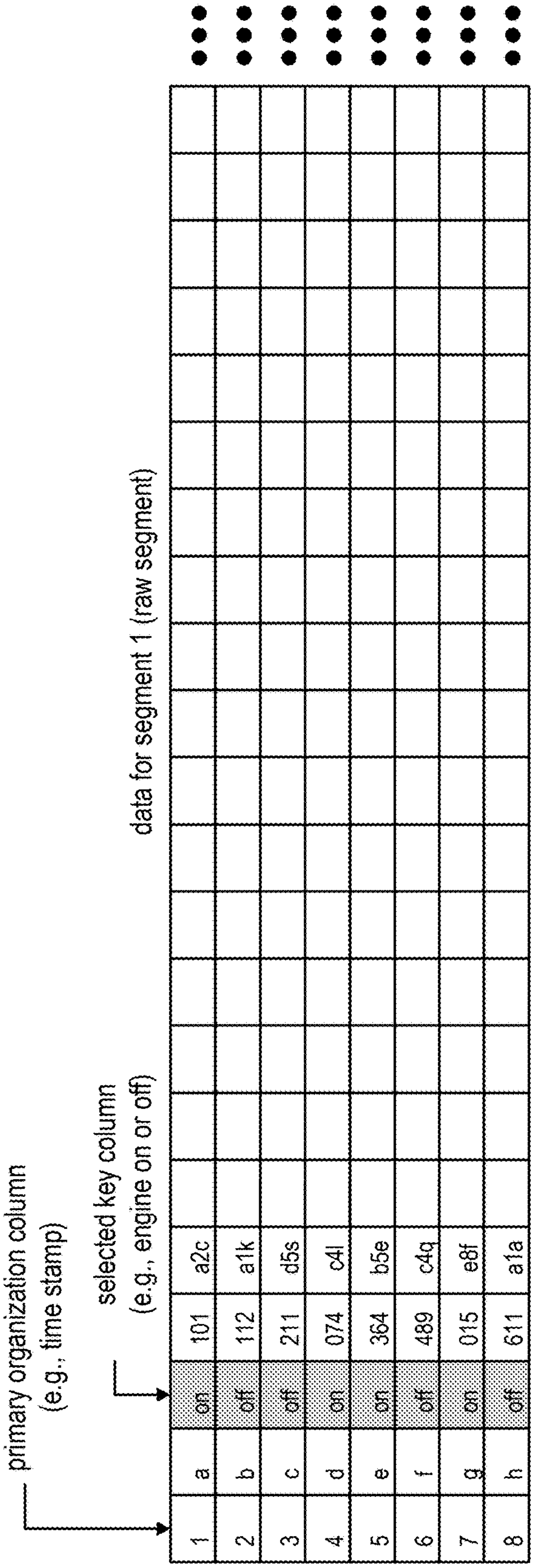

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

Figure 19:
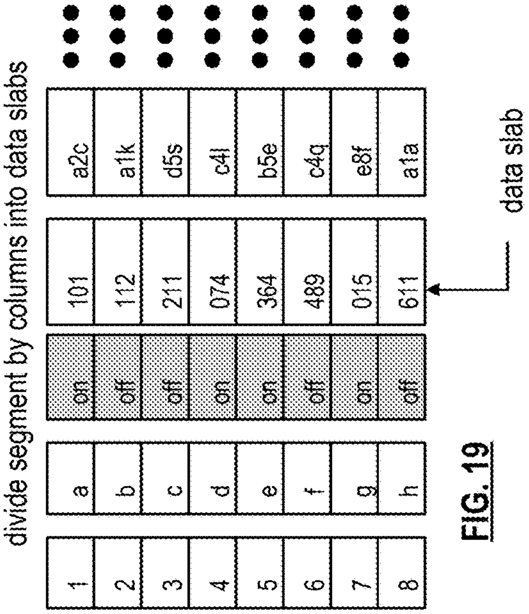

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

Figure 20:
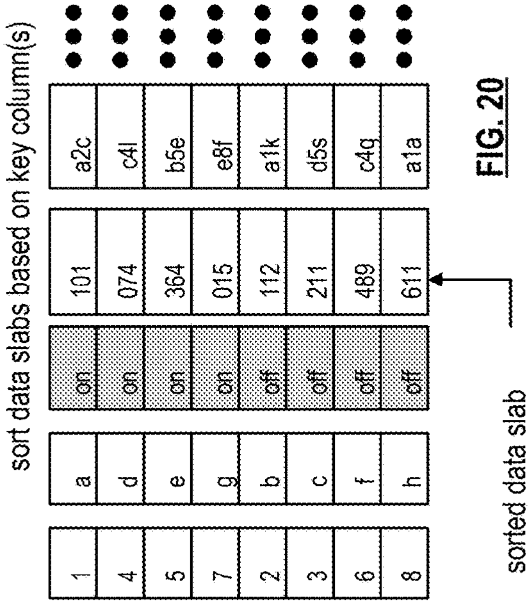

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
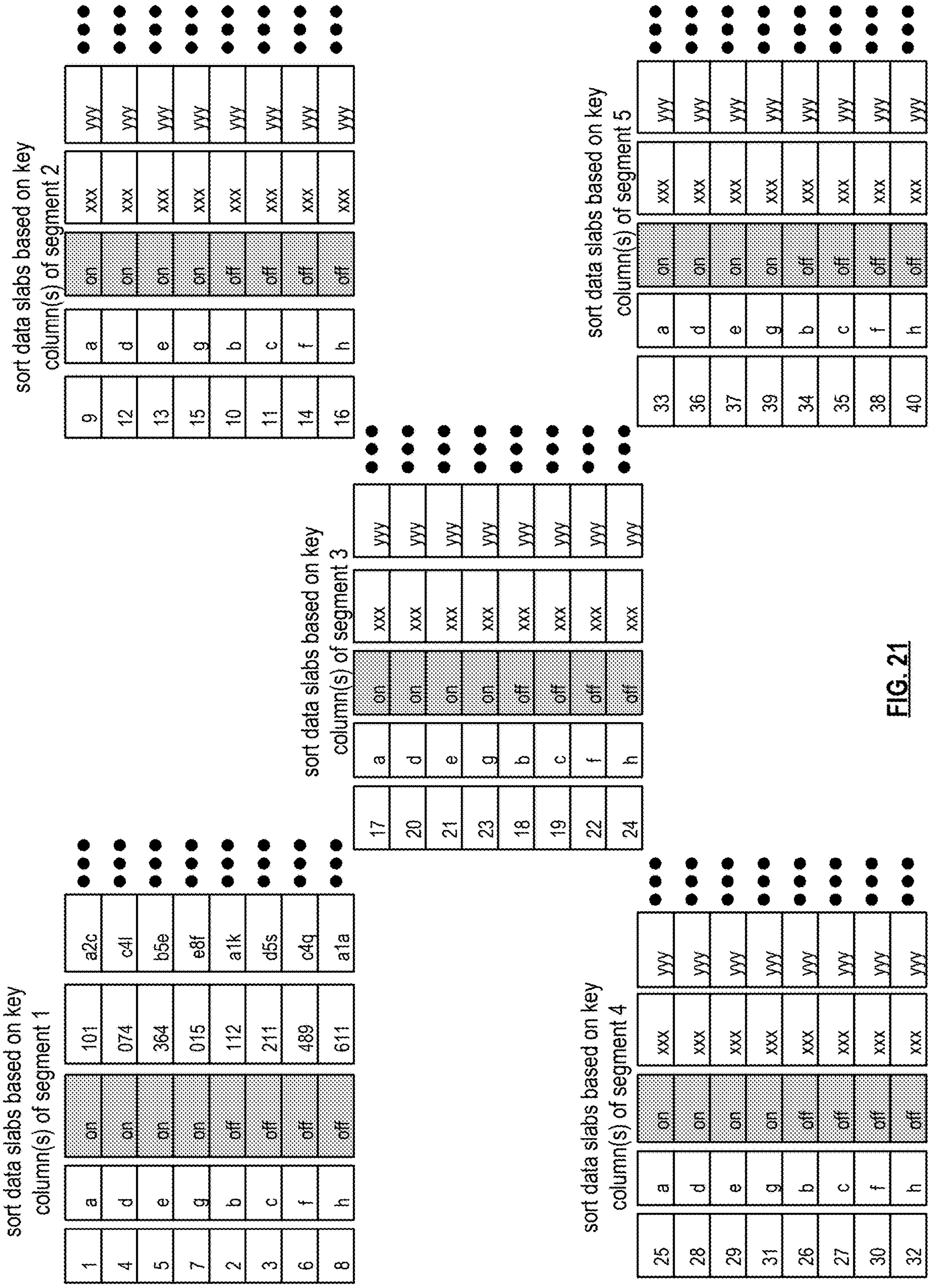

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
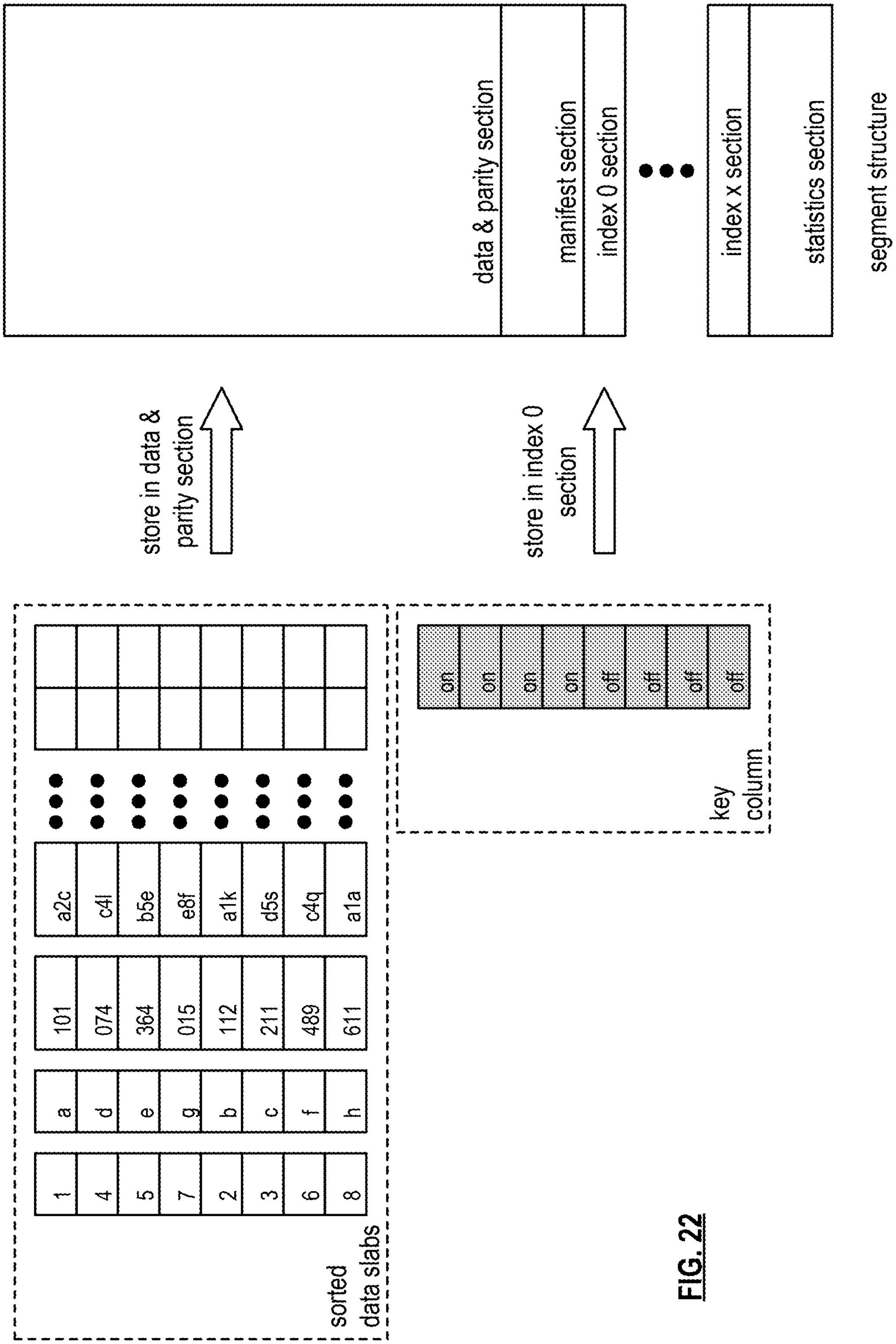

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
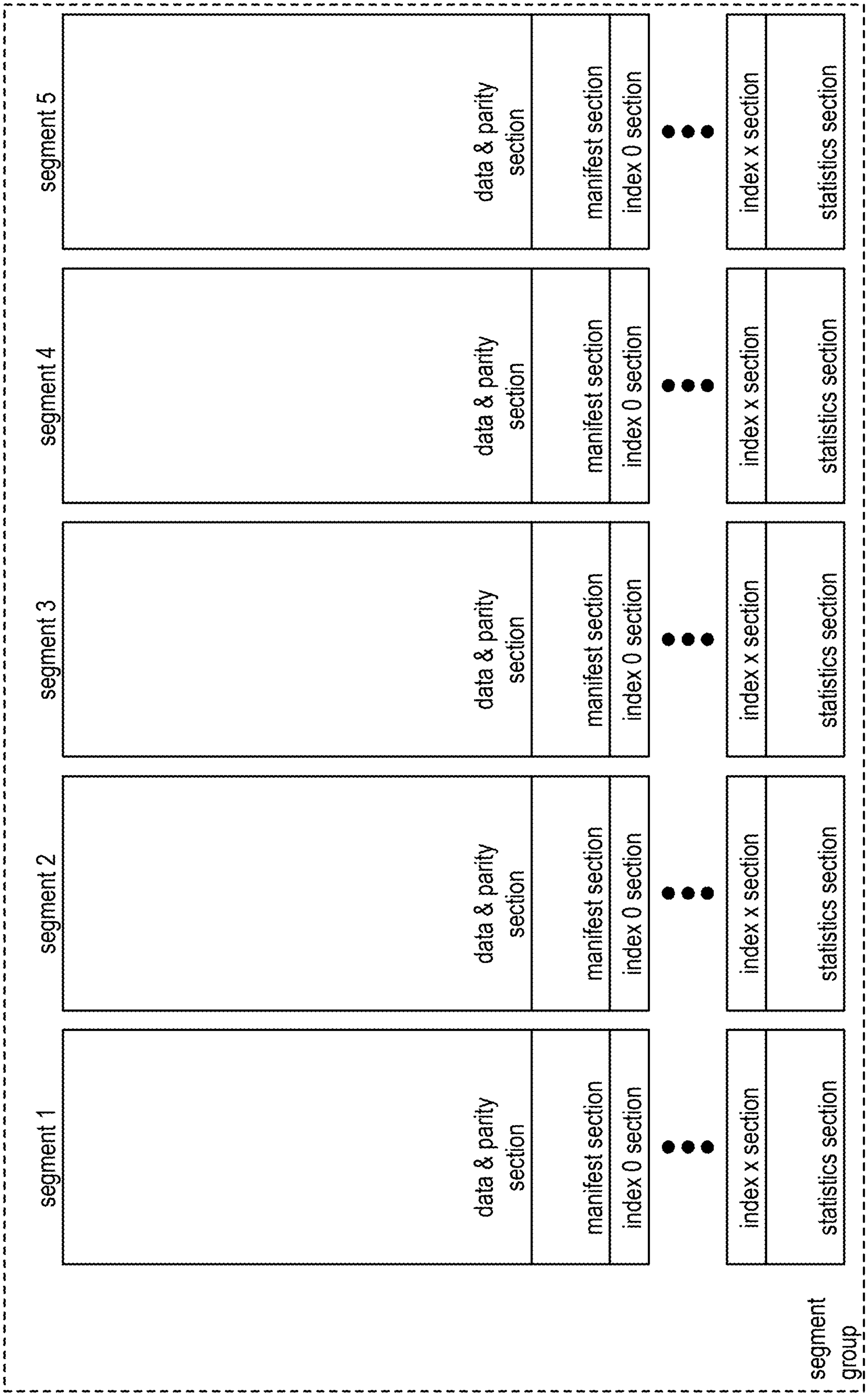

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
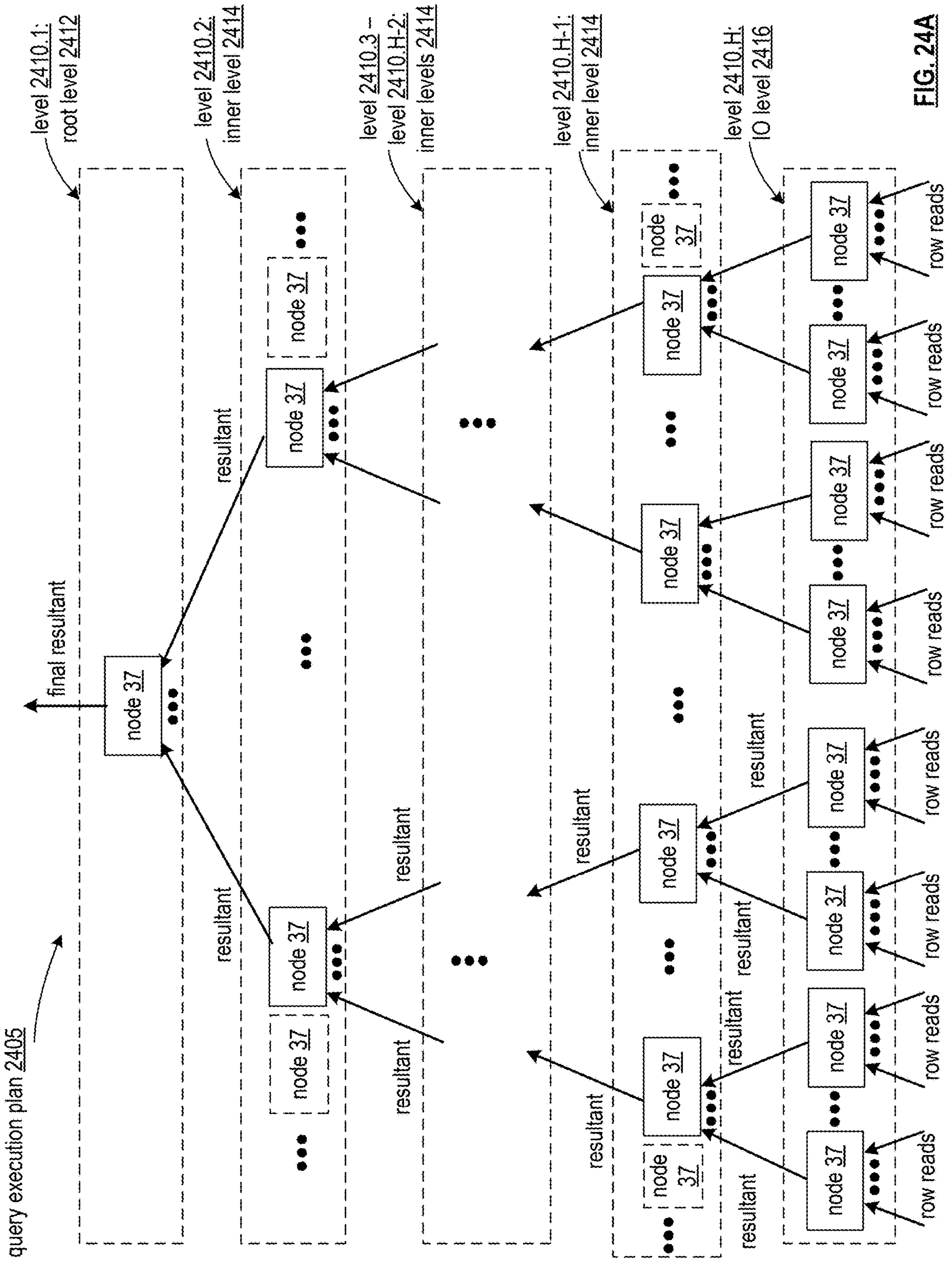
FIG. 24A is a schematic block diagram of a query execution plan in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H−1, and there are no other inner levels 2410.3-2410.H−2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H−1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H−1 includes at least one node from the IO level 2416 in the possible set of nodes. In such cases, while each selected node in level 2410.H−1 is depicted to process resultants sent from other nodes 37 in FIG. 24A, each selected node in level 2410.H−1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
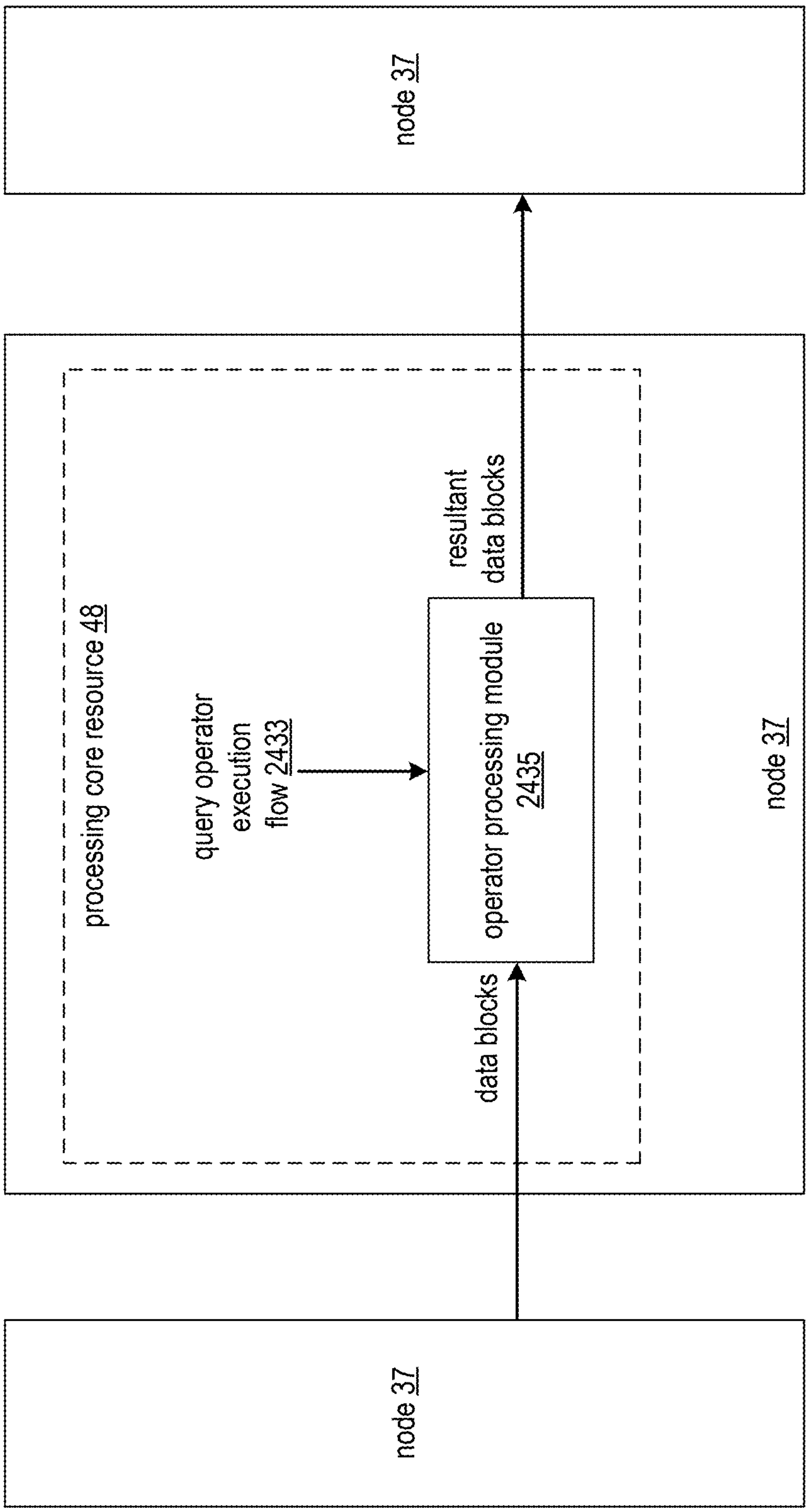
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing an operator processing module 2435. The operator processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes an operator processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2416 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2412 can be gathered into a final result of the query, for example, by the node 37 at root level 2412 if this inner level is the top-most inner level 2414 or the only inner level 2414. As another example, resultants generated by each of the plurality of nodes at this inner level 2412 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the operator processing module 2435 can be implemented by a single processing core resource 48 of the node 37, for example, by utilizing a corresponding processing module 44. In such embodiments, each one of the processing core resources 48-1-48-$n$ of a same node 37 can be executing at least one query concurrently via their own query processing module 2435, where a single node 37 implements each of set of operator processing modules 2435-1-2435-$n$ via a corresponding one of the set of processing core resources 48-1-48-$n$. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query. Alternatively, the operator processing module 2435 can be implemented via multiple processing core resources 48 and/or via one or more other processing modules of the node 37.

Figure 24C:
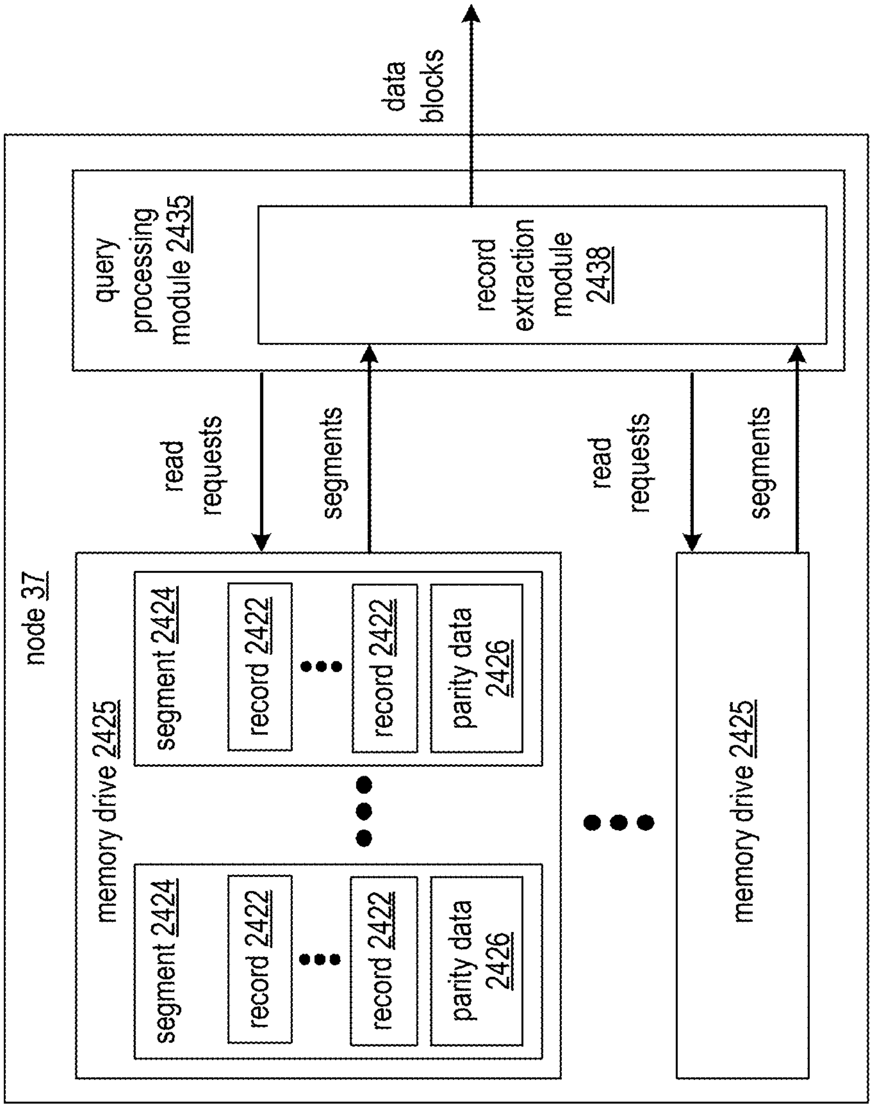

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-$n$ of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
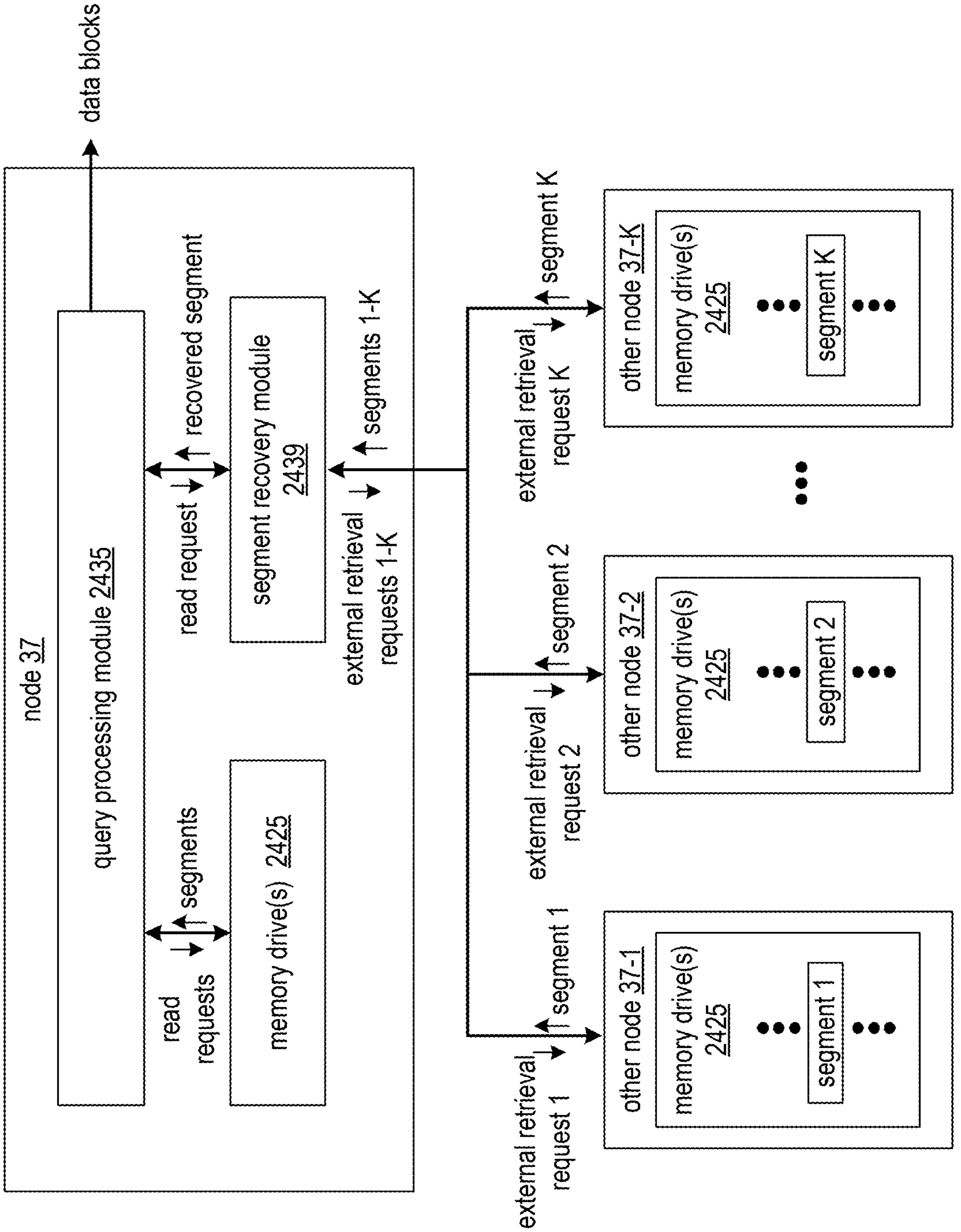

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
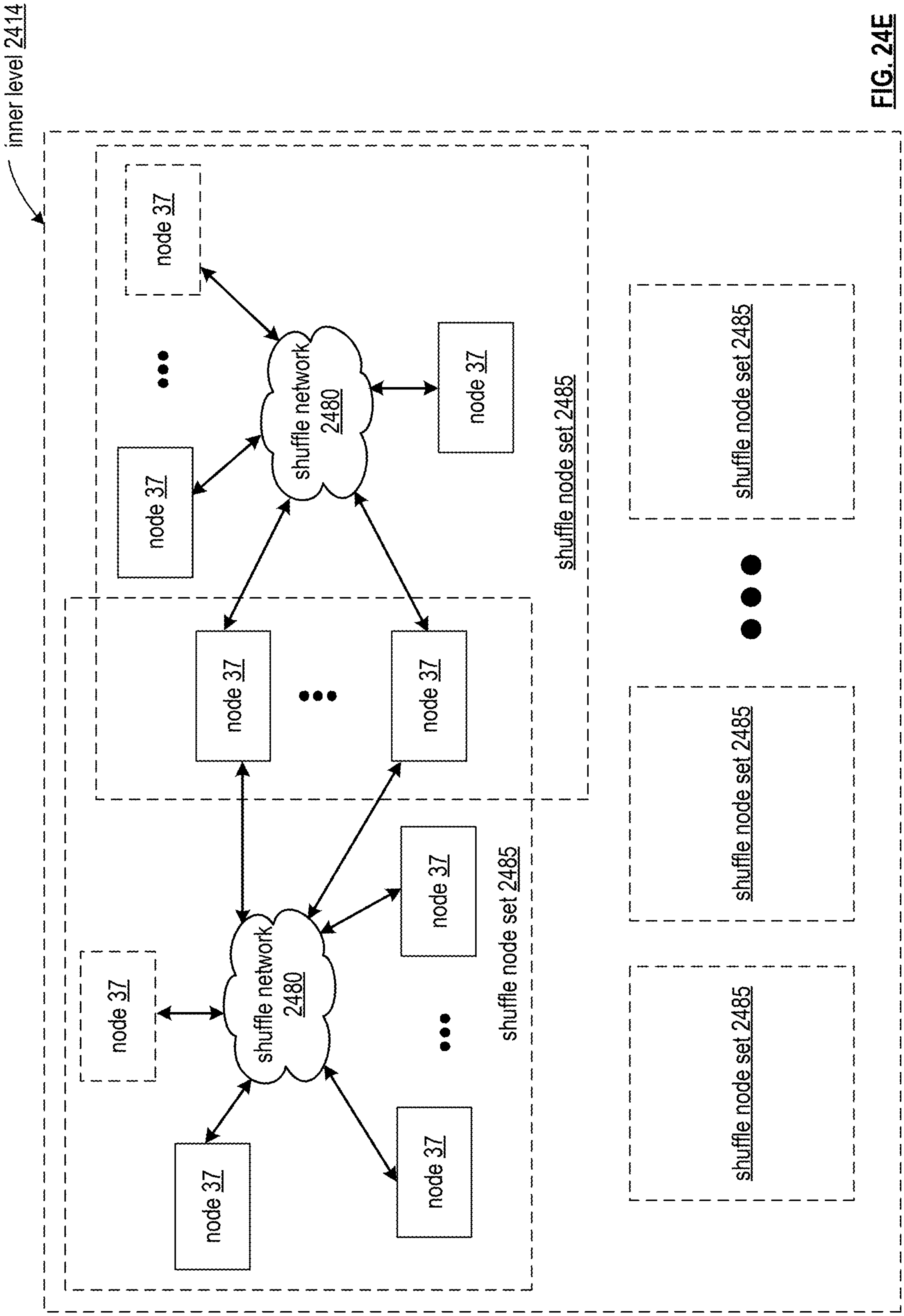
FIG. 24E is a schematic block diagram illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were accessed in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are “further apart” in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
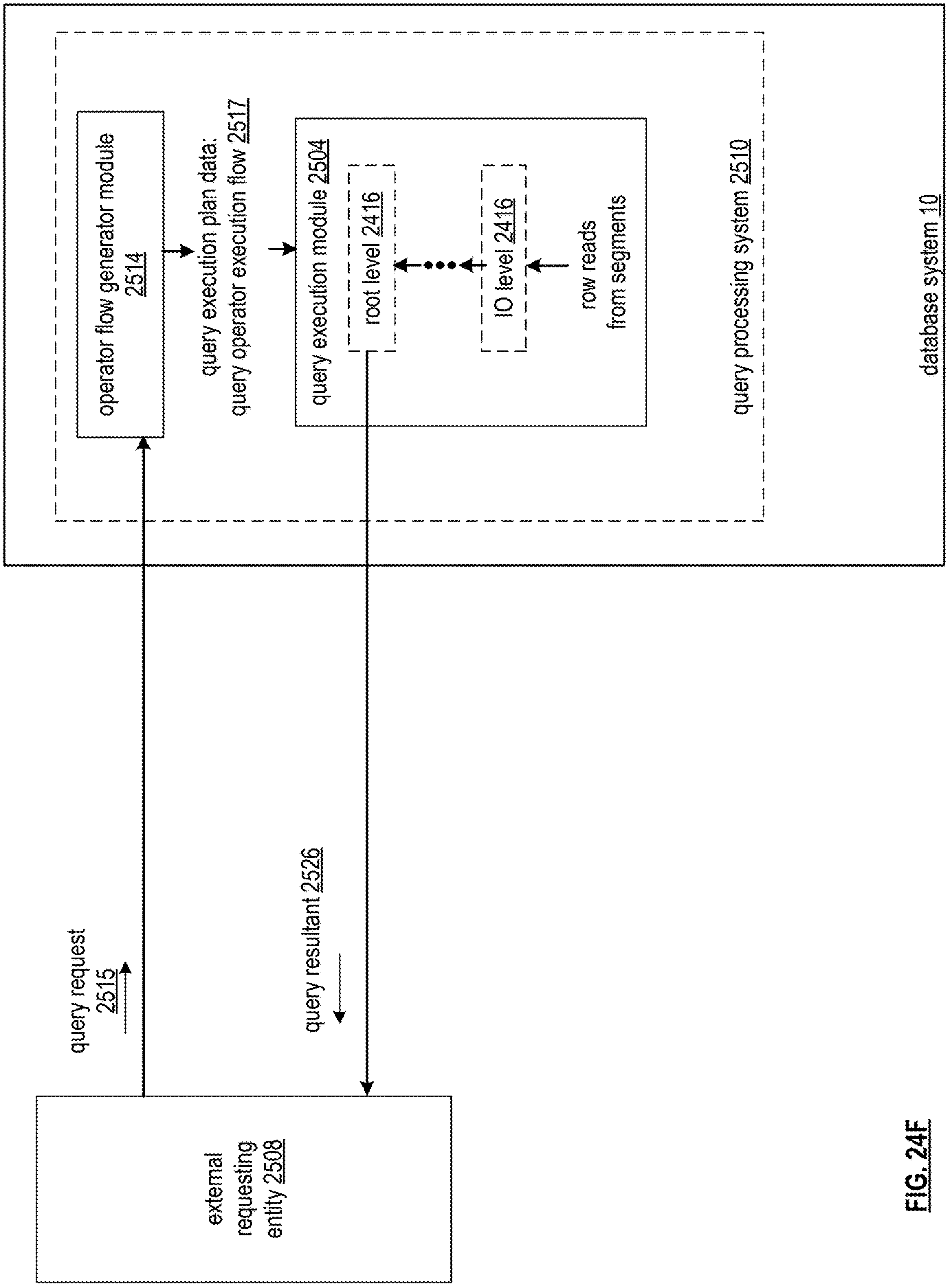
FIG. 24F is a schematic block diagram of a database system communicating with an external requesting entity in accordance with various embodiments.

FIG. 24F illustrates an embodiment of a database system that receives some or all query requests from one or more external requesting entities 2508. The external requesting entities 2508 can be implemented as a client device such as a personal computer and/or device, a server system, or other external system that generates and/or transmits query requests 2515. A query resultant 2526 can optionally be transmitted back to the same or different external requesting entity 2508. Some or all query requests processed by database system 10 as described herein can be received from external requesting entities 2508 and/or some or all query resultants generated via query executions described herein can be transmitted to external requesting entities 2508.

For example, a user types or otherwise indicates a query for execution via interaction with a computing device associated with and/or communicating with an external requesting entity. The computing device generates and transmits a corresponding query request 2515 for execution via the database system 10, where the corresponding query resultant 2526 is transmitted back to the computing device, for example, for storage by the computing device and/or for display to the corresponding user via a display device.

Figure 24G:
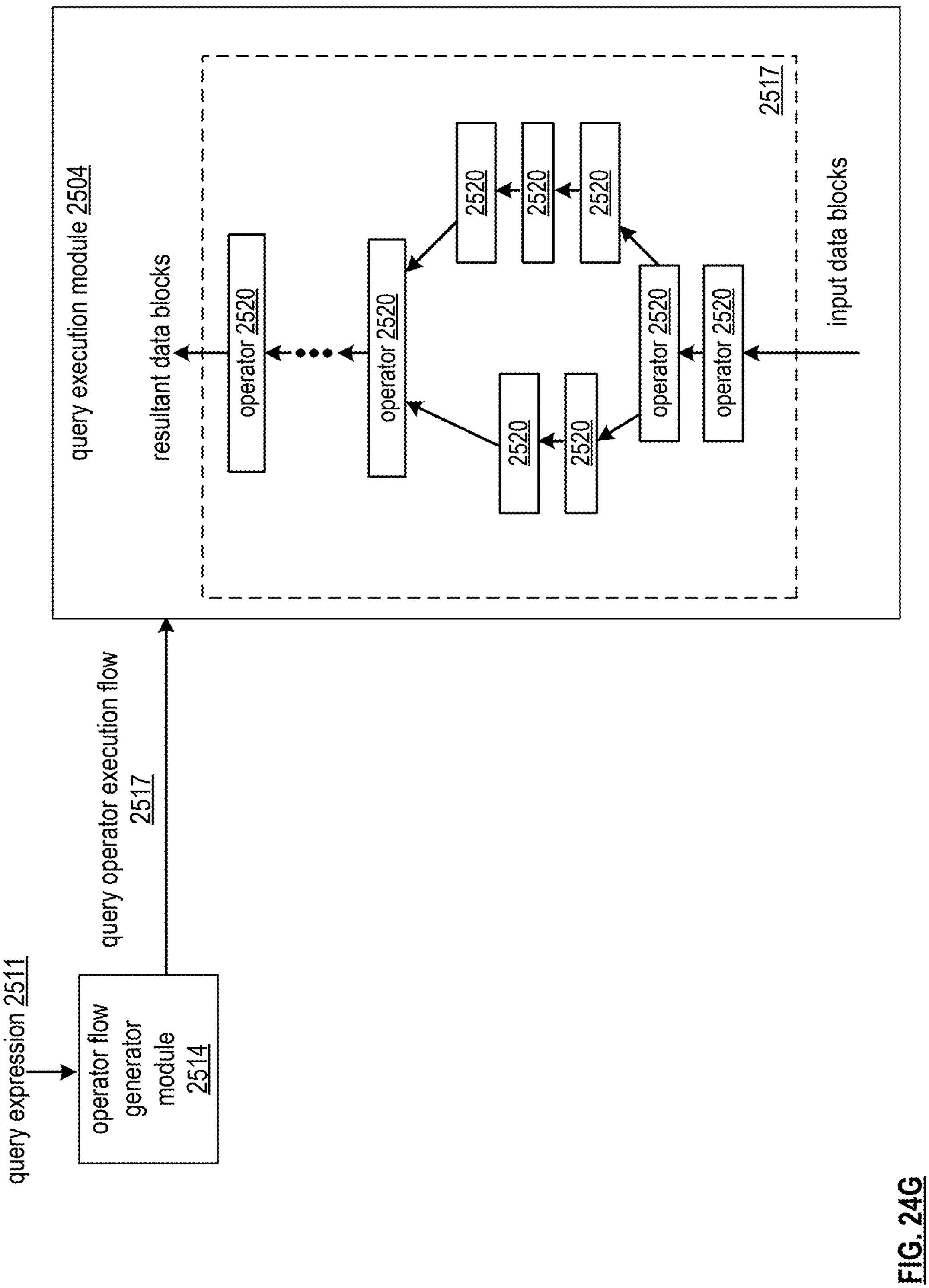
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Figure 24H:
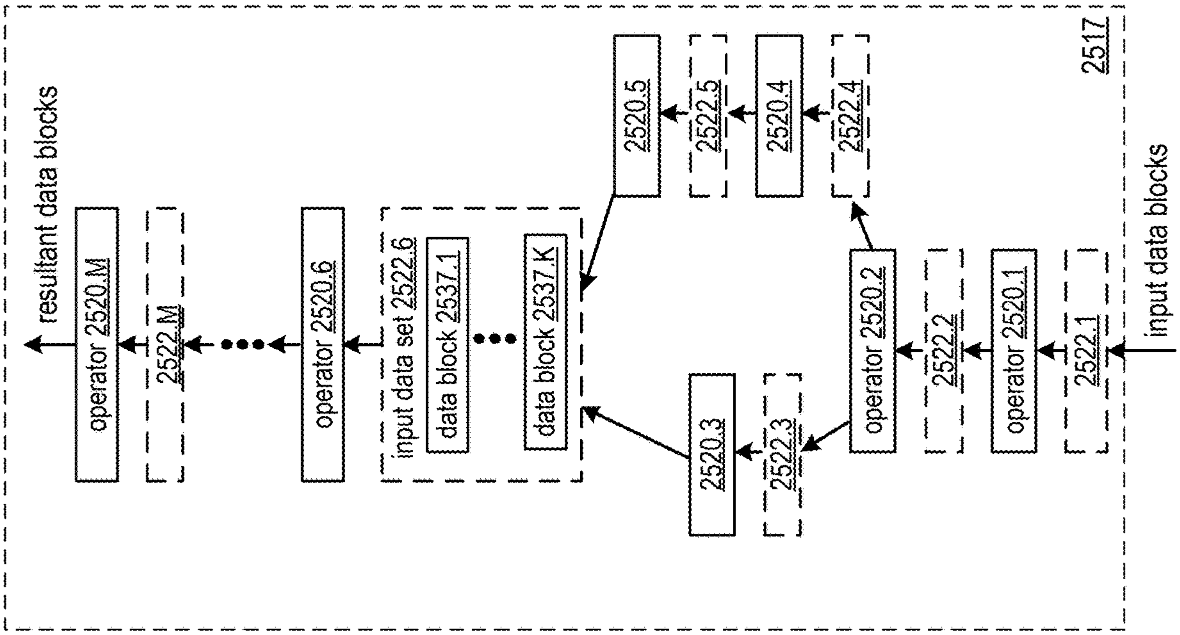
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in a same shuffle node set as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

As used herein, a child operator of a given operator corresponds to an operator immediately before the given operator serially in a corresponding query operator execution flow and/or an operator from which the given operator receives input data blocks for processing in generating its own output data blocks. A given operator can have a single child operator or multiple child operators. A given operator optionally has no child operators based on being an IO operator and/or otherwise being a bottommost and/or first operator in the corresponding serialized ordering of the query operator execution flow. A child operator can implement any operator 2520 described herein.

A given operator and one or more of the given operator's child operators can be executed by a same node 37 of a given node 37. Alternatively or in addition, one or more child operators can be executed by one or more different nodes 37 from a given node 37 executing the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow, and/or an operator from which the given operator receives input data blocks for processing in generating its own output data blocks. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator. A parent operator can implement any operator 2520 described herein.

A given operator and one or more of the given operator's parent operators can be executed by a same node 37 of a given node 37. Alternatively or in addition, one or more parent operators can be executed by one or more different nodes 37 from a given node 37 executing the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more shuffle operators of a shuffle operation. For example, a set of lateral operators are implemented via corresponding plurality of parallel processes 2550, for example, of a join process or other operation, to facilitate transfer of data such as right input rows received for processing between these operators. As another example, data is optionally transferred between lateral network operators via a corresponding shuffle and/or broadcast operation, for example, to communicate right input rows of a right input row set of a join operation to ensure all operators have a full set of right input rows.

A given operator and one or more lateral network operators lateral with the given operator can be executed by a same node 37 of a given node 37. Alternatively or in addition, one or lateral network operators can be executed by one or more different nodes 37 from a given node 37 executing the given operator lateral with the one or more lateral network operators. For example, different lateral network operators are executed via different nodes 37 in a same shuffle node set 37.

Figure 24I:
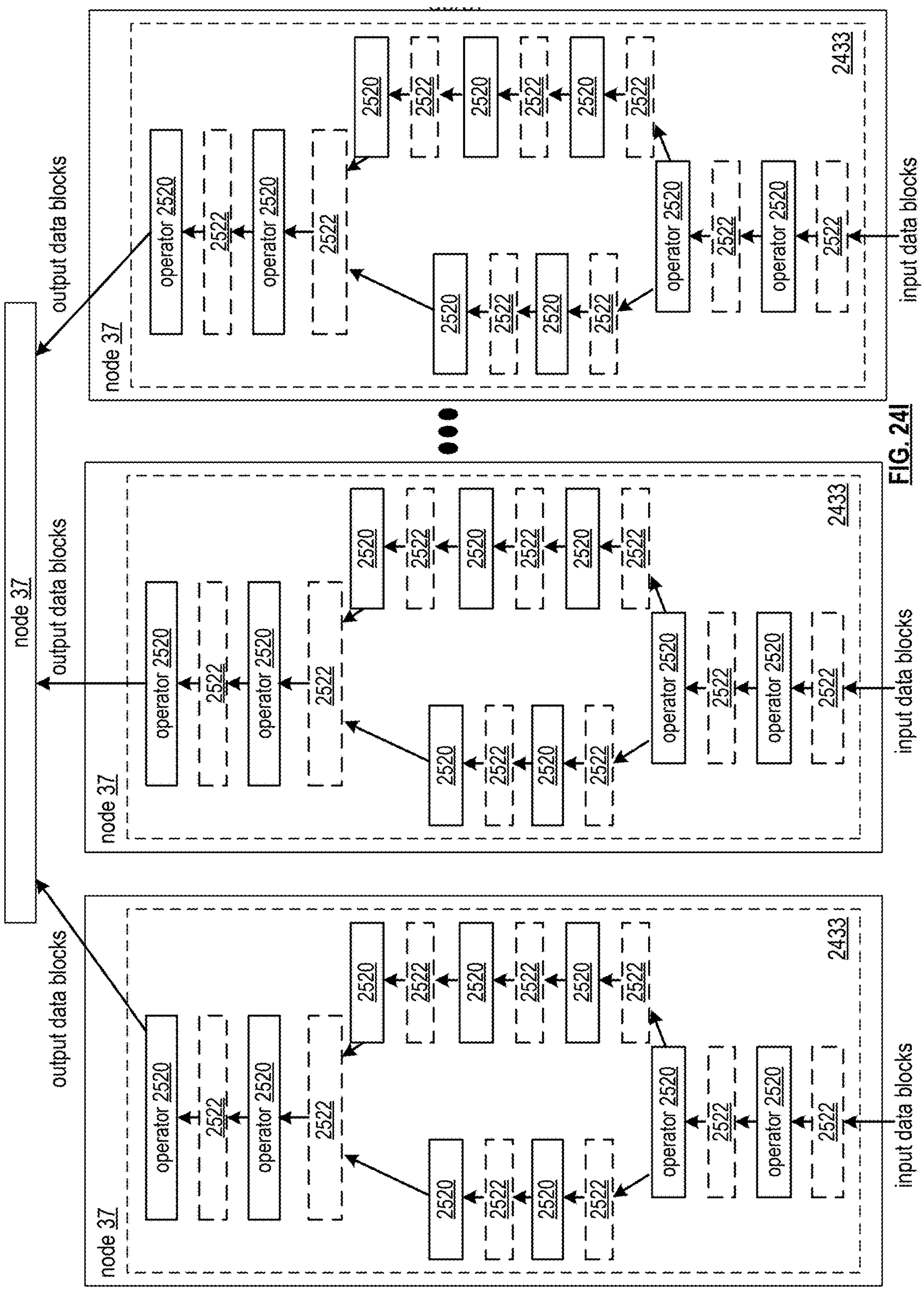
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
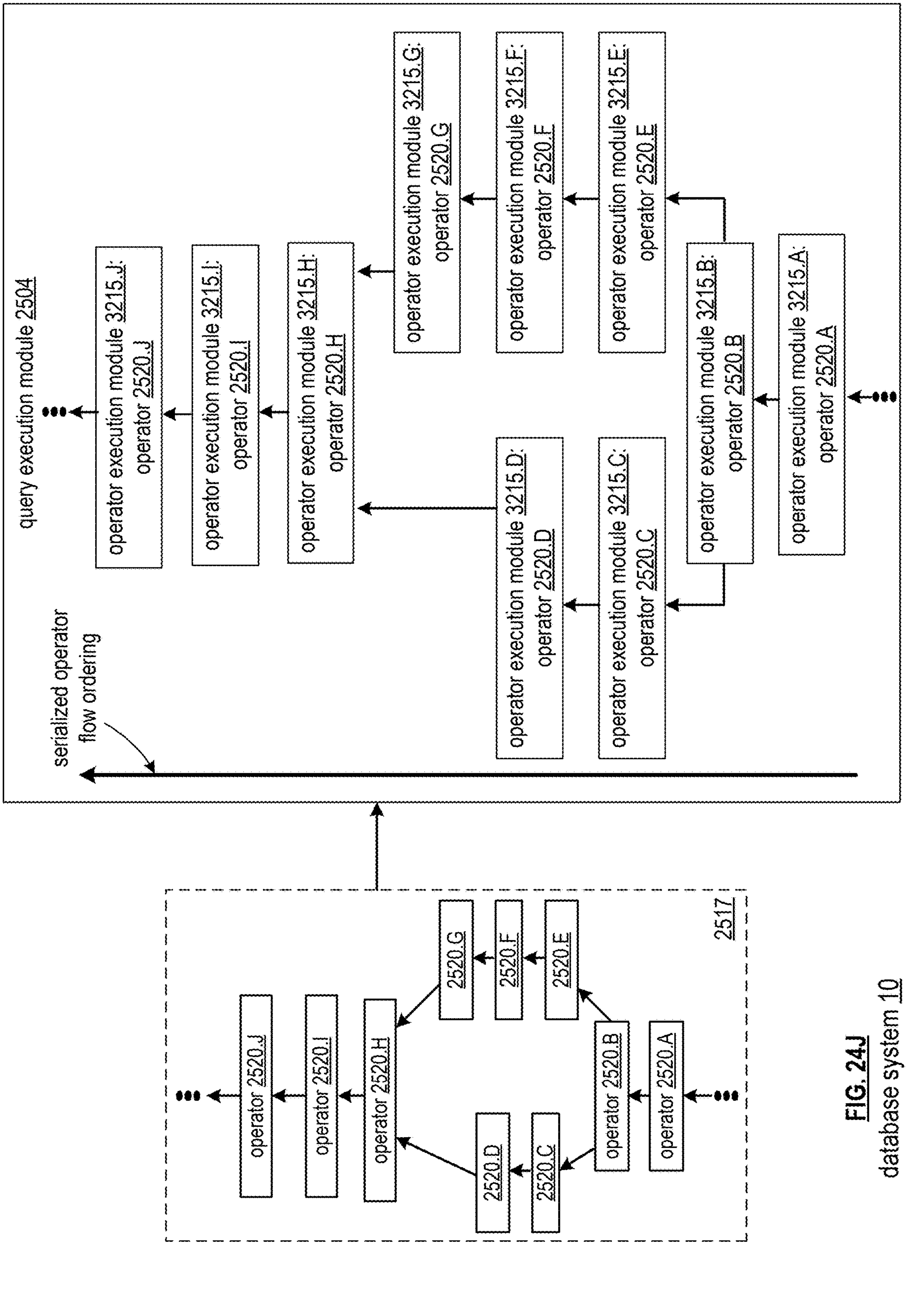
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 32A can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
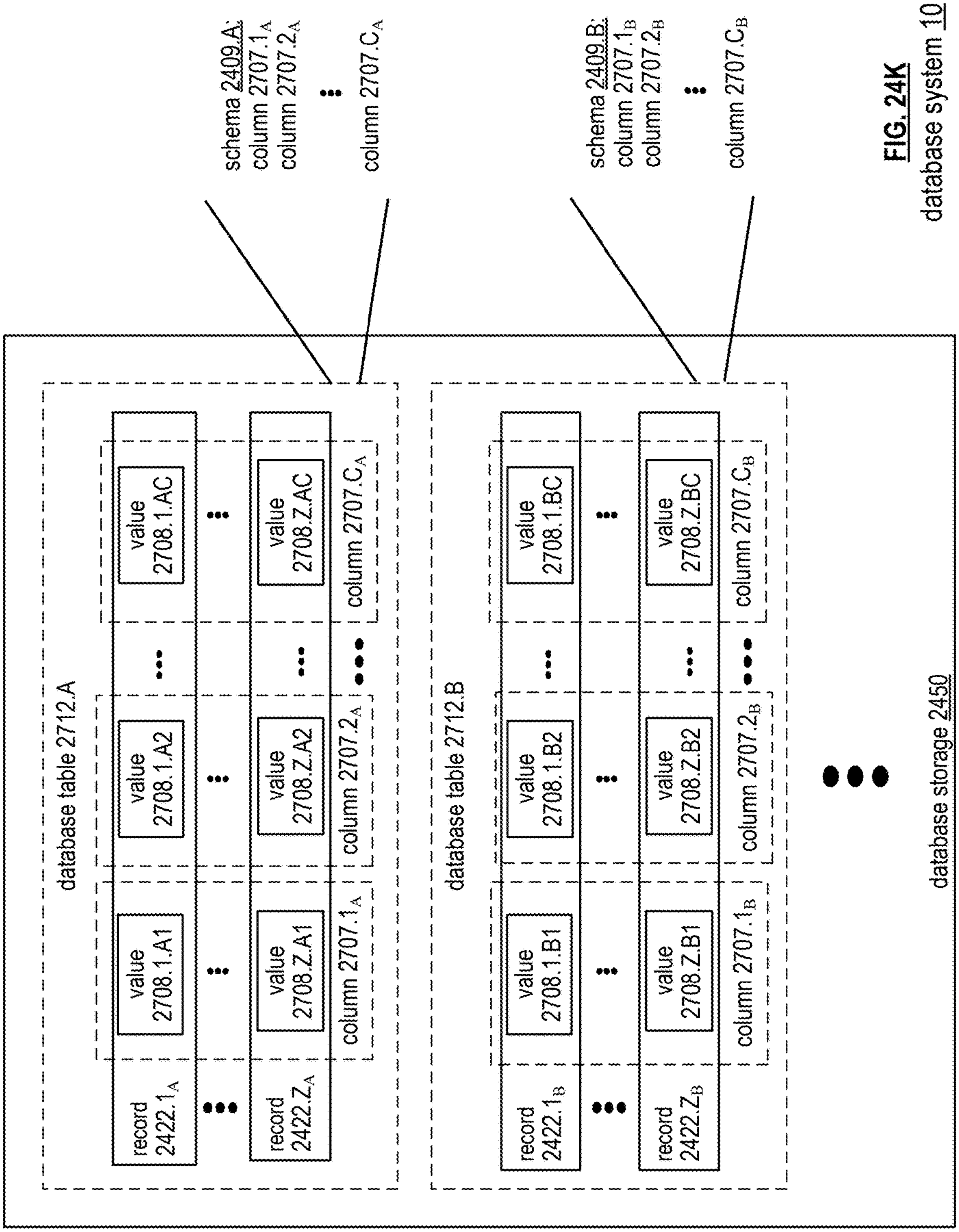
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns 2707.1$_A$-2707.C$_A$ of schema 2709.A for database table 2712.A can have a different number of columns than and/or can have different datatypes for some or all columns of the set of columns 2707.I$_B$-2707.C$_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
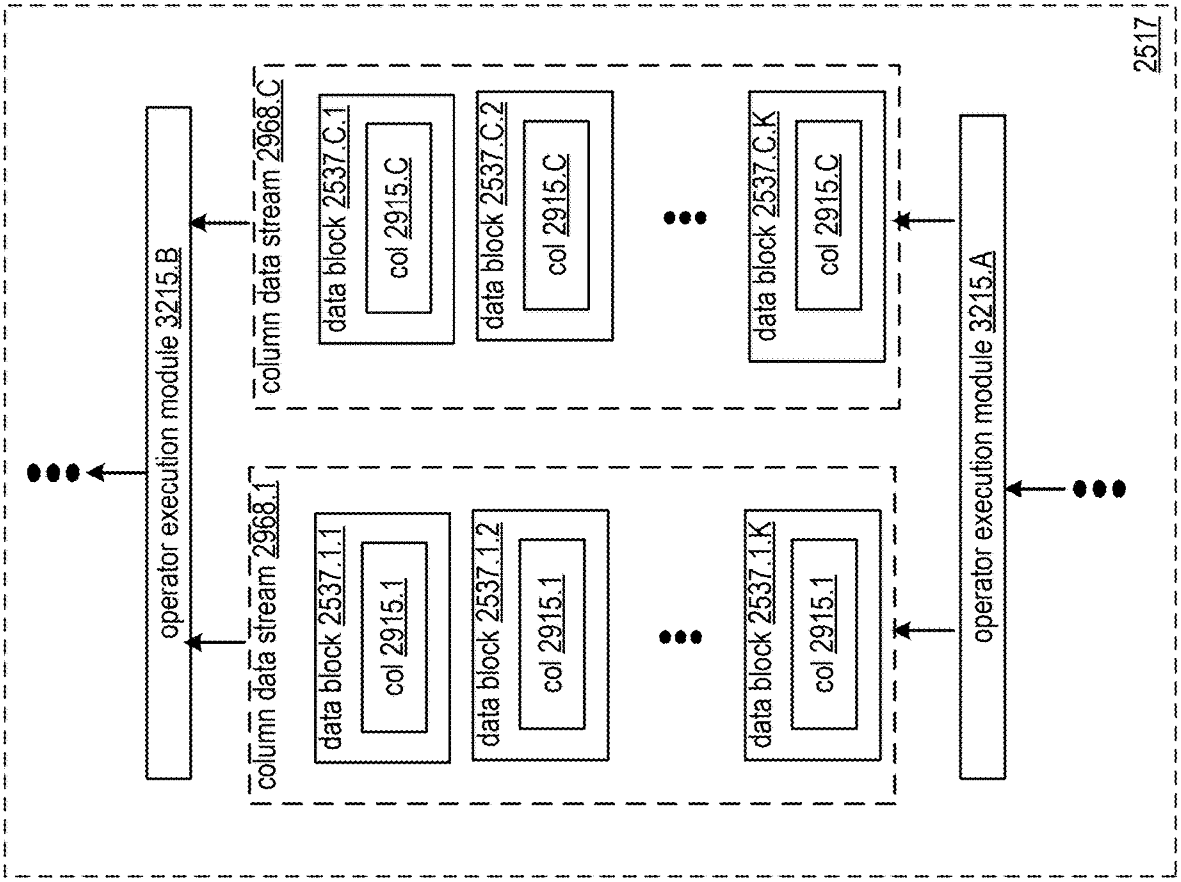
FIG. 24L is a schematic block diagram of a query execution module that implements a plurality of column data streams in accordance with various embodiments.
Figure 24M:
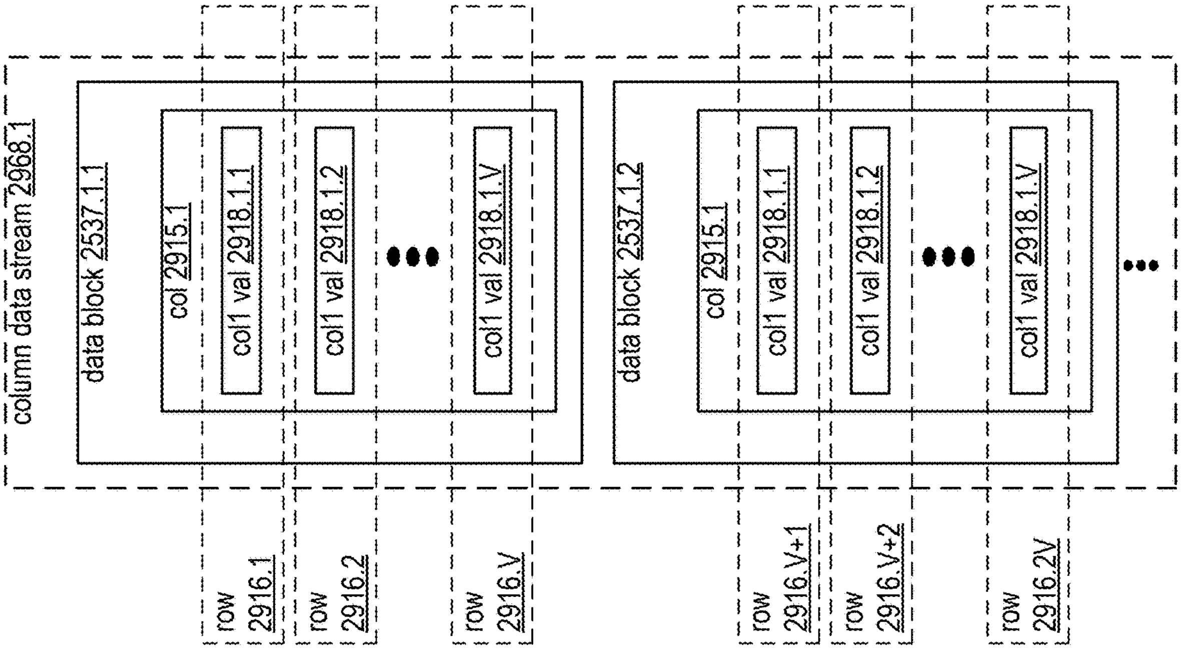
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
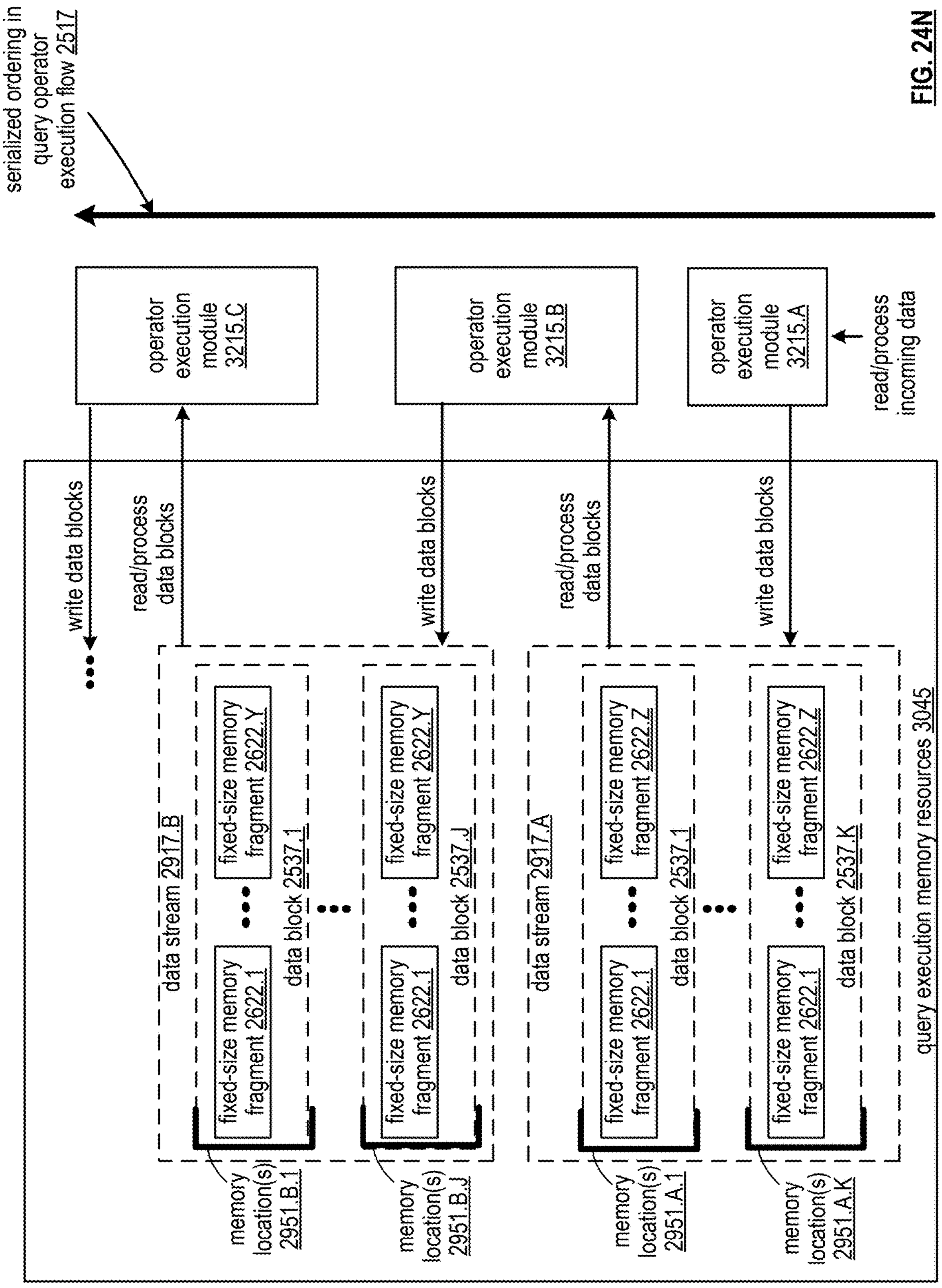
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations to filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

FIGS. 25A-25F illustrate embodiments of a database system 10 operable to execute queries indicating join expressions based on implementing corresponding join processes via one or more join operators. Some or all features and/or functionality of FIGS. 25A-25F can be utilized to implement the database system 10 of FIGS. 24A-24I when executing queries indicating join expressions. Some or all features and/or functionality of FIGS. 25A-25F can be utilized to implement any embodiment of the database system 10 described herein.

Figure 25A:
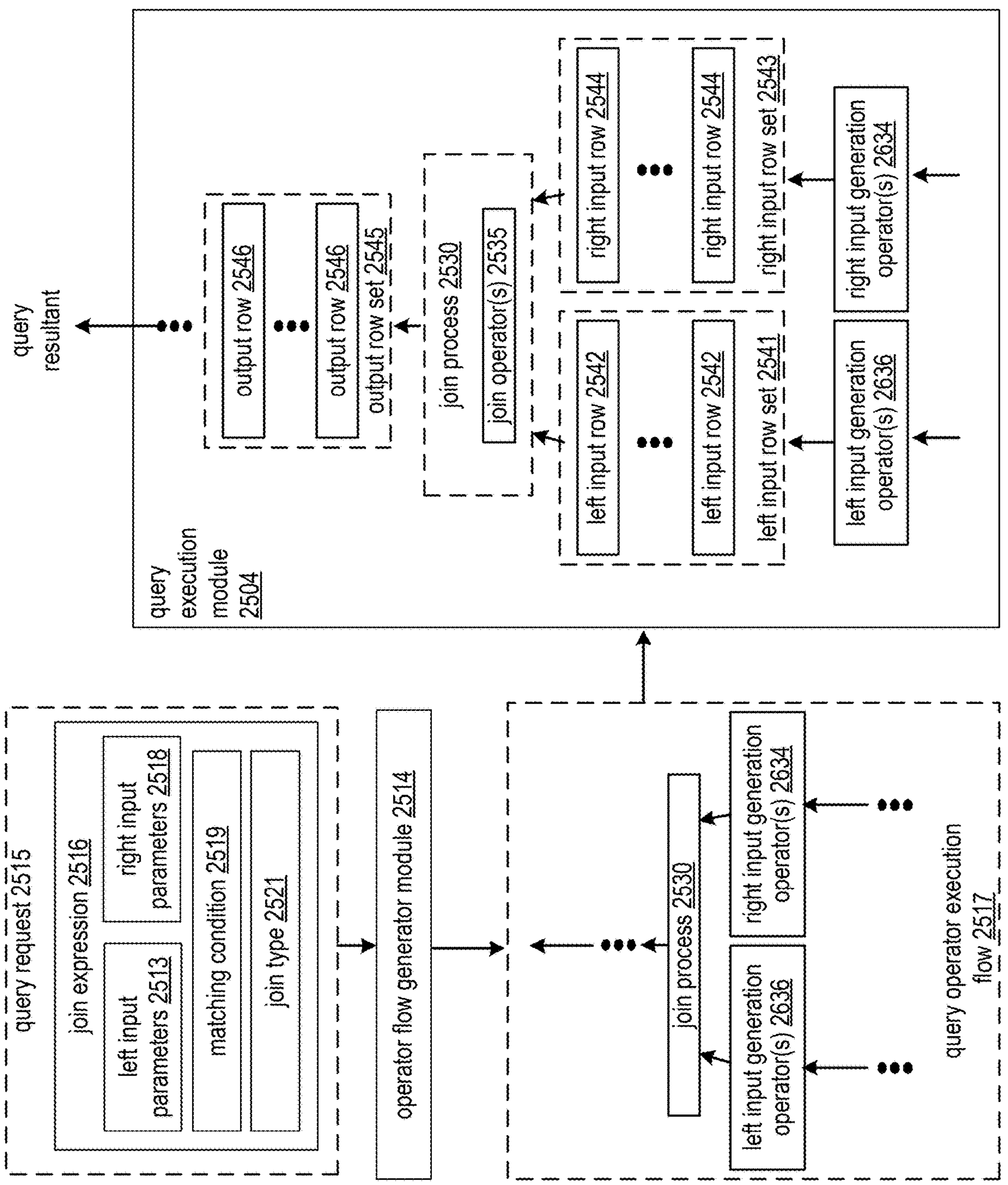
FIG. 25A is a schematic block diagram of a database system executing a join process based on a join expression of a query request in accordance with various embodiments.

FIG. 25A illustrates an example of processing a query request 2515 that indicates a join expression 2516. The join expression 2516 can indicate that columns from one or more tables, for example, indicated by left input parameters 2513 and/or right input parameters 2518, be combined into a new table based on particular criteria, such as matching condition 2519 and/or a join type 2521 of the join operation. For example, the join expression 2516 can be implemented as a SQL JOIN clause, or any other type of join operation in any query language.

The join expression 2516 can indicate left input parameters 2513 and/or right input parameters 2518, denoting how the left input rows and/or right input rows are selected and/or generated for processing, such as which columns of which tables are selected. The left input and right input are optionally not distinguished as left and right, for example, where the join expression 2516 simply denotes input values for two input row sets. The join expression can optionally indicate performance of a join across three or more sets of rows, and/or multiple join expressions can be indicated to denote performance of joins across three or more sets of rows. In the case of a self-join, the join expression can optionally indicate performance of a join across a single set of input rows.

The join expression 2516 can indicate a matching condition 2519 denoting what condition constitutes a left input row being matched with a right input row in generating output of the join operation, which can be based on characteristics of the left input row and/or the right input row, such as a function of values of one or more columns of the left input row and/or the right input row. For example, the matching condition 2519 requires equality between a value of a first column value of the left input rows and a second column value of the right input rows. The matching condition 2519 can indicate any conditional expression between values of the left input rows and right input rows, which can require equality between values, inequality between values, one value being less than another value, one value being greater than another value, one value being less than or equal to another value, one value being greater than or equal to another value, one value being a substring of another value, one value being an array element of an array, or other criteria. In some embodiments, the matching condition 2519 indicates all left input rows be matched with all right input rows. Two values and/or two corresponding rows can meet matching condition 2519 based on comparing favorably to one another and/or based on comparing favorably to the matching condition 2519.

The join expression 2516 can indicate a join type 2521 indicating the type of join to be performed to produce the output rows. For example, the join type 2521 can indicate the join be performed as a one of: a full outer join, a left outer join, a right outer join, an inner join, a cross join, a cartesian product, a self-join, an equi-join, a natural join, a hash join, or any other type of join, such as any SQL join type and/or any relational algebra join operation.

The query request 2515 can further indicate other portions of a corresponding query expression indicating performance of other operators, for example, to define the left input rows and/or the right input rows, and/or to further process output of the join expression.

The operator flow generator module 2514 can generate the query operator execution flow 2517 to indicate performance of a join process 2530 via one or more corresponding operators. The operators of the join process 2530 can be configured based on the matching condition 2519 and/or the join type 2521. The join process can be implemented via one or more serialized operators and/or multiple parallelized branches of operators 2520 configured to execute the corresponding join expression.

The operator flow generator module 2514 can generate the query operator execution flow 2517 to indicate performance of the join process 2530 upon output data blocks generated via one or more left input generation operators 2636 and one or more right input generation operators 2634. For example, the left input generation operators 2636 include one or more serialized operators and/or multiple parallelized branches of operators 2520 utilized to retrieve a set of rows from memory, for example, to perform IO operations, to filter the set of rows, to manipulate and/or transform values of the set of rows to generate new values of a new set of rows for performing the join, or otherwise retrieve and/or generate the left input rows, in accordance with the left input parameters 2513. Similarly, the right input generation operators 2634 include one or more serialized operators and/or multiple parallelized branches of operators utilized to retrieve a set of rows from memory, for example, via IO operators, to filter the set of rows, to manipulate and/or transform values of the set of rows to generate new values of a new set of rows for performing the join, or otherwise retrieve and/or generate the right input rows, in accordance with the right input parameters 2518. The left input generation operators 2636 and right input generation operators 2634 can optionally be distinct and performed in parallel to generate respective left and right input row sets separately. Alternatively, one or more of the left input generation operators 2636 and right input generation operators 2634 can optionally be shared operators between left input generation operators 2636 and right input generation operators 2634 to aid in generating both the left and right input row sets.

The query execution module 2504 can be implemented to execute the query operator execution flow 2517 to facilitate performance of the corresponding join expression 2516. This can include executing the left input generation operators 2636 to generate a left input row set 2541 that includes a plurality of left input rows 2542 determined in accordance with the left input parameters 2513, and/or executing the right input generation operators 2634 to generate a right input row set 2543 that includes a plurality of right input rows 2544 determined in accordance with the right input parameters 2518. The plurality of left input rows 2542 of the left input row set 2541 can be generated via the left input generation operators 2636 as a stream of data blocks sent to the join process 2530 for processing, and/or the plurality of right input rows 2544 of the right input row set 2543 can be generated via the right input generation operators 2634 as a stream of data blocks sent to the join process 2530 for processing.

The join process 2530 can implement one or more join operators 2535 to process the left input row set 2541 and the right input row set 2543 to generate an output row set 2545 that includes a plurality of output rows 2546. The one or more join operators 2535 can be implemented as one or more operators 2520 configured to execute some or all of the corresponding join process. The output rows 2546 of the output row set 2545 can be generated via the join process 2530 as a stream of data blocks emitted as a query resultant of the query request 2515 and/or sent to other operators serially after the join process 2530 for further processing.

Each output rows 2546 can be generated based on matching a given left input row 2542 with a given right input row 2544 based on the matching condition 2519 and/or the join type 2521, where one or more particular columns of this left input row are combined with one or more particular columns of this given right input row 2544 as specified in the left input parameters 2513 and/or the right input parameters 2518 of the join expression 2516. A given left input row 2542 can be included in no output rows based on matching with no right input rows 2544. A given left input row 2542 can be included in one or more output rows based on matching with one or more right input rows 2544 and/or being padded with null values as the right column values. A given right input row 2544 can be included in no output rows based on matching with no left input rows 2542. A given right input row 2544 can be included in one or more output rows based on matching with one or more left input rows 2542 and/or being padded with null values as the left column values.

The query execution module 2504 can execute the query operator execution flow 2517 via a plurality of nodes 37 of a query execution plan 2405, for example, in accordance with nodes 37 participating across different levels of the plan. For example, the left input generation operators 2636 and/or the right input generation operators 2634 are implemented via nodes at a first one or more levels of the query execution plan 2405, such as an IO level and/or one or more inner levels directly above the IO level.

The left input generation operators 2636 and the right input generation operators 2634 can be implemented via a common set of nodes at these one or more levels. Alternatively some or all of the left input generation operators 2636 are processed via a first set of nodes of these one or more levels, and the right input generation operators 2634 are processed via a second set of nodes that have a non-null difference with and/or that are mutually exclusive with the first set of nodes.

The join process 2530 can be implemented via a nodes at a second one or more levels of the query execution plan 2405, such as one or more inner levels directly above the first one or more levels, and/or the root level. For example, one or more nodes at the second one or more levels implementing the join process 2530 receive left input rows 2542 and/or right input rows 2544 for processing from child nodes implementing the left input generation operators 2636 and/or child nodes implementing the right input generation operators 2634. The one or more nodes implementing the join process 2530 at the second one or more levels can optionally belong to a same shuffle node set 2485, and can laterally exchange left input rows and/or right input rows with each other via one or more shuffle operators and/or broadcast operators via a corresponding shuffle network 2480.

Figure 25B:
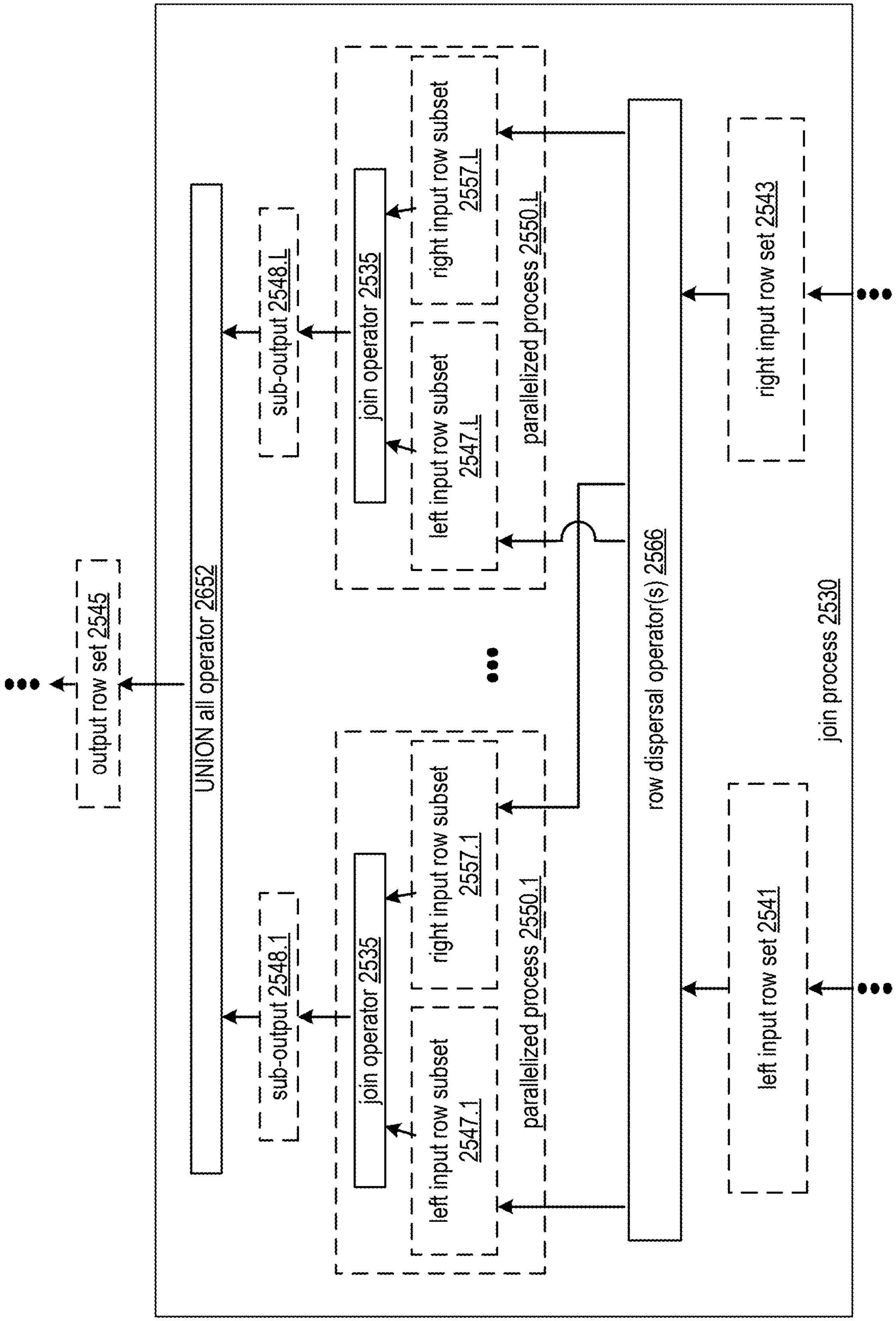
FIGS. 25B-25E are schematic block diagrams of example join processes executed via multiple parallel processes in accordance with various embodiments.

FIG. 25B illustrates an embodiment of a query execution module 2504 executing a join process 2530 via a plurality of parallelized processes 2550.1-2550.L Some or all features and/or functionality of the query execution module 2504 can be utilized to implement the query execution module 2504 of FIG. 25A, and/or any other embodiment of the query execution module 2504 described herein. In other embodiments, the query execution module 2504 of FIG. 25A implements the join process 2530 via a single join operator of a single processes rather than the plurality of parallelized processes 2550.

In some embodiments, the plurality of parallelized processes 2550.1-2550.L are implemented via a corresponding plurality of nodes 37.1-37.L of a same level, such as a given inner level, of a query execution plan 2405 executing the given query. In some embodiments, the plurality of parallelized processes 2550.1-2550.L are implemented via a corresponding plurality of processing core resources 48, such as multiple virtual machine cores, on a same given node 37 and/or across multiple parallelized nodes 37. In some embodiments, the plurality of parallelized processes 2550.1-2550.L can be implemented as a parallelized set of operator instances 2520 in parallel tracks of a given query operator execution flow 2517. The plurality of parallelized processes 2550.1-2550.L can be implemented as a set via any other set of parallelized and/or distinct memory and/or processing resources.

Each parallelized process 2550 can be responsible for generating its own sub-output 2548 based on processing a corresponding left input row subset 2547 of the left input row set 2541 and processing a corresponding right input row subset 2557. As discussed in further detail herein, each right input row subset 2557 can be a proper subset of the full right input row set 2543 and/or can include all of the right input row set 2543. Alternatively or in addition, each left input row subset 2547 can be a proper subset of the full left input row set 2541 and/or can include all of the left input row set 2541.

The dispersal of the left input row set 2543 into respective left input row subsets 2547.1-2547.L can be performed via one or more row dispersal operators 2566, such as one or more multiplexer operators, one or more tee operators, and/or one or more shuffle operators.

Figure 25C:
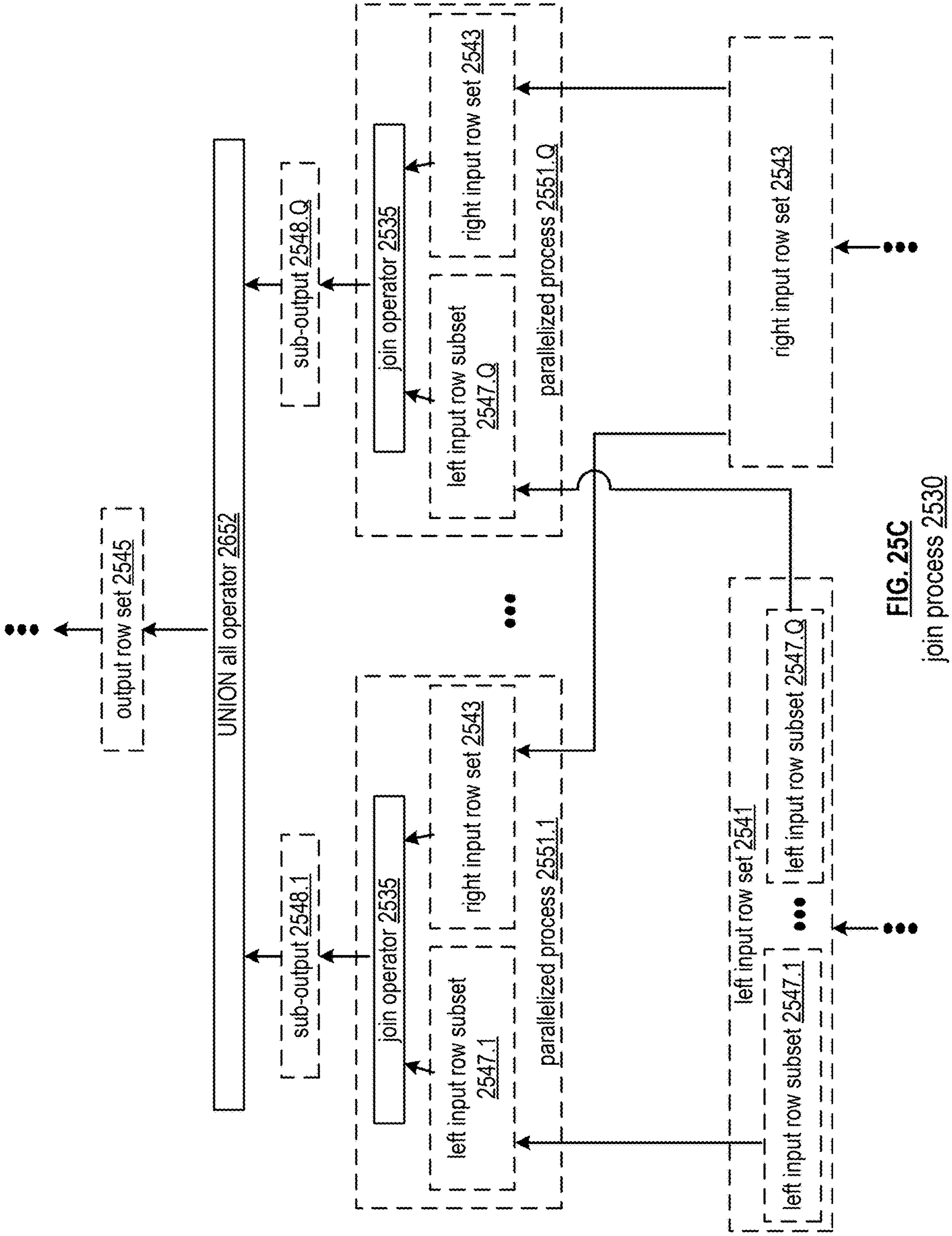

When implemented as a multiplexer operator, a row dispersal operator 2566 can be operable to emit different subsets of a set of incoming rows of an input row set, such as the right input row set 2543 and/or the left input row set 2541, to different parallelized processes for processing, for example, via respective parent operators. Each subset of rows sent to a given parallelized process 2550 can be is mutually exclusive from subsets of rows sent to other parallelized processes 2550, and/or the plurality of subsets of rows sent to the plurality of parallelized process 2550.1-2550.L are collectively exhaustive with respect to the input row set. This can be utilized to facilitate partitioning of a set of left input rows for processing across parallelized processes as illustrated in FIG. 25C.

When implemented as a tee operator, a row dispersal operator 2566 can be operable to emit all of a set of incoming rows of input row set to each different parallelized processes 2550 of the set of parallelized processes 2550.1-2550.L for processing, such as to respective parent operators. Each subset of rows sent to a given parallelized process 2550 is equivalent to that sent to other parallelized processes 2550, and/or the plurality of subsets of rows sent to the plurality of patent parallelized processes 2550 are equivalent to the input row set. This can be utilized to facilitate sharing of all of a same set of right input rows across all parallelized processes as illustrated in FIG. 25C.

When implemented as a set of shuffle operators, a respective set of row dispersal operators 2566 can be operable to share incoming rows with other operators to render all corresponding parallelized processes 2550 receiving all rows for processing, despite each shuffle operator receiving only one input set of rows itself. For example, each parallelized process implements its own shuffle operator to enable this sharing of rows. This can be utilized to facilitate sharing of all of a same set of right input rows across all parallelized processes as illustrated in FIG. 25C.

Each row in the left input row set 2541 can be included in exactly one of the respective left input row subsets 2547, can be included in more than one but less than all of the respective left input row subsets 2547, and/or can be included in every respective left input row subset 2547. Each row in the right input row set 2543 can be included in exactly one of the respective left input row subsets 2557, can be included in more than one but less than all of the respective left input row subsets 2557, and/or can be included in every respective left input row subset 2557. The dispersal and respective processing by the parallelized processing can guarantee that the union outputted via union operator 2652 does not include duplicate rows that should not be included in the output for query correctness and/or is not missing any rows that should be included in the output for query correctness.

FIG. 25C illustrates an embodiment of execution of a join process 2530 via a plurality of parallelized processes 2551.1-2551.Q. Some or all features and/or functionality of FIG. 25C can implement the join process 2530 of FIG. 25B, FIG. 25A, and/or any other embodiment of join process 2530 described herein.

The plurality of parallelized processes 2551.1-2551.Q can implement the plurality of parallel processes 2550.1-2550.L of FIG. 25B, where a given process 2551 of FIG. 25C implements some or all of a given process 2550 of FIG. 25B. Alternatively or in addition, a given plurality of parallelized processes 2551.1-2551.Q can be a plurality of inner, sub-processes of a given parallelized process 2550, where some or all of the plurality of parallel processes 2550.1-2550.L implement their own plurality of inner parallelized sub-processes 2551.1-2551.Q.

Each parallelized process 2551 can be responsible for generating its own sub-output 2548 based on processing a corresponding left input row subset 2547 of the left input row set 2541, and by further processing all of the right input row set. The full output row set 2545 can be generated by applying a UNION all operator 2652 implementing a union across all L sets of sub-output 2548, where all output rows 2546 of all sub-outputs 2548 are thus included in the output row set 2545. The output rows 2546 of a given sub-output 2548 can be generated via the join operator 2535 of the corresponding parallelized process 2555 as a stream of data blocks sent to the UNION all operator 2652.

In some embodiments, each parallelized process 2551 only receives the left input rows 2542 generated by its own one or more child nodes, where each of these child nodes only sends its output data blocks to one parent. The left input row set 2541 can otherwise be segregated into the set of left input row subsets 2547.1-2547.Q, each designated for a corresponding one of the set of parallelized processes 2551.1-2551.Q. The plurality of left input row subsets 2547.1-2547.Q can be mutually exclusive and collectively exhaustive with respect to the left input row set 2541, where each left input row 2542 is received and processed by exactly one parallelized process 2551.

In some embodiments, the right input row set 2543 is generated via another set of nodes that is the same as, overlapping with, and/or distinct from the set of nodes that generate the left input row subsets 2547.1-2547.L. For example, similar to the nodes generating left input row subsets 2547, Q different nodes and/or Q different subsets of nodes that each include multiple nodes generate a corresponding subset of right input rows, where these subsets are mutually exclusive and collectively exhaustive with respect to the right input row set 2543. Unlike the left input rows, all right input rows 2544 can be received by all parallelized processes 2551.1, for example, based on each node of this other set of nodes sending its output data blocks to all L nodes implementing the Q parallelized processes 2551, rather than a single parent. Alternatively, the right input rows 2544 generated by a given node can be sent by the node to one parent implementing a corresponding one of the plurality of parallelized processes 2551.1-2551.Q, where the Q nodes perform a shuffle and/or broadcast process to share received rows of the right input row set 2543 with one another via a shuffle network 2480 to facilitate all Q nodes receiving all of the right input rows 2544. Each right input row 2544 is otherwise received and processed by every parallelized process 2551.

This mechanism can be employed for correctly implementing inner joins and/or left outer joins. In some embodiments, further adaptation of this join process 2530 is required to facilitate performance of full outer joins and/or right outer joins, as a given parallel process cannot ascertain whether a given right row matches with a left row of some or the left input row subset, or should be padded with nulls based on not matching with any left rows.

In some embodiments, to implement a right outer join, the right and left input rows of a right outer join are designated in reverse, enabling the right outer join to be correctly generated based on instead segregating the right input rows of the right outer join across all parallelized processes 2551, and instead processing all left input rows of the right outer join by all parallelized processes 2551.

The left input row set that is segregated across all parallelized processes 2551 vs. the right input row set processed via every parallelized processes 2551 can be selected, for example, based on an optimization process performed when generating the query operator execution flow 2517. For example, for a join specified as being performed upon two sets of input rows, while the input row set segregated amongst different parallelized processes 2551 and the input row set processed via every parallelized processes 2551 could be interchangeably selected, an intelligent selection is employed to optimize processing via the parallelized processes. For example, the input row set that is estimated and/or known to require smaller memory space due to column value types and/or number of input rows meeting the respective parameters is optionally designated as the right input row set 2543, and the larger input row set that is estimated and/or known to require larger memory space is designated as the left input row set 2541, for example, to reduce the full set of right input rows required to be processed by a given parallelized process. In some cases, this optimization is performed even in the case of a left outer join or right outer join, where, if the right hand side designated in the query expression is in fact estimated to be larger than the left hand side, the “left” input row set 2541 that is segregated across all parallelized processes 2551 is selected to instead correspond to the right hand side designated by the query expression, and the “right” input row set 2543 that is segregated across all parallelized processes 2551 is selected to instead correspond to the left hand side designated by the query expression. In other embodiments, the vice versa scenario is applied, where the larger row set is designated as the right input row set 2543 processed by every parallelized process, and where the smaller row set is designated as the left input row set 2541 segregated into subsets each for processing by only one parallelized process.

Figure 25D:
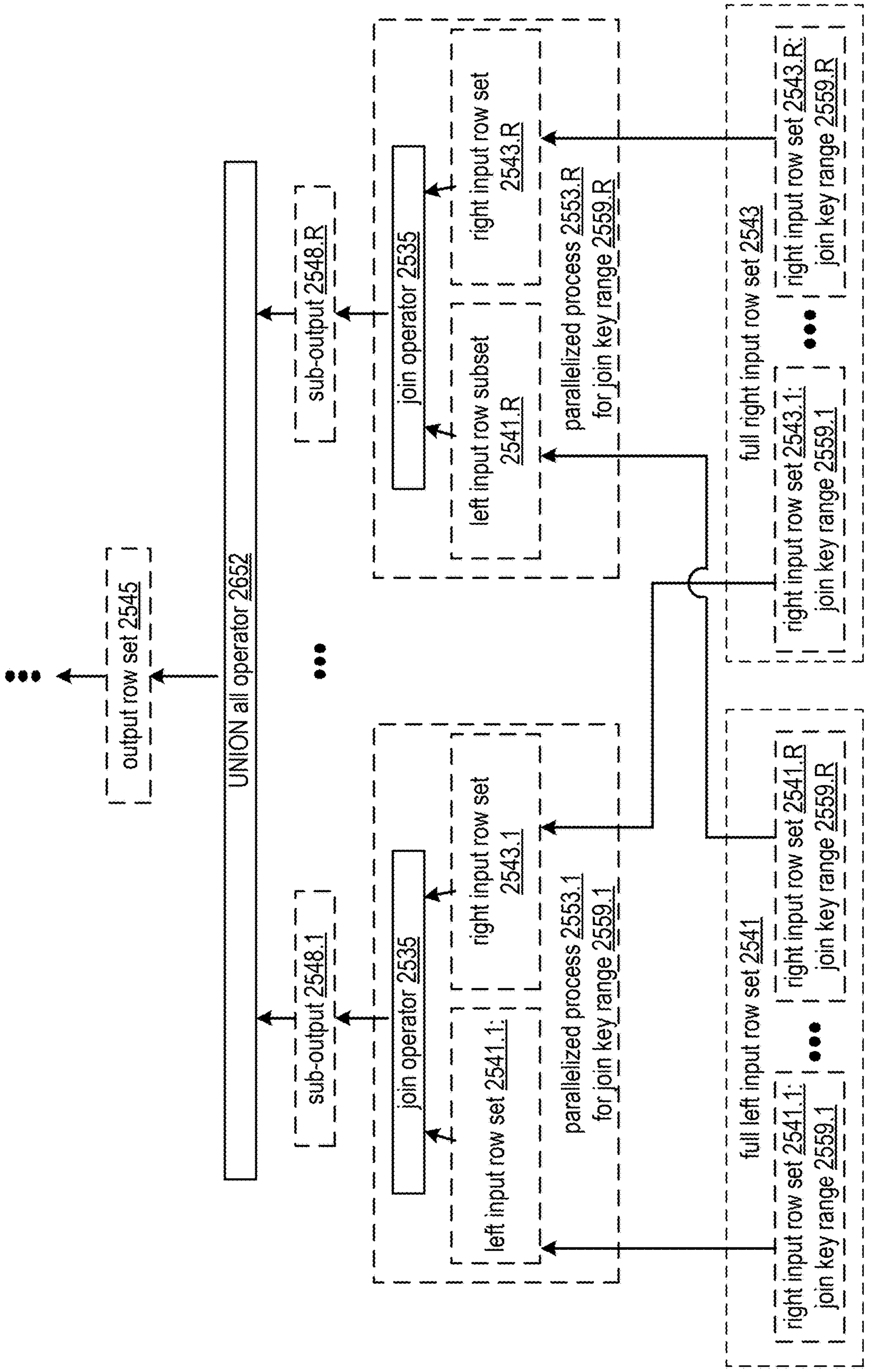

FIG. 25D illustrates an embodiment of execution of a join process 2530 via a plurality of parallelized processes 2553.1-2553.R. Some or all features and/or functionality of FIG. 25D can implement the join process 2530 of FIG. 25B, FIG. 25A, and/or any other embodiment of join process 2530 described herein.

The plurality of parallelized processes 2553.1-2553.R can implement the plurality of parallel processes 2550.1-2550.L of FIG. 25B, where a given process 2553 of FIG. 25D implements some or all of a given process 2550 of FIG. 25B. Alternatively or in addition, a given plurality of parallelized processes 2553.1-2553.R can be a plurality of inner, sub-processes of a given parallelized process 2550, where some or all of the plurality of parallel processes 2550.1-2550.L implement their own plurality of inner parallelized sub-processes 2553.1-2553.R.

Each parallelized process 2553 can be responsible for generating its own sub-output 2548 based on processing a corresponding one of the plurality of subsets of the full left input row set 2541, denoted as left input row sets 2541.1-2541.R, and by further processing a corresponding one of the plurality of subsets of the full right input row set 2543, denoted as right input row sets 2543.1-2543.R.

The left input row sets 2541.1-2541.R can be mutually exclusive and collectively exhaustive with respect to the full left input row set 2541, and can be partitioned by the join key of respective left input rows into a corresponding one of a set of join key ranges 2559.1-2559.R. For example, the join key of a left row is the value of one or more columns compared with values of right rows to determine whether the left row matches with any right rows. Thus, a given left input row sets 2541 from the full set is guaranteed to include all, and only, ones of the rows from the full set that fall within the respective join key range 2559.

Similarly, the right input row sets 2543.1-2543.R can be mutually exclusive and collectively exhaustive with respect to the full left input row set 2543, and also can be partitioned by the join key of respective right input rows into a corresponding one of a set of join key ranges 2559.1-2559.R, which can be identical ranges utilized to partition the left input rows into their respective sets 2541.1-2541.R. For example, the join key of a right row is the value of one or more columns compared with values of right rows to determine whether the left row matches with any right rows.

A given join key range 2559 can specify a single value, a set of continuous values, any set of multiple non-continuous values, and/or another portion of the domain of all possible join keys that is non-overlapping with other join key ranges. Applying the same set of join key ranges 2559.1-2559.R to route both left and right incoming rows to a parallelized process processing all rows having join keys in the respective range guarantees that any two rows in a matching pair of rows to be identified via the join will be processed by the same parallelized process 2553, and will thus be identified int he join process correctly. Thus, each parallelized process 2553 is guaranteed not to be missing any potential matches, and the output emitted by the union ALL operator can be therefore guaranteed to be correct.

In some cases, the value of null is implemented via own join key range 2559, is included in a given join key range 2559 with other non-null values, or is not included any join key ranges 2559 based on being filtered out and/or assigned to parallelized processes in a different manner.

Figure 25E:
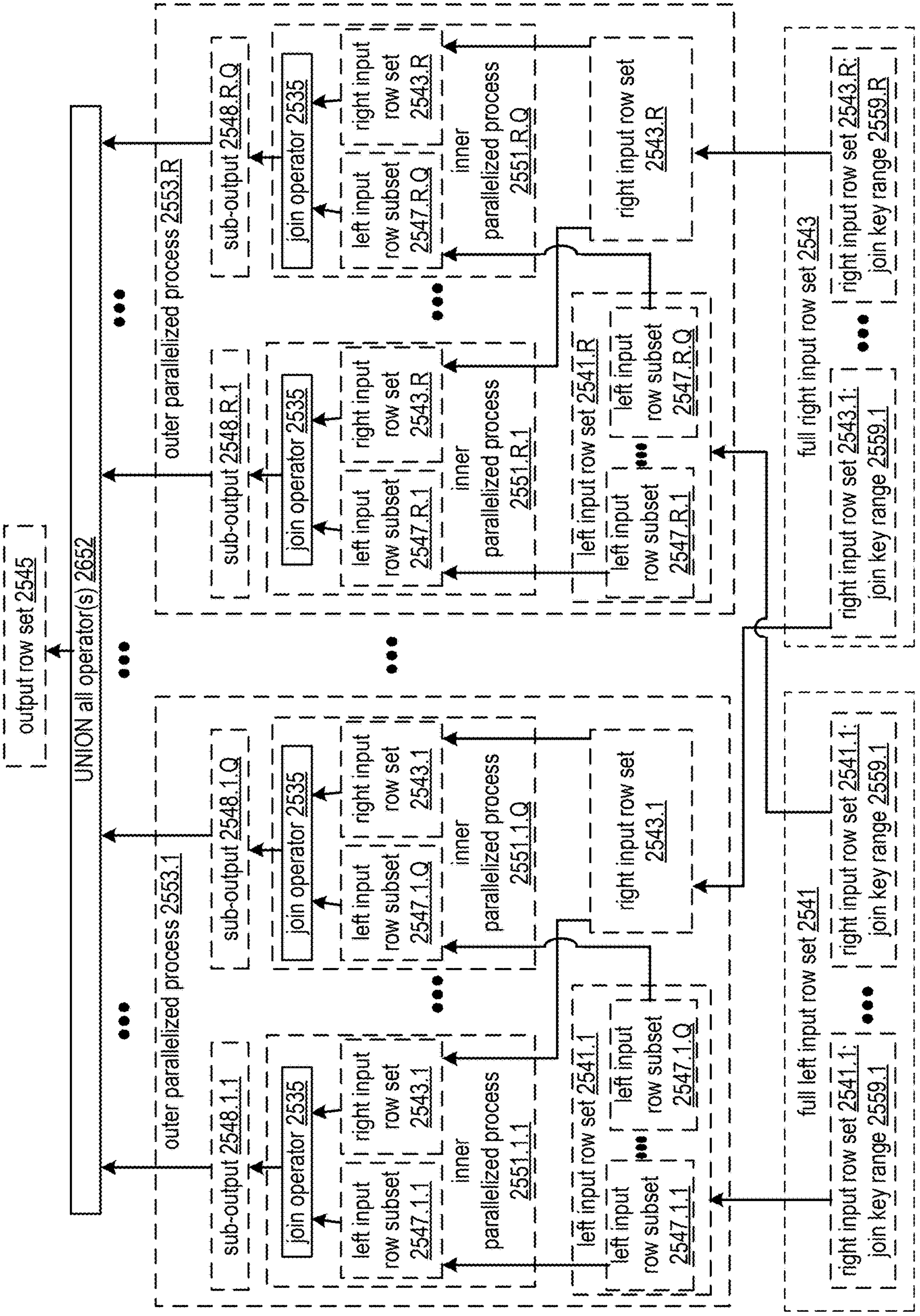

FIG. 25E illustrates an embodiment where the mechanisms of parallelization of both FIGS. 25C and 25D are combined to implement a join process. Some or all features and/or functionality of FIG. 25E can implement the join process 2530 of FIG. 25B, FIG. 25A, and/or any other embodiment of join process 2530 described herein.

The plurality of parallelized processes 2553.1-2553.R of FIG. 25D can be implemented as a plurality of outer parallelized processes, each performing its own set of inner parallelized processes implemented via the parallelized processes 2551.1-2551.Q of FIG. 25C. The number Q of inner parallelized processes 2551 implemented via a given outer parallelized process 2553 can be the same or different for different outer parallelized processes 2553.

The plurality of outer parallelized processes 2553.1-2553.R and/or the plurality of inner parallelized processes 2551.1-2551.Q across all of the plurality of outer parallelized processes s2553.1-2553.R can implement the plurality of parallel processes 2550.1-2550.L of FIG. 25B, where a given process 2553 and/or 2551 of FIG. 25E implements some or all of a given process 2550 of FIG. 25B. Alternatively or in addition, a given plurality of parallelized processes 2553.1-2553.R can be a plurality of inner, subprocesses of a given parallelized process 2550, where some or all of the plurality of parallel processes 2550.1-2550.L implement their own plurality of inner parallelized subprocesses 2553.1-2553.R, which each in turn implement their own plurality of parallelized processes 2551.1-2551.Q.

This embodiment can be preferred in reducing the size of hash map 2555 stored via each parallelized instance by leveraging partitioning via join key range, while further parallelization of the left input set of a given join key range further improves performance of implementing the join process for a given join key range 2559. Other embodiments only implement one of the forms of parallelization, or neither, in performing join processes 2530.

Figure 25F:
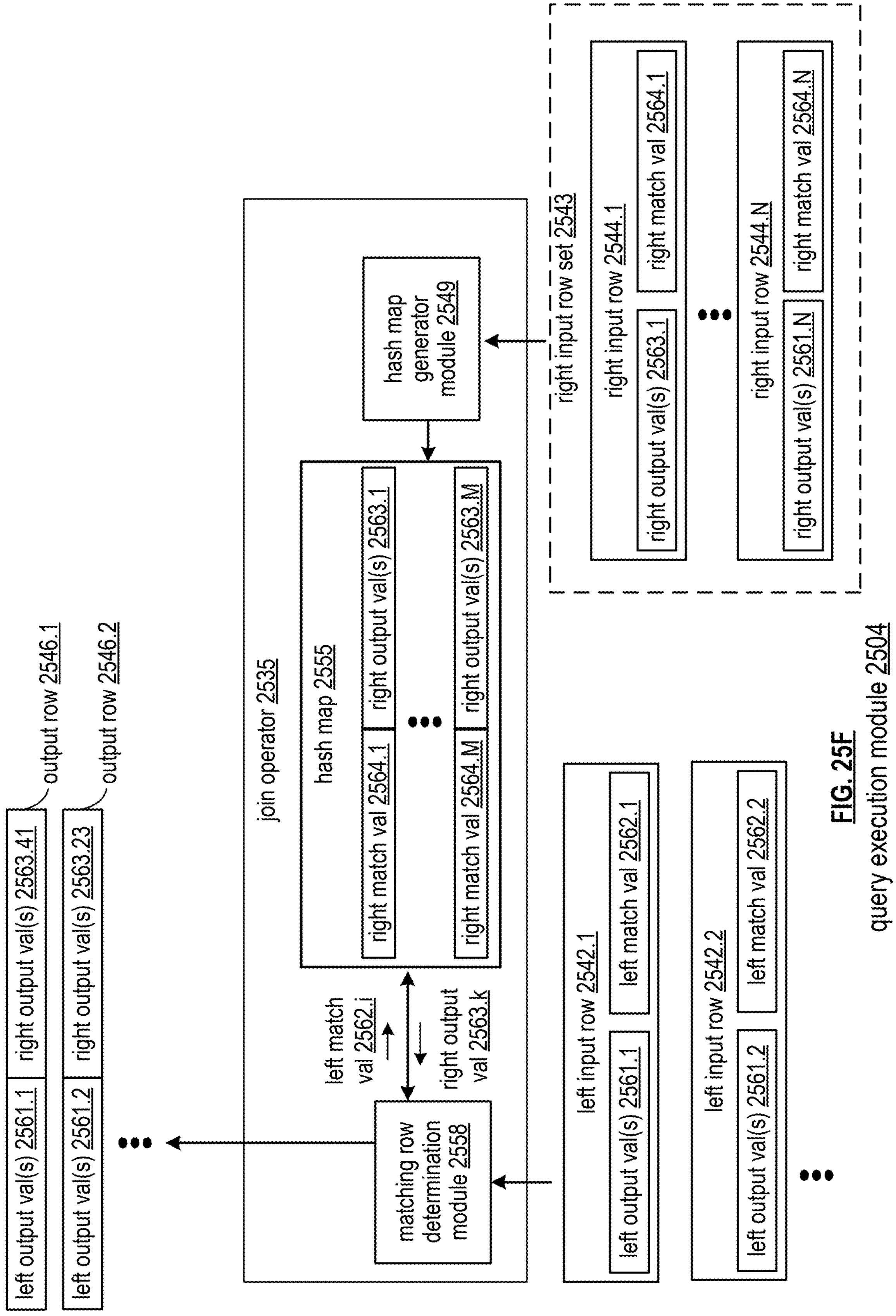
FIG. 25F is a schematic block diagram of a query execution module executing a join operator based on utilizing a hasp map generated from right input rows in accordance with various embodiments.

FIG. 25F illustrates an embodiment of a query execution module 2504 executing a join operator 2535. The embodiment of implementing the join operator 2535 of FIG. 25F can be utilized to implement the join process 2530 of FIG. 25A and/or can be utilized to implement the join operator 2535 executed via each of a set of parallelized processes 2550 of FIG. 25B, and/or via each of a set of parallelized processes 2551 and/or 2553 of FIGS. 25D, 25D, and/or 25E.

The join operator can process all right input rows 2544.1-2544.N of a right input row set 2543, and can process some or all left input rows 2542, such as only left input rows of a corresponding left input row subset 2547. The right input rows 2544 and/or left input rows can be received as one or more streams of data blocks.

A plurality of left input rows 2542 can have a respective plurality of columns each having its own column value. One or more of these column values can be implemented as left output values 2561, designated for output in output rows 2546, where these left output values 2561, if outputted, are padded with nulls or combined with corresponding right rows when matching condition 2519 is met. One or more of these column values can be implemented as left match values 2562, designated for use in determining whether the given row matches with one or more right input rows. The left match values 2562 can implement the join keys discussed previously that are optionally utilized to partition incoming rows into distinct parallelized portions for processing as discussed in conjunction with FIGS. 25D and 25E. These left match values 2562 can be distinct columns from the columns that include left output values 2561, where these columns are utilized to identify matches only as required by the matching condition 2519, but are not to be emitted as output in output rows 2546. Alternatively, some or all of these left match values 2562 can same columns as one or more columns that include left output values 2561, where these columns are utilized to not only identify matches as required by the matching condition 2519, but are further emitted as output in output rows 2546.

In some cases, the left input rows 2542 utilize a single column whose values implement both the left output values 2561 and the left match values 2562. In other cases, the left input rows 2542 can utilize multiple columns, where a first subset of these columns implement one or more left output values 2561, where a second subset of these columns implement one or more left match values 2562, and where the first subset and the second subset are optionally equivalent, optionally have a non-null intersection and/or a non-null difference, and/or optionally are mutually exclusive. Different columns of the left input rows can optionally be received and processed in different column streams, for example, via a distinct set of processes operating in parallel with or without coordination.

Similarly to the left input rows, the plurality of right input rows 2544 can have a respective plurality of columns each having its own column value. One or more of these column values can be implemented as right output values 2563, designated for output in output rows 2546, where these left output values 2561, if outputted, are padded with nulls or combined with corresponding left rows when matching condition 2519 is met. One or more of these column values can be implemented as left match values 2564, designated for use in determining whether the given row matches with one or more left input rows. The right match values 2564 can implement the join keys discussed previously that are optionally utilized to partition incoming rows into distinct parallelized portions for processing as discussed in conjunction with FIGS. 25D and 25E. These right match values 2564 can be distinct columns from the columns that include right output values 2563, where these columns are utilized to identify matches only as required by the matching condition 2519, but are not to be emitted as output in output rows 2546. Alternatively, some or all of these right match values 2564 can be implemented via same columns as one or more columns that include left output values 2561, where these columns are utilized to not only identify matches as required by the matching condition 2519, but are further emitted as output in output rows 2546.

In some cases, the right input rows 2544 utilize a single column whose values implement both the left output values 2561 and the left match values 2564. In other cases, the right input rows 2544 can utilize multiple columns, where a first subset of these columns implement one or more right output values 2563, where a second subset of these columns implement one or more right match values 2564, and where the first subset and the second subset are optionally equivalent, optionally have a non-null intersection and/or a non-null difference, and/or optionally are mutually exclusive. Different columns of the right input rows can optionally be received and processed in different column streams, for example, via a distinct set of processes operating in parallel with or without coordination.

Some or all of the set of columns of the left input rows can be the same as or distinct from some or all of the set of columns of the right input rows. For example, the left input rows and right input rows come from different tables, and include different columns of different tables. As another example, the left input rows and right input rows come from different tables each having a column with shared information, such as a particular type of data relating the different tables, where this column in a first table from which the left input rows are retrieved is used as the left match value 2562, and where this column in a second table from which the right input rows are retrieved is used as the right match value 2564. As another example, the left input rows and right input rows come from a same table, for example, where the left input row set 2541 and right input row set 2543 are optionally equivalent sets of rows upon which a self-join is performed.

The join operator 2535 can utilize a hash map 2555 generated from the right input row set 2543, mapping right match values 2564 to respective right output values 2563. For example, the raw right match values 2564 and/or other values generated from, hashed from, and/or determined based on the raw right match values 2564, are stored as keys of the hash map. In the case where the right match value 2564 for a given right input row includes multiple values of multiple columns, the key can optionally be generated from and/or can otherwise denote the given set of values.

These keys can be implemented as, and/or can be generated as a deterministic function of such as a hash function of, join keys of incoming rows that are utilized to identify whether the join's matching condition is satisfied. The join keys stored in a given hash map can correspond to join keys of a plurality of possible keys for the join, and/or only the join keys in the join key range 2559 that this hash map is generated for, where the given input row set 2541 utilized to generate the hash map 2555 is one of a plurality of distinct input row sets 2541.1-2541.R for a respective join key range 2559 of the plurality of distinct join key ranges 2559.1-2559.R.

The right match values 2564 in entries the hash map 2555 as corresponding keys of the hash map 2555 can each denote respective right output values 2563, for example, based on being mapped to row numbers and/or pointers to the respective row for the respective right output values 2563. Rather than the hash map storing the raw right output values 2563 themselves in its entries, these values can be denoted as row numbers and/or pointers mapped to a given key (e.g. given right match value 2564), denoting the storage location of the respective one or more right output values 2563 of a respective row, such as its ordering in a list of rows, an offset and/or other location information for this respective row in a corresponding column stream stored in query execution memory resources.

In some embodiments, the join operator 2535 be implemented as a hash join, and/or the join operator 2535 can utilize the hash map 2555 generated from the right input row set 2543 based on being implemented as a hash join.

The number of entries M of the hash map 2555 is optionally strictly less than the number of right input rows N based on one or more right input rows 2544 having a same right match value 2564 and/or otherwise mapping to the same key generated from their right match values. These right match values 2564 can thus be mapped to multiple corresponding right output values 2563 of multiple corresponding right input rows 2544. The number of entries M of the hash map 2555 is optionally equal to N in other cases based on no pairs of right input rows 2544 sharing a same right match value 2564 and/or otherwise not mapping to the same key generated from their right match values.

The join operator 2535 can generate this hash map 2555 from the right input row set 2543 via a hash map generator module 2549. Alternatively, the join operator can receive this hash map and/or access this hash map in memory. In embodiments where multiple parallelized processes 2550 are employed, each parallelized processes 2550 optionally generates its own hash map 2555 from the full set of right input rows 2544 of right input row set 2543. Alternatively, as the hash map 2555 is equivalent for all parallelized processes 2550, the hash map 2555 is generated once, and is then sent to all parallelized processes and/or is then stored in memory accessible by all parallelized processes.

The join operator 2535 can implement a matching row determination module 2558 to utilize this hash map 2555 to determine whether a given left input row 2542 matches with a given right input row 2543 as defined by matching condition 2519. For example, the matching condition 2519 requires equality of the column that includes left match values 2562 with the column that includes right match values 2564, or indicates another required relation between one or more columns that includes one or more corresponding left match values 2562 with one or more columns that include one or more right match values 2564. For a given incoming left input row 2542.*i*, the matching row determination module 2558 can access hash map 2555 to determine whether this given left input row's left match value 2562 matches with any of the right match values 2564, for example, based on the left match value being equal to and/or hashing to a given key and/or otherwise being determined to match with this key as required by matching condition 2519. In the case where a match is identified as a right input row 2544*k*, the right output value 2563 is retrieved and/or otherwise determined based on the hash map 2555, and the respective output row 2546 is generated to include the new row generated to include both the one or more left output values 2561.*i* of the left input row 2542.*i*, as well as the right output values 2563.*k* of the identified matching right input row 2544.*k*.

In this example, a first output value includes left output value 2561.1 and right output value 2563.41 based on the left match value 2562.1 of left input row 2542.1 being determined to be equal to, or otherwise match with as defined by the matching condition 2519, the right match value 2564.41 of the right input row 2542.41. Similarly, a second output value includes left output value 2561.2 and right output value 2563.23 based on the left match value 2562.2 of left input row 2542.2 being determined to be equal to, or otherwise match with as defined by the matching condition 2519, the right match value 2564.23 of the right input row 2542.23.

While not illustrated, in some cases, one or left match values 2562 of one or more left input rows 2542 are determined match with no right match values 2564 of any right input rows 2544, for example, based on matching row determination module 2558 searching the hash map for these raw and/or processed left match values 2562 and determining no key is included in the hash map, or otherwise determining no right match value 2564 is equal to, or otherwise matches with as defined by the matching condition 2519, the given left match value 2562. The respective left output values of these left input rows 2542 can be padded with null values in output rows 2546, for example, in the case where the join type is a full outer join or a left outer join. Alternatively, the respective left output values of these left input rows 2542 are not emitted in respective output rows 2546, for example, in the case where the join type is an inner join or a right outer join.

While not illustrated, in some cases, one or left match values 2562 of one or more left input rows 2542 are determined match with right match values 2564 of multiple right input rows 2544, for example, based on matching row determination module 2558 searching the hash map for these raw and/or processed left match values 2562 and determining a key is included in the hash map 2555 that maps to multiple right output values 2563 of multiple right input rows 2544. The respective left output values of these left input rows 2542 can be emitted in multiple corresponding output rows 2546, where each of these multiple corresponding output rows 2546 includes the right output values 2563 of a given one of the multiple right input rows 2544. For example, if the left match values 2562 of a given left input rows 2542 matches with right match values 2564 of three right input rows 2544, the left match values 2562 is emitted in three output rows 2546, each including the respective one or more right output values of a given one of the three right input rows 2544.

While not illustrated, in some cases, after processing the left input rows, one or more or right match values 2562 of one or more right input rows 2544 are determined not to have matched with any left match values 2562 of any of the received left input rows 2542, for example, based on matching row determination module 2558 never accessing these entries having these keys in the hash map when identifying matches for the left input rows. For example, execution of the join operator 2535 implementing a full outer join or a right join includes tracking the right input rows 2544 having matches, and all other remaining rows of the hash map are determined to not have had matches, and thus never had their output values 2563 emitted. In the case of a full outer join or a right join, the output values 2563 of these remaining, unmatched rows can be emitted as output rows 2546 padded with null values.

Figure 26A:
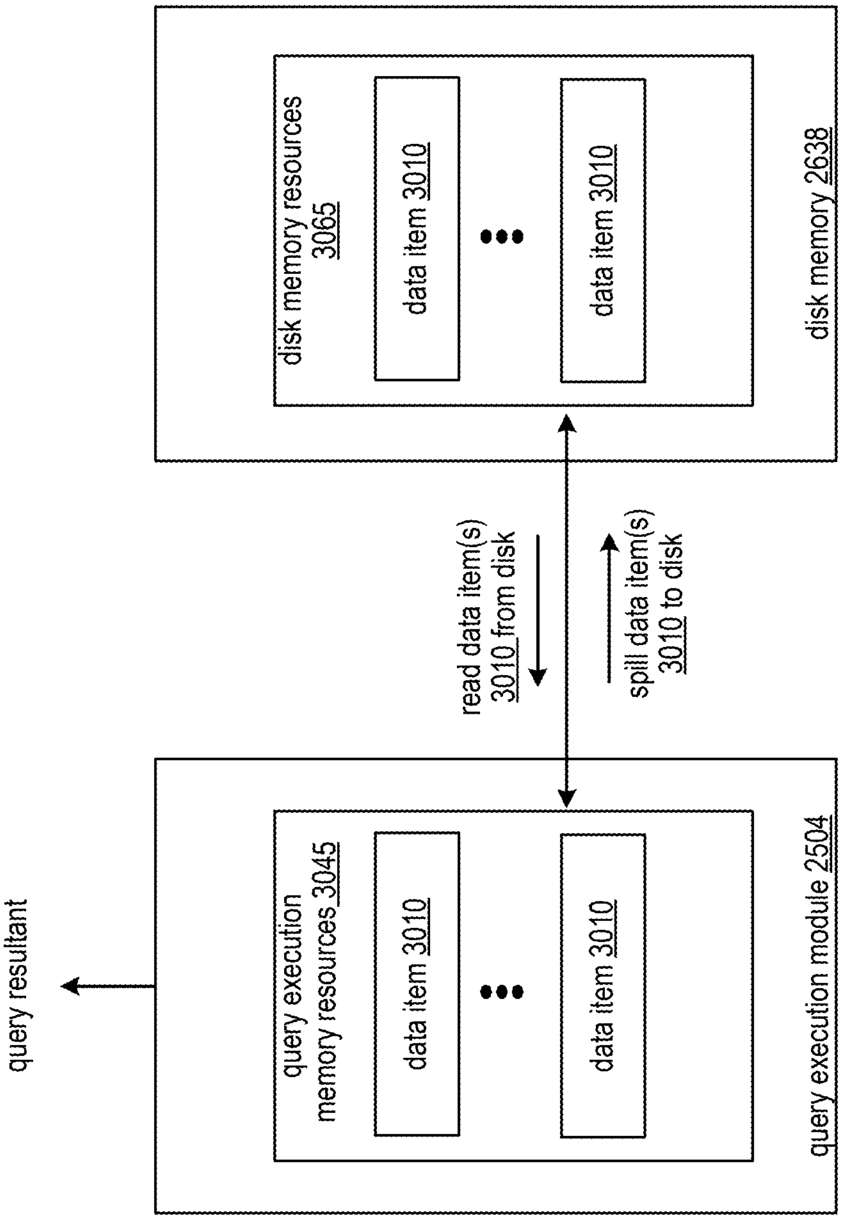
FIG. 26A is a schematic block diagram of a query execution module that spills data items to disk memory resources of disk memory in accordance with various embodiments.

FIG. 26A illustrates an embodiment of a query execution module 2504 that executes queries utilizing its own query execution memory resources 3045. As needed, the query execution module 2504 spills data items to at least one corresponding disk memory 2638 during query executions. These data items can later be read for processing via query execution memory resources 3045 in conjunction with query execution. Some or all features and/or functionality of the query execution module 2504 of FIG. 26A can implement the query execution module 2504 of FIG. 24F and/or any other embodiment of query execution module 2504 and/or performance of query execution described herein.

The query execution module 2504 processing module can be operable to perform operator executions of operators 2520 and/or to store one or more input data sets 2522 of data blocks pending processing via by utilizing its query execution memory resources 3045. The operator processing module can otherwise execute queries via a plurality of operator executions of operators of the corresponding query operator execution flows 2517 by utilizing these query execution memory resources 3045.

The query execution memory resources 3045 can include a threshold amount of memory capacity that can be utilized for query execution by the query execution module 2504, at any given time. In some cases, during query execution, these memory resources are exhausted where additional memory is required for further execution of the query that is not available via query execution memory resources 3045, for example, due to the memory capacity of the internal query execution memory resources 3045 being reached via the current state of executing one or more query operator execution flows of one or more queries. For example: output is generated via an operator execution causing query execution memory resources 3045 to be low and/or fully exhausted; new pending datablocks are received causing query execution memory resources 3045 to be low and/or fully exhausted; a data structure, such as a hash map 2555 for performing hash joins, is generated and consumes query execution memory resources 3045 causing query execution memory resources 3045 to be low and/or fully exhausted; and/or other combinations of tasks and/or data being performed and/or processed during query execution at a given time consumes at least a threshold amount of the query execution memory resources 3045.

In these cases, one or more data items 3010 of corresponding query can be spilled to disk. Data items 3010 can include some or all operator state info for one or more corresponding operators in the query operator execution flow. For example, newly generated output, data blocks pending processing, and/or a data structure such as a hash map 2555 of a corresponding join such as a hash join, some or all of the corresponding query operator execution flow 2517, such as some or all data blocks outputted by operators 2520 and/or already included in operator queues 2522, or other data items 3010, are spilled to disk if there are not enough available portions of query execution memory resources 3045 for storing these data items. This can include transferring and/or storing these data items 3010 in disk memory resources 3065 of at least one disk memory 2638. Disk memory resources 3065 of disk memory 2638 can be accessed to perform the remainder of operator executions at a later time for performance the remainder of operator executions to facilitate completion of the query's execution.

Spilling to disk can result in slower execution of the corresponding query due to slower access and/or processing of data items 3010 in disk memory 38. Thus, in most cases as discussed herein, it can be favorable to execute queries via query execution memory resources 3045 when possible and it can be favorable to prevent executing queries from spilling to disk, when possible. Furthermore, the amount of disk memory resources 3065 available for data spills can be limited, so it can be further favorable to limit the amount of data spilled to disk.

Figure 26B:
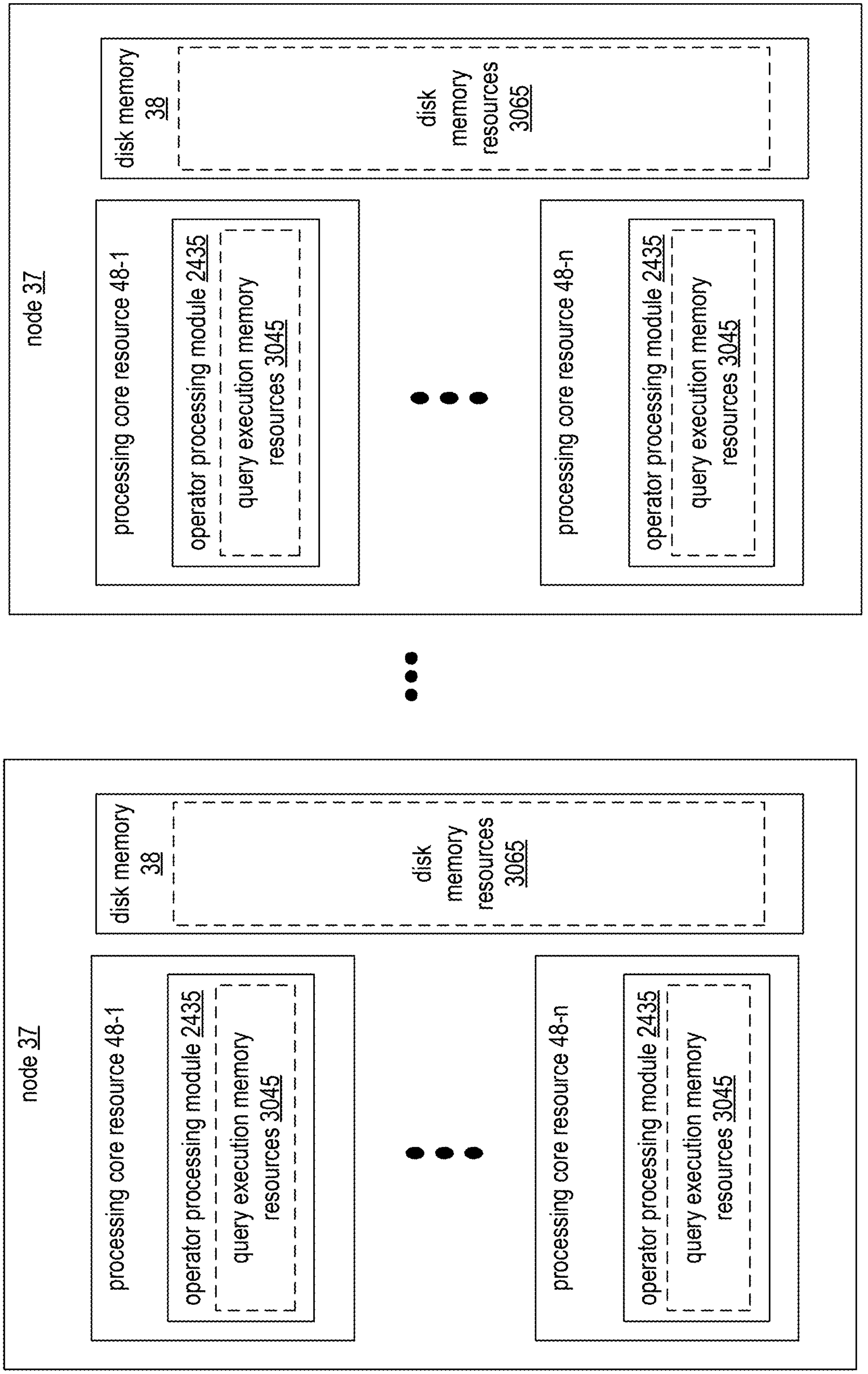
FIG. 26B is a schematic block diagram of a query execution module includes a plurality of nodes that each implement their own disk memory resources and their own query execution memory resources in accordance with various embodiments.

FIG. 26B illustrates an embodiment of a plurality of nodes of a query execution module 2504 that each implement their own query execution memory resources 3045 and their own disk memory resources 3065. For example, the plurality of nodes of FIG. 26B collectively execute one or more given queries via participation in a query execution plan 2405.

Some or all features and/or functionality of the query execution module 2504 of FIG. 26B can implement the query execution module of FIG. 26A and/or any other embodiment of the query execution module 2504 described herein.

The query execution memory resources 3045 of a given node can be implemented via some or all features and/or functionality of the query execution memory resources 3045 of FIG. 26A and/or any embodiment of query execution memory resources 3045 described herein. The disk memory resources 3065 of a given node can be implemented via some or all features and/or functionality of the disk memory resources 3065 of FIG. 26A and/or any embodiment of disk memory resources 3065 described herein. A given node can implement the spilling to disk and/or the reading from disk of FIG. 26A, and/or any other embodiment of spilling to disk or reading from disk described herein.

Some or all features and/or functionality of a given node 37 of FIG. 26B can be utilized to implement some or all nodes 37 of some or all computing devices 18 of the database system 10 described herein. A given node 37 can include one or more processing core resources **48-1-48-*n* as discussed previously, where each processing core resource 48 optionally executes queries by implementing its own query processing module 2435, such as embodiments of the query processing module 2435 discussed in conjunction with FIGS. 24A-24**D.

Each query processing module 2435 can be operable to execute queries by utilizing its own query execution memory resources 3045. For example, the query execution memory resources 3045 can be implemented by utilizing cache memory 45 of the corresponding processing core resource 48 and/or by utilizing other memory of the processing core resource 48 that is utilized by its processing module 44. In some cases, the query execution memory resources 3045 are shared by an operator scheduling module and/or other processing modules of the corresponding processing core resource 48 to facilitate performance of other functionality of the processing core resource 48 discussed herein.

The query execution memory resources 3045 can include a threshold amount of memory capacity that can be utilized for query execution by the query processing module 2435 of the given processing core resource 48 and/or given node 37, and/or other operations of the processing core resource and/or given node, at any given time. The query execution memory resources 3045 can store data items 3010 utilized by the node to execute queries.

Individual nodes can spill various data items 3010 to their own disk memory during query executions as needed, for example, based on the individual node's query execution memory resources 3045 comparing unfavorably to low memory criteria, having availability lower than or equal to a low memory threshold, otherwise becoming unavailable for further processing of its data items, and/or other reasons. Individual nodes can read these data items from their own disk memory, for example, based on the individual node's query execution memory resources 3045 comparing favorably to low memory criteria, having availability greater than a low memory threshold, otherwise becoming available for further processing of data items, and/or other reasons. This can include transferring and/or storing data items in disk memory 38, such as memory device 42 of the particular processing core resource 48, and/or other disk memory accessible by the node 37. For example, after a given data item to be processed in conjunction with execution of a given query is spilled to a node's disk memory by a given node when query execution memory resources 3045 are low and/or unavailable, this given node later reads the given data item from disk memory for processing in conjunction with the given query when query execution memory resources 3045 are no longer low and/or are again available.

Figure 26C:
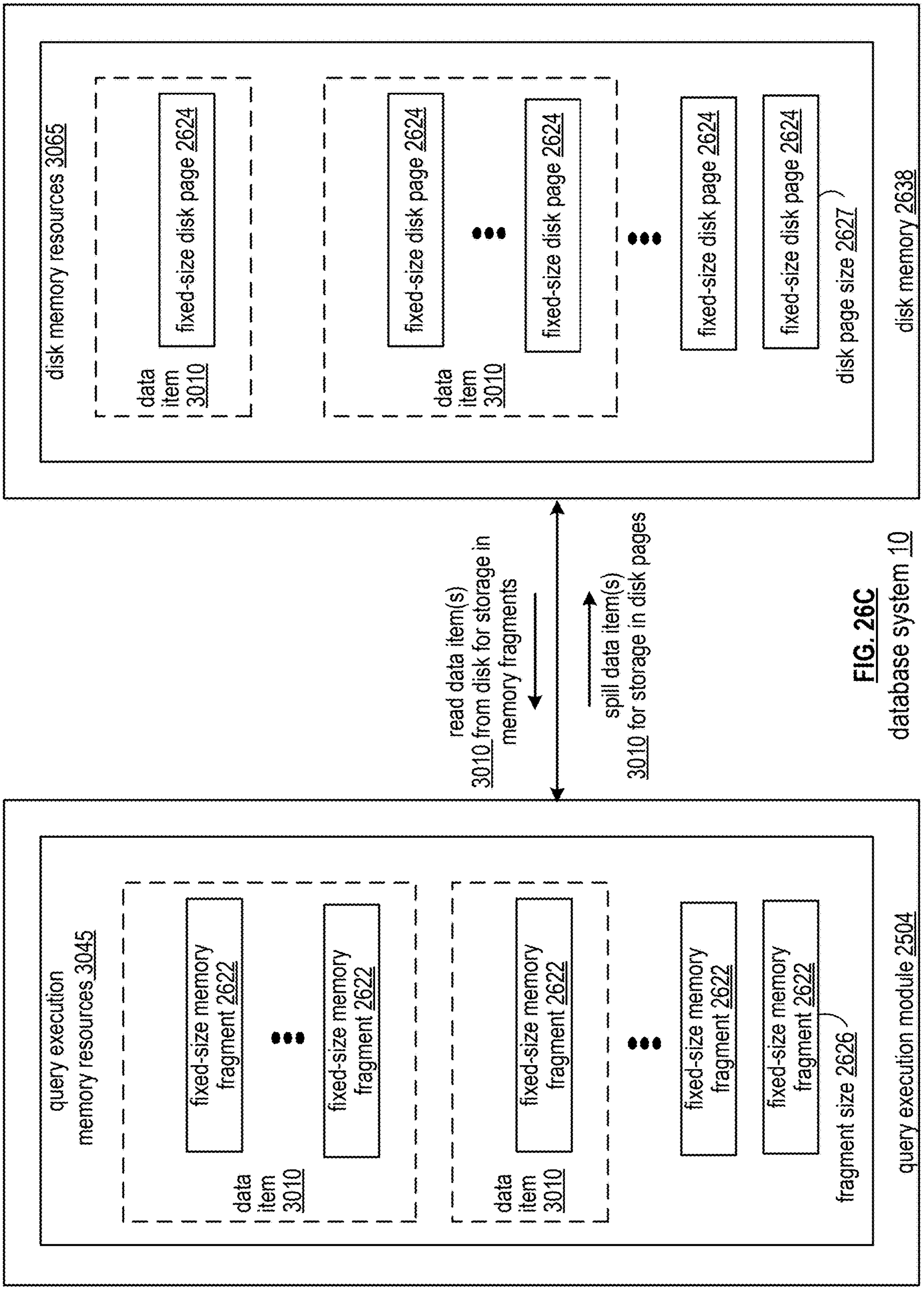
FIG. 26C is a schematic block diagram of a query execution processing resources 3045 that include a plurality of fixed-sized memory resources and of disk memory resources that include a plurality of fixed-size disk pages in accordance with various embodiments.

FIG. 26C illustrates an embodiment of a database system 10 where query execution memory resources 3045 store various data items 3010 via a plurality of fixed-size memory fragments 2622, and/or where disk memory resources 3065 store various data items 3010 via a plurality of fixed-size disk pages 2624. Some or all features and/or functionality of the query execution memory resources 3045 and/or disk memory resources 3065 of FIG. 26C can implement the query execution memory resources 3045 and/or disk memory resources 3065 of FIGS. 26A and/or 26B, and/or any other embodiments of query execution memory resources 3045 and/or disk memory resources 3065 described herein.

In some embodiments, data items 3010 that are processed and/or spilled via query execution module 2504 and/or a given node 37 are a portion of memory made up of one or more fixed-size fragment each having the same fragment size 2626. For example, each fixed size fragment can have a fixed size of 128 KiB, or any other fixed size. The fragment size can correspond to smallest increment of memory allocation. Thus, in some cases, a given data item only consumes a fraction of a single fragment, where this single fragment is optionally only utilized for this given data item and not any other data items, despite having extra space not being filled, as this is the smallest allocatable memory of query execution memory resources 3045. Other data items can be larger and consist of more than one data fragment.

Data can be spilled to an underlying store that manages the disk memory resources 3065 as a collection of fixed-size pages each having the same disk page size 2627. For example, each fixed-size page can have a fixed size of 8-128 KiB. Similar to fragments, a page can correspond to the smallest increment of disk allocation, and/or all writes are rounded up to the nearest page.

Figure 26D:
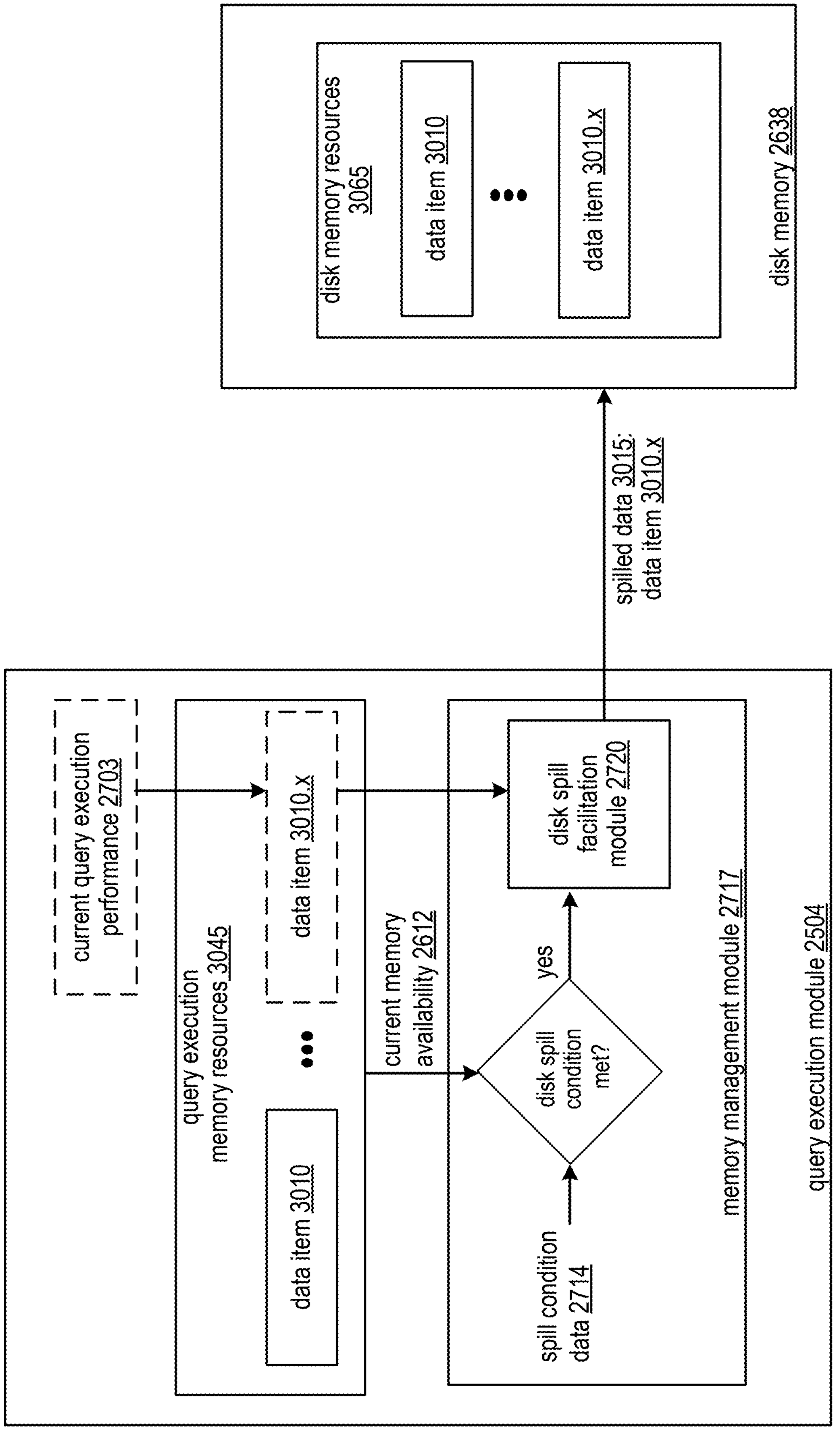
FIG. 26D is a schematic block diagram of a memory management module that implements a disk spill facilitation module to spill a data item to disk when a disk spill condition is met in accordance with various embodiments.

FIG. 26D illustrates an embodiment of a memory management module 2717 implemented to determine whether to spill to disk as incoming data items 3010 are generated and processed during query execution. The memory management module 2717 of FIG. 26D can be implemented via a query execution module 2504 to implement the spilling to disk of FIG. 26A. As a particular example, the memory management module 2717 of FIG. 26D can be implemented via one or more individual nodes 37 of FIG. 26B to implement spilling to disk by individual nodes 37 of a query execution module 2504.

The memory management module 2717 can determine whether a disk spill condition is met for a given incoming data item 3010.*x* generated and/or received during current query execution performance 2703 based on current memory availability 2612 of query execution memory resources 3045 and/or based on disk spill condition data 2714, such as a threshold memory availability, threshold memory utilization, and/or other predetermined and/or dynamic conditions dictating that a disk spill be performed for the incoming data item. In particular, the disk spill condition can be determined to be met based on the current memory availability 2612 comparing unfavorably to the disk spill condition.

The disk spill condition data 2714 can indicate data be spilled when a low memory condition is met. For example, when memory availability 2612 is lower than a threshold minimum memory availability of the disk spill condition data 2714, the disk spill is facilitated for the given data item, where the given data item is stored in query execution memory resources 3045 when memory availability 2612 is greater than or equal to this threshold minimum memory availability. As another example, when memory availability 2612 is lower than an amount of memory required to store the incoming data item 3010.*x*, the disk spill is facilitated for the given data item, where the given data item is stored in query execution memory resources 3045 when memory availability 2612 indicates enough memory is available to be allocated to store the incoming data item.

When a disk spill condition of disk spill condition data 2714 is determined to be met, a disk spill facilitation module 2720 can be implemented to facilitate transfer of corresponding spilled data 3015 for the incoming data item in disk memory resources 3065. This can include sending the data stored in the one or more fixed-size memory fragments 2622 for storage in a set of fixed-size disk pages 2624. This can further include freeing these fixed-size memory fragments 2622 for allocation and use to store other data items generated in subsequent steps of the query execution.

Figure 26E:
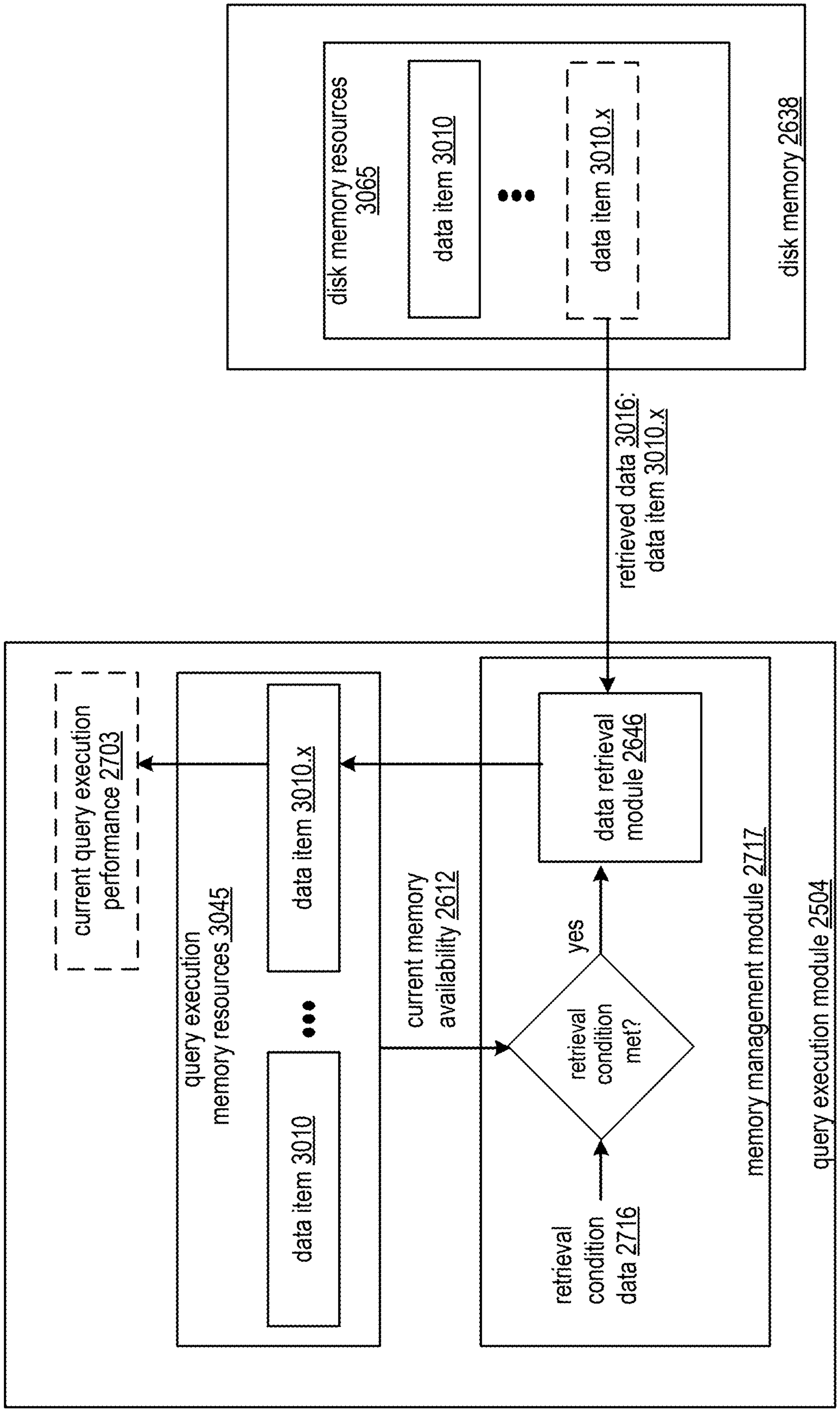
FIG. 26E is a schematic block diagram of a memory management module that implements a data retrieval module to read a data item from disk when a data retrieval condition is met in accordance with various embodiments.

FIG. 26E illustrates an embodiment of a memory management module 2717 that implements a data retrieval module 2646 to read previously spilled data back to query execution memory resources 3045 for further processing in accordance with the query. As a particular example, data item 3010.*x* is spilled at a first time during query execution as illustrated in FIG. 26D, and is later read back to back to query execution memory resources 3045 for further processing in accordance with the query at a second time during query execution as illustrated in FIG. 26E. The memory management module 2717 of FIG. 26E can be implemented via a query execution module 2504 to implement the reading of data from disk of FIG. 26A. As a particular example, the memory management module 2717 of FIG. 26E can be implemented via one or more individual nodes 37 of FIG. 26B to implement reading of data from disk by individual nodes 37 of a query execution module 2504.

The memory management module 2717 can determine whether a retrieval condition is met for based on current memory availability 2612 of query execution memory resources 3045 and/or based on retrieval condition data 2716, such as a threshold memory availability, threshold memory utilization, query progress, and/or other predetermined and/or dynamic conditions dictating that some or all data previously spilled to disk be retrieved for processing.

The spill condition data 2714 can indicate data be spilled when a low memory condition is no longer met. For example, when memory availability 2612 is greater than or equal to threshold minimum memory availability of the disk spill condition data 2714, the retrieval is facilitated for at least one given data item. As another example, when a second threshold minimum memory availability of the retrieval condition data that indicates a higher, or otherwise different, minimum memory favorability than the threshold minimum memory availability of the disk spill condition data 2714, the retrieval is facilitated for at least one given data item. As another example, when memory availability 2612 has availability for storing a given data item with at least a threshold buffer after storing the given data item, the given data item is retrieved. As a particular example, at least a number of fixed-sized memory fragments corresponding to a size of a corresponding data item 3010 must be available for storing the corresponding data item. Given data items retrieved at a given time can be based on their size, an ordering for processing these data items in conjunction with continuing query execution, or other factors.

When a retrieval condition of disk spill condition data 2714 is determined to be met, a data retrieval module 2646 can be implemented to facilitate retrieving of a given data item 3010 as retrieved data 3016, for example, based on sending a corresponding retrieval request. Performing this retrieval of data item 3010, for example, via sending of a corresponding retrieval request, can include utilizing lookup data and/or other metadata tracked for data items spilled to disk to identify the location of the data item in memory. Performing this retrieval of data item 3010 can include first allocating memory, such as one or more memory fragments 2622 for the data item to be retrieved in query execution memory resources 3045, and/or storing the retrieved data item 3010 in this allocated memory.

FIGS. 27A-27G illustrate embodiments of a database system 10 operable to sort a hash map 2555 prior to being spilled to disk memory resources. Some or all features and/or functionality of spilling a hash map 2555 to disk via a disk spill facilitation module 2720 of FIGS. 27A-27G can be implemented via some or all features and/or functionality of spilling a data item 3010 as discussed in conjunction with FIGS. 26A-26E, where the hash map 2555 of FIGS. 27A-27G is optionally implemented as data item 3010. Some or all features and/or functionality of the hash map 2555 of FIGS. 27A-27G can implement the hash map 2555 of FIG. 25F and/or any other embodiment of a hash map described herein. Some or all features and/or functionality of FIGS. 27A-27G can implement any other embodiments of database system 10 described herein.

Performance of a hash join operation, such as a corresponding join process 2530, can involve an attempt to build a full in-memory hash map of one of the sets of inputs, such as the right input row set, to query execution memory resources 3045. If there is insufficient memory in the system, such as a disk spill condition being met, the hash join operator, such as a corresponding operator execution module and/or corresponding node, may be signaled to spill its map to disk, for example, via memory management module 2717, and go into external mode, for example, where query execution continues via access to the disk memory. For example, this situation only occurs when the system is low on memory, and/or when a disk spill condition is otherwise met denoting the hash map to be spilled to disk.

Based on how hash joins are executed, for a hash join operator instance to spill its map to disk, it can be required to write every row in the map to some bucket, for example, to ensure proper continued execution of the hash join. The bucket for a row can be selected based on the hash value for that row's equijoin keys (e.g., modulo the number of buckets used and/or via applying a deterministic function). Since an output data block takes memory, in this low memory state ideally the operator only writes to just one bucket at a time. To accomplish this, the entries in the hash map can be sorted by their hash bucket values for iteration through the map.

Note that as described herein in conjunction with FIGS. 27A-27G, the hash map 2555 is not necessarily a hash map built for execution for a hash join, but could alternatively or additionally be implemented as a hash map or other data structure utilized for performance of another type of query operator, such as an intersection operator or other set operator, a multi join operator, an aggregation operator, or other operator that requires sorting prior to being spilled to disk.

Figure 27A:
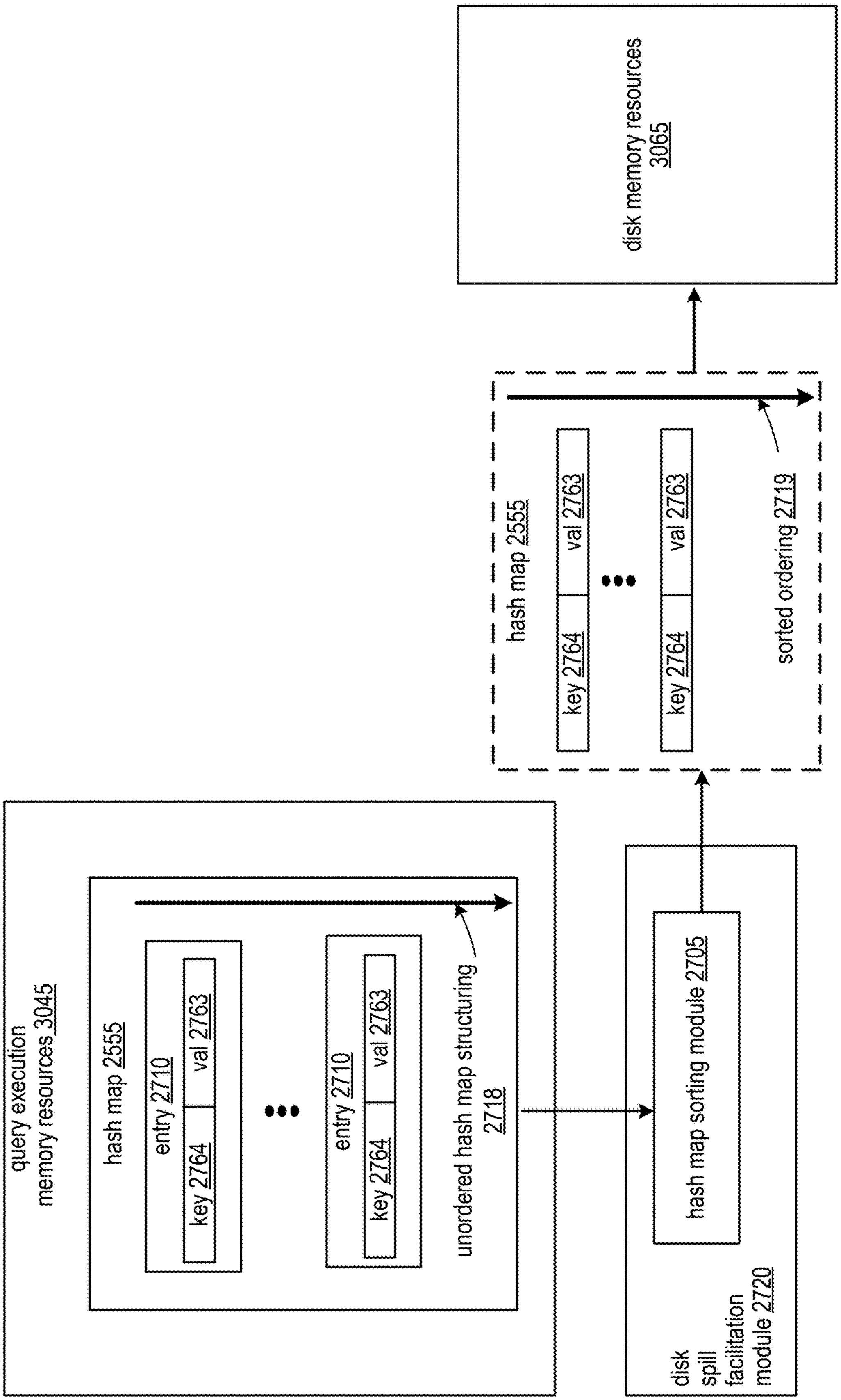
FIG. 27A is a schematic block diagram of a database system implementing a disk spill facilitation module that spills a plurality of entries of a hash map to disk in accordance with a sorted ordering in accordance with various embodiments.

FIG. 27A illustrates a disk spill facilitation module 2720 that implements a hash map sorting module 2705 operable to sort a plurality of entries 2710 included in query execution memory resources 3045 of hash map 2555 in accordance with an unordered hash map structuring 2718 to be spilled to disk memory resources 3065 in accordance with a sorted ordering 2719. Some or all features and/or functionality of the disk spill facilitation module 2720 of FIG. 27A can implement the disk spill facilitation module 2720 of FIGS. 26A-26E and/or any other embodiment of the disk spill facilitation module 2720 described herein.

Each entry 2710 in the hash map can include a key 2764 mapped to a corresponding value 2763. For example, key can be implemented as a join key that, when matching another join key for the other input set, denotes the matching condition is met. As a particular example, in the case where the hash map is implemented for a join process as discussed in conjunction with FIG. 25F, each key 2764 can indicate a right match value 2564 and/or each value can indicate a right output value 2563, built from a right input row set. The key can be implemented as any key utilized for other non-join operations implementing a hash map utilized to determine whether a matching condition for these operations exist and/or otherwise utilized to determine whether and/or how the respective values are included in output.

The value 2763 stored in hash map 2555 can denote the single value or multiple values mapped to the respective key 2764. The value 2763 can include the raw value itself, and/or can optionally include a row number and/or row pointer to the respective value for the respective row, for example, to the value 2918 for a corresponding row 2916 in a column data stream 2968. For example, the right input row set 2543 is implemented as a column data stream 2968 stored via query execution memory resources 3045 and each right output value 2563 of FIG. 25F is implemented as a pointer to the value 2918 for a corresponding row 2916 in this column data stream 2968.

The sorting the plurality of entries 2710 of hash map 2555 for spilling to disk memory in sorted ordering 2719 can be accomplished via different types of sorting schemes requiring different memory allocation for execution.

A first solution for sorting hash maps for spilling to disk is allocating a vector of "slot numbers" in the hash map, and then sorting that vector according to the entries' hash buckets', for example, to avoid having to move actual hash map entries around. While this achieves the desired sorting required for spilling the hash map to disk, aspects of this first solution can be unideal in some embodiments: in particular because this operation only happens when the system is memory constrained, there might not be enough memory for this list of slot numbers.

A second solution for sorting hash maps for spilling to disk is to sort the entries of the hash map in place so that the hash map can be spilled to disk without acquiring more memory. While this also achieves the desired sorting required for spilling the hash map to disk, aspects of this second solution can also be unideal in some embodiments: this sorting mechanism requires moving entries of the hash map, which may be large. This can be somewhat mitigated by having the value fields of the map be pointers to a larger type. In particular, applying a bucket sort to this second solution can be favorable, as it's faster than comparison based sorting. One challenge to implement a bucket sort is that bucket sort typically requires additional memory to build linked lists of values for each bucket.

A third solution for sorting hash maps for spilling to disk can include exploiting the structure of the hash map to reuse memory and build a sorted linked list without any new allocations to enable the favorable benefits of applying a bucket sort. Notionally, this scheme can convert the plurality of (key, value) pairs of entries 2710 in the unordered hash map structuring 2718 of hash map 2555 into a sorted list of (key, value) pairs, sorted by key in accordance with sorted ordering 2719. As a particular example, the hash map 2555 is implemented as an unsorted map of join key mapped to row numbers and/or row pointers (e.g. unordered_map<join_key, row_pointer>) into a sorted list of (join key, row pointer) pairs (e.g. a list<pair<join_key, row_pointer>>) that is sorted by arbitrary function of the join key (e.g. some f(join_key, row)) for spill without allocating new memory and/or by allocating a minimal amount of new memory.

Figure 27B:
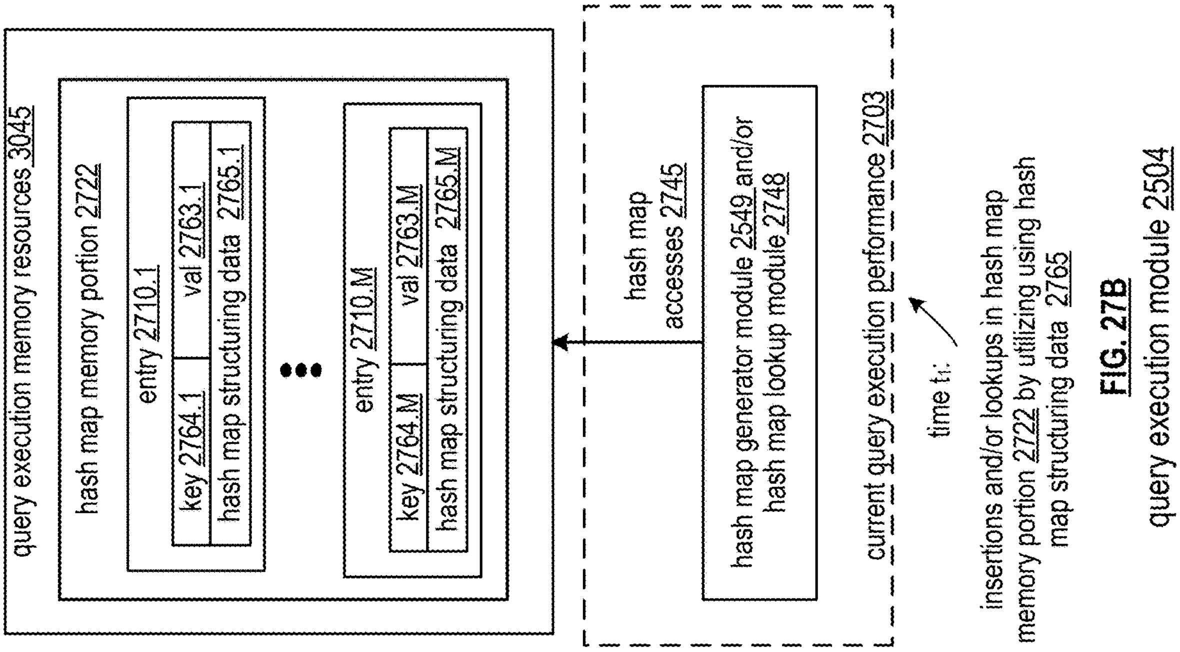
FIGS. 27B and 27C are schematic block diagrams of a query execution module illustrating overwriting of hash map structuring data of hash map entries with sorted position data in accordance with various embodiments.
Figure 27C:
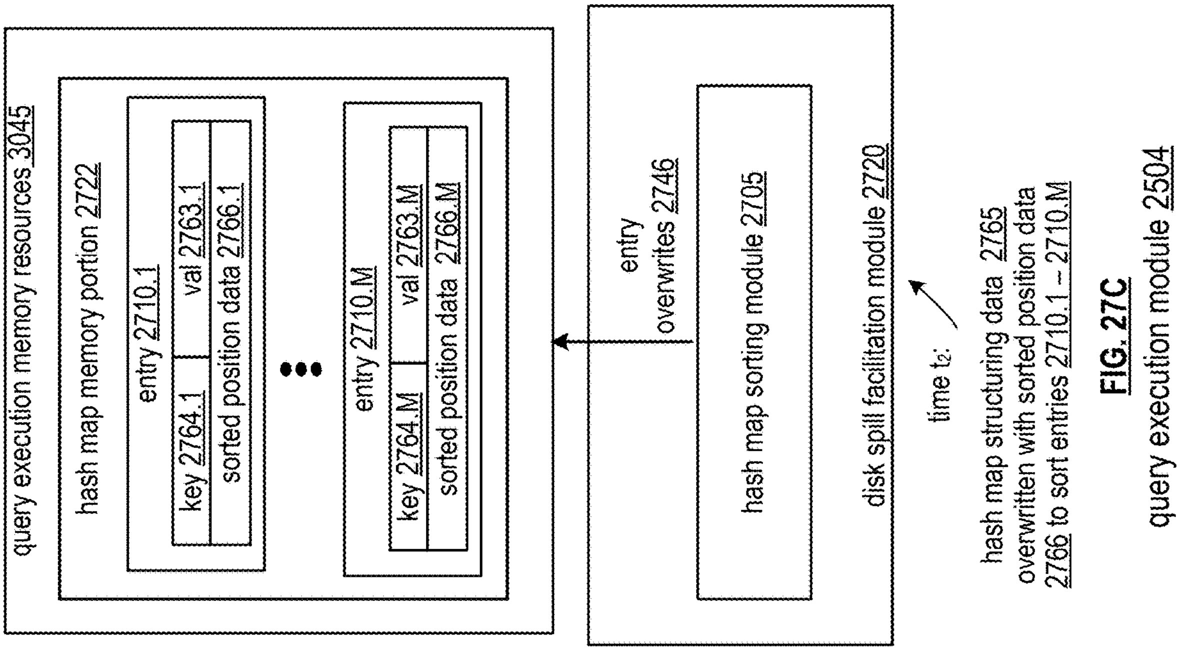

FIGS. 27B and 27C illustrates an example embodiment where the hash map structure is leveraged to enable overwriting portions of the hash map itself to denote the sorted ordering, for example, to implement some or all features and/or functionality of this third solution. Some or all features and/or functionality of the hash map sorting module 2705 and the corresponding overwriting of values in entries 2710 of FIGS. 27B and/or 27C can implement the hash map sorting module 2705 and/or any spilling of hash maps to disk described herein.

As illustrated in FIG. 27B, each of a plurality of M entries 2710.1-2710.M can be stored via a hash map memory portion 2722 of the query execution memory resources 3045. The hash map memory portion 2722 can correspond to one or more memory fragments 2622 and/or other portion of query execution memory resources allocated for and utilized to store the hash map 2555 during query execution.

Each entry 2710 can store the key 2764 and corresponding value 2762 as discussed previously. Each entry 2710 can further store corresponding hash map structuring data 2765 for the given entry. This hash map structuring data 2765 can be implemented to implement the structure and/or functionality of the hash map 2555 itself, and can be necessary for performing standard hash map operations upon the hash map such as insertions and/or lookups. For example, the hash map structuring data 2765 includes hash collision handling data utilized to handle hash collisions.

As a particular example, the plurality of entries 2710 of hash map 2555 can be stored as an array of slots, where each slot is implemented as a struct, which can be defined as follows:

```
struct slot_t {
size_t tail;
size_t next;
KeyType key;
ValueType value;
};
```

Note that the tail and/or next can optionally be implemented as other data types other than size_t, such as smaller integer types. Each entry 2710 can otherwise optionally store a tail value and/or a next value in addition to storing key 2764 and value 2763. The tail value and/or a next value can be implemented as some or all of the hash map structuring data 2765, such as some or all of the hash collision handling data. As a particular example, the tail value and/or the next value can be implemented as pointers, for example, to other entries 2710 in conjunction with implementing a corresponding linked list structure, for use in handling hash collisions.

While the hash map 2555 is stored and maintained in this "normal" fashion as illustrated in conjunction with FIG. 27B, current query execution performance 2703 can include implementing the hash map generator module 2549 to perform hash map accesses 2745 corresponding to insertions of new entries into hash map 2555, for example, to continue building the hash map 2555 from a corresponding input set. Alternatively or in addition, the current query execution performance 2703 can include implementing a hash map lookup module 2549 to perform hash map accesses 2745 corresponding to insertions of lookups to hash map 2555 for whether a key exists and/or to retrieve the respective value 2763, for example, to identify rows from this hash map matching with other rows of a second input set, such determining whether join keys 2764 of any entries 2710 match with join keys of incoming left input rows of left input row set to generate corresponding join output rows. This functionality of hash map 2555 to operate "normally" can be implemented during a first time $t_1$, where these hash map insertions and/or lookups to memory portion 2722 are performed utilizing hash map structuring data. Time $t_1$ can correspond to a time prior to when disk spill condition is met and/or before it is determined that the hash map is determined to be spilled to disk, and is thus prior to preparing the hash map for spilling to disk via sorting of the entries.

Performance of such hash map accesses 2745 can be contingent upon the inclusion of and/or use of hash map structuring data 2765. For example, hash collision handling data utilized to identify and/or handle hash collisions, such as a tail field and/or next field of each entry are utilized to identify and/or handle hash collisions, which can be required for insertions and/or lookups to the hash map to be performed correctly.

FIG. 27C illustrates an example of overwriting at least a portion of the hash map in hash map memory resources 2722 via a disk spill facilitation module 2720 during a time $t_2$ after time $t_1$ of FIG. 27B. In particular, the hash map structuring data 2765 can overwritten by hash map sorting module 2705 with sorted position data 2766 to sort entries 2710.1-2710.M. Time $t_2$ can correspond to a time after disk spill condition is met and/or after it is determined the hash map be spilled to disk, where the hash map is thus prepared for spilling to disk via this sorting of the entries.

Hash map sorting module 2705 can perform entry overwrites 2746 to overwrite the hash map structuring data 2765 in some or all entries with corresponding sorted position data 2766, which can denote a given entries position with respect to the sorted ordering 2719 and/or can collectively across all entries constitute sorting data denoting the sorted ordering of all of the entries 2710.1-2710.M.

The semantics of this means of sorting the hash map 2555 can include allowing the hash map sorting module 2705 to destroy the hash map's other functionality. For example, it can be illegal to perform hash map accesses 2745, such as lookups and/or insertions, once the hash map has been sorted, due to the hash map structuring data 2765 no longer being stored and thus not being able to be utilized to handle hash map collisions, where performance insertions and/or lookups cannot be guaranteed to be performed correctly. After performing these entry overwrites 2746 to denote sorted ordering rather than hash map structuring data 2765, the only legal operation that can be performed upon the entries 2710 stored in hash map memory portion 2722 is iterating over the key/value pairs in sorted order by utilizing the sorted position data 2766. However, in cases where the hash map need be spilled to disk, sacrificing future performance of lookups and insertions can be an acceptable trade-off to minimize additional memory allocation required to perform the disk spill, as the hash map will be only accessed via disk anyways in sorted order, for example, in conjunction with externally completing performance of the corresponding join and/or the corresponding other operation.

Figure 27D:
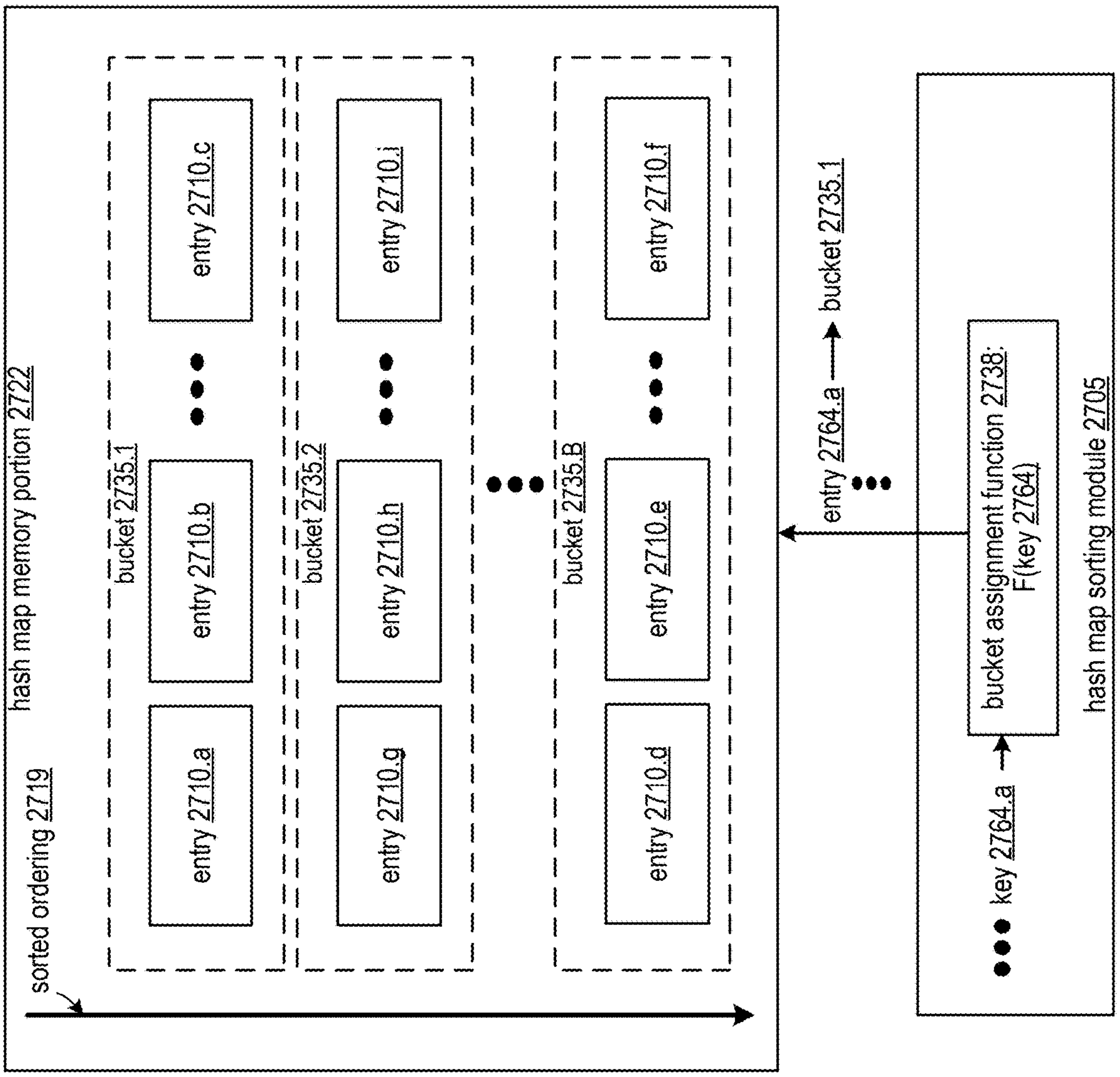
FIG. 27D is a schematic block diagram of a query execution module that implements a hash map sorting module that assigns each entry of the hash map to one of a set of buckets via a bucket assignment function in accordance with various embodiments.

FIG. 27D illustrates an embodiment of query execution module 2504 where hash map sorting module 2705 is implemented to sort the plurality of entries 2710 of hash map 2555 based on assigning each entry 2710 to one bucket 2735 of a plurality of corresponding buckets 2735.1-2735.B by performing a bucket assignment function 2738. Some or all features and/or functionality of hash map sorting module 2705 of FIG. 27D can implement the hash map sorting module 2705 of FIG. 27A, FIG. 27C and/or any other embodiment of the hash map sorting module 2705 described herein.

The bucket assignment function 2738 can assign entries into buckets as deterministic function of the given entry's key 2764 (e.g., as some function F(key 2764)). For example, the bucket assignment function 2738 is implemented as a hash function and/or other function that only has and/or only maps to B possible outputs, where the given output thus maps to a particular one of the set of B buckets 2735.1-2735.B. For example, each bucket 2735 is assigned a subset of keys in a domain of possible keys, where the plurality of subsets of keys for the plurality of buckets are mutually exclusive and/or mutually exhaustive with respect to the set of domain of possible keys.

The plurality of buckets 2735.1-2735.B themselves can be sorted in accordance with sorted ordering 2719, for example, where all entries 2710 assigned to the first bucket 2735.1 are guaranteed to be before the entries assigned to all other buckets 2735.2-2735.B in the sorted ordering, where all entries 2710 assigned to the second bucket 2735.2 are guaranteed to be after all entries assigned to the first bucket 2710.1 and are guaranteed to be before the entries assigned to all other buckets 2735.3-2735.B in the sorted ordering, etc. For example, the plurality of subsets of keys for the plurality of buckets each correspond to a contiguous range of keys that is non-overlapping with and has no gap from that of an immediately prior bucket and/or an immediately subsequent bucket in the sorted ordering.

To achieve this sorted ordering of buckets, the bucket assignment function 2738 can be implemented as a monotone function that preserves the ordering of keys 2864. For example, the bucket assignment function 2738 can be a function of the number of buckets B and/or the maximum key value (e.g., a maximum numerical value, when the sorted ordering 2719 corresponds to an ordering by key numerically from lowest to highest value). This maximum key value can correspond to a maximum of the corresponding domain and/or can be a known maximum based on distribution data stored and/or otherwise determined for the corresponding input, such as distribution data stored for a corresponding column.

As a particular example, the bucket assignment function 2738 is implemented as, and/or based on, generating output by performing floor(B*key 2764/maxKeyVal), and/or a corresponding integer division to inherently implement the floor functionality, where each bucket is assigned a corresponding value between 0 and B−1, where entries with keys where F(key) having outputs of 0 are designated for bucket 2735.1, where entries with keys where F(key) having outputs of 1 are designated for bucket 2735.2, etc., and where entries with keys where F(key) having outputs of B−1 are designated for bucket 2735.B−1. Note that the maxKeyVal of this example is optionally implemented as one more than the maximum value rather than the maximum value itself, and/or the mapping is otherwise adapted to handle the case of mapping the entry having the maximum value to B−1 to render placement in bucket 2735.B.

In other embodiments, other mapping functions can be implemented, for example, based on a known and/or estimated distribution of key values, for example, based on a probability distribution function for key value and/or other column values of the database system 10 being stored and/or generated by the database system 10 for one or more tables. In such embodiments, the mapping function can optionally be configured to render buckers having equal and/or roughly equal numbers of entries assigned to them, where the respective ranges of keys that can be assigned to are optionally not equal due to a corresponding skewed and/or otherwise non-uniform distribution of key values.

In other embodiments, the mapping function is based on performing a modulo function, for example, utilizing the number of buckets B as the divisor for the modulo function to be applied to the key 2764 being implemented as the dividend of the modulo function. The output of the modulo function can be guaranteed to output values from 0-B−1 denoting which bucket the corresponding entry is designated for as discussed previously.

The assigning of entries 2710 into buckets 2735 to perform sorting of the entries 2710.1-2710.M can be in accordance with performing a corresponding bucket sorting/bin sorting algorithm. The bucket assignment function 2738 can be implemented to assign entries 2710 into buckets 2735 in accordance with a conventional and/or adapted bucket sorting/bin sorting algorithm.

In this example, the first bucket 2735.1 is assigned at least entries 2710.*a*, 2710.*b*, and/or 2710.*c*; the second bucket 2735.2 is assigned at least entries 2710.*g*, 2710.*h*, and/or 2710.*i*; and/or the last bucket 2735.B is assigned at least entries 2710.*d*, 2710.*e*, and/or 2710.*f*. Note that different buckets 2735 can be assigned same or different numbers of entries 2710. In some cases, one or more buckets can have zero assigned entries 2710.

In some embodiments, assigning each entry to a given bucket 2735 is one part of performing of the sorting performed by hash map sorting module 2705, where the hash map sorting module 2705 further performs sorts, for each bucket 2735, its set of assigned entries 2710 within the bucket. After each bucket is sorted itself, a concatenation of the plurality of sorted buckets, in order by buckets, can render the sorted ordering of the plurality of entries 2710.1-2710.M.

FIG. 29E illustrates an example of an overwritten hash map memory portion 2722 that denotes assignment of entries 2710 into buckets 2735.1-2735.B and further denotes sorting of entries 2710 within each bucket 2735. Some or all features and/or functionality of the overwritten hash map memory portion 2722 can implement the hash map 2555 being sorted in accordance with sorted ordering 2719 of FIG. 27A and/or can implement the hash map memory portion resulting for the end of time $t_2$ of FIG. 27C after hash map sorting module 2705 completes all necessary entry overwrites 2746. Some or all features and/or functionality of the overwritten hash map memory portion 2722 can implement the assignment of entries 2710 into buckets 2735 of FIG. 27D and/or the further sorting of entries 2710 within each given bucket 2735.

The hash map 2555 can be sorted via overwriting the hash map structuring data 2765, such as the next field in each corresponding slot, to use it as essentially a pointer in a singly linked list, for example, in conjunction with performing a bucket sort over the hash map as discussed in conjunction with FIG. 27D. This can include implementing B singly linked lists 2736.1-2736.B corresponding to the plurality of buckets 2735.1-2735.B in conjunction with performing a bucket sort/bin sort via reuse of existing memory rather than allocating new memory.

In this example, the set of entries included in bucket 2735.1 is denoted by the set of elements included a corresponding singly linked list 2736.1, where the ordering of this set of entries in accordance with the sorted ordering 2719 is denoted by the ordering of the elements included a corresponding singly linked list 2736.1, starting with the linked list head 2751.1 of the singly linked list. The sets of entries in other buckets 2735.2-2735.B, and their respective ordering, are similarly denoted via the other respective linked lists 2736.2-2736.B.

In particular, the sorted position data 2766 of a given entry can be implemented as a pointer 2755 to a next entry in the respective singly linked list, in accordance with the sorted ordering 2719. The last entry in a given singly linked list can have a pointer 2755 to NULL, denoting it is the final entry in the respective bucket.

In embodiments where the hash map structuring data 2765 includes a tail field and a next field as discussed previously, only one of these fields, such as the next field, is optionally repurposed for the pointers of the linked list denoting the sorted order of a respective bucket, where the tail field is optionally unchanged from its implementation as hash map structuring data 2765, and/or where despite the tail field being unchanged, the reuse of the next field still renders the hash map unusable for further lookups and/or insertions.

Performing the sorting of elements within a given bucket can be based on updating the pointers 2755 to reflect the respective ordering. For example, as each entry is assigned to a given bucket, it is inserted into its sorted position of the given bucket 2735 based on traversing through the respective singly linked list 2736 starting with the head of the given singly linked list 2736, comparing the value with the given key with each entry in the list until arriving at an existing entry in the linked list where the given key should be ordered before existing element's given key. Insertion of the given entry into its sorted position prior to this existing entry and/or immediately after an entry immediately prior to this existing entry can include: overwriting the hash map structuring data 2765 as pointer 2755 pointing to this existing entry in the linked list; and/or overwriting the pointer 2755 of the entry immediately prior to this existing entry in the linked list to point to the given entry instead of pointing to the existing entry. Note that the first insertion into a given bucket can include establishing the entry as the head of the corresponding singly linked list 2736, where a link list head 2751 and linked list tail 2752 points to this entry. The linked list head 2751 can be updated as new entries are added that should be ordered first in the respective bucket. The linked list tail 2752 can similarly be updated as new entries are added that should be ordered last in the respective bucket, where these entries have respective pointers 2755 set to NULL until a subsequently processed entry is determined to be ordered after this entry. Traversal through the linked list to add each entry in its respective ordering can be achieved based on utilizing a pointer to the given bucket's linked list head 2751 to determine where the link list starts, where the respective pointers are utilized to achieve the traversal.

Alternatively or in addition, sorting mechanisms for, and/or other attributes of singly linked lists and/or bucket sorting schemes, can be employed to enable sorting of entries into singly linked lists 2736 for each bucket 2735. In other embodiments, rather than being implemented as singly linked lists, the buckets can be implemented by and/or sorted in accordance with another type of linked list such as a doubly linked list, and/or another type of data structure.

Figure 27E:
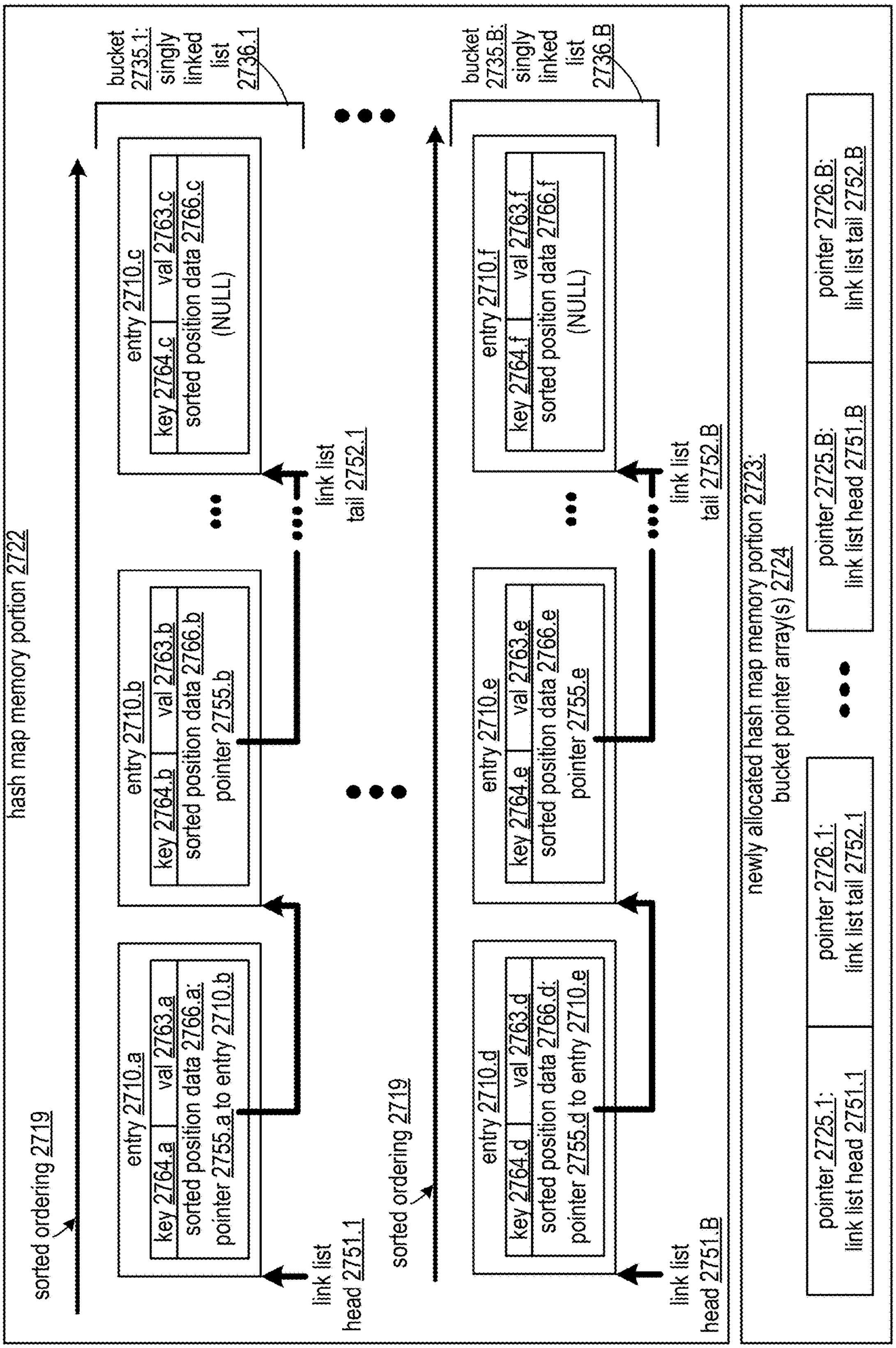
FIG. 27E is a schematic block diagram of a query execution module that implements each of a plurality of buckets as singly linked list of entries in accordance with a sorted ordering in accordance with various embodiments.

As the link list head 2751 is required to determine where a given bucket starts, additional memory can be allocated to store the linked list heads 2751.1-2751.B, which can be established and maintained to perform the respective sort. For example, as illustrated in FIG. 27E, a newly allocated hash map memory portion 2723 of query execution memory resources 3045 can be allocated by hash map sorting module 2705 to store a corresponding one or more bucket pointer arrays 2724, such as a vector. The bucket pointer array 2724 can store, for each singly linked list 2736, a pointer 2725 to the respective linked list head 2751 and/or a pointer 2725 to the respective tail 2752 of each bucket's singly linked list 2736. In some embodiments, the bucket pointer array 2724 only stores the B pointers 2725.1-2725.B to the linked list heads 2751.1-2751.B. As only the pointers 2725 and/or 2726 to the head 2751 and/or tail 2752, respectively, of the B linked lists need to be stored, the amount of memory required for this newly allocated hash map memory portion 2723 can be a negligible amount of memory compared to a vector with an entry for each row in the map, which can be favorably in preparing the hash map for spilling to disk in corresponding low memory conditions. Furthermore, the bucket pointer array 2724 of the hash map memory portion 2723 need only be accessed in performing the sort itself, and optionally not for writing the buckets to disk, and thus the newly allocated hash map memory portion 2723 only need be utilized for these purposes during performance of the sort, and can be freed prior to writing the key value pairs of the hash map to disk memory resources 3065, which can also be favorable to more quickly make these resources available for other uses during the low memory state.

Figure 27F:
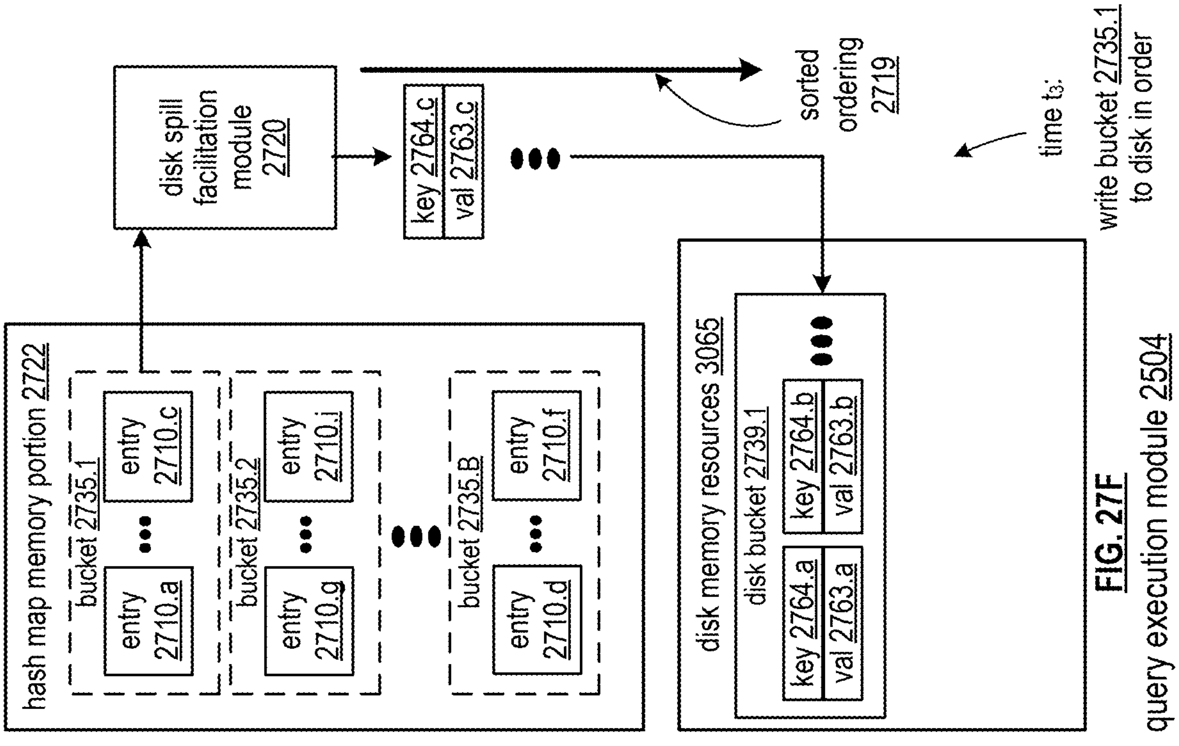
FIGS. 27F and 27G are schematic block diagrams of a database system that implements disk spill facilitation module to write entries of a hash map to disk one bucket at a time in accordance with various embodiments.
Figure 27G:
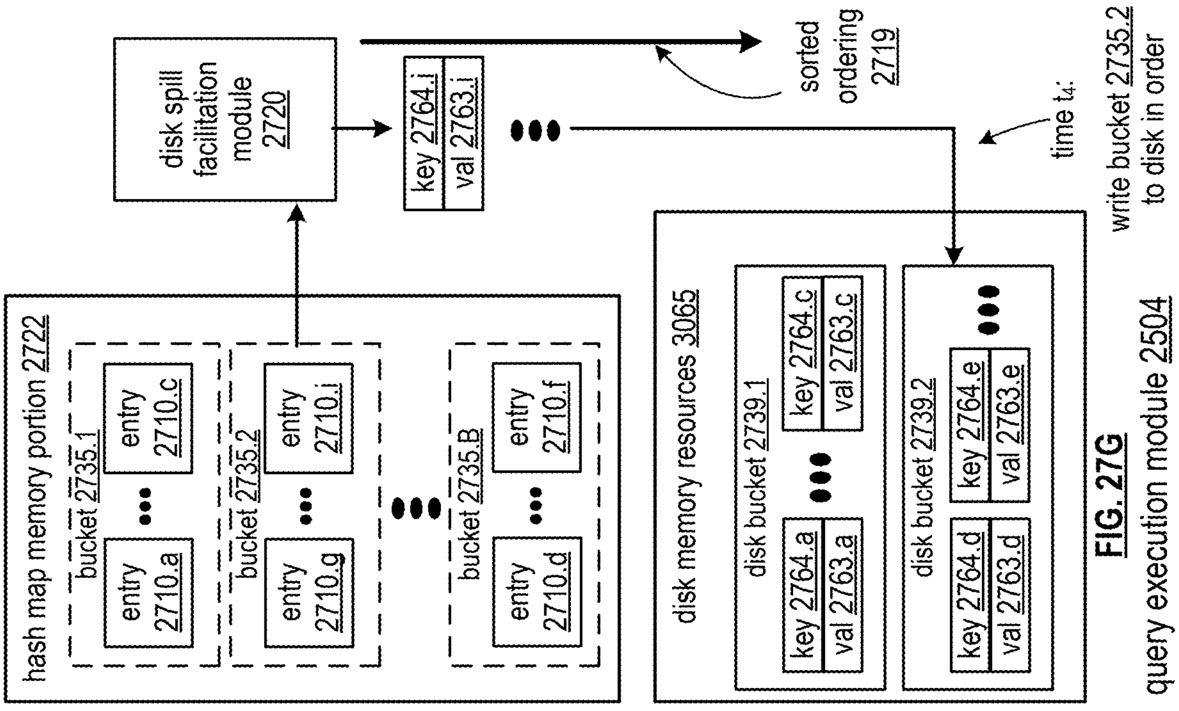

FIGS. 27F and 27G illustrates an example of writing the key value pairs of a hash map 2555 to disk in the sorted ordering by writing each bucket 2735's set of entries to a corresponding disk bucket 2739 one at a time, in accordance with the sorted ordering. Some or all features and/or functionality of writing the each bucket 2735's set of entries to a corresponding disk bucket 2735 can implement the writing of sorted entries of hash map 2555 to disk as discussed in conjunction with FIG. 27A. The buckets 2735 of FIGS. 27F and/or 27G can be implemented as the buckets 2735 of FIGS. 27D and/or 27E.

As illustrated in FIG. 27F, the first bucket 2735.1 is written to disk first at a time $t_3$ for example, after times $t_1$ and $t_2$ of FIGS. 27B and/or 27C, respectively. The set of entries in the given bucket 2735.1, and the respective ordering of this set of elements, can be determined based on interpreting the sorted position data 2766 of its entries. For example, writing bucket 2735.1 to disk includes traversing through the corresponding singly linked list 2736.1 via pointers 2755 and writing the respective key 2764 and value 2763 to a corresponding disk bucket 2739.1. The given disk bucket 2735.1 can thus be written with key value pairs of a given bucket 2735.1 in sorted order, with respect to sorted ordering 2719.

As illustrated in FIG. 27G, the second bucket 2735.2 is written to disk first at a time $t_4$ for example, after times $t_3$ and/or after writing of the first bucket 2735.1 is otherwise complete. The second bucket can be written in a similar fashion.

In continuing this process for all B buckets 2735.1-2735.B, a set of B corresponding disk buckets 2739.1-2739.B can ultimately be written, one at a time. The disk buckets 2739 can each be distinct portions of disk memory resources 3065, for example, each implemented via one or more disk pages 2624. The hash map memory portion 2722 can be freed for other use once all disk buckets are written, which can render return from being in the low memory state.

This writing of buckets 2735 one at a time can be ideal in allocating and utilizing one corresponding output data block of query processing memory resources 3045 at a time for writing each bucket. This single output data block can be freed and/or overwritten after each bucket is written to disk memory resources 3065, for example, for use in writing the next bucket.

The disk buckets 2739 of disk memory resources 3065 can later be retrieved for use in continuing the corresponding join operation or other operation. Alternatively or in addition, the disk buckets 2739 of disk memory resources 3065 can be accessed in disk memory in executing the respective operator, such as via the respective operator execution module 3215, to continue performance of the respective operator execution externally. This external operator execution can be performed based on leveraging the fact that all entries are guaranteed to be in order, to identify matches and/or otherwise perform the operator for incoming rows (e.g. left rows of left input row set of a hash join where the hash map 2555 stores the right input row set) based on searching the sorted disk buckets 2739, where not all entries need be checked for matches due to the fact that the key value pairs are sorted.

Figure 27H:
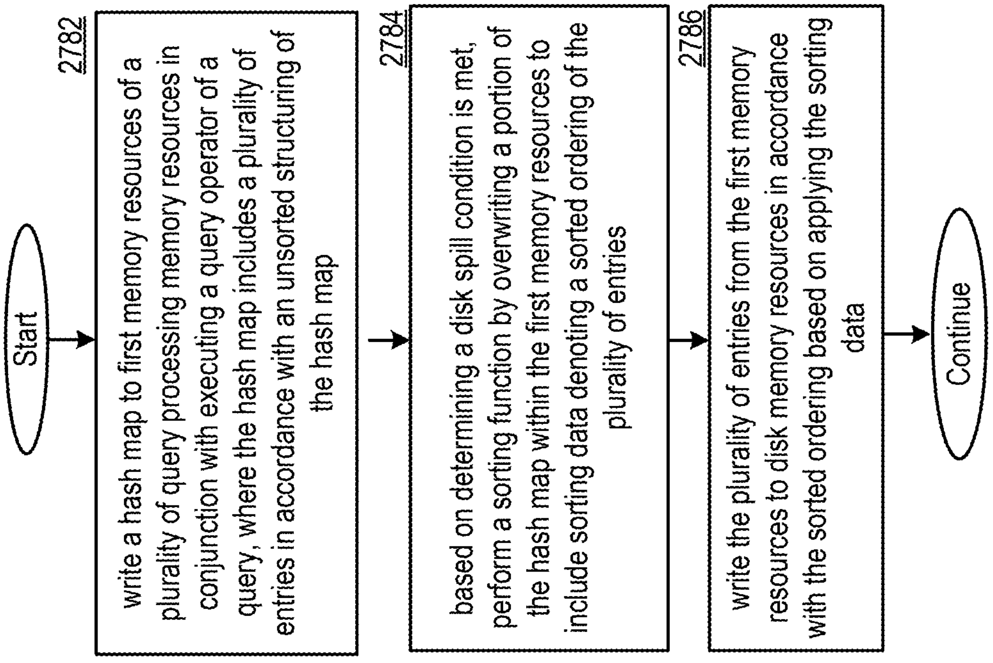
FIG. 27H is a logic diagram illustrating a method for execution in accordance with various embodiments.

FIG. 27H illustrates a method for execution by at least one processing module of a database system 10, such as via query execution module 2504 in executing one or more operators 2520. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27H. In particular, a node 37 can utilize their own query execution memory resources 3045 to execute some or all of the steps of FIG. 27H, where multiple nodes 37 implement their own query processing modules 2435 to independently execute the steps of FIG. 27H for example, to facilitate execution of a query as participants in a query execution plan 2405. Some or all of the steps of 27H can optionally be performed by any other processing module of the database system 10. Some or all of the steps of FIG. 27H can be performed to implement some or all of the functionality of the database system 10 as described in conjunction with FIGS. 27A-27G, for example, by implementing some or all of the functionality of sorting entries of a hash map 2555 to be spilled to disk in order when executing a corresponding join process 2530 or other operator. Some or all of the steps of FIG. 27H can be performed to implement some or all of the functionality regarding spilling a data item 3010 to disk memory resources 3065 as described in conjunction with some or all of FIGS. 26A-26E. Some or all of the steps of FIG. 27H can be performed to implement some or all of the functionality regarding execution of a query via the plurality of nodes in the query execution plan 2405 as described in conjunction with some or all of FIGS. 24A-25F. Some or all steps of FIG. 27H can be performed by database system 10 in accordance with other embodiments of the database system 10 and/or nodes 37 discussed herein. Some or all steps of FIG. 27H can be performed in conjunction with one or more steps of any other method described herein.

Step 2782 includes writing a hash map to first memory resources of a plurality of query processing memory resources in conjunction with executing a query operator of a query, where the hash map includes a plurality of entries in accordance with an unsorted structuring of the hash map. In various examples, the first memory resources are implemented as the memory resources of the hash map memory portion 2722.

Step 2784 includes, based on determining a disk spill condition is met, performing a sorting function by overwriting a portion of the hash map within the first memory resources to include sorting data denoting a sorted ordering of the plurality of entries. Step 2786 includes writing the plurality of entries from the first memory resources to disk memory resources in accordance with the sorted ordering based on applying the sorting data. In various examples, the sorting data is based on the sorted position data 2766 of some or all entries of the hash map.

In various examples, the method further includes freeing the first memory resources based on writing the plurality of entries to the disk memory resources.

In various examples, the method further includes externally performing the query operator of the query based on accessing the plurality of entries in the disk memory resources.

In various examples, the query operator corresponds to one of: a hash join operator, a multi-join operator, an aggregation operator, or a set operator. In various examples, the set operator is an intersection operator, a union operator, a negation operator, an exclusive-OR operator, and/or another set operator operable to implement set logic for two or more input sets.

In various examples, the sorting function implements a bucket sorting function and/or a bin sorting function.

In various examples, the sorting data includes a plurality of entry position data for the plurality of entries. In various examples, the overwriting the portion of the hash map within the first memory resources includes overwriting data in each entry of the plurality of entries as a corresponding entry position data of the plurality of entry position data denoting a position of the each entry with respect to the sorted ordering of the plurality of entries.

In various examples, the each entry of the plurality of entries includes a corresponding key, a corresponding value, and/or hash map structuring data, which can include hash collision handling data or other hash map structuring data. In various examples, the corresponding key is a corresponding one of a plurality of keys of the hash map. In various examples, the data overwritten in the each entry of the plurality of entries is the hash collision handling data.

In various examples, the corresponding value includes a row number denoting the location of the value for a corresponding row in a column stream stored in query execution memory resources. In various examples, the corresponding value is a pointer to a memory location storing a value of a corresponding row in a corresponding column stream.

In various examples, during a first temporal period prior to determining the disk spill condition is met, the method further includes accessing the hash collision handling data of at least one entry of the plurality of entries to facilitate performance of at least one insertion of a new entry into the plurality of entries of the hash map and/or at least one lookup of an existing entry of the plurality of entries of the hash map. In various examples, during a first temporal period after overwriting the hash collision handing data in the each entry of the plurality of entries, no further insertions and no further lookups to the hash map are performed based on the hash collision handing data in the each entry of the plurality of entries no longer being accessible.

In various examples, the hash collision handling data includes a tail field and a next field. In various examples, the tail field and/or the next field are pointers in accordance with implementing a linked list denoting the hash collision handling data. In various examples, the overwriting the hash collision handing data in the each entry of the plurality of entries includes overwriting the next field. In various examples, the overwriting the hash collision handing data in the each entry of the plurality of entries includes overwriting only the next field, and not the tail field. In various examples, the entry position data denoting the position of the each entry includes a pointer in conjunction with inclusion of the entry in a singly linked list.

In various examples, the sorting data indicates a plurality of buckets each implemented via a one of a corresponding plurality of ordered lists that each indicate an ordering of a corresponding subset of a plurality of subsets of the plurality of entries. In various examples, each of the plurality of subsets corresponds to a corresponding one the plurality of buckets. In various examples, each of the plurality of subsets are mutually exclusive and collectively exhaustive with respect to the plurality of entries.

In various examples, each of the plurality of buckets is assigned one of a plurality of possible values outputted by a bucket assignment function. In various examples, performing the sorting function includes selecting the one bucket of the plurality of buckets to include the each entry based on performing the hash function. In various examples, multiple ones of the plurality of entries hashing to a same bucket are included as separate entries of a corresponding ordered list for the same bucket.

In various examples, the bucket assignment function is a monotone function and/or is an order preserving hash function. In various examples, the number of the plurality of possible values outputted by a bucket assignment function is equal to the number of buckets in the plurality of buckets.

In various examples, each of the plurality of buckets is assigned one of a plurality of possible values outputted by a modulo function. In various example, performing the sorting function includes selecting the one bucket of the plurality of buckets to include the each entry based on performing the modulo function. In various examples, a dividend of the modulo function is a hash value of a corresponding key of the each entry. In various examples, a divisor of the modulo function is a number of buckets in the plurality of buckets.

In various examples, wherein each of the plurality of ordered lists are implemented via a plurality of singly linked lists. In various examples, each of the plurality of singly linked lists includes a corresponding head and a corresponding tail. In various examples, performing the sorting function includes: allocating second memory resources of the query execution memory resources; storing a vector storing pointers to the corresponding head and the corresponding tail for all singly linked list of the plurality of singly linked lists; and/or freeing the second memory resources once performance of the sorting function is complete. In various examples, the second memory resources are freed before writing the plurality of entries from the first memory resources to the disk memory resources. In various examples, the second memory resources not accessed and/or are not required for writing the plurality of entries from the first memory resources to the disk memory resources.

In various examples, writing the plurality of entries from the first memory resources to the disk memory resources in accordance with the sorted ordering includes writing the plurality of buckets to a plurality of corresponding disk bucket of the disk memory based on writing, one at a time, the sorted list of each bucket of the plurality of buckets to a corresponding disk bucket portion of the plurality of corresponding disk bucket by writing a corresponding proper subset of entries of the plurality of entries of the each bucket. In various examples, all entries of a first corresponding proper subset of entries are written to a first corresponding disk bucket of the disk memory prior to any entries of a second corresponding proper subset of entries being written to a second corresponding disk bucket of the disk memory based on writing the each bucket of the plurality of buckets one at a time.

In various examples, performing the sorting function by overwriting the portion of the hash map within the first memory resources corresponds to performing a first type of optimization of a set of optimization types to execute the query. In various examples, the method further comprises performing a second type of optimization of the set of optimization types to execute a second query that includes a plurality of CASE statements by performing a single switch operator and a single union operator to execute all of the plurality of CASE statements based on the plurality of CASE statements having an identical predicate. In various examples, the method further comprises performing any other type of optimization for performing join operators and/or other operators described herein in conjunction with performing the same query or other queries.

In various embodiments, any one of more of the various examples listed above are implemented in conjunction with performing some or all steps of FIG. 27H. In various embodiments, any set of the various examples listed above can be implemented in tandem, for example, in conjunction with performing some or all steps of FIG. 27H.

Figure 30A:
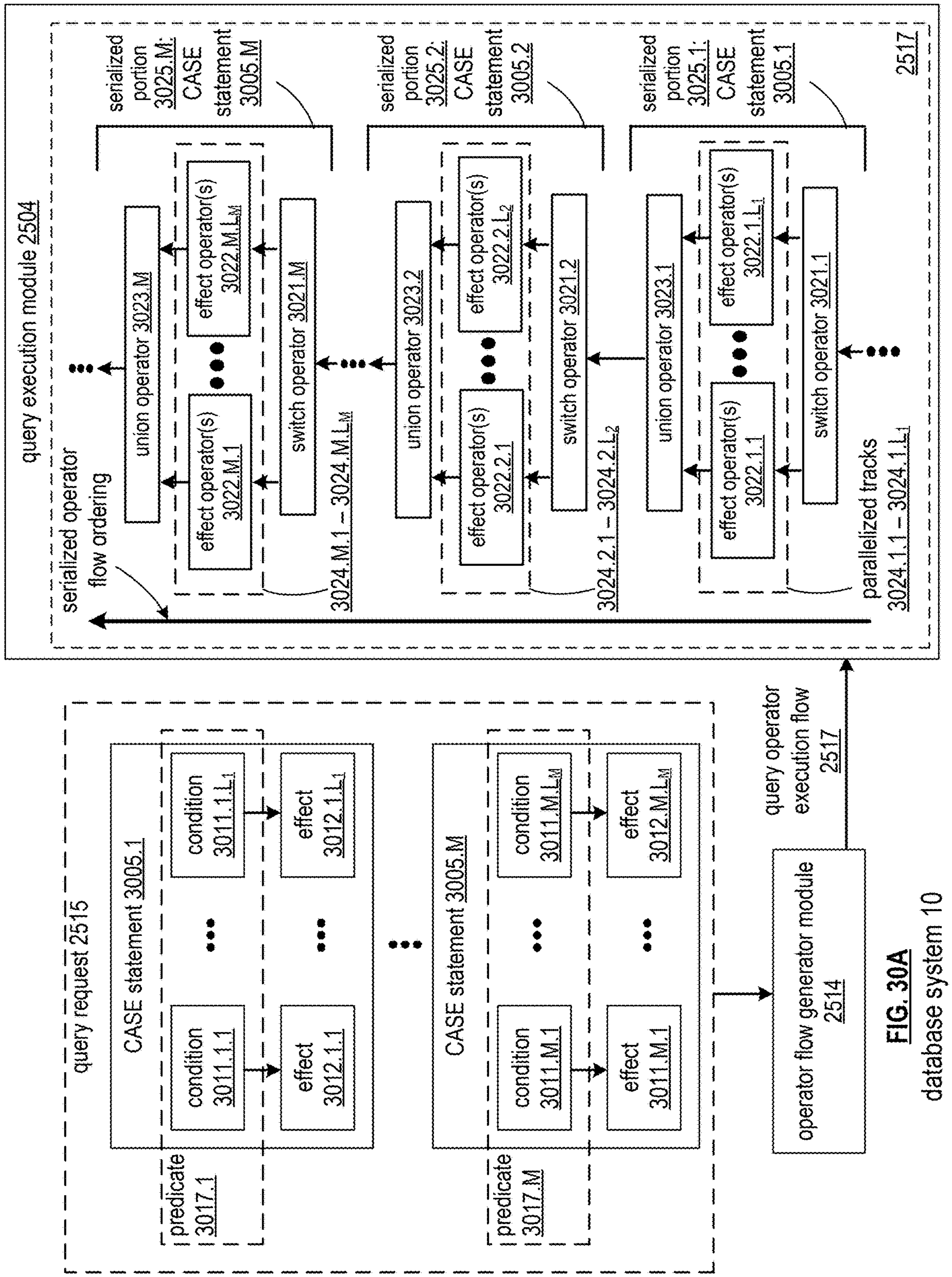
FIG. 30A is a schematic block diagram of a database system that executes a query operator execution flow for a query that includes multiple CASE statements in accordance with various embodiments.
Figure 30B:
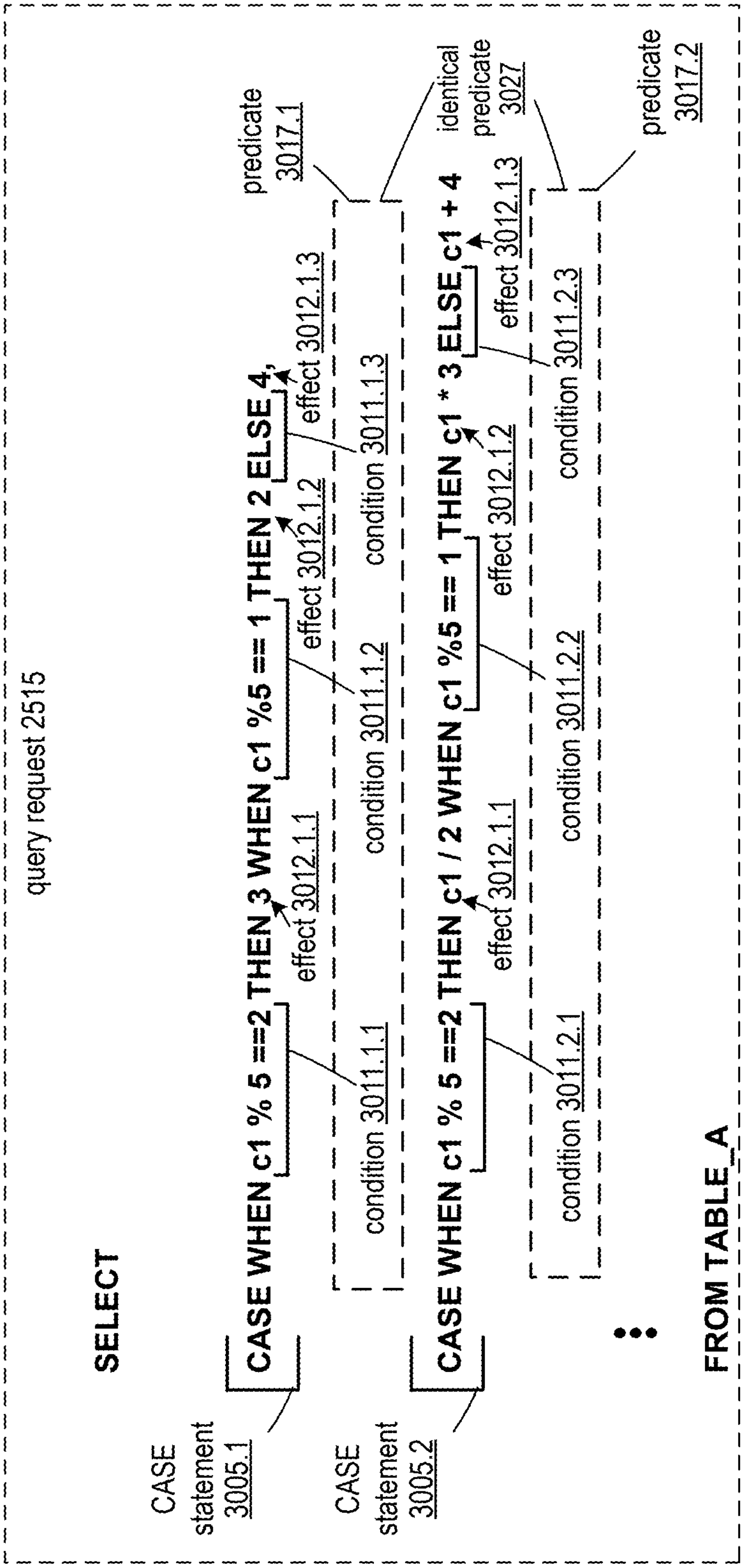
FIG. 30B illustrates an example query request that includes multiple CASE statements having an identical predicate in accordance with various embodiments.
Figure 30C:
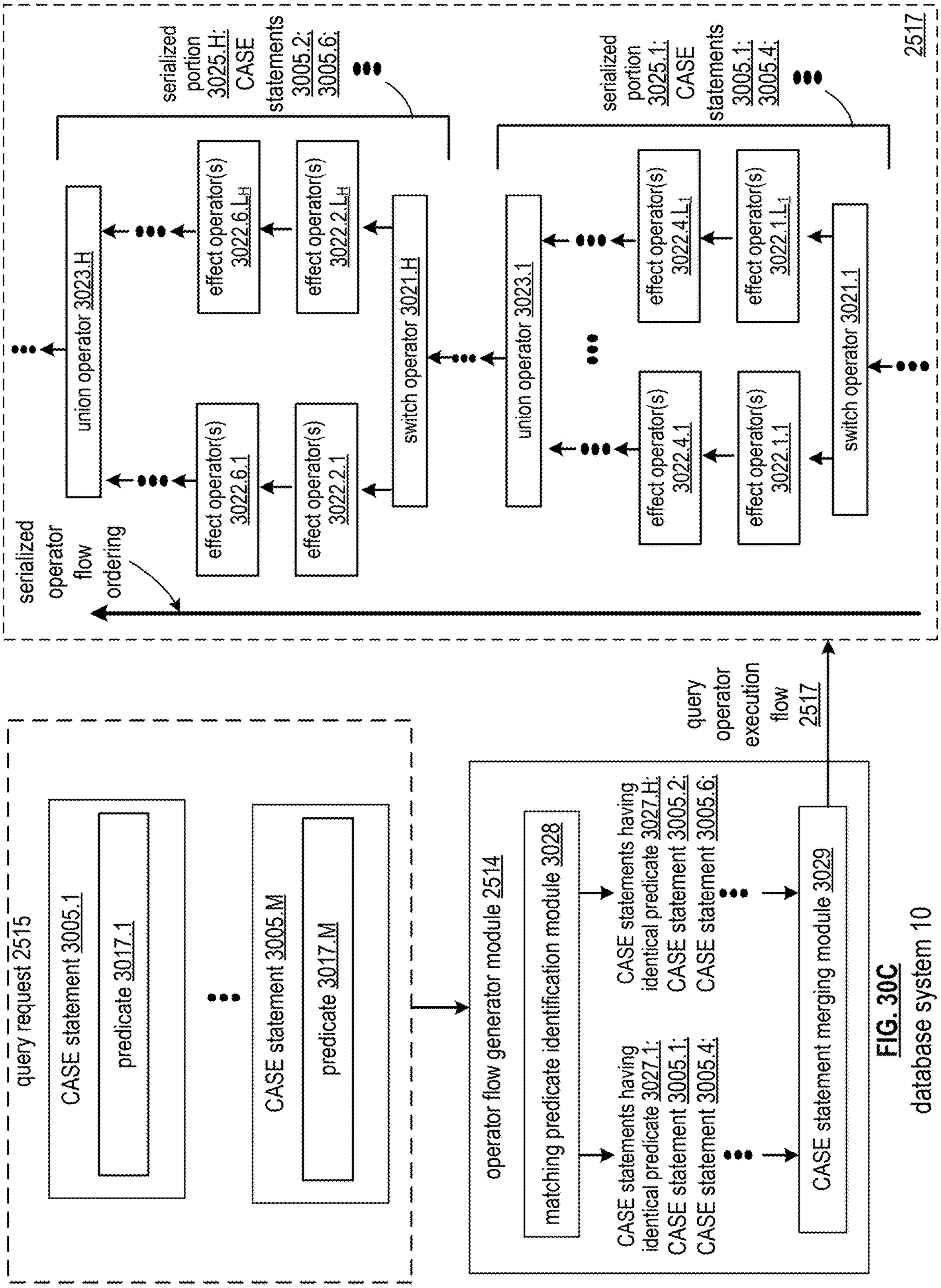
FIG. 30C is a schematic block diagram of a database system that executes a query operator execution flow for a query that includes multiple CASE statements having identical predicates in accordance with various embodiments.
Figure 30D:
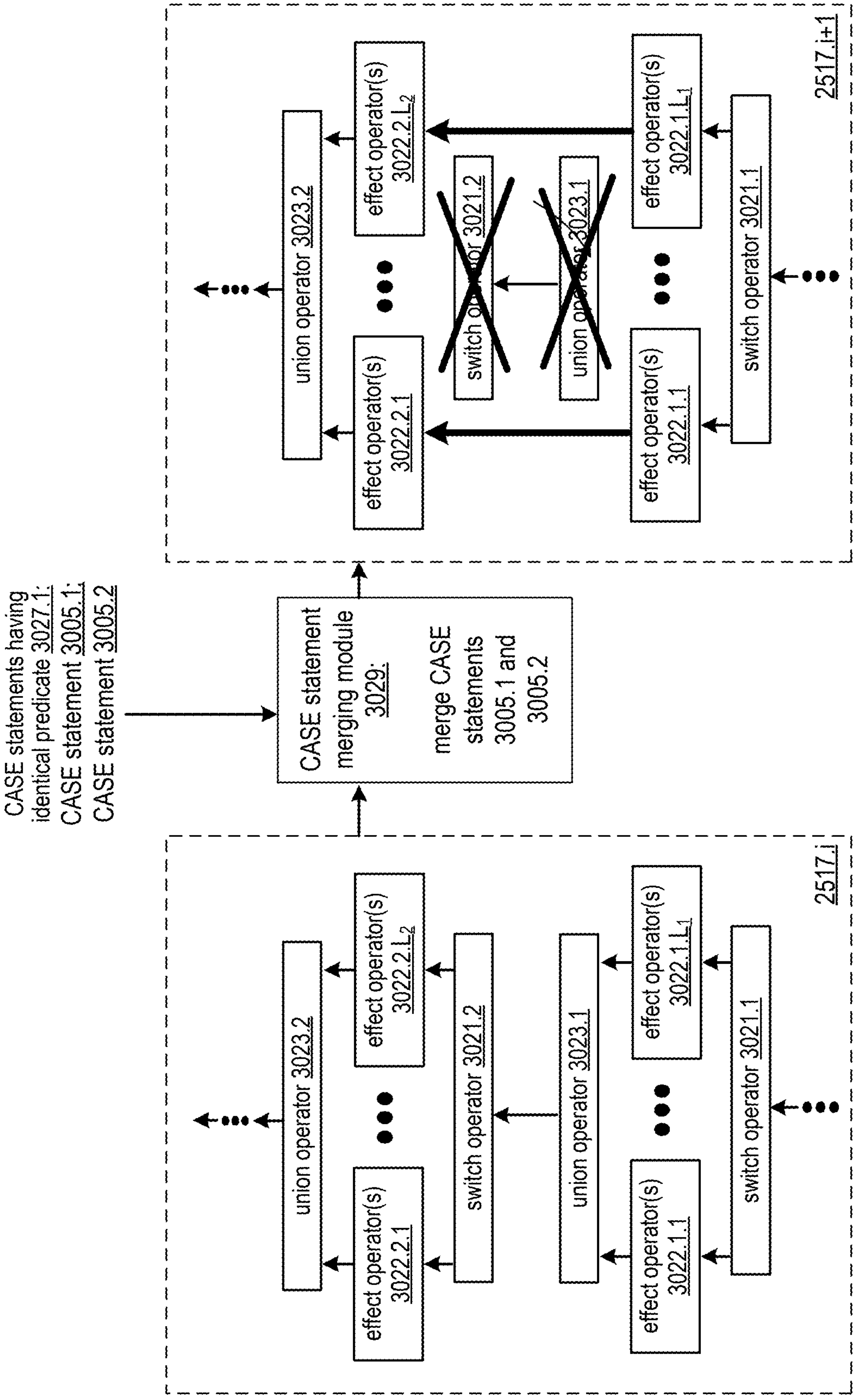
FIG. 30D is schematic block diagram of an operator flow generator module that implements a CASE statement merging in accordance with various embodiments.
Figure 30E:
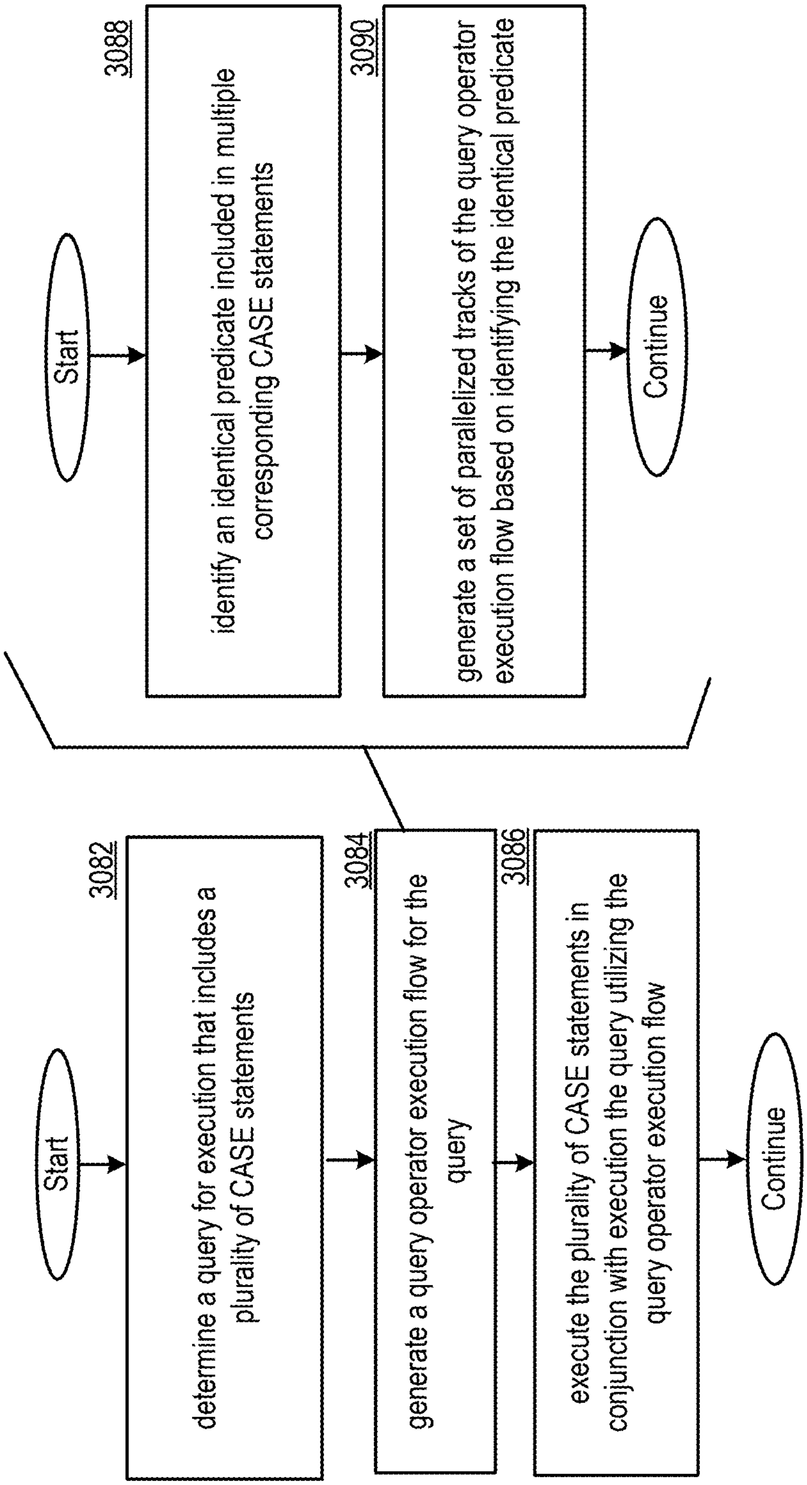
FIG. 30E is a logic diagram illustrating a method for execution in accordance with various embodiments.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27H, for example, in conjunction with further implementing any one or more of the various examples described above.

In various embodiments, the operational instructions, when executed by the at least one processor, cause the database system to: write a hash map to first memory resources of a plurality of query processing memory resources in conjunction with executing a query operator of a query, where the hash map includes a plurality of entries in accordance with an unsorted structuring of the hash map. The operational instructions, when executed by the at least one processor, can further cause the database system to, based on determining a disk spill condition is met: perform a sorting function by overwriting a portion of the hash map within the first memory resources to include sorting data denoting a sorted ordering of the plurality of entries; and/or write the plurality of entries from the first memory resources to disk memory resources in accordance with the sorted ordering based on applying the sorting data.

FIGS. 28A-28E illustrate embodiments of a database system 10 operable to retrieve values in data blocks of column streams during query execution based on row index data 2825 for the respective rows generated during the query execution. Some or all features and/or functionality of generating and/or processing data blocks 2537 in conjunction with generating and/or processing corresponding row index data 2825 as illustrated and discussed in conjunction with FIGS. 28A-28E can implement the generating and/or processing data blocks 2537 of FIGS. 24G-24I, the generating and/or processing data blocks 2537 of column steams 2968 and/or data streams 2917 of FIGS. 24L-24M, and/or any other generation and/or processing of data blocks described herein. Some or all features and/or functionality of operator execution modules 3215 can implement the execution modules 3215 of FIG. 24J, FIGS. 24L-24M, and/or any other embodiments of operator execution modules 3215 described herein. Some or all features and/or functionality of query execution memory resources 3045 can implement the of query execution memory resources 3045 of FIGS. 26A-26E.

In database system 10, a data block can contain fragmented memory, such as a plurality of non-contiguous memory fragments 2622 stored in different locations of query execution memory resources 3045. In certain situations (e.g., performing hash joins), a specific row may need to be identifier (e.g., by row number) within a data block. This locating of a particular row's value (e.g., in executing operations such as hash joins) can be nontrivial, for example, due to the fragmented memory). In these situations, a data block indexer can be opened over the data block, which can be implemented as and/or similarly to a wrapper around multiple data stream indexers having one for each column. This data block indexer and/or corresponding row index data can be implemented to address the problem of, given a column stream with fragmented memory, how can indexing into the column stream to find the kth entry be performed efficiently.

Figure 28A:
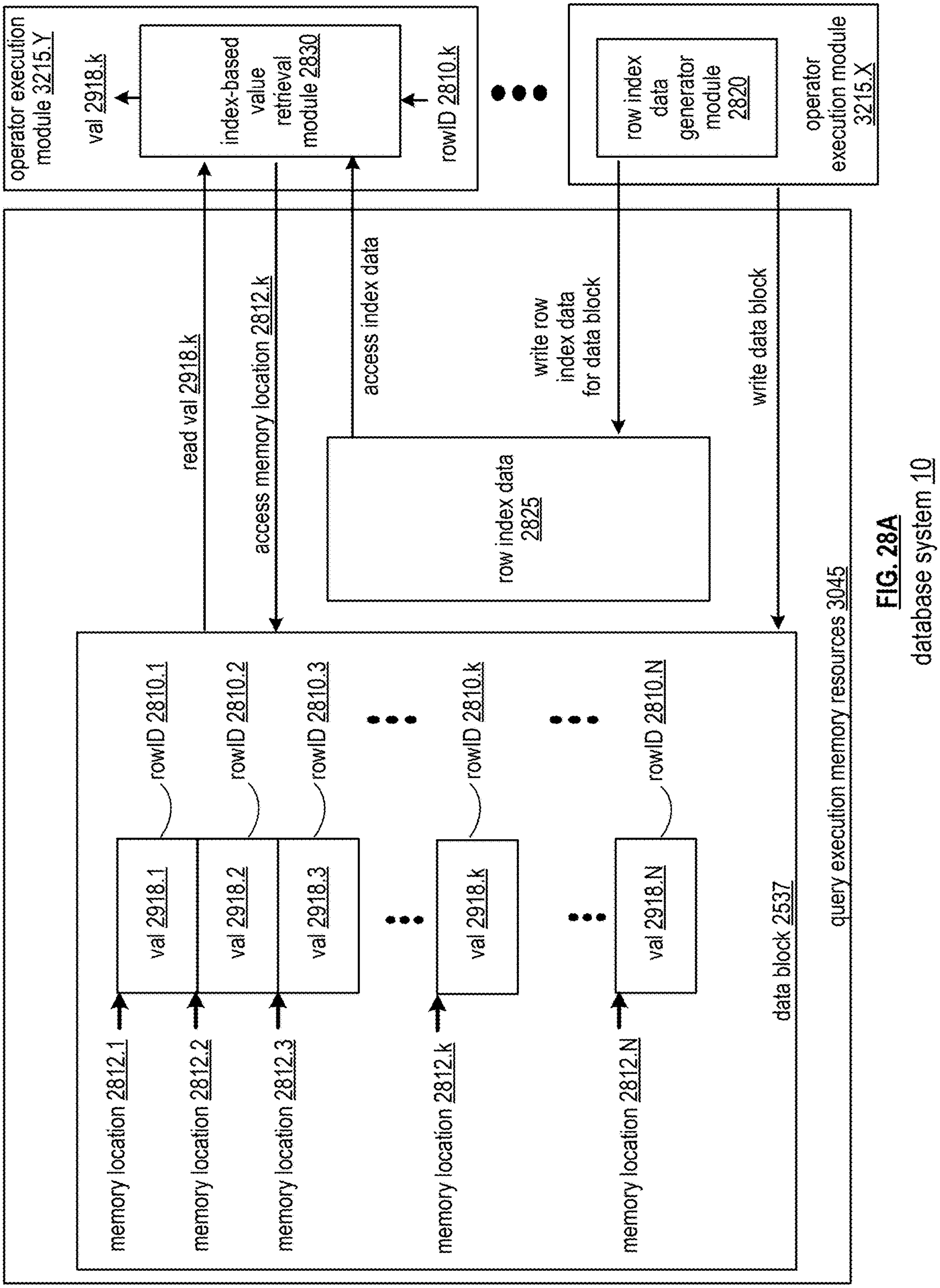
FIG. 28A is a schematic block diagram of a query execution module that implements row index data for accessing row values in a data block in accordance with various embodiments.

FIG. 28A illustrates an embodiment of a database system that implements row index data 2825 stored in query execution memory resources 3045 for a given data block 2537, for example, of a given column stream storing column values of one or more columns for a plurality of rows. A row index data generator module 2820 of operator execution module 3215.X that writes this given data block 2537 can generate the respective row index data 2825 for storage in query execution memory resources 3045 and/or for processing by one or more subsequent operators in the query operator execution flow in conjunction with their accessing of particular values in the given data block 2537. For example, this row index data is applied in cases where only some values are accessed, for example, based on performing an operator such as a join operator, intersection operator, aggregation operator, set operator, and/or other operator, for example, implemented identifying matches, such as matches with other input as denoted by a hash map 2555.

One or more subsequent operator modules 3215.Y serially after the given operator execution module 3215.X that wrote this row index data and/or the corresponding data block 2537, such as a parent operator, grandparent operator, or operator having the given operator implementing the operator execution module 3215.X as a descendent, can access particular values 2918 of one or more particular rows 2916 of the given data block 2537 based on accessing this row index data in conjunction with implementing an index-based value retrieval module 2830.

The data block 2537 can store a plurality of values 2818.1-2818.N of a plurality of rows 2916.1-2916.N. The plurality of values 2818.1-2818.N can be ordered in the data block 2537 by ordering of a respective plurality of rowIDs 2810.1-2810.N. The plurality of values 2818.1-2818.N can be implemented as values 2918 of a respective column 2915 of a respective one or more column streams 2968 for a corresponding set of rows 2916.1-2916.N. The plurality of values 2818.1-2818.N can be implemented as fixed-length values, for example, corresponding to a given data type for the respective column 2915.

A given row identifier (rowID) 2810 can be implemented as a row number having numerical value such as an integer value, or other value with respect to other values denoting order. For the sake of example, rowIDs increment numerically in intervals of 1, and are implemented as integer values, for example, starting at the value of 0 or the value of 1. Other types of identifiers and/or respective ordering schemes can be applied in other embodiments.

Note that values for some or all of the plurality of rowIDs 2810.1-2810.N may be inherently determinable by nature of the ordering schemes and/or assignment of rowIDs, despite some or all of these plurality of rowIDs 2810.1-2810.N not being stored in row index data 2825, and/or not being stored in other portions of query processing memory resources 3045. This can be ideal in reducing memory usage by reducing the number of values that need be stored to perform accesses by index-based value retrieval module 2830 to improve space efficiency of row index data 2825 and/or otherwise reduce resource consumption of query processing memory resources 3045 during query execution. Embodiments where characteristics of ordering schemes and/or assignment of rowIDs are leveraged by row index data enable storing only values for a proper subset of the of rowIDs 2810.1-2810.N, or values for no rowIDs at all, are discussed in conjunction with FIGS. 28D and 28E.

In this example, the subsequent operator module 3215.Y determines to read the value for a given row 2916 having a corresponding rowID 2810.*k* (e.g., denoting this row as kth row in a given ordered set of rows). The index-based value retrieval module determines rowID 2810.*k* is stored in memory location 2812.*k* based on accessing the row index data 2825, and reads the respective value 2918.*k* from in this memory location 2812.*k* accordingly.

This read value 2918.*k* can further processed by the operator execution module 3215.Y in conjunction with execution of the respective operator 2520, can be in be included in output of the respective operator 2520, for example, as a value in a column stream and/or other output data blocks generated by the operator execution module 3215.Y and/or written to query execution memory resources 3045, and/or can otherwise be outputted/further processed in conjunction with continued execution of a respective query by query execution module 2504.

Figure 28B:
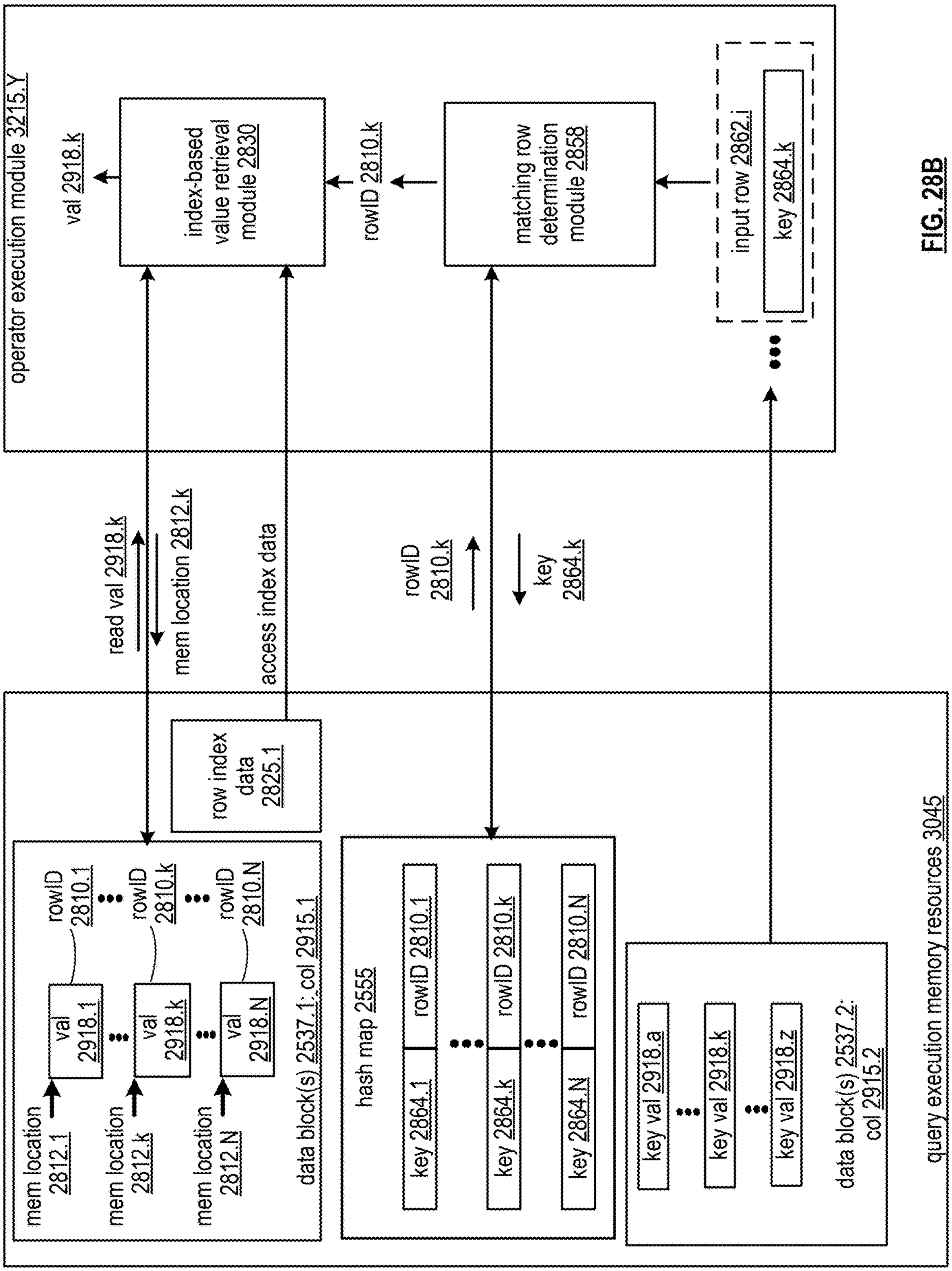
FIG. 28B is a schematic block diagram of a query execution module that implements row index data for accessing row values based on a hash map lookup in accordance with various embodiments.

FIG. 28B illustrates an example embodiment of utilizing index-based value retrieval module 2830 to access row index data 2825.1 for a given data block 2537.1, which can correspond to some or all rows of a given column 2915.1. The reading of value 2918.*k* from data block 2537.1 based on applying index data 2825.1 to rowID 2810.*k* can implement the reading of value 2918.*k* from data block 2537 based on applying index data 2825 to rowID 2810.*k* of FIG. 28A.

The determination to read the value 2918.*k* for the given row 2916.*k* having rowID 2810*k*, and/or to not read some or all other values 2918 for other rows of the given data block, can be based on processing rowIDs outputted by a matching row determination module 2858. The matching row determination module 2858 can determine the given rowID 2810*k*, and/or other rowIDs, based on performing a lookup to a hash map 2555, for example, stored in query execution memory resources 3045, for a given key 2864.*k*. In particular, hash map 2555 store one or more rowIDs mapped to a given key 2864 denoting the memory location of one or more given values for the given key, rather than storing the given values themselves, which can decrease the memory requirements for storing hash maps 2555 and/or can improve the efficiency of spilling hash maps to disk.

Some or all features and/or functionality of the hash map 2555 of FIG. 28B can be implemented via some or all features and/or functionality of the hash map of FIG. 25F, the hash map 2555 of FIGS. 27A-27E, and/or any other embodiment of hash map 2555 described herein. Some or all features and/or functionality of the matching row determination module 2858 can be implemented via some or all features and/or functionality of the matching row determination module 2558 of FIG. 25F. Some or all features and/or functionality of the key 2864.*k* of FIG. 28B can be implemented via some or all features and/or functionality of the right match value 2564 of FIG. 25F and/or any other embodiment of a hash map key and/or join key described herein. Some or all features and/or functionality of the key 2864.*k* of FIG. 28B can be implemented via some or all features and/or functionality of the right match value 2564 of FIG. 25F can implement the values 2918 of FIG. 28B, for example, where a rowID denotes the location of a respective right output values 2563 for a respective row in the data block 2537.

The matching row determination module 2858 can optionally process some or all input rows 2862 of a second given data block 2535.2, which can correspond to some or all rows of another column 2915.2, for example, of the same of different database table from that of column 2915.1 and/or that is otherwise different from column 2915.1. Column 2915.2 can have the same or different number of rows and/or same or different value type from column 2915.1. In some embodiments, the rows of column 2915.2 implement the rows of left input row set 2541 of a join process 2530 and/or the rows of column 2915.1 implement the rows of right input row set 2543 of a join process 2530. In this example, a given input row 2862.*i* being processed has key 2864.*k*, and the matching row determination module 2558 accesses the value mapped to key 2864.*k* in hash map 2555 accordingly to render reading of rowID 2810*k*, inducing the accessing of the respective value 2918.*k* for this rowID 2810.*k* in data block 2537.1 via use of tow index data 2825.1 accordingly.

Figure 28C:
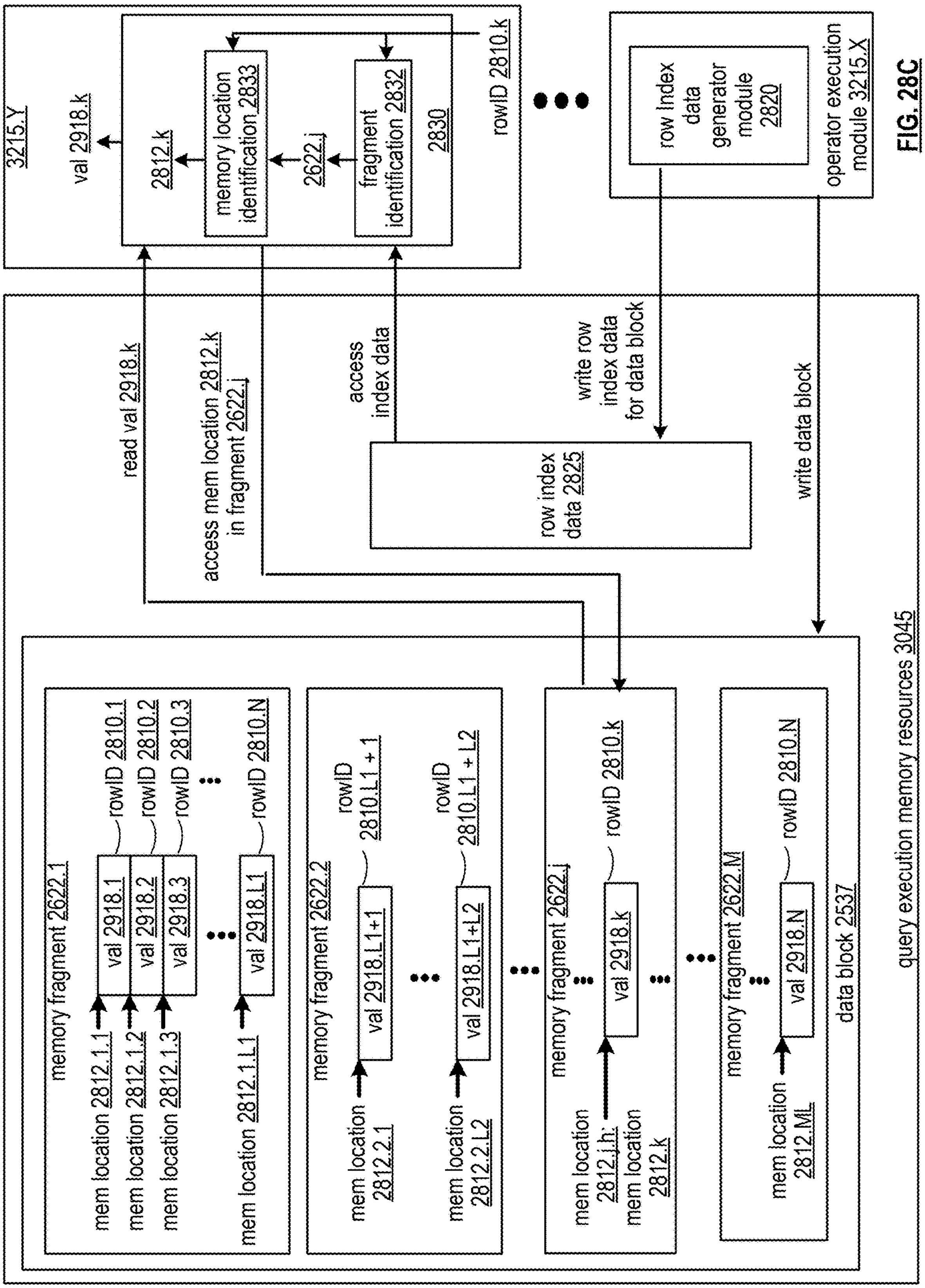
FIG. 28C is a schematic block diagram of a query execution module that implements row index data for accessing row values dispersed across multiple memory fragments of a data block in accordance with various embodiments.

FIG. 28C illustrates an embodiment of accessing a given value 2918.*k* in a respective data block 2537 that is implemented via a plurality of memory fragments 2622.1-2622.M via an index-based value retrieval module 2830 that performs fragment identification 2832 and/or memory location identification 2833. Some or all features and/or functionality of the data block 2537 of FIG. 28C can implement the data block 2537 of FIG. 28A and/or any other embodiment of data block 2537 described herein. Some or all features and/or functionality of the index-based value retrieval module 2830 of FIG. 28C can implement the index-based value retrieval module 2830 of FIG. 28A and/or any other embodiment of index-based value retrieval module 2830 described herein.

The plurality of memory fragments 2622.1-2622.M can be implemented as a plurality of non-contiguous memory fragments optionally stored in different locations and/or optionally having no pattern or relation that would denote where the location of a memory fragment 2622.*i*+1 would be located given the location of a memory fragment 2622.*i*.

Each memory fragment 2622 can store a corresponding proper subset of values 2918 of the plurality of values 2918.1-2918.N stored in the data block 2537. The M proper subsets of values 2918 across the M memory fragments 2622.1-2622.M can be mutually exclusive and collectively exhaustive with respect to the plurality of values 2918.1-2918.N, where the value 2918 of each given row 2916 of the N rows is stored in exactly one corresponding memory location 2812 within exactly one memory fragment 2622 of the plurality of memory fragments 2622.1-2622.M. The M proper subsets of values 2918 across the M memory fragments 2622.1-2622.M can further be contiguous subsets in accordance with an ordering of the respective rows by rowIDs 2810.1-2810.N. For example, a first subset that includes L1 values of the plurality of values 2918 corresponding to a first contiguous subset of L2 rowIDs 2810.1-2810.L1 are stored, in order, in a first memory fragments 2622.1 in a respective set of L1 ordered memory locations 2812.1.1-2812.1.L1 within the first memory fragment 2622.1; a second subset that includes L2 values of the plurality of values 2918 corresponding to a first contiguous subset of L2 rowIDs 2810.L1+1-2810.L1+L2+1 are stored, in order, in a second memory fragment 2622.2 in a respective set of L2 ordered memory locations 2812.2.1-2812.2.L1 within the second memory fragment 2622.2, and so on, for all M memory fragments. The number of values L stored in a given memory fragment can be the same or different for different memory fragments 2622, for example, based on whether the different memory fragments 2622 have same or different sizes.

The index row data 2830 can be implemented to enable determination of the of location of a value 2918.*k* within a corresponding given memory fragment 2622.*j* via index-based value retrieval module 2830 to enable their retrieval despite the fragmentation of the memory fragments 2622.1-2622.M implementing the respective data block 2537 across query execution memory resources 3045 in a non-contiguous manner.

Determining the memory location 2812.*k* in which to access a given value 2918.*k* for a given row identifier 2810.*k* can include first identifying which memory fragment of the plurality of memory fragments 2622.1-2622.M stores the given value 2918*k*, for example, via performing corresponding fragment identification 2832. This determination can be based on the value of rowID 2810.*k* and/or can be based on row index data 2825.1. In this example, a given memory fragment 2622.*j* is determined to store the given value 2918.*k*.

Determining the memory location 2812.*k* in which to access a given value 2918.*k* for a given row identifier 2810.*k* can alternatively or additionally include next which memory location 2812 within the given memory fragment 2622.*j* stores the given value 2918*k*, for example, via performing corresponding memory location identification 2833. This determination can be based on the value of rowID 2810.*k* and/or can be based on memory fragment 2622.*j* identified as storing the given value.

Once the given memory fragment 2622.*j* is identified via fragment identification 2832 the row index data 2825 is optionally not further accessed and/or not further utilized to identify the given location within the memory fragment, where attributes of the rowID assignment and/or ordering and/or attributes of the memory fragments, attributes of the values 2918, and/or other information is utilized to determine the memory location 2812.*k* for the given value 2918.*k*.

A first embodiment of implementing row index data 2825 can include, for example, upon creation of a data stream indexer, the operator execution module 3215.X implementing row index data generator module 2820 can iterate through the entire column stream and/or create a contiguous vector of pointers to every entry in the column stream as row index data 2825. Indexing into the column stream in this first embodiment via index-based retrieval module 2830 is then trivial, taking O(1) time. However, this first embodiment can thus require O(N) memory and O(N) time to construct row index data 2825 where N is the number of entries in the data block 2537 of the column stream.

In cases where this approach require O(N) memory and O(N) time to construct row index data 2825 is unfavorable and/or where improved memory and/or construction time is favorable, other approaches can be utilized to implement the row index data 2825. As discussed in further detail herein, other approaches that can be used that drastically reduce the memory usage of row index data 2825, for example, based on relying upon, and/or thus leveraging, stricter assumptions, and/or based on sacrificing processing time for performing the respective indexing into the column stream for a respective value. Implementing such other approaches can include performing the fragment identification 2832 and/or the memory location identification 2833 of FIG. 28C. Implementing such other approaches can include implementing a corresponding second embodiment via some or all features and/or functionality of FIG. 28D and/or include implementing a corresponding third embodiment via some or all features and/or functionality of FIG. 28E.

Figure 28D:
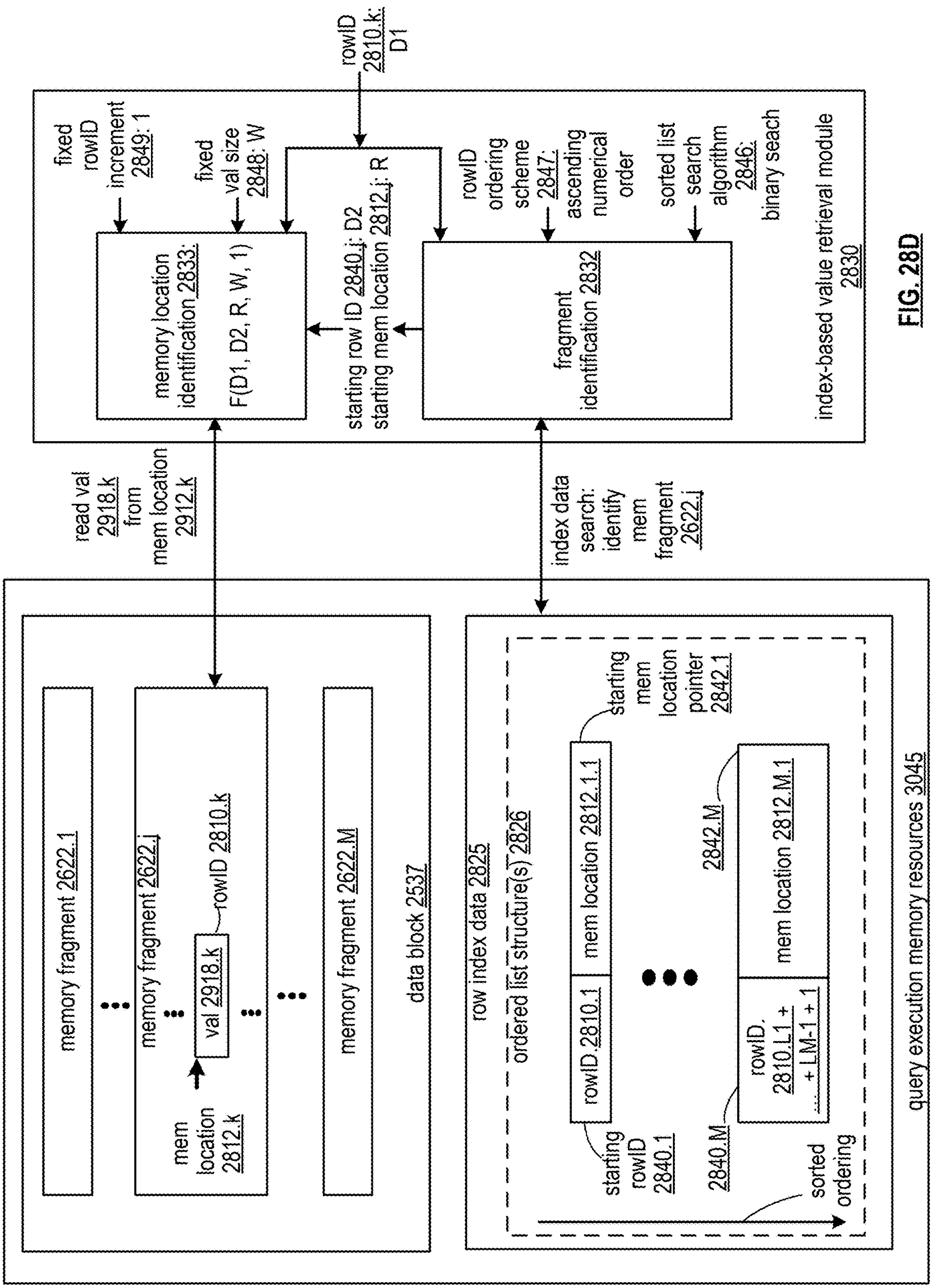
FIGS. 28D and 28E are schematic block diagrams of a query execution module that implements example row index data that include ordered list structures row index in accordance with various embodiments.

FIG. 28D illustrates an example embodiment of accessing a given value 2918.*k* in a respective data block 2537 via an index-based value retrieval module 2830 applying an example embodiment of row index data 2825, for example, that enables improved memory space efficiency and/or improved processing time efficiency over the first embodiment of implementing row index data 2825 described above. Some or all features and/or functionality of the row index data 2825 of FIG. 28D can implement the row index data 2825 of FIG. 28C, FIG. 28A, and/or any other embodiment of data block 2537 described herein. Some or all features and/or functionality of the index-based value retrieval module 2830 of FIG. 28D can implement the index-based value retrieval module 2830 of FIG. 28C, FIG. 28A, and/or any other embodiment of index-based value retrieval module 2830 described herein.

In some embodiments, such as in a second embodiment different from the first embodiment described above, for example, without requiring any additional assumptions, the row index data can store information for a list of M memory fragments 2622.1-2622.M in the data block 2537 of the column stream. For each fragment, the row index data 2825 can store the row number of the first row in the fragment as well as a pointer to the memory for that fragment. For example, as illustrated in FIG. 28D, one or more ordered list structures 2826 store the value of each of the M starting rowIDs 2840.1-2840.M for the respective set of M memory fragments 2622.1-2622.M, in accordance with the sorted ordering that matches the ordering in which values are stored in these fragments as discussed in conjunction with FIG. 28C. This list of memory fragment information can be stored in sorted order with ascending firstRowNumber fields, without storing pointers for each row. For example, ordered list structure 2826 is implemented as an array, vector, list, or other ordered structure ordered by the values of rowID 2810 that correspond to the M starting rowIDs 2840.1-2840.M.

The index-based value retrieval module 2830 can be implemented to find the kth entry in the column stream to first identify the fragment 2622.*j* containing the value 2918.*k* for row 2916.*k* having rowID 2810.K. This can include performing a sorted search algorithm 2846 such as a binary search or other search algorithm leveraging the sorted ordering of ordered list structure 2826 for the value 2918.K in the list of M starting rowIDs 2810.1-2810.M. The search can optionally be performed based on performing comparisons and/or otherwise performing the search in accordance with a rowID ordering scheme 2847, such as the known scheme where rowIDs are ordered numerically in ascending order. Note that in most or all cases, the search does not render finding of rowID 2810.*k* in the list itself, unless it is the first rowID for a respective fragment. The fragment containing the respective row can correspond to the fragment with rowID less than and closest to the given rowID 2810.*k*, such as the value of the rowID that would be immediately before this rowID.k if rowID.k were to be included in the list in sorted order.

Once the fragment is identified, the memory location 2812.*k* of the value 2918.*k* for row 2916.*k* can be found in this fragment based on its staring memory location 2812.*j*, such as the location of its first starting row having starting rowID 2840.*j*. This can include determining the memory location 2812.*k* as a function F of: the value D1 of rowID 2810.*k* (e.g. the numeric value of k or k−1 when corresponding the kth row), the value D2 of starting rowID 2840.*j*; the value R of starting memory location 2812.*j*, such as a corresponding address, pointer, and/or offset; the value W denoting the fixed value size 2848 of values 2918; and/or the value fixed rowID increment 2849, which can be an increment by 1 or another number. As a particular example, the memory location 2812.*k* is determined by subtracting the starting row ID 2840.*j* (e.g., D2) in the identified fragment from the value of rowID 2810.*k* (e.g., D1) to compute a corresponding offset of the value 2918.*k* in the given fragment (e.g., how many values into the fragment until reaching value 2918*k*). Given this value for the offset, the memory location 2812.*k* is located at starting memory location 2812.*j* (e.g., R)+this offset value*the fixed value size 2848 (e.g., W). In cases where the fixed rowID increment 2849 has a value of one, performance of function F can be expressed as R+(D1−D2)*W, where the respective output of this function is equal to and/or otherwise denotes the memory location 2812.*k*.

Figure 28E:
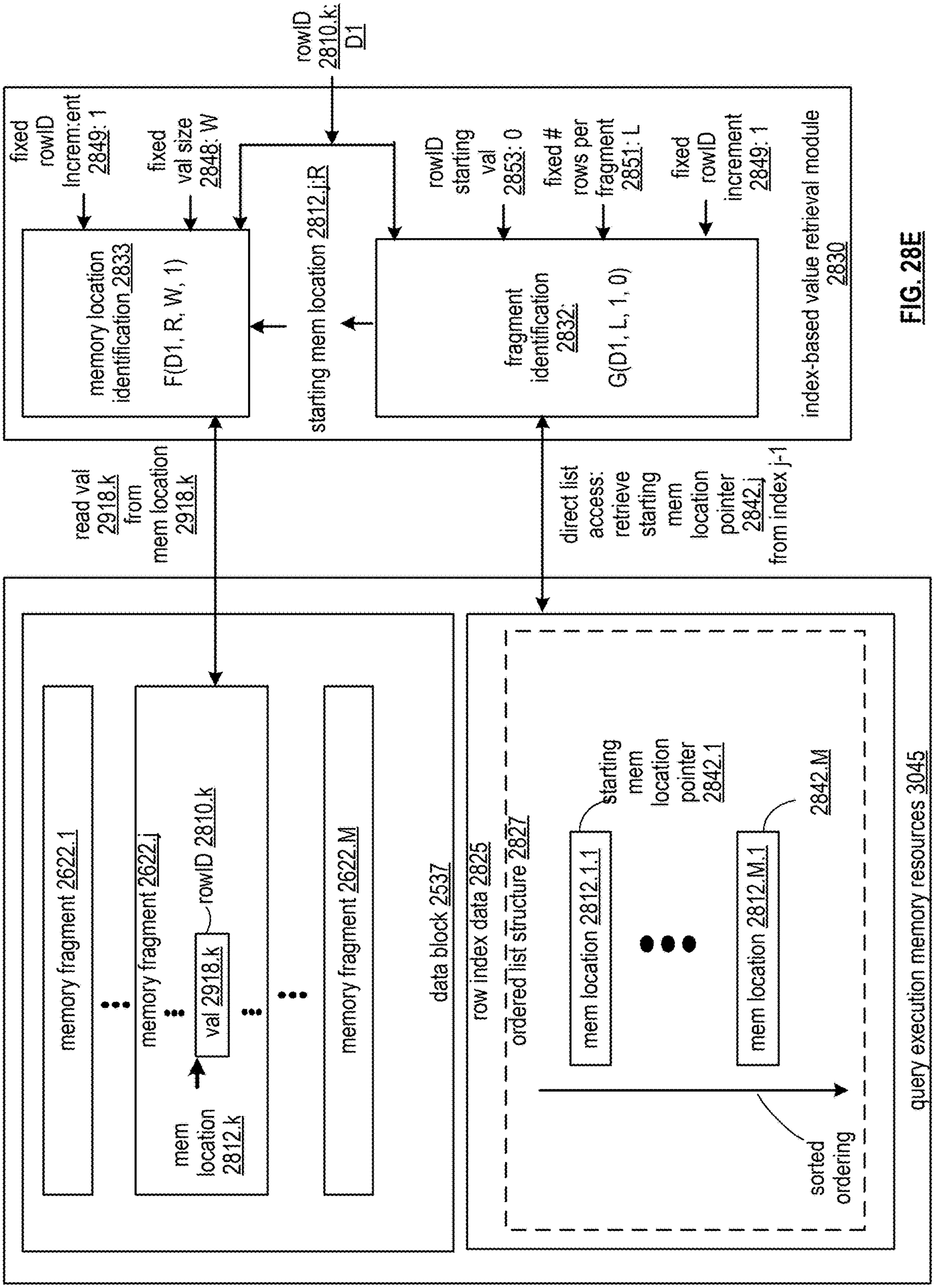

Implementing the row index data 2825 and respective index-based value retrieval module 2830 of FIG. 28E can render a request to index into the column stream will take O(log(M)) time, for example, due to the performance of the binary search to the ordered list of M entries. Implementing the row index data 2825 and respective index-based value retrieval module 2830 can render row index data 2825 consuming O(m) space and taking O(m) time to generate via row data index generator module 2820. Because the number of fragments M in the data block of the column stream cannot exceed the number of rows N in the data block of the column stream, the memory usage is strictly an improvement from the first embodiment discussed previously where memory locations for all N values are stored in row index data 2825. In some embodiments, as long as the number of fragments in each column stream is small, the slight performance hit to indexing requests can be worth the decreased memory usage.

FIG. 28E illustrates an example embodiment of accessing a given value 2918.*k* in a respective data block 2537 via an index-based value retrieval module 2830 applying an example embodiment of row index data 2825, for example, that enables improved memory space efficiency and/or improved processing time efficiency over the first embodiment of implementing row index data 2825 described previously and/or that further enables improved memory space efficiency and/or improved processing time efficiency over the second embodiment of implementing row index data 2825 as presented in conjunction with FIG. 28D. Some or all features and/or functionality of the row index data 2825 of FIG. 28E can implement the row index data 2825 of FIG. 28C, FIG. 28A, and/or any other embodiment of data block 2537 described herein. Some or all features and/or functionality of the index-based value retrieval module 2830 of FIG. 28E can implement the index-based value retrieval module 2830 of FIG. 28C, FIG. 28A, and/or any other embodiment of index-based value retrieval module 2830 described herein.

In some embodiments, such as in a third embodiment different from the first embodiment and the second embodiment described previously, an additional assumption can be exploited to improve the indexing speed. If it is known that every fragment is the same size and/or contains the same number of entries L, then finding the fragment that contains a given row number can be performed in constant time having O(1). This third embodiment can be implemented similarly to the second embodiment, where in an indexing request, instead of performing a binary search or other sorted search algorithm 2846 over the list of fragments, a simple computation such as integer division is performed to find the fragment containing a given row. This renders constant, O(1) time to index into the column stream while using O(M) space and taking O(M) time to construct.

In particular, as illustrated in FIG. 28E, the ordered list structure 2827 can be implemented differently from the ordered list structure 2826 of FIG. 26D, and/or can optionally simply store the memory locations 2812.1.1-2812.M.1 without being mapped to respective starting row numbers as illustrated in FIG. 28D, where the row index data 2825 further improves space efficiency by optionally not storing the values of any rowIDs 2810. The mapping of memory locations 2812.1.1-2812.M.1 can be denoted by being ordered in the list in the respective ordering of their storage of rowIDs, where the memory locations 2812.1.1 is stored in the first entry of a respective array (e.g. at index 0), and thus maps to the first memory fragment 2812.1; where the memory location 2812.2.1 is stored in the first entry of a respective array (e.g. at index 0), and thus maps to the second memory fragment 2812.2; and so on, for all M entries.

The fragment identification 2832 can be performed to identify the starting memory location 2812.*j* for the fragment determined to store the respective value 2918.*k* for the denoted rowID 2810.*k* utilizing this ordered list structure 2827. This can include determining the respective index of ordered list structure 2827 such as a corresponding one of M possible values 0-M−1, and/or corresponding one of M other possible values denoting the different fragments mapped to different memory location in ordered list structure 2827, as a function G of: the value D1 of rowID 2810.*k*; the value L denoting the fixed number of rows per fragment 2851; the rowID starting value 2853, such as a starting value of 0; the fixed rowID increment 2849, which can be an increment by 1 or another number; and/or a rowID starting value 2853, such as the value of 0, 1, or another starting number from which subsequent rowIDs are increment via the fixed rowID increment 2849. As a particular example, the memory location 2812.*k* is determined by dividing the value of rowID 2810.*k* (e.g. D1) by the value of fixed number of rows per fragment 2851 (e.g. L), for example, where the index of ordered list structure 2827 storing the starting memory location pointer 2842 for the memory location 2812 storing the value 2918.*k* for rowID 2810.*k* is the result of and/or is based on performance of this division. For example, this index into ordered list structure 2827 can be determined via performance of function G expressed as floor(D1/L), where an integer division is optionally performed to inherently implement the floor function. In this example, the computed index is the value j−1 and/or otherwise rendering identification that the jth value from the ordered list structure via a direct access having O(1) time efficiency via use of this computed index.

The memory location identification 2833 can be implemented in a similar fashion as discussed in conjunction as FIG. 28E, for example, without the use of the starting rowID 2840.*j* due to not being necessary due to the knowledge that all memory fragments includes the same number of entries (e.g., L). For example, the value of D2 can be inherently determined as a function of the fixed number of rows per fragment 2851 (e.g., L), the computed index j−1, the fixed rowID increment 2849 (e.g., 1) and/or the rowID starting value 2853 (e.g., 0). For example, the value of D2 computed as and/or based on (j−1)*L. Thus, the performance of function F can be expressed as R+(D1−(j−1)*L))*W, where the respective output of this function is equal to and/or otherwise denotes the memory location 2812.*k*.

Figure 28F:
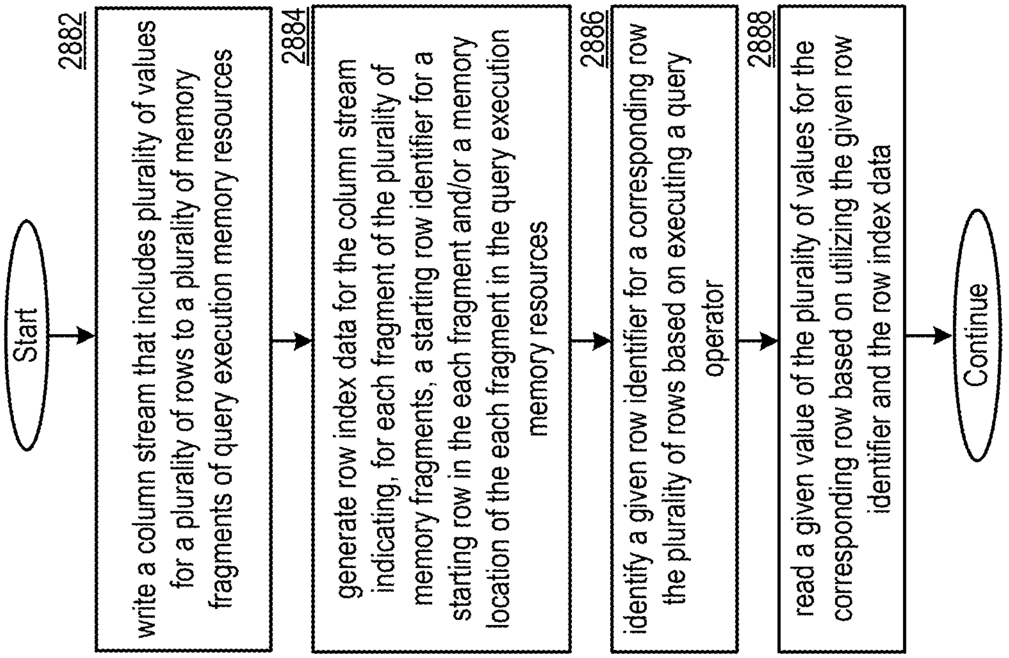
FIG. 28F is a logic diagram illustrating a method for execution in accordance with various embodiments.

FIG. 28F illustrates a method for execution by at least one processing module of a database system 10, such as via query execution module 2504 in executing one or more operators 2520. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28F. In particular, a node 37 can utilize their own query execution memory resources 3045 to execute some or all of the steps of FIG. 28F, where multiple nodes 37 implement their own query processing modules 2435 to independently execute the steps of FIG. 28F for example, to facilitate execution of a query as participants in a query execution plan 2405. Some or all of the steps of 28F can optionally be performed by any other processing module of the database system 10. Some or all of the steps of FIG. 28F can be performed to implement some or all of the functionality of the database system 10 as described in conjunction with FIGS. 28A-28E, for example, by implementing some or all of the functionality of generating and/or accessing row index data for use in query execution. Some or all of the steps of FIG. 28F can be performed to implement some or all of the functionality regarding execution of a query via the plurality of nodes in the query execution plan 2405 as described in conjunction with some or all of FIGS. 24A-25F. Some or all steps of FIG. 28F can be performed by database system 10 in accordance with other embodiments of the database system 10 and/or nodes 37 discussed herein. Some or all steps of FIG. 28F can be performed in conjunction with one or more steps of any other method described herein.

Step 2882 includes writing a column stream that includes plurality of values for a plurality of rows to a plurality of memory fragments of query execution memory resources. Step 2884 includes generate row index data for the column stream indicating, for each fragment of the plurality of memory fragments, a starting row identifier for a starting row in the each fragment and/or a memory location of the each fragment in the query execution memory resources. Step 2886 includes identifying a given row identifier for a corresponding row the plurality of rows based on executing a query operator. Step 2888 includes reading a given value of the plurality of values for the corresponding row based on utilizing the given row identifier and the row index data.

In various examples, the method includes generating a hash map that includes a plurality of entries corresponding to the plurality of rows that each include a corresponding key and a corresponding value, In various examples, the corresponding value of each of the plurality of entries indicates a corresponding row identifier of a plurality of row identifiers corresponding to the plurality of rows. In various examples, the method further includes performing a lookup to the hash map for a given key. In various examples, identifying the given row identifier is based on the given key mapping to the given row identifier in a corresponding entry of the hash map.

In various examples, the method further includes executing a join process upon a left input row set and a right input row set in conjunction with executing a query. In various examples, the plurality of rows of the column stream includes the right input row set. In various examples, the hash map is generated from the right input row set based on accessing the column stream, wherein the query operator is a join operator executed in conjunction with executing the join process. In various examples, the lookup to the hash map for the given key is performed based on the join operator processing a corresponding left row of the left input row set having the given key.

In various examples, the row index data for the column stream indicates a set of row identifiers that includes the row identifier for the starting row in every fragment of the plurality of memory fragments. In various examples, reading the given value of the plurality of values for the corresponding row is based on: identifying one fragment of the plurality of memory fragments that includes the given row identifier based on the given row identifier and the set of row identifiers; and/or identifying a location of the given row within the one fragment that includes the given row based on the given row identifier and the row identifier for the starting row in the one fragment.

In various examples, each of the plurality of memory fragments stores ones of the plurality of values for a corresponding proper subset of the plurality of rows. In various examples, plurality of proper subsets of the plurality of rows stored across the plurality of memory fragments are mutually exclusive and collectively exhaustive with respect to the plurality of rows.

In various examples, each of the plurality of memory fragments stores the ones of the plurality of values for the corresponding proper subset of the plurality of rows in a sorted ordering. In various examples, each of the corresponding proper subset of the plurality of rows are assigned one of a corresponding proper subset of a plurality of row identifiers ordered in accordance with the sorted ordering. In various examples, a plurality of proper subsets of the of the plurality of row identifiers are mutually exclusive and collectively exhaustive with respect to the plurality of rows.

In various examples, the plurality of rows includes exactly a first number of rows (e.g., the first number has the value of N of FIGS. 28A-28E). In various examples, the plurality of memory fragments includes exactly a second number of fragments (e.g., second number has the value of M of FIGS. 28A-28E). In various examples, the second number is strictly less than the first number based on fragments of the plurality of memory fragments each storing multiple ones of the plurality of rows. In various examples, the plurality of row identifiers includes exactly the first number of row identifiers. In various examples, the row index data stores a proper subset of the plurality of row identifiers that includes exactly the second number of row identifiers. In various examples, the given row identifier is not included in the proper subset of the plurality of row identifiers stored in the row index data.

In various examples, the plurality of row identifiers are numerical values, wherein the plurality of row identifiers ordered in accordance with an ascending numerical order, and wherein consecutive ones of the plurality of row identifiers in the sorted ordering increment by a fixed numerical value.

In various examples, the row index data stores the starting row identifier for the starting row in the each fragment.

In various examples, the row index data stores a list of row identifiers that includes row identifiers for the starting row in every fragment of the plurality of memory fragments in accordance with the ascending numerical order. In various examples, reading the given value of the plurality of values includes identifying one row identifier in the list of row identifiers having a numerical value closest to the given row identifier of all row identifiers in the list of row identifiers with numerical values less than or equal to the given row identifier. In various examples, the given value is read from one fragment of the plurality of memory fragments having the one row identifier as its corresponding starting row identifier.

In various examples, the one row identifier is identified by performing a binary search upon the list of row identifiers for the given row identifier.

In various examples, the plurality of rows includes a first number of rows. In various examples, the list of row identifiers includes a second number of row identifiers. In various examples second number is strictly less than the first number. (e.g. the first number has the value of N of FIGS. 28A-28E and/or the second number has the value of M of FIGS. 28A-28E).

In various examples, a memory efficiency of storing the row index data has linear complexity with respect to the second number based on the list of row identifiers having the second number of row identifiers and/or based on each row identifier of the list of row identifiers each having size in accordance with constant complexity. In various examples, the memory efficiency of storing the row index data has the linear complexity with respect to the second number further based on storing a list of memory location pointers having the second number of memory location pointers and/or based on each memory location pointer of the list of memory location pointers each having size in accordance with constant complexity.

In various examples, a processing efficiency and/or time efficiency of reading the given value has logarithmic complexity with respect to the second number based on the list of row identifiers being numerically ordered. In various examples, a processing efficiency and/or time efficiency of generating the row index data has linear complexity with respect to the second number based on the list of row identifiers having the second number of row identifiers. In various examples, a processing efficiency and/or time efficiency of generating the row index data has linear complexity with respect to the second number further based on storing a list of memory location pointers having the second number of memory location pointers.

In various examples, the given value is read from the one fragment of the plurality of memory fragments having the one row identifier as its corresponding starting row identifier based on: determining a memory location of the given value based on: determining a row identifier offset from the corresponding starting row identifier of the one fragment to the given row identifier; determining a memory offset of the given value in the given fragment based on a product of the row identifier offset and a fixed column value size; and/or determining the memory location based on applying the memory offset to the memory location of the each fragment.

In various examples, every fragment of the plurality of memory fragments has a same fixed fragment size, and wherein the every fragment of the plurality of memory fragments has a same fixed number of rows.

In various examples, the row index data for the column stream does not store the starting row identifier for the starting row in the each fragment. In various examples, the row index data for the column stream indicates the starting row identifier for the starting row in the each fragment based on the every fragment having the same fixed fragment size and further based on the every fragment storing the same fixed number of rows.

In various examples, the plurality of row identifiers are numerical values. In various examples, the plurality of row identifiers ordered in accordance with an ascending numerical order. In various examples, consecutive ones of the plurality of row identifiers in the sorted ordering increment by a fixed numerical value. In various examples, reading the given value of the plurality of values includes identifying one fragment of the plurality of memory fragments containing the given row by performing an integer division and/or by applying a floor function to output of a division function. In various examples, a dividend of the integer division is the given row identifier. In various examples, a divisor of the integer division is a fixed number of rows per memory fragment. In various examples, a quotient of the integer division maps to one memory fragment of the plurality of memory fragments. In various examples, the given value is read from the one memory fragment of the plurality of memory fragments.

In various examples, the plurality of rows includes a first number of rows. In various examples, the plurality of memory fragments includes a second number of memory fragments. In various examples, the second number is strictly less than the first number (e.g., the first number has the value of N of FIGS. 28A-28E and/or the second number has the value of M of FIGS. 28A-28E).

In various examples, a memory efficiency of storing the row index data has linear complexity with respect to the second number based on the plurality of memory fragments having the second number of memory fragments and based on each memory location being stored as a starting memory pointer having size in accordance with constant complexity. In various examples, a processing efficiency and/or time efficiency of reading the given value has constant complexity with respect to the second number based on the every fragment having the same fixed fragment size and further based on the every fragment storing the same fixed number of rows. In various examples, a processing efficiency and/or time efficiency of generating the row index data has linear complexity with respect to the second number based on the plurality of memory fragments having the second number of memory fragments;

In various examples, the row index data corresponds to performing a first type of optimization of a set of optimization types to execute the query. In various examples, the method further includes performing a second type of optimization of the set of optimization types to execute a second query that includes a plurality of CASE statements by performing a single switch operator and a single join operator to execute all of the plurality of CASE statements based on the plurality of CASE statements having an identical predicate. In various examples, the method further comprises performing any other type of optimization for performing join operators and/or other operators described herein in conjunction with performing the same query or other queries.

In various embodiments, any one of more of the various examples listed above are implemented in conjunction with performing some or all steps of FIG. 28F. In various embodiments, any set of the various examples listed above can implemented in tandem, for example, in conjunction with performing some or all steps of FIG. 28F.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28F, for example, in conjunction with further implementing any one or more of the various examples described above.

In various embodiments, the operational instructions, when executed by the at least one processor, cause the database system to: write a column stream that includes plurality of values for a plurality of rows to a plurality of memory fragments of query execution memory resources; generate row index data for the column stream indicating, for each fragment of the plurality of memory fragments, a starting row identifier for a starting row in the each fragment; and/or a memory location of the each fragment in the query execution memory resources; identifying a given row identifier for a corresponding row the plurality of rows based on executing a query operator; and/or reading a given value of the plurality of values for the corresponding row based on utilizing the given row identifier and the row index data.

Figure 29A:
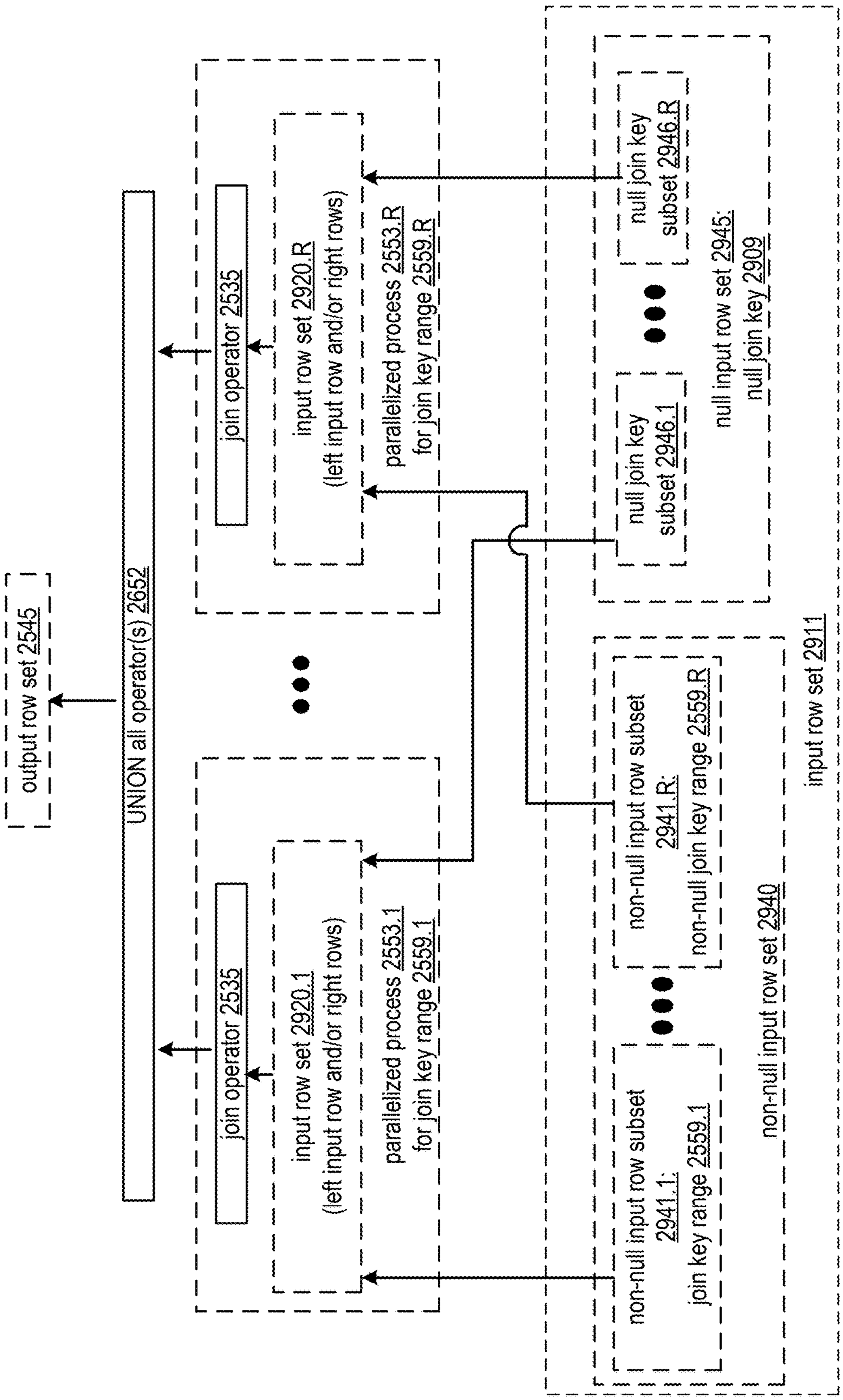
FIG. 29A is a schematic block diagram illustrating execution of a join process by processing a null input row set and a non-input row set in accordance with various embodiments.
Figure 29B:
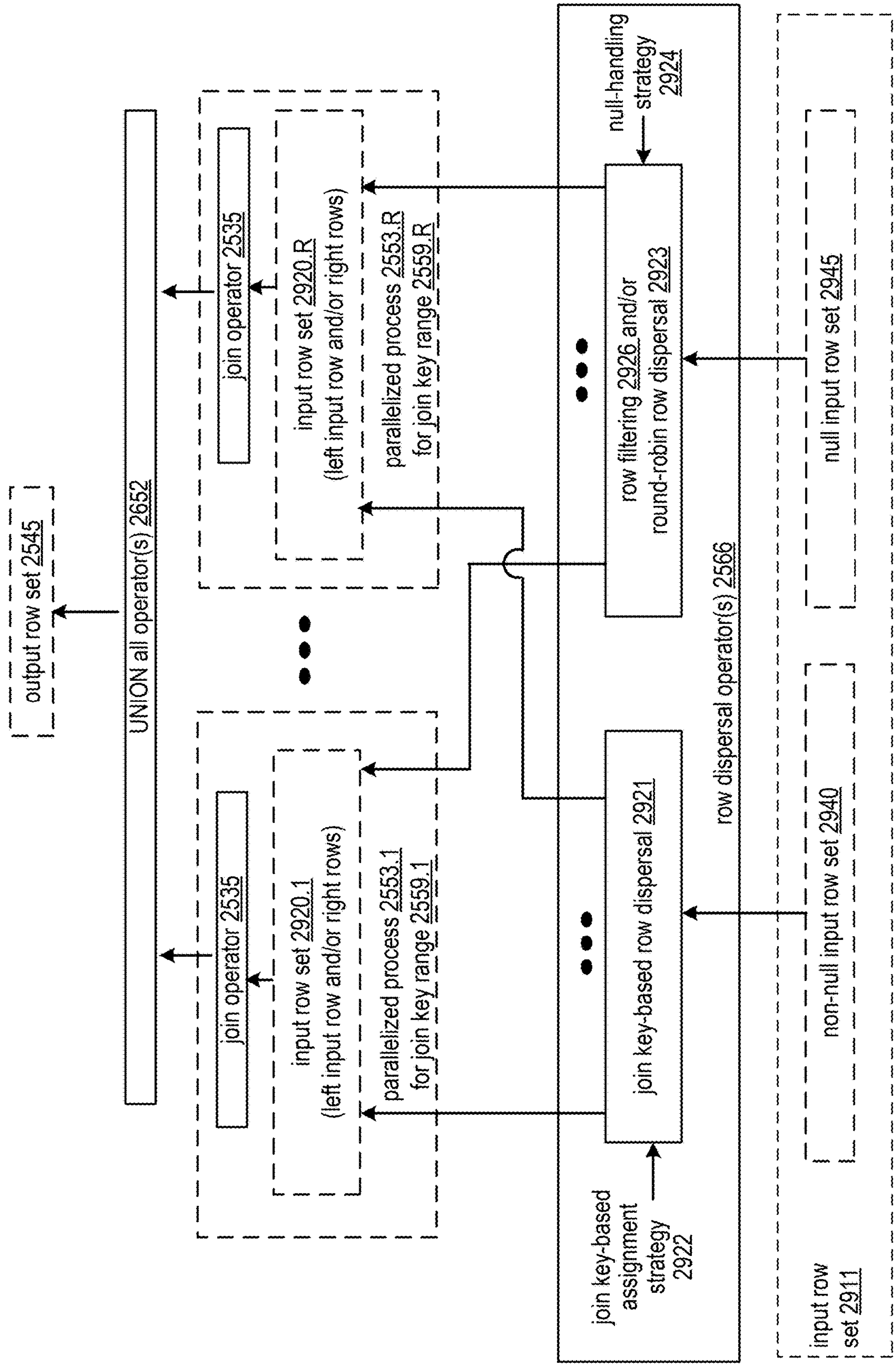
FIG. 29B is a schematic block diagram of executing a join process via at least one row dispersal operator that implements join key-based row dispersal, row filtering, and/or round-robin row dispersal in accordance with various embodiments.
Figure 29C:
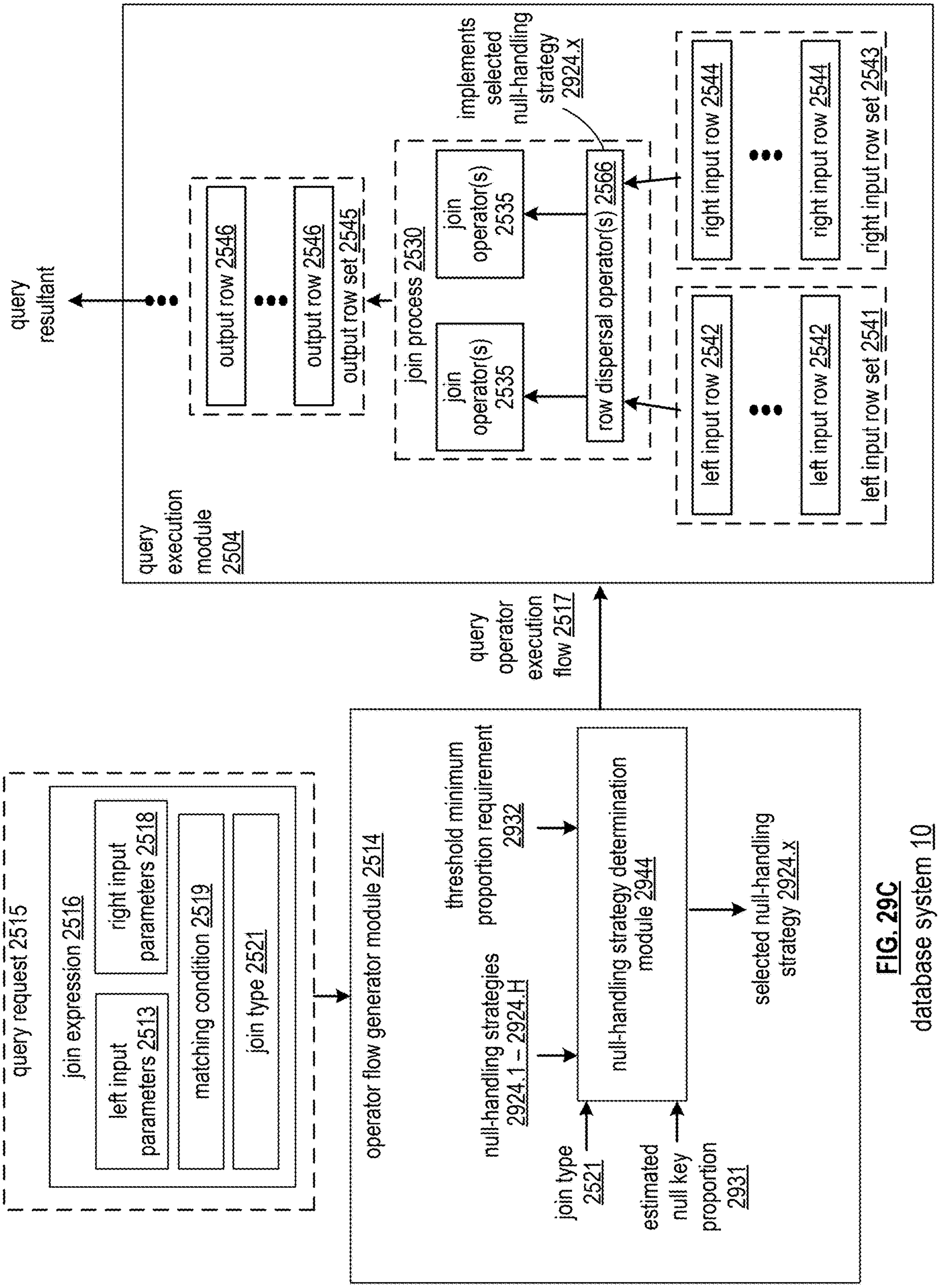
FIG. 29C is a schematic block diagram of a database system that implements a null-handling strategy determination module to generate a query operator execution flow for execution in accordance with various embodiments.

FIGS. 29A-29C illustrate embodiments of a database system 10 operable to efficiently process queries with JOIN expressions by leveraging cases where input rows have NULL values that don't need hash map accesses 2745 to be processed by a particular parallelized process due to being guaranteed to have no matching values. Some or all features and/or functionality of processing and/or executing queries of FIGS. 29A-29C can implement some or all features and/or functionality of generating and/or executing a query operator execution flow 2517 of FIGS. 24G-24G, can implement performance of JOIN expressions as described in conjunction with FIGS. 25A-25F, and/or can be implemented via any embodiment of database system 10 described herein.

In certain workloads, data skew cases can exist where, for example, 80+% of rows to a given join expression on the right hand side, left hand side, or both can have the same value on a shuffle key, such as the NULL value. In some embodiments, such those as discussed in conjunction with FIGS. 25D and/or 25E where incoming rows are dispersed for processing by parallelized processes in accordance with being assigned into subsets for processing by particular parallelized processes by join key in a corresponding join key range, some parallelized processes 2550 implementing a join process 2530 can have way more rows to process than others, limiting parallelism and/or hurting performance.

As used herein, a null join key 2909 can correspond to a value of NULL for a given join key, where the join key can be implemented as the one or m left match values 2562 and/or the one or more right match values 2564 of the given row as discussed previously. In particular, a row can have null join key 2909 based on having a NULL value and/or otherwise undesignated value for the column designated as containing the left match values 2562 and/or the column designated as containing the right match values 2564 as denoted by the matching condition 2519 of the respective query. In some embodiments, as per the matching condition 2519 and/or general definition of some or all join types 2521, a left row having the null join key 2909 for its left match value 2562 cannot match with any right rows, including right rows with the null join key 2909 for its right match value 2564, and/or vice versa. For example, in cases where the join type 2521 is a hash join and/or equi-join and/or where matching condition 2519 requires equality between left match value 2562 and right match value 2564 to render a match, the matching condition 2519 can necessitate that matches are identified for defined, non-null values only, where a given left row having a NULL and/or undefined value for left match value 2562 and a given right row having a NULL and/or undefined value for right match value 2564 are not identified as matching, as having the NULL/undefined value does not render matching due to the value not being defined and/or not being non-null.

Because rows having a null join key 2909 are guaranteed to not match other rows, it is not necessary that these rows be grouped by join key when being assigned and emitted to a given parallelized process 2553 for processing to guarantee query correctness and semantic equivalence. While non-null rows of one side, such as the left hand side, need be compared with all possible rows that could match, necessitating the grouping by join key range discussed in FIG. 25D when the right hand side is divided for processing, for example, where the left hand side is optionally further divided for comparison against this full right hand side of a given join key range as illustrated in FIG. 25E, the null join key need not be included in these join key ranges and/or need not be assigned its own join key range, because processing rows having null join keys 2909 via the "wrong" parallelized process that doesn't process all rows having the null join keys 2909 does not risk any missed matches outputted by the join expression due to these rows being guaranteed to not match with other rows.

This characteristic of rows having null join keys 2909 can be leveraged, where these rows are dispersed evenly and/or somewhat evenly across all parallelized processes rather than being grouped separately, in cases where these rows cannot be filtered out and need be included in output, for example, padded with nulls, based on the respective join type. This can improve the technology of database systems by improving the efficiency of processing join conditions via a plurality of parallelized processes 2553.1-2553.R, particularly in cases where the input is skewed and has a large proportion of such rows that would otherwise require needlessly reducing parallelism if grouped all together via their own parallelized process 2553 that would potentially be needlessly processing the most input rows itself, for example, when the proportion of null rows is higher than the value of 1/R. The dispersal of rows having null join values can enable more even dispersal of rows across parallelized processes 2553.1-2553.R, improving the parallelism-induced efficiency of the join process 2530.

In cases where this strategy of dispersing rows having null join values is applied, corresponding information can be added to the query operator execution flow 2517 and/or respective query execution plan 2405 to inform a row dispersal operator 2566, such as one or more shuffle/multiplexers, to perform join key-based dispersal on "normal rows" (e.g. rows having non-null join keys), but randomly (e.g. round robin) disperse rows that have null values for certain columns (e.g. the one or more key columns utilized to dictate matches).

FIG. 29A illustrates an example where rows in an input row set 2911 to a join process 2530 are assigned to parallelized processes in accordance with different dispersal strategies depending on whether or not they have null join keys 2909. Some or all features and/or functionality of the join process 2530 of FIG. 29A can implement the join process 2530 of some or all of FIGS. 25A-25F.

The input row set 2911 can be implemented as only the left input row set 2541 of the respective join process, can be implemented as only the right input row set 2543 of the respective join process, and/or can be implemented as both the left input row set 2541 and the right input row set 2543 of the respective join process. The set of parallelized processes 2553.1-2553.R can be implemented as the set of parallelized processes 2553.1-2553.R of FIGS. 25D and/or 25E, the set of parallelized processes 2550.1-2550.L of FIG. 25B, and/or can be implemented as any parallelized set of nodes 37, processing core resources 48, where the respective join operators 2535 are implemented as corresponding parallelized operator instances of the join process 2530.

The input row set can include a non-null input row set 2940 and a null input row set 2945. The non-null input row set 2940 can correspond to all rows having non-null values for the join key, while the null input row set 2945 can correspond to all rows having null values (i.e., null join key 2909) for the join key. The non-null input row set 2940 and the null input row set 2945 can be mutually exclusive and collectively exhaustive with respect to the input row set 2911.

Each incoming row in the non-null input row set 2940 can be included in exactly one of a set of non-null join key subsets 2941.1-2941.R of the non-null input row set 2940 for processing via a corresponding one of the set of parallelized processes 2553.1-2553.R based on their join key falling within a corresponding join key range 2559.R, for example, as discussed in conjunction with FIG. 25D. The plurality of join key ranges 2559.1-2559.R can be mutually exclusive as discussed previously, and can be collectively exhaustive with respect to a plurality of possible non-null values, where the null join key 2909 is not included in any of these join key ranges 2559.1-2559.R.

The non-null join key subsets 2941.1-2941.R of the non-null input row set 2940 can be mutually exclusive and collectively exhaustive with respect to the non-null input row set 2940, guaranteeing that each row in the non-null input row set be processed via exactly one parallelized process 2553. This can guarantee that all rows having any given non-null join key are processed via the same parallelized process 2553 as discussed previously, to guarantee identification of all respective matches and render query correctness.

The join key ranges 2559.1-2559.R can be determined on a per query basis and/or per table basis, for example, based on a probability distribution function of column values and/or to otherwise estimate even and/or somewhat even dispersal of rows across the parallelized processes 2553.1-2553.R based on a known and/or estimated distribution of values across the plurality of possible non-null values.

Meanwhile, each incoming row in the null input row set 2945 can be included in exactly one of a set of null join key subsets 2946.1-2946.R for processing via a corresponding one of the set of parallelized processes 2553.1-2553.R, despite all having the same null join key 2909 and despite this null join key not falling into the respective join key range 2559 to which a given row is processed. Rather than these null join key subsets 2946.1-2946.R being grouped by join key, as all incoming rows in the null input row set 2945 have the same null join key 2909, these null join key subsets 2946.1-2946.R can be identified arbitrarily, for example, via a randomized assignment, round-robin assignment, and/or other scheme implemented to render a uniform distribution and/or substantially uniform distribution of the rows in null input row set 2945 across the plurality of null input row sets 2945.

Alternatively, in other embodiments, more rows in the null input row set 2945 can intentionally be designated for one or more parallelized processes 2553 than others based on this parallelized processes 2553 awaiting more rows to process, having a lower proportion of non-null rows due to an unexpected data skew, processing rows more efficiently and/or having more processing and/or memory resources than other parallelized processes, and/or other reasons intended to balance work across parallelized processes 2553.1-2553.R and/or maximize parallelism.

Each parallelized process 2553 can thus receive and process an input row set 2920, which can include left input rows, right input rows, or both, from row input row set 2911. Based on the dispersal of non-null input row set, a given input row set 2920 of a given parallelized process 2553 can be guaranteed to have only non-null input rows with non-null join keys falling within its respective join key range 2559, and can be further guaranteed to have all non-null input rows with non-null join keys falling within its respective join key range 2559 from the row input row set 2911. Based on the dispersal of non-null input row set, a given input row set 2920 of a given parallelized process 2553 can further have a randomly selected and/or arbitrary null input rows having null join key 2909, such as exactly and/or approximately 1/R rows of the null input row set due to the uniform dispersal of null input row set 2945 across the set of R parallelized processes. Based on the dispersal of non-null input row set, all input row sets 2920 across parallelized processes 2553 can be guaranteed to include at least some null input rows in addition to all non-null input rows of their respective join key range 2559, for example, when the null input row set 2945 includes more than R rows.

Consider an example join expression "A LEFT JOIN B on a_col=b_col", for example, where A and B are tables joined via a left join type, where a_col is a column of table A, b_col is a column of table B, and matches are identified when the value of col_A equal the value of column_B. The semantics of SQL can dictate that rows from table A where a_col is null will not match with rows from table B where b_col is null.

Due to this example join expression implementing a left join, all rows of table A will be outputted at least once regardless of whether they have a match, where rows of table A having values of a_col not equal to the value of b_col for any rows of table B will be outputted with NULL joined on the right side, while rows of table B are only outputted when they have col_B values matching with a corresponding col_A value of table A.

Thus, by nature of the left join, rows where b_col is null cannot match and will not be included output due to the join being implemented as a left join, so these rows can be filtered out prior to dispersal to parallelized processes, for example via an explicit super select (e.g., in the xform sojn/selectOutJoinNulls). Meanwhile, by nature of the left join, rows of table A having values of null, which are guaranteed to not be not equal to the value of b_col for any rows of table B, will be outputted with NULL joined on the right side since unmatched left rows are output in a left join.

For this join, a row where a_col is null can be sent to any parallelized process 2553, such as any corresponding node 37 and/or any corresponding operator instance, since it is guaranteed to go unmatched. If there are a lot of rows where a_col is null and all of them were shuffled and/or otherwise emitted to the same parallelized process 2553, such as the same node and/or operator instance, parallelism would be limited and performance would be negatively impacted. However, if rows where a_col is null are shuffled randomly, for example, via a round robin process, the correct results are produced and the work is better balanced the work across and within parallelized processes 2553, improving processing efficiency of such queries.

As discussed in further detail in conjunction with FIG. 29C, other join types 2521 different from the left join can have corresponding different requirements as to whether rows having null join keys 2909 be included in output or be filtered out by nature of the corresponding type of join, and the rows of the left input row set 2541 and/or the right input row set 2543 can thus be handled accordingly, where rows having null join keys 2909 are thus treated differently for different types of joins to render the correct output for the corresponding join type 2521.

FIG. 29B illustrates an embodiment of executing a join process 2530 via implementing one or more row dispersal operators 2566 to disperse input row set 2911 to a set of parallelized processes 2553.1-2553.R. The one or more row dispersal operators 2566 of FIG. 29B can be implemented to render the dispersal of input row set across the set of parallelized processes 2553.1-2553.R as described in conjunction with FIG. 29A. The row dispersal operators 2566 can include one or more multiplexer operators, one or more tee operators, and/or one or more shuffle operators.

The one or more row dispersal operators 2566 can implement join key-based row dispersal 2921 of rows in non-null input row set 2940 of the input row set 2911 via applying a join-key based assignment strategy 2922. The applying of join-key based assignment strategy 2922 by the row dispersal 2921 of join key-based row dispersal 2921 can render assigning incoming rows of non-null input row set 2940 to a respective parallelized processes 2553 assigned to process the join key range 2559 that include the join key of a given incoming row as discussed in conjunction with FIG. 29A. For example, the join-key based assignment strategy 2922 indicates a deterministic mapping of non-null join keys to parallelized processes 2553 and/or indicates the join key ranges 2559.1-2559.R assigned to the parallelized processes 2553.1-2553.R. In some embodiments, applying the join-key based assignment strategy 2922 can include performing a corresponding hash-based assignment strategy, for example, where a hash function is performed upon a given non-null key value and the respective hash value dictates which join key range 2559 the row falls within dictating its routing to a particular parallelized process 2553, where the join key range 2559 includes exactly one hash value or multiple hash values.

The one or more row dispersal operators 2566 can further implement row filtering 2926 and/or round-robin row dispersal 2923 of rows in null input row set 2945 of the input row set 2911 via applying a null-handling strategy 2924. The null-handling strategy 2924 can be dictate that null input row set 2945 evenly across parallelized processes 2559 as discussed in conjunction with FIG. 29A, for example, via a round-robin process implemented by round-robin dispersal module and/or via a randomized process, pseudo-random process, or other process that renders uniform distribution, or other predetermined distribution dictated by null-handling strategy 2924, of rows in null input row set across parallelized processes 2553.1-2553.R. The null-handling strategy 2924 can otherwise be different from the join key-based assignment strategy 2922, rendering assignment of rows in null input row set 2945 to parallelized processes in a different fashion than assignment of rows in non-null input row set 2940.

The applying of null-handling strategy 2924 by the row filtering 2926 of join key-based row dispersal 2921 can further render filtering out all some or all rows having null join keys that are not to be included in the respective output of the join process. For example, prior to applying the round-robin row dispersal 2923, a subset of the null input row set 2945 that meets output inclusion criteria denoting they be included in output, as dictated by null-handling strategy, is identified via first applying row filtering to remove and/or otherwise filter out rows not meeting this output inclusion criteria.

In some cases, based on the given null-handling strategy 2924 denoting no rows having null join key be filtered out, the subset of the null input row set 2945 can be equal to the null input row set 2945 based on row filtering 2926 not being applied where here round-robin row dispersal 2923 is applied to all rows in null input row set 2945.

In other cases, based on the given null-handling strategy 2924 denoting all rows having null join key be filtered out, the subset of the null input row set 2945 can be null, based on row filtering 2926 being applied to filter out all rows, where round-robin row dispersal 2923 is applied to no rows in null input row set 2945.

In other cases, based on the given null-handling strategy 2924 denoting some rows having null join key be filtered out, such as only filtering right input rows having the null join key and not any left input rows having the null input key, or vice versa, the subset of the null input row set 2945 can be a non-null proper subset of the null input row set 2945 based on row filtering 2926 being applied to filter out some rows, where round-robin row dispersal 2923 is applied to the remaining, unfiltered rows.

This row filtering can be based on join type 2521, where the corresponding null handing strategy 2924 is selected based on the join type 2521 For example, when the join type is a left join as described in the example above, the null-handling strategy 2924 dictates that all right input rows in the null input row set 2945 be filtered out via row filtering 2926 and that none of the left input rows in the null input row set 2945 be filtered out via the row filtering 2926. Thus, the subset of remaining null input rows that are dispersed via the round-robin row dispersal 2923 in this case includes only the left input rows having the null join key.

FIG. 29C illustrates an example of an operator flow generator module 2514 that generates a query operator execution flow 2517 based on selecting a null-handling strategy 2924.*x* from a plurality of possible null-handling strategies 2924.1-2924.H based on the join type 2521 and/or an estimated null key proportion 2931. The resulting join process 2530 can implement the selected null-handling strategy 2924.*x*

Some or all of the plurality of possible null-handling strategies 2924.1-2924.H can map a corresponding one of a plurality of different join types 2521, where the join type dictates which null-handling strategies 2924 is performed and/or where the null-handling strategy 2924.*x* is otherwise a function of and/or based on the given join type 2521 of the given query. In some cases, one or more different join types 2521 are mapped to the same null-handling strategy 2924. Alternatively or in addition, different null-handling strategies 2924 can be selected for different queries having the same join type 2521 based on other factors, such as the estimated null key proportion 2931.

Below are examples of different null-handling strategies 2924 mapped to different join types rendering query correctness for respective different join types 2521:

For inner joins, the corresponding null-handling strategies 2924 can dictate that round-robin row dispersal 2923 is not applied. For example, all rows having null join key 2909 are filtered out via row filtering 2926 as rows with null join key are not to be included in the join output.

For left joins, the corresponding null-handling strategy 2924 can dictate that if any of the join keys is null on the left hand side, round-robin shuffle and/or multiplexing is applied to that row. For example, all rows in the right input row set having null join key 2909 are filtered out via row filtering 2926, and all rows in the left input row set are dispersed via round-robin row dispersal 2923.

For right joins, the corresponding null-handling strategy 2924 can dictate that if any of the join keys is null on the right hand side, round-robin shuffle and/or multiplexing is applied to that row. For example, all rows in the left input row set having null join key 2909 are filtered out via row filtering 2926, and all rows in the right input row set are dispersed via round-robin row dispersal 2923.

For full joins such as full outer joins, the corresponding null-handling strategy 2924 can dictate that if any of the join keys is null on the left hand side or the right hand side, round-robin shuffle and/or multiplexing is applied to that row. For example, no row filtering 2926 is applied, where all rows in both the left input row set and right input row set are dispersed via round-robin row dispersal 2923.

For semi and/or reverse semi joins, the corresponding null-handling strategies 2924 can dictate that round-robin row dispersal 2923 is not applied. For example, all rows having null join key 2909 are filtered out via row filtering 2926 as rows with null join key are not to be included in the join output.

For anti joins, the corresponding null-handling strategy 2924 can dictate that if any of the join keys is null on the left hand side, round-robin shuffle and/or multiplexing is applied to that row. For example, all rows in the right input row set having null join key 2909 are filtered out via row filtering 2926, and all rows in the left input row set are dispersed via round-robin row dispersal 2923.

Locally (i.e. in the context of the individual join process 2530), applying the respective null-handling strategy 2924 for the respective join type can always be a favorable addition to the query execution: if there's no data skew, it may not make a difference, but it would not be expected to cause the join to be performed more slowly and/or less efficiently.

The only complication is that without applying a null-handling strategy 2924 that includes round-robin row dispersal 2923, the output of the join may be partitioned (across nodes and operator instances) according to the key values. After performing round-robin row dispersal 2923, this is no longer true since rows that have the same null key values may be on different parallelized processes such as different nodes/processing core resources. With that in mind, if the query operator execution flow 2517 has an operator after the join process 2530 that relies on the partitioning, an additional shuffle and/or multiplexer operator must be added to ensure the optimization is legal, for example, where null-values join rows are routed to a same node and/or same track of the query operator execution flow to undo the round-robin row dispersal 2923.

In some cases, the null-handling strategy determination module 2944 further selects null-handling strategy 2924.*x* based on computing and/or otherwise determining an estimated null key proportion 2931, and determining whether this estimated null key proportion 2931 compares favorably to a threshold minimum proportion requirement 2932. The operator flow generator module 2514 can estimate how many of the rows have null join keys 2909 as estimated null key proportion 2931, for example, using a probability distribution function or other distribution data for the respective one or more tables and/or respective set of input rows on the right and/or left hand side, where a null-handling strategy 2924 that involves round-robin row dispersal 2923 is only selected when a large enough percentage of rows are expected to have null values. For example, when the estimated null key proportion 2931 compares favorably to the threshold minimum proportion requirement 2932, for example, based on being strictly greater than and/or being greater than or equal to a corresponding predetermining minimum proportion, the null-handling strategy 2924 to round-robin disperse null join keyed rows in accordance with the join type is selected. When the estimated null key proportion 2931 compares unfavorably to the threshold minimum proportion requirement 2932, for example, based on being strictly less than and/or being less than or equal to the corresponding predetermining minimum proportion, a null-handling strategy 2924 to round-robin disperse null join keyed rows in accordance with the join type is not selected, where all rows having null join keys are routed to a same respective parallelized process and/or are dispersed in a same fashion as the input rows having non-null join keys in accordance with the join-key based assignment strategy 2922.

In some embodiments, the operator flow generator module 2514 can always attempt to apply the appropriate null-handling strategy 2924 to round-robin disperse null join keyed rows when these rows are to be included in the join output, for example, during post-optimization. The operator flow generator module 2514 can optionally only evaluate whether the estimated null key proportion 2931 compares favorably with the threshold minimum proportion requirement 2932 in cases where the operator flow generator module 2514 detects that an additional shuffle/multiplexer operator must be added to undo the round-robin row dispersal 2923, where the round-robin row dispersal 2923 is always applied, if applicable for the respective join type, when no an additional shuffle/multiplexer operator is required.

In some embodiments, determining whether to apply a null-handling strategy 2924 that includes round-robin dispersal of rows can be based on whether the respective join operation is designated to match null values, for example, where for a join type where a right row having a null join key 2909 is designated as matching with a left row having the null join key. This can be based on a match null key flag being true or false, which can be based on the corresponding query expression, a user configuration, and/or the join type 2521. In cases where the respective join operation is designated to match null values and/or when the respective match null key flag is true, the round-robin row dispersal 2923 is automatically not applied as all null join keyed rows must be processed via the same parallelized process to guarantee query correctness.

In some embodiments, our external hash joins, for example, applied when hash maps 2555 are spilled to disk, are performed based on writing rows to on-disk buckets based on the hash value of the equijoin columns of the row. This can guarantee that matching rows will get spilled to the same bucket, so at End-of-File (eof) processing and/or processing once rows are read from buckets to complete the join process, the join process only has to read one bucket into memory at a time, allowing it to operate with far less memory. In situations where the null-handling strategy 2924 that includes round-robin shuffling of rows having null join keys is selected and/or otherwise makes sense, an external hash join can pick an arbitrary bucket for rows that have null equijoin columns and cannot possibly match with other rows but will get output. Furthermore, when an external join sees a row like this, it could emit the row (padded with nulls) immediately instead of spilling it at all, as long as it has an output data block ready. These buckets can be implemented via the buckets 2735 of FIGS. 27D-27G when the spilling of a hash map 2555 to of FIGS. 27A-27H is performed.

Figure 29D:
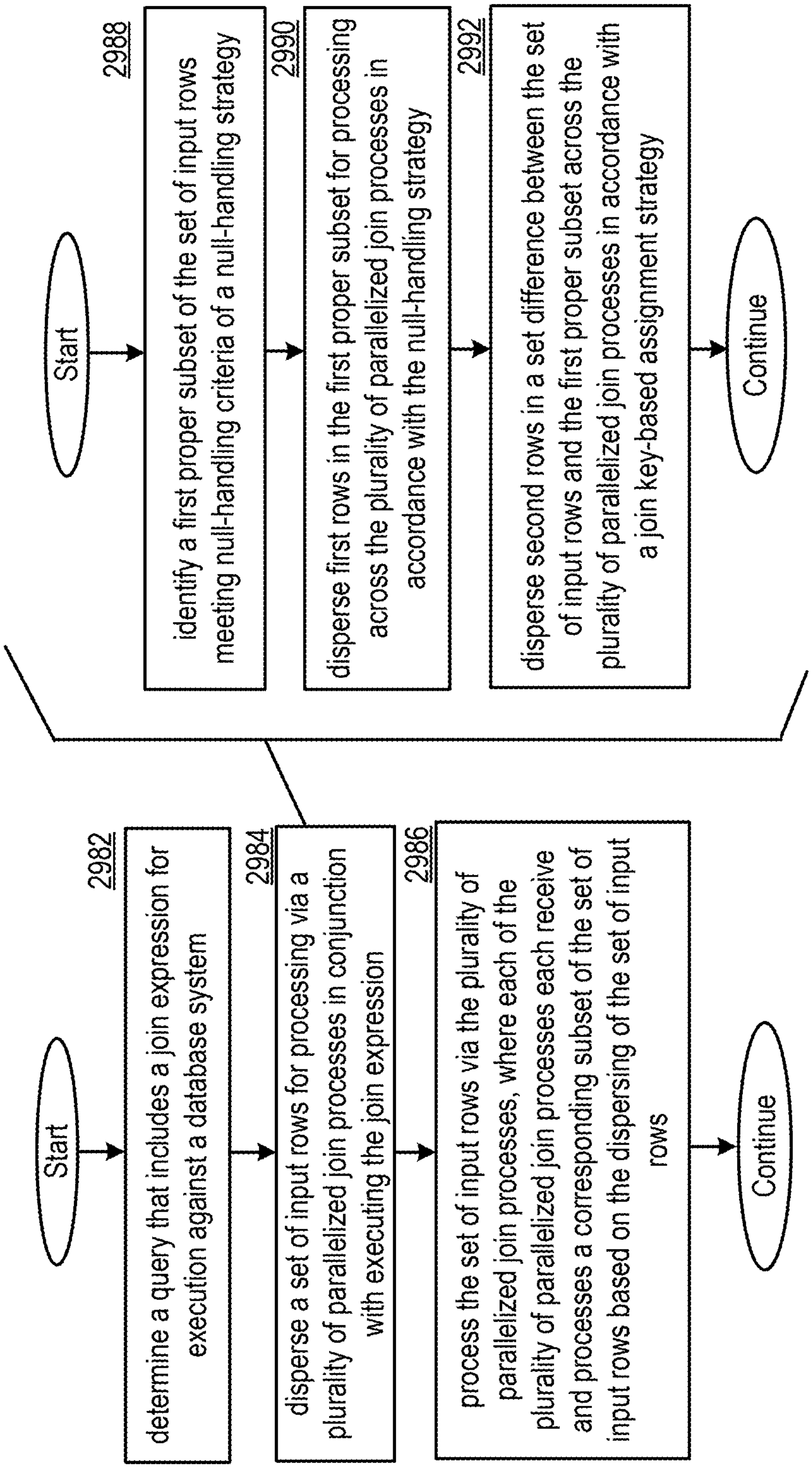
FIG. 29D is a logic diagram illustrating a method for execution in accordance with various embodiments.

FIG. 29D illustrates a method for execution by at least one processing module of a database system 10, such as via query execution module 2504 in executing one or more operators 2520. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29D. In particular, a node 37 can utilize their own query execution memory resources 3045 to execute some or all of the steps of FIG. 29D, where multiple nodes 37 implement their own query processing modules 2435 to independently execute the steps of FIG. 29D for example, to facilitate execution of a query as participants in a query execution plan 2405. Some or all of the steps of 29D can optionally be performed by any other processing module of the database system 10. Some or all of the steps of FIG. 29D can be performed to implement some or all of the functionality of the database system 10 as described in conjunction with FIGS. 29A-29C, for example, by implementing some or all of the functionality of handling rows with null join keys when executing a corresponding join process 2530 having multiple parallelized processes 2553 for a query denoting execution of a corresponding a join expression. Some or all of the steps of FIG. 29D can be performed to implement some or all of the functionality regarding execution of a query via the plurality of nodes in the query execution plan 2405 as described in conjunction with some or all of FIGS. 24A-25F. Some or all steps of FIG. 29D can be performed by database system 10 in accordance with other embodiments of the database system 10 and/or nodes 37 discussed herein. Some or all steps of FIG. 29D can be performed in conjunction with one or more steps of any other method described herein.

Step 2982 includes determining a query that includes a join expression for execution against a database system. Step 2984 includes dispersing a set of input rows for processing via a plurality of parallelized join processes in conjunction with executing the join expression. Step 2986 includes processing the set of input rows via the plurality of parallelized join processes, where each of the plurality of parallelized join processes receives and processes a corresponding subset of the set of input rows based on the dispersing of the set of input rows.

Performing step 2984 can include performing step 2988, step 2990, and/or step 2992. Step 2988 includes identifying a first proper subset of the set of input rows meeting null-handling criteria of a null-handling strategy. Step 2990 includes dispersing first rows in the first proper subset for processing across the plurality of parallelized join processes in accordance with the null-handling strategy. In various examples, the second rows are dispersed differently from the first rows based on the join key-based assignment strategy being different from the null-handling strategy. Step 2992 includes dispersing second rows in a set difference between the set of input rows and the first proper subset across the plurality of parallelized join processes in accordance with a join key-based assignment strategy.

In various examples, a join type of the join expression is one of a plurality of different join types. In various examples, the method includes selecting the null-handling strategy from a plurality of different null-handling strategies for the join expression based on the join type of the join expression, In various examples, the plurality of different null-handling strategies correspond to the plurality of different join types.

In various examples, the plurality of different join types includes at least two of: an inner join type; a left join type; a right join type; a full join type; a semi join type; a reverse semi join type; an anti join type; or an outer join type.

In various examples, each of the set of input rows has a join key. In various examples, each of the plurality of parallelized join processes is assigned a corresponding join key range of a corresponding plurality of join key ranges. In various examples, the plurality of join key are collectively exhaustive with respect to the plurality of possible non-null join keys. In various examples, dispersing the second rows includes assigning each of the second rows to a corresponding one of the plurality of parallelized join processes having the corresponding join key range that includes the join key of the each of the second rows.

In various examples, the join expression is executed based on identifying pairs of rows in the set of input rows having join keys that meet a matching condition for the join expression. In various examples, the set of input rows includes a set of left input rows and a set of right input rows. In various examples, the join key for each left input row in the set of left input rows is based on a column value of the each left input row for a first column of the set of left input rows, and/or the join key for each right input row in the set of right input rows is based on a column value of the each right input row for a second column of the set of right input rows. In various examples, each identified pair is the pairs of rows includes one left input row of the set of left input rows and one right input row of the set of right input rows.

In various examples, the plurality of parallelized processes each include a plurality of sub-processes, wherein each right input row of the set of second rows is sent to and processed by all of the plurality of sub-processes of the given parallelized process having the corresponding join key range that includes the join key of the each right input row, and wherein each left input row of the set of second rows is sent to and processed by exactly one of the plurality of sub-processes of the given parallelized process having the corresponding join key range that includes the join key of the each left input row.

In various examples, dispersing the first rows includes assigning each of the first rows to a corresponding one of the plurality of parallelized join processes to distribute the first rows across the plurality of parallelized join processes in accordance with a uniform distribution. In various examples, the join key of each of the first rows is not included in the corresponding join key range of the corresponding one of the plurality of parallelized join processes to which the each of first rows is assigned. In various examples, the first rows are distributed across the plurality of parallelized join processes in accordance with the uniform distribution based on implementing a round-robin approach to disperse the first rows.

In various embodiments, the first proper subset of the set of input rows includes only rows having a null join key not included in the plurality of possible non-null join keys.

In various embodiments, the method further includes filtering out a second subset of rows included in the first proper subset based on the null-handling strategy, where only rows in a set difference between the first proper subset and the second subset are included in the first rows dispersed for processing across the plurality of parallelized join processes in accordance with the null-handling strategy.

In various examples, the first proper subset is non-null. In various examples, the second subset of rows is null, wherein all rows in the first proper subset of rows are dispersed for processing across the plurality of parallelized join processes in accordance with the null-handling strategy, the second subset of rows is null based on the join expression being implemented as a full join.

In various examples, the second subset includes all of the first proper subset of rows, no rows in the first proper subset of rows are dispersed for processing across the plurality of parallelized join processes in accordance with the null-handling strategy. In various examples, the second subset of rows includes all of the first proper subset of rows based on the join expression being implemented as one of: an inner join, a semi join, or a reverse semi join.

In various examples, the set of input rows includes a set of left input rows and a set of right input rows, where the set of left input rows and the set of right input rows are subsets of the set of input rows and are collectively exhaustive with respect to the set of input rows. In various examples, based on the join expression being implemented as a left join, the second subset of rows includes only rows of the first proper subset included in the set of right input rows and wherein only rows of the first proper subset included in the set of left input rows are dispersed for processing across the plurality of parallelized join processes. In various examples, based on the join expression being implemented as a right join, the second subset of rows includes only rows of the first proper subset included in the set of left input rows and wherein only rows of the first proper subset included in the set of right input rows are dispersed for processing across the plurality of parallelized join processes.

In various examples, the method includes performing an extra shuffle operation upon a set of output rows of the plurality of parallelized join processes, and wherein the extra shuffle operation is performed based on the first rows in the first proper subset having been dispersed for processing across the plurality of parallelized join processes in accordance with the null-handling strategy.

In various examples, the method further includes determining a second query that includes a second join expression for execution against a database system, and determining not to utilize the null-handing strategy for the second query. In various examples, the method further includes dispersing a second set of input rows for processing via a second plurality of parallelized join processes in conjunction with executing the second join expression based on dispersing all of the set of input rows across the second plurality of parallelized join processes in accordance with the join key-based assignment strategy based on determining not to utilize the null-handing strategy for the second query. In various examples, the method further includes processing the second set of input rows via the second plurality of parallelized join processes, where each of the second plurality of parallelized join processes receives and processes a corresponding subset of the set of input rows based on the dispersing of the second set of input rows.

In various examples, the method further includes determining to utilize the null-handling strategy for the query based on: determining an extra shuffle operation is required for performance on output rows of the plurality of parallelized join processes if the null-handing strategy is implemented for the query; determining a first estimated proportion of rows in the set of input rows having a null join key based on determining the extra shuffle operation is required if the null-handing strategy is implemented for the query; and/or determining to utilize the null-handing strategy based on the first estimated proportion meeting, and/or otherwise comparing favorably to, a threshold minimum proportion requirement. In various examples, determining not to utilize the null-handing strategy for the second query is based on: determining the extra shuffle operation is required for performance on output rows of the second plurality of parallelized join processes if the null-handing strategy is implemented for the second query; determining a second estimated proportion of rows in the second set of input rows having the null join key based on determining the extra shuffle operation is required if the null-handing strategy is implemented for the second query; and/or determining not to utilize the null-handing strategy based on the second estimated proportion not meeting, and/or otherwise comparing unfavorably to, the threshold minimum proportion requirement.

In various examples, each of the set of input rows has a join key, wherein all of the first rows have a null join key. In various examples, all of the second rows have a non-null join key that corresponds to one of a plurality of possible non-values. In various examples, processing the set of input rows via the plurality of parallelized join processes includes, based on determining a disk spill condition is met: writing each second row of a subset of the second rows to a corresponding one of a plurality of buckets in disk memory, where, for each value of the plurality of possible non-values, all second rows having the each value are written to a same one of the plurality of buckets based on a deterministic mapping of each non-null join keys to exactly one bucket; and/or writing each first row of a subset of the first rows to an arbitrary one of the plurality of buckets in the disk memory, where different first rows having the null join key are written to different ones of the plurality of buckets based on the null join key not mapping to exactly one bucket, and/or where one of the plurality of buckets includes rows having non-null join keys mapped to the one of the plurality of buckets and further includes a proper subset of the subset of the first rows having the null join key. In various examples, the arbitrary one of the plurality of buckets is selected in accordance with a uniform distribution and/or based on implementing a round-robin scheme.

In various examples, the subset of the first rows is a proper subset of the first rows. In various examples, at least one of the first rows is not written to the arbitrary one of the plurality of buckets in the disk memory based on an output data block being available. In various examples, the at least one of the first rows is padded with null values and emitted via the output data block based on being guaranteed to not match with other rows due to having the null join key.

In various examples, the subset of the second rows includes some or all of the second rows. In various examples, the subset of the first rows includes some or all of the first rows.

In various examples, the plurality of parallelized processes are implemented via a corresponding plurality of nodes each having their own query execution memory resources and their own disk memory resources. In various examples, the disk spill condition is met for one node of the plurality of nodes, wherein the subset of the second rows includes ones of the second rows dispersed to and processed by the one node, and wherein the subset of the first rows includes ones of the first rows dispersed to and processed by the one node.

In various examples, performing the null-handling strategy corresponds to performing a first type of optimization of a set of optimization types to execute the query. In various examples, the method further comprises performing a second type of optimization of the set of optimization types to execute a second query that includes a plurality of CASE statements by performing a single switch operator and a single union operator to execute all of the plurality of CASE statements based on the plurality of CASE statements having an identical predicate. In various examples, the method further comprises performing any other type of optimization for performing join operators and/or other operators described herein in conjunction with performing the same query or other queries.

In various embodiments, any one of more of the various examples listed above are implemented in conjunction with performing some or all steps of FIG. 29D. In various embodiments, any set of the various examples listed above can implemented in tandem, for example, in conjunction with performing some or all steps of FIG. 29D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29D, for example, in conjunction with further implementing any one or more of the various examples described above.

In various embodiments, the operational instructions, when executed by the at least one processor, cause the database system to: determine a query that includes a join expression for execution against a database system; disperse a set of input rows for processing via a plurality of parallelized join processes in conjunction with executing the join expression; and/or process the set of input rows via the plurality of parallelized join processes, where each of the plurality of parallelized join processes receives and processes a corresponding subset of the set of input rows based on the dispersing of the set of input rows. Dispersing the set of input rows for processing via the plurality of parallelized join processes in conjunction with executing the join expression can be based on: identifying a first proper subset of the set of input rows based on a null-handling strategy; dispersing first rows in the first proper subset for processing across the plurality of parallelized join processes in accordance with the null-handling strategy; and/or dispersing second rows in a set difference between the set of input rows and the first proper subset across the plurality of parallelized join processes in accordance with a join key-based assignment strategy, wherein the second rows are dispersed differently from the first rows based on the join key-based assignment strategy being different from the null-handling strategy.

FIGS. 30A-30D illustrate embodiments of a database system 10 operable to efficiently process queries with multiple CASE statements by leveraging cases where CASE statements have identical predicates via query processing system 2510. Some or all features and/or functionality of processing and/or executing queries of FIGS. 30A-30D can implement some or all features and/or functionality of generating and/or executing a query operator execution flow 2517 of FIGS. 24G-24G and/or can be implemented via any embodiment of database system 10 described herein.

FIG. 30A illustrates an embodiment of generating and executing a query operator execution flow 2517 for a query expression 2515 has N CASE statements 3005.1-3005.M. Some or all features and/or functionality of the query operator execution flow 2517 can implement any embodiment of query operator execution flow 2517 described herein.

As used herein, a CASE statement 3005 can correspond to a SQL CASE statement, a switch statement, and/or statement that implements if/then logic via multiple possible conditions with corresponding results. In some embodiments, the CASE statement 3005 can be implemented as a plurality of IF clauses, particular, where ELSE IF clauses are utilized and/or where the set of conditions in the plurality of IF clauses are mutually exclusive and/or where exactly one condition met by an incoming row is selected to determine exactly one corresponding result.

As illustrated in FIG. 30A, each CASE statement 3005 can have a set of conditions 3011.1-3011.L. Different CASE statements 3005 can have the same or different number L of conditions. A given CASE statement 3005's set of conditions 3011.1-3011.L can collectively correspond to the predicate 3017 for the given case statement 3005. The set of conditions 3011.1.1-3011.1.$L_1$ of a first given CASE statement 3005.1 can be mutually exclusive with and/or can have non-null intersection with the set of conditions 3011.2.1-3011.2.$L_2$ of a second given CASE statement 3005.2, where the value of $L_2$ is the same as or different from the value of $L_1$.

Each condition can have a corresponding effect 3012, such as a result and/or value that is returned and/or utilized, and/or another effect, such as one or more operators 2520 that are performed. For example, the CASE statement 3005 dictates what a particular column value and/or other value will be set to as a function of an incoming row, each effect 3012 denotes a literal and/or deterministic function for this value, and where exactly one effect is applied to set the corresponding value based on which exactly one condition 3011 of the set of conditions 3011.1-3011.L is determined to be met. Different CASE statements 3005 can switch upon different column values and/or different output, and/or can otherwise induce different sets of effects. The set of effects 3012.1.1-3012.1.$L_1$ of a first given CASE statement 3005.1 can be mutually exclusive with and/or can have non-null intersection with the set of effects 3012.2.1-3012.2.$L_2$ of a second given CASE statement 3005.2, where the value of $L_2$ is the same as or different from the value of $L_1$.

The number L of conditions 3011.1-3011.L, and number of corresponding possible effects, can be greater than or equal to 2. In the case where L is two, the CASE statement can be implemented in a same or similar fashion as an IF ELSE statement, where the first condition and second condition are mutually exclusive and collectively exhaustive with respect to the input domain and/or where the second condition is the negation of the first condition (e.g. the first condition is col1<10, and the second condition, denoted by ELSE, is thus the negation of this case requiring col1≥10). In cases where L is greater than two, all conditions can be mutually exclusive and/or collectively with respect to the input domain, for example, where an ELSE clause corresponds to the condition where no other ones of the L−1 conditions are met.

The plurality of M CASE statements 3005.1-3005.M can be performed serially based on being implemented in a plurality of serialized portions 3025.1-3025.M in the query operator execution flow 2517. The ordering of serialized portions 3025 of the M CASE statements 3005.1-3005.M in the query operator execution flow can be based on a required execution ordering dictated by the query expression 2515, based on an optimization, and/or based on another determination, for example, where the query expression 2515 does not dictate a required ordering and/or where the operator flow generator module 2514 determines that swapping orderings of some or all CASE statements 3005 results in semantic equivalence guaranteeing query correctness.

Each serialized portion 3025 implementing a given CASE statement can include a switch operator 3021.1, which can be applied to input rows to determine, for each given input row, which one of the plurality of conditions 3011.1-3011.L of the given CASE statement 3005 is met. Serially after the switch operator, a plurality of L parallelized tracks of the query operator execution flow 2517 are implemented, corresponding to the L possible conditions 3011.1-3011.L. Each row is processed via the one or more effect operators 3022 of exactly one of these L parallelized tracks 3024.1-3024.L, for example, based on the switch operator emitting the operator in a column stream to exactly one of the effect operators 3022.1-3022.L according to which one of the plurality of conditions 3011.1-3011.L of the given CASE statement 3005 is met. The one or more one or more effect operators 3022 of a given parallelized track 3024 can include a single operator 2520 and/or multiple operators 2520 in a serialized and/or parallelized ordering along the given parallelized track. The switch operator 3021 can be implemented as a child operator of each of the set of parallelized tracks 3024, such as a child operator of a bottom-most operator 2520 of the effect operators 3022 of each of the set of parallelized tracks 3024.

For example, a first row meeting condition 3011.1 is processed via the one or more effect operators 3022 of the parallelized track 3024.1, and not via any other parallelized tracks 3024.2-3024.L, for example, based on switch operator 3021 emitting the first row for processing via the one or more operators 3022 of the parallelized track 3024.1, for example, in one or more corresponding column streams 2968. Meanwhile, a second row meeting condition 3011.2 is processed via the one or more effect operators 3022 of the parallelized track 3024.2, and not via any other parallelized tracks 3024.1 or 3024.3-3024.L, for example, based on switch operator 3021 emitting the second row for processing via the one or more operators, for example, in one or more corresponding column streams 2968.

A union operator 3023 can be applied after the plurality of parallelized tracks 3024.1-3024.L of a given serialized portion 3025, where the union operator 3023 emits all rows outputted by all effect operators 3022.1-3022.L. Thus, data, such as column values, for all incoming rows to the serialized portion 3025 can be ultimately outputted, after exactly one effect is selected for and applied to each row.

Each serialized portions 3025 can thus be considered a switch block implementing a corresponding CASE statement. As discussed in further detail in conjunction with FIGS. 30C and 30D, a given serialized portion 3025 can be implemented as a switch block merging evaluation of multiple CASE statements, rather than just a single CASE statement, where the M case statements 3005.1-3005.M are optionally evaluated via less than M of these switch blocks.

In the case where multiple CASE statements are implemented, the output rows of one given serialized portion 3025.*i* can be processed as input rows a next given serialized portion 3025.*i*+1 immediately after serialized portion 3025.*i* in the serialized ordering of the query operator execution flow 2517. In particular, the union operator 3023.*i* of the given serialized portion 3025.*i* can be a child operator of the switch operator 3021.*i*+1 of the next given serialized portion 3025.*i*+1 immediately after serialized portion 3025.*i*. In other embodiments, one or more other operators 2520 are optionally implemented between two given serialized portions 3025.*i* and 3021.*i*+1.

As used herein, in the case were all of the set of conditions 3011.1.1-3011.1.$L_1$ of a first given CASE statement 3005.1 match the set of conditions 3011.2.1-3011.2.$L_2$ of a second given CASE statement 3005.2, these CASE statements 3005.1 and 3005.2 can be identified as having the identical predicates. When one or more of the set of conditions 3011.1.1-3011.1.$L_1$ of a first given CASE statement 3005.1 do not match the set of conditions 3011.2.1-3011.2.$L_2$ of a second case statement, these CASE statements 3005.1 and 3005.2 can be identified as not having identical predicates. Note that more than two CASE statements 3005 can have the same identical predicate, where some or all of the set of M CASE statements 3005.1-3005.M can be identified as having the same identical predicate, and or where multiple identical predicates are identified in multiple different discrete proper subsets of the set of M CASE statements 3005.1-3005.M. Some CASE statements 3005 of the set of M CASE statements 3005.1-3005.M may have a predicate 3017 that is identical with no predicates of any other statements 3005 of the set of M CASE statements 3005.1-3005.M. Note that a set of CASE statements 3005 having identical predicates can thus have the same number L of CASE statements.

FIG. 30B illustrates an example of a query request 2515 that includes a set of multiple CASE statements 3005 that includes at least a first CASE statement 3005.1 and a second CASE statement 3005.2 having an identical predicate 3027. Some or all features and/or functionality of the query request 2515 and/or CASE statements 3005 of FIG. 30B can implement the query request 2515 and/or some or all CASE statements 3005 of FIG. 30A, and/or any other embodiment of query request 2515 and/or CASE statements 3005 described herein.

The query request 2515 can be expressed as a SQL expression in the SQL language as illustrated in the example of FIG. 30B, and/or can be expressed in any other query language and/or as any other instruction for execution against one or more tables stored by database system 10.

In this example, due to the first CASE statement 3005.1 and a second CASE statement 3005.2 having an identical predicate 3027, a given row processed by the corresponding expression that meets a given condition 3011.1.*x* of the first CASE statement 3005.1 will thus meet the given condition 3011.1.*x* of the second CASE statement 3005.1, and therefore induce both corresponding effect 3012.1.*x* and 3012.2.*x*.

Note that in some embodiments, identical ordering of conditions 3011 in two CASE statements 3005.1 and CASE statement 3005.2 in the query request 2515 is not required for these CASE statements 3005.1 and 3005.2 to both have the identical predicate 3027, where the given row processed by the corresponding expression that meets a given condition 3011.1.*x* of the first CASE statement 3005.1 will thus meet the matching condition 3011.2.*y* second CASE statement 3005.2, where condition 3011.2.*y* is ordered differently in the set of conditions of the second CASE statement 3005.2 than the ordering of condition 3011.1.*x* in the set of conditions of the first CASE statement 3005.1. In particular, the sets of conditions 3011.1.1-3011.1.L of a first predicate 3017.1 can be evaluated for set equality with other sets of conditions 3011.1.1-3011.1.L of a second predicate 3017.2, independent of ordering, to determine if these predicates 3017.1 and 3017.2 are identical.

Consider an example where a first incoming row row1 has a col1 value of 12, and wherein a second incoming row row2 has a col1 value of 6. The output generated for row1 in this example would include the values (3, 6), and the output generated for row2 in this example would include the values (2, 18). For example, these output pairs of values can correspond to column values for a corresponding set of new columns, an array structure corresponding to one new column, and/or other output included in, and/or further processed to generate, the query resultant outputted via execution of the full query operator execution flow 2517.

FIG. 30C illustrates an example of leveraging identical predicates 3027 when generating a query operator execution flow 2517 for execution based on including multiple sets of effects 3012.1-3012.L of multiple CASE statements along a same set of parallelized tracks 3024.1-3024.L of a same set of conditions 3011.1-3011.L shared by all predicates 3017 of the multiple CASE statements. Some or all features and/or functionality of the operator flow generator module 2514 and/or the query operator execution flow 2517 can implement any embodiment of operator flow generator module 2514 and/or query operator execution flow 2517 described herein.

In some embodiments of building query operator execution flow 2517, when a query expression 2515 has M CASE statements, many switch blocks can have identical predicates. Handling these CASE statements one at a time can be less efficient than merging processing of CASE statements having the same predicate. In the case where multiple CASE statements have the same predicate it can be inefficient for each switch block to evaluate the predicate independently on the input, and then copy each row manually out to the applicable parent's output branch. For example, switch blocks do not change the input values, per above, so in the case where N switch statements have identical predicates, these operations would thus happen N−1 more times than necessary.

For example rather than handling CASE statements having identical predicates via an equal number of corresponding serialized portions 3025 as illustrated in FIG. 30A, where a switch operator 3021 and union operator 3023 is applied for every CASE statement to disperse rows across parallelized tracks 3024 and then recombine the rows from the different parallelized paths, multiple CASE statements having the same predicate 3017 can instead be into a same serialized portion 3035 having only one shared switch operator 3021 and union operator 3023, where all effects are applied across the set of parallelized paths 3024 in accordance with which condition they are mapped to. The correctness of this transformation can follow from the equivalence of the predicates involved, which implies that there is a one-to-one correspondence of branches for a given conditional branch in each switch block.

As a particular example, for a query request 2515 that includes 30 CASE statements 3005.1-3005.30, all having the same identical predicate 3027, it can be more efficient to process this query via merging of all 30 sets of effects 3012 into a same set of parallel tracks 3024 extending from a same switch operator 3021 and emitting to a same union operator 3023 in a single serialized portion 3025 versus processing all 30 case statements via 30 serialized portions 3025 each applying its own switch operator 3021 and union operator 3023.

As illustrated in FIG. 30C, the operator flow generator module 2514 can implement a matching predicate identification module 3028 to identify any sets of CASE statements having matching predicates, if any. In this example, H identical predicates 3027.1-3027.H are identified, where each identical predicate 3027 is shared by two or more CASE statements. In this example, at least CASE statements 3005.1 and 3005.4 share identical predicate 3027.1, and at least CASE statements 3005.2 and 3005.6 share identical predicate 3027.H.

In some cases, such as that illustrated in the example of FIG. 30C, more than one identical predicate 3027 is identified, where at least different identical predicates 3027 are identified that are non-identical to each other, and where a set of CASE statements having a given identical predicate 3027 has a null intersection with all other sets of CASE statements having another given identical predicate 3027. All M CASE statements can share an identical predicate 3027 with at least one other CASE statements, or one or more CASE statements optionally have predicates shared with no other CASE statements. Different identical predicates 3027 can have the same or different numbers L of conditions 3011, where the $L_1$ is the same or different from $L_H$.

In other cases, only one identical predicate 3027 is shared by two or more CASE statements, where remaining CASE statements, if any, have predicates shared with no other CASE statements. In other cases, predicate 3027 is shared by two or more CASE statements, where all CASE statements have predicates shared with no other CASE statements.

The operator flow generator module 2514 can further implement a CASE statement merging module 3029 that generates a query operator execution flow 2517 by merging each given set of CASE statements having a shared identical predicate 3027 into a same serialized portion 3025. Each parallelized track 3024 of a given serialized portion 3025 that merges a given set of multiple CASE statements having a given identical predicate 3027 can thus have multiple, serialized effect operators 3022 corresponding to effect operators for the corresponding condition 3011 for all CASE statements in this set of multiple CASE statements having a given identical predicate 3027.

In such embodiments where identical predicates are merged via implementing matching predicate identification module 3028 and/or CASE statement merging module 3029, the case illustrated in FIG. 30A where each of the M CASE statements 3005.1-3005.M is implemented via its own switch block where M different serialized portions 3024.1-3024.M are implemented can occur as a result of no pairs of CASE statements 3005.1-3005.M having identical predicates, or pairs of non-adjacent CASE statements having identical predicates not being able to be moved together into a same serialized portion 3025 due to such as shift violating a required ordering of evaluating these CASE statements required for query correctness as dictated by the corresponding query expression.

FIG. 30D illustrates an example of a CASE statement merging module 3029 that generates query operator execution flow 2517 based on updating an initial query operator execution flow 2517. This can include switching ordering of CASE statements and/or removing union operators 3023 and/or switch operators 3021 to merge two or more different switch blocks implemented via multiple different serialized portions 3025 into a same switch block implemented via a same, single serialized portion 3025. Some or all features and/or functionality of generating an updated query operator execution flow 2517 of FIG. 30D can be implemented by the operator execution flow generator module 2514 of FIG. 30C and/or any embodiment of operator execution flow generator module 2514 described herein.

In some embodiments, the CASE statement merging module 3029 and/or the matching predicate identification module 3028 of the operator flow generator module 2514 performs this merging of CASE statements to generate an updated query operator execution flow 2517 from an initial query operator execution flow based on following some or all of the following procedure:

1. While any eligible switch blocks exist for merging, take one switch block X one
2. Traverse X's eligible parents until another switch block Y with an identical predicate 3027 with switch block X is identified
3. Continue (e.g., skip merging of switch block X) if no switch block Y with a matching predicate is identified, and/or a non-eligible parent is reached (e.g one that cannot be moved in the step 4 below due to violating query correctness and/or for another reason)
4. Move all operators between switch block X and switch block Y in the query operator execution flow 2517 so that switch block X's union operator 3023 and Y's switch operator 3021 are adjacent;
5. Delete M's switch union and N's switch operator, and splice the corresponding parallelized branches 3024 in switch block X and switch block Y.

In some embodiments, the above steps 1-5 can be re-performed, for example, from bottom up and/or otherwise until all candidate switch block are evaluated.

In the example of FIG. 30D, based on CASE statements 3005.1 and 3005.2 having identical predicate 3027.1, version i of the query operator execution flow 2517.*i*, such as the initial version and/or a previously updated version based on having previously merged other switch blocks, is updated via CASE statement merging module 3029 to merge their respective switch blocks by removing union operator 3023.1 and switch operator 3021.2, where the updated flow dictates output of effect operators 3022.1.1-3022.1.$L_1$ is routed directly to effect operators 3022.2.1-3022.2.1. For example, effect operators 3022.1.1 becomes a direct child of effect operator 3022.2.1, effect operator 3022.1.2 becomes a direct child of effect operator 3022.2.2, and so on. In other examples, the operators are reordered to enable CASE statements with identical predicates to be adjacent, when they were previously non-adjacent, to enable this merging of parallelized branches. Further updates to the query operator execution flow 2517 can cause further effect operators to be merged in these parallelized tracks for additional CASE statements having the identical predicate 3027.1. This update can be performed based on following some or all of steps 1-5 of the example procedure above.

FIG. 30E illustrates a method for execution by at least one processing module of a database system 10, such as via query execution module 2504 in executing one or more operators 2520. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30E. In particular, a node 37 can utilize their own query execution memory resources 3045 to execute some or all of the steps of FIG. 30E, where multiple nodes 37 implement their own query processing modules 2435 to independently execute the steps of FIG. 30E for example, to facilitate execution of a query as participants in a query execution plan 2405. Some or all of the steps of FIG. 30E can optionally be performed by any other processing module of the database system 10. Some or all of the steps of FIG. 30E can be performed to implement some or all of the functionality of the database system 10 as described in conjunction with FIGS. 30A-30D, for example, by implementing some or all of the functionality of generating and/or executing a query operator execution flow 2517 for a query having multiple CASE statements where some or all of the multiple CASE statements have identical predicates. Some or all of the steps of FIG. 30E can be performed to implement some or all of the functionality regarding execution of a query via the plurality of nodes in the query execution plan 2405 as described in conjunction with some or all of FIGS. 24A-25F. Some or all steps of FIG. 30E can be performed by database system 10 in accordance with other embodiments of the database system 10 and/or nodes 37 discussed herein. Some or all steps of FIG. 30E can be performed in conjunction with one or more steps of any other method described herein.

Step 3082 includes determining a query for execution that includes a plurality of CASE statements. In various examples, each CASE statement of the plurality of CASE statements includes a corresponding predicate that includes a set of conditions each inducing a corresponding one of a set of effects.

Step 3084 includes generating a query operator execution flow for the query. Performing step 3084 can include performing step 3088 and/or 3090. Step 3088 includes identifying an identical predicate included in multiple corresponding CASE statements. Step 3090 includes generating a set of parallelized tracks of the query operator execution flow based on identifying the identical predicate. In various examples, each parallelized track in the set of parallelized tracks corresponds to a corresponding condition of the set of conditions of the identical predicate. In various examples, each parallelized track of the set of parallelized tracks includes a serialized plurality of operators. In various examples, the serialized plurality of operators for the each parallelized track induces all effects across the multiple corresponding CASE statements that are induced by the corresponding condition of the set of conditions of the identical predicate.

Step 3086 includes executing the plurality of CASE statements in conjunction with execution the query utilizing the query operator execution flow. In various embodiments, executing the plurality of CASE statements includes executing the multiple corresponding CASE statements based on, for each row of a plurality of input rows, processing the each row via serially performing each of the serialized plurality of operators of exactly one of the set of parallelized tracks.

In various examples, the multiple CASE statements includes all of the plurality of CASE statements. In various examples, the multiple CASE statements includes a proper subset of the plurality of CASE statements.

In various examples, the identical predicate is identified based on the multiple corresponding CASE statements including a same set of conditions. In various examples, executing the multiple corresponding CASE statements in conjunction with execution the query utilizing the query operator execution flow is further based on selecting the exactly one of the set of parallelized tracks for the each row based on determining the each row satisfies one of the same set of conditions corresponding to the exactly one of the set of parallelized tracks.

In various examples, the each of the conditions of the same set of conditions are mutually exclusive and collectively exhaustive with respect to a domain corresponding to all possible input rows. In various examples, any incoming row is guaranteed to satisfy exactly one of the same set of conditions based on the same set of conditions are mutually exclusive and collectively exhaustive with respect to the domain.

In various examples, the same set of conditions includes two conditions. In various examples, a first one of the two conditions corresponds to when a given condition is true, and wherein a second one of the two conditions corresponds to when a given condition is false. In various examples, the first one of the two conditions is denoted in a corresponding query with a WHEN clause and/or the second one of the two conditions is denoted in a corresponding query with an ELSE clause.

In various example, in a first CASE statement of the multiple corresponding CASE statement, each of the same set of conditions induces a corresponding one of a first set of effects, while, in a second CASE statement of the multiple corresponding CASE statement, each of the same set of conditions induces a corresponding one of a second set of effects. In various examples, a set difference between the first set of effects and the second set of effects is non-null. In various examples, a set difference between the first set of effects and the second set of effects is null.

In various examples, at least one of the same set of conditions is a function of at least one column value of at least one column of the each input row. In various examples, at least one of the set of effects of at least one of the plurality of CASE statements is a function of at least one column value of at least one column of the each input row.

In various examples, generating the query operator execution flow for the query is further based on including a single switch operator serially before the set of parallelized tracks. In various examples, the exactly one of the set of parallelized tracks is selected for the each row based on executing the single switch operator upon the each row.

In various examples, the multiple CASE statements includes only a first proper subset of the plurality of CASE statements. In various examples, a second proper subset of the plurality of CASE statements have corresponding predicates different from the identical predicate. In various examples, the query operator execution flow for the query includes the single switch operator and the set of parallelized tracks in a first one of a plurality of serialized portions of the query operator execution flow.

In various examples, the query operator execution flow for the query is further generated based on including a set of additional CASE statements in a corresponding set of other serialized portions of the plurality of serialized portions. In various examples, the first one of a plurality of serialized portions is serially before all of the set of other serialized portions, serially after all of the set of other serialized portions, or serially after a first proper subset of the set of serialized portions and serially after a second proper of the set of other serialized portions. In various examples, the set of additional CASE statements includes more than one additional CASE statement.

In various examples, a second CASE statement is implemented via a second serialized portion of the set of other serialized portions based on the one corresponding serialized portion of the set of other serialized portions including a second single switch operator; and/or a second set of parallelized tracks after the second switch operator. In various examples, exactly one of the second set of parallelized tracks is selected for each input row to the one corresponding serialized portion based on executing the single switch operator upon the each input row.

In various examples, the first one of a plurality of serialized portions includes a first union operator applied to output of the set of parallelized tracks, where the first union operator emits first output rows. In various examples, the second serialized portion includes a second union operator applied to output of the second set of parallelized tracks, where the second union operator emits second output rows. In various examples, the second output rows are input rows to the first switch operator based on the second serialized portion being immediately before the first serialized portion in the query operator execution flow, or the first output rows are input rows to the second switch operator based on the first serialized portion being immediately before the second serialized portion in the query operator execution flow.

In various examples, the query operator execution flow for the query is further generated based on identifying a second identical predicate included in second multiple corresponding CASE statements of the set of additional CASE statements, wherein the second identical predicate is different from the identical predicate. In various examples, based on identifying the second identical predicate, a second set of parallelized tracks of the query operator execution flow serially after a single second switch operator are generated, wherein each second parallelized track in the second set of parallelized tracks corresponds to a second corresponding condition of a second set of conditions of the second identical predicate. In various examples, each parallelized track of the second set of parallelized tracks includes another serialized plurality of operators, wherein the serialized plurality of operators for the each second parallelized track induces all effects across the second multiple corresponding CASE statements that are induced by the second corresponding condition of the second set of conditions. In various examples, the single second switch operator and the second set of parallelized tracks of the query operator execution flow are included in a second serialized portion of the corresponding set of other serialized portions.

In various examples, the plurality of CASE statements are executed via a set of switch operators of the query operator execution flow. In various examples, a number of switch operators in the set of switch operators is strictly less than a number of CASE statements in the plurality of CASE statements based on at least two of the plurality of CASE statements having the identical predicate.

In various examples, generating the query operator execution flow for the query is further based on determining an initial query operator execution flow that includes a plurality of switch operators corresponding to the plurality of CASE statements in accordance with an ordering. In various examples, generating the query operator execution flow for the query is further based on processing each switch operator of a set of the plurality of switch operators, in accordance with the ordering, based on, for the each switch operator. In various examples, generating the query operator execution flow for the query is further based on traversing remaining ones of the plurality of switch operators serially after the each switch operator in the ordering to identify whether any ones of the plurality of switch operators serially after the each switch operators have corresponding predicates identical to a predicate corresponding to the each switch operator.

In various examples, generating the query operator execution flow for the query is further based on, when there is at least one of the plurality of switch operators serially after the each switch operators having corresponding predicates identical to the predicate corresponding to the each switch operator, updating the initial query operator execution flow. In various example updating the initial query operator execution flow is based on removing the at least one of the plurality of switch operators from the plurality of switch operators and/or including a set of parallelized operators corresponding to the set of effects of the at least one of the plurality of switch operators in parallelized tracks immediately after the each switch operator. In various examples, the parallelized tracks immediately after the each switch operator each include more than one operator to induce more than one effect based on there being the at least one of the plurality of switch operators having the corresponding predicates identical to the predicate corresponding to the each switch operator.

In various examples, processing a first switch operator includes identifying a second switch operator after the one switch operator having the identical predicate with the one switch operator; moving all operators between the first switch operator and the second switch operator to render a first union operator corresponding to the first switch operator being immediately before the second switch operator; and/or removing the first union operator and the second switch operator to splice a first set of parallelized branches immediately after the first switch operator and immediately before the first union operator with a second set of parallelized branches immediately after the second switch operator and immediately before a second union operator corresponding to the second switch operator. In various examples, the set of parallelized tracks include the first set of parallelized branches immediately followed by the second set of parallelized branches based on removing the first union operator and the second switch operator.

In various examples, the set of the plurality of switch operators includes all but a final switch operators in the ordering that were not identified as having identical predicates with any prior switch operators in the ordering.

In various examples, a set of multiple values are emitted for the each row based on executing the multiple corresponding CASE statements in conjunction with execution the query.

In various examples, the each CASE statement is in accordance with Structured Query Language (SQL) based on the query being indicated by a corresponding SQL expression.

In various embodiments, any one of more of the various examples listed above are implemented in conjunction with performing some or all steps of FIG. 30E. In various embodiments, any set of the various examples listed above can implemented in tandem, for example, in conjunction with performing some or all steps of FIG. 30E.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30E, for example, in conjunction with further implementing any one or more of the various examples described above.

In various embodiments, the operational instructions, when executed by the at least one processor, cause the database system to: determine a query for execution that includes a plurality of CASE statements and/or generate a query operator execution flow for the query. Each CASE statement of the plurality of CASE statements can include a corresponding predicate that includes a set of conditions each inducing a corresponding one of a set of effects. Generating the query operator execution flow for the query can be based on identifying an identical predicate included in multiple corresponding CASE statements; and/or based on identifying the identical predicate, generating a set of parallelized tracks of the query operator execution flow. Each parallelized track in the set of parallelized tracks can correspond to a corresponding condition of the set of conditions of the identical predicate. Each parallelized track of the set of parallelized tracks includes a serialized plurality of operators. The serialized plurality of operators for the each parallelized track can induce all effects across the multiple corresponding CASE statements that are induced by the corresponding condition of the set of conditions of the identical predicate. The operational instructions, when executed by the at least one processor, can further cause the database system to: execute the multiple corresponding CASE statements in conjunction with execution the query utilizing the query operator execution flow based on, for each row of a plurality of input rows, processing the each row via serially performing each of the serialized plurality of operators of exactly one of the set of parallelized tracks.

As used herein, an "AND operator" can correspond to any operator implementing logical conjunction. As used herein, an "OR operator" can correspond to any operator implementing logical disjunction.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c" and/or "a" "b" and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A query and response sub-system of a database system, wherein the query and response sub-system comprises:

a plurality of computing devices, wherein a computing device of the plurality of computing devices is operably coupled to:

identify a first switch block operator in a non-final query plan regarding a massive scale query, wherein the first switch block operator includes a CASE statement that includes a predicate, wherein the non-final query plan includes a plurality of query operators that is organized into a non-final query operation execution flow, and wherein the first switch block operator is one of the plurality of query operators;

in accordance with the non-final query execution flow, identify a second switch block operator within the plurality of query operators, wherein the second switch block operator includes a second CASE statement;

determine whether a predicate of the second switch block operator is substantially similar to the predicate of the first switch block operator; and when the predicate of the second switch block operator is substantially similar to the predicate of the first switch block operator;

merge the first and second switch block operators to produce a merged switch block operator;

adjust the non-final query plan to remove the first and second switch block operators and to include the merged switch block operator to create an updated query plan;

partition the updated query plan into a low level portion, an inner level portion, and a root level portion;

generate a plurality of copies of the low level portion and of the inner level portion;

send the plurality of copies of the low level portion and of the inner level portion to a plurality of computing device clusters of a store and compute sub-system of the database system;

receive a plurality of inner level results from the plurality of computing device clusters; and execute the root level portion on the plurality of inner level results to produce a root level result.

2. The query and response sub-system of claim 1 further comprises:

the first switch block includes a first SELECT statement and the CASE statement, wherein the CASE statement includes the predicate that provides a condition, a first THEN result, and a first ELSE result; and the second switch block includes a second SELECT statement and the second CASE statement, wherein the second CASE statement includes the predicate that provides the condition, a second THEN result, and a second ELSE result.

3. The query and response sub-system of claim 2, wherein the merged switch block operator comprises:

a merged SELECT statement and a merged CASE statement, wherein the merged CASE statement includes the predicate that provides the condition, the first THEN result, the first ELSE result, the second THEN result, and the second ELSE result.

4. The query and response sub-system of claim 1 further comprises:

the first switch block includes a first SELECT statement and the CASE statement, wherein the CASE statement includes the predicate that provides a condition, a first THEN result, a second predicate that provides a second condition, a third THEN result, and a first ELSE result; and the second switch block includes a second SELECT statement and the second CASE statement, wherein the second CASE statement includes the predicate that provides the condition, a second THEN result, the second predicate that provides the second condition, a fifth THEN result, and a second ELSE result.

5. The query and response sub-system of claim 1, wherein the computing device, or portion thereof, is further operable to adjust the non-final query plan by:

removing a UNION statement regarding the first and second switch block operators.

6. The query and response sub-system of claim 1 further comprises at least one of:

the updated query plan includes an updated query execution flow; and a query operator of the plurality of query operators include one or more operational instructions regarding a query operation.

7. The query and response sub-system of claim 1, wherein the computing device, or a portion thereof, is further operable to identify the second switch block operator by:

traversing the non-final query execution flow to a parent operator of the plurality of operators;

determining whether the parent operator is a non-eligible parent;

when the parent operator is an eligible parent, determining whether the parent operator is a switch block operator.

8. The query and response sub-system of claim 1 further comprises:

the computing device is in a set of computing devices of the plurality of computing devices, wherein set of computing devices assists the computing device in generating the updated query plan.

9. The query and response sub-system of claim 1, wherein the computing device, or portion thereof, is further operable to:

in accordance with the non-final query execution flow, identify a third switch block operator within the plurality of query operators, wherein the third switch block operator includes a third CASE statement;

determine whether a predicate of the third switch block operator is substantially similar to the predicate of the first switch block operator;

when the predicate of the third switch block operator is substantially similar to the predicate of the first switch block operator:

merge the first, second, and third switch block operators to produce the merged switch block operator; and adjust the non-final query plan to remove the first, second, and third switch block operators and to include the merged switch block operator to create an updated query plan.

10. A computer readable memory comprises:

a first memory that stores operational instructions that, when executed by a computing device of a plurality of computing devices of a query and response sub-system of a database system, causes the computing device to:

identify a first switch block operator in a non-final query plan regarding a massive scale query, wherein the first switch block operator includes a CASE statement that includes a predicate, wherein the non-final query plan includes a plurality of query operators that is organized into a non-final query operation execution flow, and wherein the first switch block operator is one of the plurality of query operators;

in accordance with the non-final query execution flow, identify a second switch block operator within the plurality of query operators, wherein the second switch block operator includes a second CASE statement;

a second memory that stores operational instructions that, when executed by the computing device, causes the computing device to:

determine whether a predicate of the second switch block operator is substantially similar to the predicate of the first switch block operator; and when the predicate of the second switch block operator is substantially similar to the predicate of the first switch block operator;

merge the first and second switch block operators to produce a merged switch block operator;

adjust the non-final query plan to remove the first and second switch block operators and to include the merged switch block operator to create an updated query plan;

partition the updated query plan into a low level portion, an inner level portion, and a root level portion;

generate a plurality of copies of the low level portion and of the inner level portion;

send the plurality of copies of the low level portion and of the inner level portion to a plurality of computing device clusters of a store and compute sub-system of the database system;

receive a plurality of inner level results from the plurality of computing device clusters; and execute the root level portion on the plurality of inner level results to produce a root level result.

11. The computer readable memory of claim 10 further comprises:

the first switch block includes a first SELECT statement and the CASE statement, wherein the CASE statement includes the predicate that provides a condition, a first THEN result, and a first ELSE result; and the second switch block includes a second SELECT statement and the second CASE statement, wherein the second CASE statement includes the predicate that provides the condition, a second THEN result, and a second ELSE result.

12. The computer readable memory of claim 11, wherein the merged switch block operator comprises:

a merged SELECT statement and a merged CASE statement, wherein the merged CASE statement includes the predicate that provides the condition, the first THEN result, the first ELSE result, the second THEN result, and the second ELSE result.

13. The computer readable memory of claim 10 further comprises:

the first switch block includes a first SELECT statement and the CASE statement, wherein the CASE statement includes the predicate that provides a condition, a first THEN result, a second predicate that provides a second condition, a third THEN result, and a first ELSE result; and the second switch block includes a second SELECT statement and the second CASE statement, wherein the second CASE statement includes the predicate that provides the condition, a second THEN result, the second predicate that provides the second condition, a fifth THEN result, and a second ELSE result.

14. The computer readable memory of claim 10, wherein the computing device, or portion thereof, is further operable to adjust the non-final query plan by:

removing a UNION statement regarding the first and second switch block operators.

15. The computer readable memory of claim 10 further comprises at least one of:

the updated query plan includes an updated query execution flow; and a query operator of the plurality of query operators include one or more operational instructions regarding a query operation.

16. The computer readable memory of claim 10, wherein the first memory further stores operational instructions that, when executed by the computing device, causes the computing device to identify the second switch block operator by:

traversing the non-final query execution flow to a parent operator of the plurality of operators;

determining whether the parent operator is a non-eligible parent;

when the parent operator is an eligible parent, determining whether the parent operator is a switch block operator.

17. The computer readable memory of claim 10 further comprises:

the computing device is in a set of computing devices of the plurality of computing devices, wherein set of computing devices assists the computing device in generating the updated query plan.

18. The computer readable memory of claim 10 further comprises:

the first memory further stores operational instructions that, when executed by the computing device, causes the computing device to:

in accordance with the non-final query execution flow, identify a third switch block operator within the plurality of query operators, wherein the third switch block operator includes a third CASE statement;

the second memory further stores operational instructions that, when executed by the computing device, causes the computing device to:

determine whether a predicate of the third switch block operator is substantially similar to the predicate of the first switch block operator;

when the predicate of the third switch block operator is substantially similar to the predicate of the first switch block operator:

merge the first, second, and third switch block operators to produce the merged switch block operator; and adjust the non-final query plan to remove the first, second, and third switch block operators and to include the merged switch block operator to create an updated query plan.

* * * * *